United States Patent
Jiang et al.

(10) Patent No.: US 7,294,681 B2
(45) Date of Patent: *Nov. 13, 2007

(54) MUTLIPLE CATALYST SYSTEM FOR OLEFIN POLYMERIZATION AND POLYMERS PRODUCED THEREFROM

(75) Inventors: Peijun Jiang, League City, TX (US); Armenag Hagop Dekmezian, Kingwood, TX (US); Jo Ann Marie Canich, Houston, TX (US); Charles Lewis Sims, Houston, TX (US); Ramin Abhari, Friendswood, TX (US); Cesar Alberto Garcia-Franco, Houston, TX (US); David Raymond Johnsrud, Humble, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/687,508

(22) Filed: Oct. 15, 2003

(65) Prior Publication Data

US 2004/0138392 A1    Jul. 15, 2004

Related U.S. Application Data

(60) Provisional application No. 60/460,714, filed on Apr. 4, 2003, provisional application No. 60/418,482, filed on Oct. 15, 2002.

(51) Int. Cl.
C08F 210/06 (2006.01)
C08F 210/18 (2006.01)
C08F 4/646 (2006.01)
C08F 4/6392 (2006.01)

(52) U.S. Cl. .................. 526/348.2; 526/114; 526/116; 526/160; 526/165; 526/336; 526/337; 526/943

(58) Field of Classification Search ................ 525/240, 525/245, 247; 526/113, 116, 114, 160, 165, 526/348.2, 336, 337, 943
See application file for complete search history.

(56) References Cited

U.S. PATENT DOCUMENTS

| | | | |
|---|---|---|---|
| 1,953,104 A | 4/1934 | Hale-Church et al. | |
| 3,821,143 A | 6/1974 | Cluff et al. | |
| 3,954,697 A | 5/1976 | McConnell et al. | |
| 4,178,272 A | 12/1979 | Meyer, Jr. et al. | |
| 4,205,021 A | 5/1980 | Morita et al. | |
| 4,217,428 A | 8/1980 | McConnell et al. | |
| 4,496,698 A | 1/1985 | Adriaans et al. | |
| 4,525,469 A | 6/1985 | Ueda et al. | |
| 4,547,552 A | 10/1985 | Toyota et al. | |
| 4,668,752 A | 5/1987 | Tominari et al. | |
| 4,668,753 A | 5/1987 | Kashiwa et al. | |
| 4,668,834 A | 5/1987 | Rim et al. | |
| 4,673,719 A | 6/1987 | Kioka et al. | |
| 4,675,247 A | 6/1987 | Kitamura et al. | |
| 4,701,432 A | 10/1987 | Welborn, Jr. | |
| 4,794,096 A | 12/1988 | Ewen | |
| 4,849,487 A | 7/1989 | Kaminsky et al. | |
| 4,882,406 A | 11/1989 | Cozewith et al. | |
| 4,892,851 A | 1/1990 | Ewen et al. | |
| 4,935,474 A | 6/1990 | Ewen et al. | |
| 4,937,299 A | 6/1990 | Ewen et al. | |
| 4,939,217 A | 7/1990 | Stricklen | |
| 4,950,720 A | 8/1990 | Randall, Jr. et al. | |
| 4,975,403 A | 12/1990 | Ewen | |
| 4,981,760 A | 1/1991 | Naito et al. | |
| 5,008,356 A | 4/1991 | Ishimaru et al. | |
| 5,021,257 A | 6/1991 | Foster et al. | |
| 5,035,283 A | 7/1991 | Brücher et al. | |
| 5,036,034 A | 7/1991 | Ewen | |
| 5,039,614 A | 8/1991 | Dekmezian et al. | |
| 5,091,352 A | 2/1992 | Kioka et al. | |
| 5,096,743 A | 3/1992 | Schoenbeck | |
| 5,114,897 A | 5/1992 | Schell, Jr. et al. | |
| 5,115,030 A | 5/1992 | Tanuka et al. | |
| 5,151,474 A | 9/1992 | Lange et al. | |
| 5,155,080 A | 10/1992 | Elder et al. | |
| 5,171,799 A | 12/1992 | Kioka et al. | |
| 5,212,247 A | 5/1993 | Asanuma et al. | |
| 5,216,095 A | 6/1993 | Dolle et al. | |
| 5,218,071 A | 6/1993 | Tsutsui et al. | |
| 5,225,500 A | 7/1993 | Elder et al. | |
| 5,231,126 A | 7/1993 | Shi et al. ..................... 524/296 |
| 5,272,236 A | 12/1993 | Lai et al. | |
| 5,308,817 A | 5/1994 | Reddy et al. | |
| 5,314,956 A | 5/1994 | Asanuma et al. | |

(Continued)

FOREIGN PATENT DOCUMENTS

| | | |
|---|---|---|
| CA | 2157806 | 3/1997 |
| CA | 2407183 | 4/2003 |
| DE | 2316614 | 10/1973 |
| DE | 19960411 | 7/2001 |
| DE | 19963585 | 7/2001 |

(Continued)

OTHER PUBLICATIONS

De Souza, et al., "Recent Advances in Olefin Polymerization Using Binary Catalyst Systems", *Macromol. Rapid Commun.*, 2001, 22, pp. 1293-1301.

Chen, et al., "Cocatalysts for Metal-Catalyzed Olefin Polymerization: Activators, Activation Processes, and Structure-Activity Relationships", *Chem. Rev.*, 2000, 100, pp. 1391-1434.

Resconi, et al., "Selectivity in Propene Polymerization with Metallocene Catalysts", *Chem. Rev.*, 2000, pp. 1253-1345.

(Continued)

*Primary Examiner*—Caixia Lu

(57) ABSTRACT

This invention relates to a polymer of one or more C3 to C40 olefins, optionally one or more diolefins, and less than 15 mole % of ethylene, and polymerization processes for producing the same.

20 Claims, 6 Drawing Sheets

U.S. PATENT DOCUMENTS

| | | |
|---|---|---|
| 5,317,036 A | 5/1994 | Brady, III et al. |
| 5,317,070 A | 5/1994 | Brant et al. |
| 5,332,707 A | 7/1994 | Karayannis et al. |
| 5,334,677 A | 8/1994 | Razavi et al. |
| 5,336,746 A | 8/1994 | Tsutsui et al. |
| 5,350,817 A | 9/1994 | Winter et al. |
| 5,359,102 A | 10/1994 | Inoue et al. |
| 5,369,196 A | 11/1994 | Matsumoto et al. |
| 5,374,685 A | 12/1994 | Asanuma et al. |
| 5,374,700 A | 12/1994 | Tsutsui et al. |
| 5,410,003 A | 4/1995 | Bai |
| 5,416,228 A | 5/1995 | Ewen et al. |
| 5,430,070 A | 7/1995 | Kono |
| 5,434,115 A | 7/1995 | Yamada et al. |
| 5,439,994 A | 8/1995 | Inoue et al. |
| 5,459,217 A | 10/1995 | Todo et al. |
| 5,464,905 A | 11/1995 | Tsutsui et al. |
| 5,468,807 A | 11/1995 | Tsurutani et al. |
| 5,475,075 A | 12/1995 | Brant et al. |
| 5,480,848 A | 1/1996 | Geerts |
| 5,483,002 A | 1/1996 | Seelert et al. |
| 5,504,172 A | 4/1996 | Imuta et al. |
| 5,516,583 A | 5/1996 | Zhang et al. |
| 5,516,848 A | 5/1996 | Canich et al. |
| 5,519,091 A | 5/1996 | Tsutsui et al. |
| 5,525,689 A | 6/1996 | Tsutsui et al. |
| 5,527,846 A | 6/1996 | Christell et al. |
| 5,529,843 A | 6/1996 | Dries et al. |
| 5,529,943 A | 6/1996 | Hong et al. |
| 5,530,054 A | 6/1996 | Tse et al. |
| 5,532,396 A | 7/1996 | Winter et al. |
| 5,534,473 A | 7/1996 | Welch et al. |
| 5,539,056 A * | 7/1996 | Yang et al. ................ 525/240 |
| 5,539,066 A | 7/1996 | Winter et al. |
| 5,543,373 A | 8/1996 | Winter et al. |
| 5,548,014 A | 8/1996 | Tse et al. |
| 5,552,489 A | 9/1996 | Merrill et al. |
| 5,565,533 A | 10/1996 | Galimberti et al. |
| 5,565,534 A | 10/1996 | Aulbach et al. |
| 5,576,259 A | 11/1996 | Hasegawa et al. |
| 5,576,260 A | 11/1996 | Winter et al. |
| 5,585,448 A | 12/1996 | Resconi et al. |
| 5,585,508 A | 12/1996 | Küber et al. |
| 5,587,501 A | 12/1996 | Winter et al. |
| 5,594,078 A | 1/1997 | Welch et al. |
| 5,594,080 A | 1/1997 | Waymouth et al. |
| 5,594,172 A | 1/1997 | Shimohara |
| 5,596,052 A | 1/1997 | Resconi et al. |
| 5,599,881 A | 2/1997 | Xie |
| 5,599,885 A | 2/1997 | Kawasaki et al. |
| 5,602,223 A | 2/1997 | Sasaki et al. |
| 5,605,969 A | 2/1997 | Tsutsui et al. |
| 5,610,254 A | 3/1997 | Saguna et al. |
| 5,612,428 A | 3/1997 | Winter et al. |
| 5,618,883 A | 4/1997 | Plamthottam et al. |
| 5,629,254 A | 5/1997 | Fukuoka et al. |
| 5,631,202 A | 5/1997 | Ewen |
| 5,639,842 A | 6/1997 | Tsutsui et al. |
| 5,643,846 A | 7/1997 | Reddy et al. |
| 5,648,428 A | 7/1997 | Reddy et al. |
| 5,652,308 A | 7/1997 | Merrill et al. |
| 5,658,997 A | 8/1997 | Fukuoka et al. |
| 5,661,096 A | 8/1997 | Winter et al. |
| 5,663,249 A | 9/1997 | Ewen et al. |
| 5,670,436 A | 9/1997 | Herrmann et al. |
| 5,672,668 A | 9/1997 | Winter et al. |
| 5,693,730 A | 12/1997 | Küber et al. |
| 5,693,836 A | 12/1997 | Winter et al. |
| 5,696,045 A | 12/1997 | Winter et al. |
| 5,696,049 A | 12/1997 | Ikeyama et al. |
| 5,698,651 A | 12/1997 | Kawasaki et al. |
| 5,700,886 A | 12/1997 | Winter et al. |
| 5,700,895 A | 12/1997 | Kanda et al. |
| 5,703,180 A | 12/1997 | Tsutsui et al. |
| 5,705,565 A | 1/1998 | Hughes et al. |
| 5,705,584 A | 1/1998 | Fukuoka et al. |
| 5,710,223 A | 1/1998 | Fukuoka et al. |
| 5,714,426 A | 2/1998 | Tsutsui et al. |
| 5,714,427 A | 2/1998 | Winter et al. |
| 5,719,235 A | 2/1998 | Zandona |
| 5,719,241 A | 2/1998 | Razavi et al. |
| 5,723,640 A | 3/1998 | Fukuoka et al. |
| 5,739,220 A | 4/1998 | Shamshoum et al. |
| 5,739,225 A | 4/1998 | Tazaki et al. |
| 5,739,366 A | 4/1998 | Imuta et al. |
| 5,741,868 A | 4/1998 | Winter et al. |
| 5,747,405 A | 5/1998 | Little et al. |
| 5,747,620 A | 5/1998 | Machida et al. |
| 5,747,621 A | 5/1998 | Resconi et al. |
| 5,753,769 A | 5/1998 | Ueda et al. |
| 5,753,771 A | 5/1998 | Xie |
| 5,756,141 A | 5/1998 | Chen et al. |
| 5,760,028 A | 6/1998 | Jadhav et al. |
| 5,763,349 A | 6/1998 | Zandona |
| 5,763,516 A | 6/1998 | Godfrey |
| 5,767,031 A | 6/1998 | Shamshoum et al. |
| 5,767,032 A | 6/1998 | Hokkanen et al. |
| 5,767,033 A | 6/1998 | Imuta et al. |
| 5,767,300 A | 6/1998 | Aulbach et al. |
| 5,773,129 A | 6/1998 | Wakamatsu et al. |
| 5,773,544 A | 6/1998 | Christell et al. |
| 5,776,851 A | 7/1998 | Küber et al. |
| 5,780,168 A | 7/1998 | Satoh et al. |
| 5,795,941 A | 8/1998 | Cree et al. |
| 5,798,175 A | 8/1998 | Tynan, Jr. et al. |
| 5,804,524 A | 9/1998 | Reddy et al. |
| 5,807,948 A | 9/1998 | Sugane et al. |
| 5,817,590 A | 10/1998 | Hasegawa et al. |
| 5,817,725 A | 10/1998 | Zandona |
| 5,827,252 A | 10/1998 | Werenicz et al. |
| 5,834,393 A | 11/1998 | Jacobsen et al. |
| 5,840,815 A | 11/1998 | Tsutsui et al. |
| 5,846,896 A | 12/1998 | Ewen |
| 5,847,059 A | 12/1998 | Shamshoum et al. |
| 5,852,116 A | 12/1998 | Cree et al. |
| 5,854,354 A | 12/1998 | Ueda et al. |
| 5,859,088 A | 1/1999 | Peterson et al. |
| 5,861,474 A | 1/1999 | Weller et al. |
| 5,866,663 A | 2/1999 | Brookhart et al. |
| 5,874,513 A | 2/1999 | Watanabe et al. |
| 5,876,855 A | 3/1999 | Wong et al. |
| 5,880,056 A | 3/1999 | Tsutsui et al. |
| 5,880,241 A | 3/1999 | Brookhart et al. |
| 5,880,323 A | 3/1999 | Brookhart, III et al. |
| 5,883,204 A | 3/1999 | Spencer et al. |
| 5,883,205 A | 3/1999 | Tsutsui et al. |
| 5,886,123 A | 3/1999 | Resconi et al. |
| 5,886,224 A | 3/1999 | Brookhart et al. |
| 5,891,963 A | 4/1999 | Brookhart et al. |
| 5,914,376 A | 6/1999 | Herrmann et al. |
| 5,916,988 A | 6/1999 | Tsutsui et al. |
| 5,916,989 A | 6/1999 | Brookhart, III et al. |
| 5,922,823 A | 7/1999 | Sagane et al. |
| 5,936,051 A | 8/1999 | Santi et al. |
| 5,936,053 A | 8/1999 | Fukuoka et al. |
| 5,942,586 A | 8/1999 | Herrmann et al. |
| 5,959,046 A | 9/1999 | Imuta et al. |
| 5,969,217 A | 10/1999 | Rhodes |
| 5,977,251 A | 11/1999 | Kao et al. |
| 5,986,024 A | 11/1999 | Wilson, Jr. |
| 5,986,651 A | 11/1999 | Reber et al. |
| 5,990,331 A | 11/1999 | Winter et al. |
| 5,997,981 A | 12/1999 | McCormack et al. |
| 5,998,547 A | 12/1999 | Hohner |

| | | | | | | |
|---|---|---|---|---|---|---|
| 6,002,033 | A | 12/1999 | Razawi et al. | 6,255,246 | B1 | 7/2001 | Devore et al. |
| 6,004,897 | A | 12/1999 | Imuta et al. | 6,255,414 | B1 | 7/2001 | Ittel et al. |
| 6,008,262 | A | 12/1999 | McKay et al. | 6,255,426 | B1 | 7/2001 | Lue et al. |
| 6,017,842 | A | 1/2000 | Rosen et al. | 6,258,903 | B1 | 7/2001 | Mawson et al. |
| 6,028,152 | A | 2/2000 | Winter et al. | 6,265,512 | B1 | 7/2001 | Siedle et al. |
| 6,034,164 | A | 3/2000 | Elspass et al. | 6,268,445 | B1 | 7/2001 | McAdon et al. |
| 6,034,259 | A | 3/2000 | Brookhart et al. | 6,268,453 | B1 | 7/2001 | Köppl et al. |
| 6,040,407 | A | 3/2000 | Ishida et al. | 6,271,164 | B1 | 8/2001 | Fritze et al. |
| 6,040,469 | A | 3/2000 | Riedel et al. | 6,271,323 | B1 | 8/2001 | Loveday et al. |
| 6,042,930 | A | 3/2000 | Kelch et al. | 6,277,479 | B1 | 8/2001 | Campbell et al. |
| 6,045,922 | A | 4/2000 | Janssen et al. | 6,281,289 | B1 | 8/2001 | Maugans et al. |
| 6,054,542 | A | 4/2000 | Kojoh et al. | 6,287,658 | B1 | 9/2001 | Cosentino et al. |
| 6,054,544 | A | 4/2000 | Finlayson et al. | 6,297,301 | B1 | 10/2001 | Erderly et al. |
| 6,057,413 | A | 5/2000 | Ima et al. | 6,300,398 | B1 | 10/2001 | Jialanella et al. |
| 6,063,838 | A | 5/2000 | Patnode et al. | 6,300,451 | B1 | 10/2001 | Mehta et al. |
| 6,069,213 | A | 5/2000 | Nemzek et al. | 6,310,163 | B1 | 10/2001 | Brookhart et al. |
| 6,080,818 | A | 6/2000 | Thakker et al. | 6,319,979 | B1 | 11/2001 | Dubois et al. |
| 6,084,010 | A | 7/2000 | Baetzold et al. | 6,319,998 | B1 | 11/2001 | Cozewith et al. |
| 6,084,048 | A | 7/2000 | Hozumi et al. | 6,323,151 | B1 | 11/2001 | Siedle et al. |
| 6,090,325 | A | 7/2000 | Wheat et al. | 6,323,284 | B1 | 11/2001 | Peacock |
| 6,100,351 | A | 8/2000 | Sun et al. | 6,325,956 | B2 | 12/2001 | Chaudhary et al. |
| 6,100,353 | A | 8/2000 | Lynch et al. | 6,326,444 | B2 | 12/2001 | Lynch et al. |
| 6,107,422 | A | 8/2000 | Wang et al. | 6,329,313 | B1 | 12/2001 | Fritze et al. |
| 6,107,430 | A | 8/2000 | Dubois et al. | 6,329,468 | B1 | 12/2001 | Wang |
| 6,114,261 | A | 9/2000 | Strelow et al. | 6,331,595 | B1 | 12/2001 | Mitchell et al. |
| 6,114,457 | A | 9/2000 | Markel et al. | 6,340,703 | B1 | 1/2002 | Kelly |
| 6,114,477 | A | 9/2000 | Merrill et al. | 6,340,730 | B1 | 1/2002 | Murray et al. |
| 6,117,962 | A | 9/2000 | Weng et al. | 6,342,574 | B1 | 1/2002 | Weng et al. |
| 6,121,377 | A | 9/2000 | Chien | 6,348,272 | B1 | 2/2002 | Haveaux et al. |
| 6,121,401 | A | 9/2000 | Yamamoto et al. | 6,350,829 | B1 | 2/2002 | Lynch et al. |
| 6,121,402 | A | 9/2000 | Machida et al. | 6,350,830 | B1 | 2/2002 | Göres et al. |
| 6,124,231 | A | 9/2000 | Fritze et al. | 6,352,948 | B1 | 3/2002 | Pike et al. |
| 6,124,400 | A | 9/2000 | Chien | 6,362,125 | B1 | 3/2002 | Shamshoum et al. |
| 6,127,484 | A | 10/2000 | Cribbs et al. | 6,365,763 | B1 | 4/2002 | Winter et al. |
| 6,140,439 | A | 10/2000 | Brookhart et al. | 6,365,779 | B2 | 4/2002 | Devore et al. |
| 6,143,683 | A | 11/2000 | Shamshoum et al. | 6,369,175 | B1 | 4/2002 | Ewen |
| 6,143,844 | A | 11/2000 | Hokkanen et al. | 6,369,176 | B1 | 4/2002 | Laughner et al. |
| 6,143,846 | A | 11/2000 | Herrmann et al. | 6,376,410 | B1 | 4/2002 | Burkhardt et al. |
| 6,147,174 | A | 11/2000 | Holtcamp et al. | 6,376,416 | B1 | 4/2002 | Hirakawa et al. |
| 6,147,180 | A | 11/2000 | Markel et al. | 6,380,327 | B1 | 4/2002 | Teasley |
| 6,150,481 | A | 11/2000 | Winter et al. | 6,391,974 | B1 | 5/2002 | Ogawa et al. |
| 6,153,549 | A | 11/2000 | Hubscher et al. | 6,399,531 | B1 | 6/2002 | Job et al. |
| 6,156,844 | A | 12/2000 | Hashimoto et al. | 6,403,855 | B1 | 6/2002 | Mertens |
| 6,159,888 | A | 12/2000 | Welch et al. | 6,407,189 | B1 | 6/2002 | Herrmann |
| 6,162,871 | A | 12/2000 | Watanabe et al. | 6,413,899 | B1 | 7/2002 | Dolle et al. |
| 6,166,161 | A | 12/2000 | Mullins et al. | 6,420,516 | B1 | 7/2002 | Tau et al. |
| 6,174,974 | B1 | 1/2001 | Starzewski et al. | 6,423,793 | B1 | 7/2002 | Weng et al. |
| 6,177,190 | B1 | 1/2001 | Gehlsen et al. | 6,429,274 | B1 | 8/2002 | Siedle et al. |
| 6,177,377 | B1 | 1/2001 | Chien | 6,448,358 | B2 | 9/2002 | Siedle et al. |
| 6,177,526 | B1 | 1/2001 | Fritze | 6,482,907 | B1 | 11/2002 | Wang et al. |
| 6,177,527 | B1 | 1/2001 | Sishta et al. | 6,495,646 | B1 | 12/2002 | Arthur et al. |
| 6,180,229 | B1 | 1/2001 | Becker et al. | 6,500,540 | B1 | 12/2002 | Langohr et al. |
| 6,180,732 | B1 | 1/2001 | Ewen | 6,528,448 | B1 | 3/2003 | Jensen et al. |
| 6,184,327 | B1 | 2/2001 | Weng et al. | 6,545,108 | B1 | 4/2003 | Moody et al. |
| 6,191,241 | B1 | 2/2001 | Starzewski et al. | 6,551,955 | B1 | 4/2003 | Diefenbach |
| 6,197,910 | B1 | 3/2001 | Weng et al. | 6,569,965 | B2 | 5/2003 | Markel et al. |
| 6,207,606 | B1 | 3/2001 | Lue et al. | 6,573,350 | B1 | 6/2003 | Markel et al. |
| 6,207,748 | B1 | 3/2001 | Tse et al. | 6,573,352 | B1 * | 6/2003 | Tatsumi et al. .............. 526/351 |
| 6,207,773 | B1 | 3/2001 | Ting et al. | 6,747,114 | B2 * | 6/2004 | Karandinos et al. ...... 526/348.2 |
| 6,211,110 | B1 | 4/2001 | Santi et al. | 6,774,069 | B2 * | 8/2004 | Zhou et al. ................. 442/328 |
| 6,214,447 | B1 | 4/2001 | Nakagawa et al. | 6,800,700 | B2 * | 10/2004 | Sun ............................ 526/114 |
| 6,214,948 | B1 | 4/2001 | Zandona | 6,887,941 | B2 * | 5/2005 | Zhou ........................... 525/191 |
| 6,214,949 | B1 | 4/2001 | Reddy et al. | 2001/0004662 | A1 | 6/2001 | Bidell et al. |
| 6,218,457 | B1 | 4/2001 | Fralich et al. | 2001/0007896 | A1 | 7/2001 | Agarwal et al. |
| 6,218,488 | B1 | 4/2001 | Schiggino et al. | 2001/0016639 | A1 | 8/2001 | Agarwal et al. |
| 6,218,493 | B1 | 4/2001 | Johnson et al. | 2001/0031843 | A1 | 10/2001 | Whiteker et al. |
| 6,221,802 | B1 | 4/2001 | Costa et al. | 2001/0034299 | A1 | 10/2001 | Terry et al. |
| 6,221,981 | B1 | 4/2001 | Jung et al. | 2001/0044505 | A1 | 11/2001 | Ford et al. |
| 6,225,432 | B1 | 5/2001 | Weng et al. | 2001/0044515 | A1 | 11/2001 | Siedel et al. |
| 6,245,856 | B1 | 6/2001 | Kaufman et al. | 2001/0047064 | A1 | 11/2001 | Sun .............................. 526/74 |
| 6,248,829 | B1 | 6/2001 | Fischer et al. | 2001/0053837 | A1 | 12/2001 | Agarwal et al. |
| 6,248,832 | B1 | 6/2001 | Peacock | 2002/0010077 | A1 | 1/2002 | Lue et al. |
| 6,248,845 | B1 | 6/2001 | Loveday et al. | 2002/0013440 | A1 | 1/2002 | Agarwal et al. |

| | | | |
|---|---|---|---|
| 2002/0016254 A1 | 2/2002 | Whiteker et al. | |
| 2002/0040114 A1 | 4/2002 | Loveday et al. | |
| 2002/0045054 A1 | 4/2002 | Uhara et al. | |
| 2002/0049135 A1 | 4/2002 | Moody et al. | |
| 2002/0061945 A1 | 5/2002 | Oates et al. | |
| 2002/0064653 A1 | 5/2002 | Ladika et al. | |
| 2002/0065192 A1 | 5/2002 | Mackenzie et al. | |
| 2002/0086955 A1 | 7/2002 | Kendrick | |
| 2002/0123538 A1* | 9/2002 | Zhou et al. | 523/176 |
| 2002/0132923 A1 | 9/2002 | Langohr et al. | |
| 2003/0078350 A1 | 4/2003 | Weng et al. | 526/160 |
| 2003/0096896 A1 | 5/2003 | Wang et al. | |
| 2004/0034170 A1 | 2/2004 | Brant | |
| 2004/0039117 A1 | 2/2004 | Kijima | 525/55 |
| 2004/0048984 A1 | 3/2004 | Weng et al. | 525/245 |
| 2004/0127614 A1* | 7/2004 | Jiang et al. | 524/270 |
| 2004/0220320 A1 | 11/2004 | Abhari et al. | 524/487 |
| 2004/0220336 A1 | 11/2004 | Abhari et al. | 525/70 |
| 2004/0220359 A1 | 11/2004 | Abhari et al. | 526/65 |
| 2004/0249046 A1 | 12/2004 | Abhari et al. | 524/474 |

FOREIGN PATENT DOCUMENTS

| | | |
|---|---|---|
| EP | 0 930 320 | 10/1983 |
| EP | 0 115 434 | 8/1984 |
| EP | 0 263 718 | 4/1988 |
| EP | 0 248 708 | 10/1988 |
| EP | 0 284 707 | 10/1988 |
| EP | 0 319 043 | 6/1989 |
| EP | 0 366 411 | 5/1990 |
| EP | 0 387 691 | 9/1990 |
| EP | 0 486 293 | 9/1991 |
| EP | 0 459 264 | 12/1991 |
| EP | 0 513 808 | 11/1992 |
| EP | 0 515 132 | 11/1992 |
| EP | 0 524 624 | 1/1993 |
| EP | 0 530 908 | 3/1993 |
| EP | 0 536 104 | 4/1993 |
| EP | 0 417 428 | 9/1993 |
| EP | 0 577 581 | 1/1994 |
| EP | 0 363 029 | 8/1994 |
| EP | 0 612 768 | 8/1994 |
| EP | 0 310 734 | 11/1994 |
| EP | 0 647 246 | 11/1994 |
| EP | 0 648 801 | 4/1995 |
| EP | 0 653 433 | 5/1995 |
| EP | 0 666 267 | 8/1995 |
| EP | 0 557 718 | 10/1995 |
| EP | 0 516 019 | 12/1995 |
| EP | 0 564 596 | 2/1996 |
| EP | 0 695 765 | 2/1996 |
| EP | 0 516 018 | 3/1996 |
| EP | 0 700 937 | 3/1996 |
| EP | 0 593 083 | 5/1996 |
| EP | 0 718 359 | 6/1996 |
| EP | 0 719 829 | 7/1996 |
| EP | 0 553 757 | 9/1996 |
| EP | 0 733 652 | 9/1996 |
| EP | 0 652 905 | 10/1996 |
| EP | 0 747 430 | 12/1996 |
| EP | 0 749 989 | 12/1996 |
| EP | 0 773 238 | 5/1997 |
| EP | 0 773 239 | 5/1997 |
| EP | 0 791 607 | 5/1997 |
| EP | 0 643 100 | 7/1997 |
| EP | 0 527 221 | 9/1997 |
| EP | 0 598 628 | 9/1997 |
| EP | 0 620 257 | 9/1997 |
| EP | 0 803 559 | 10/1997 |
| EP | 0 812 854 | 12/1997 |
| EP | 0 700 934 | 1/1998 |
| EP | 0 661 300 | 3/1998 |
| EP | 0 832 924 | 4/1998 |
| EP | 0 646 604 | 5/1998 |
| EP | 0 841 349 | 5/1998 |
| EP | 0 842 955 | 5/1998 |
| EP | 0 527 589 | 6/1998 |
| EP | 0 563 917 | 6/1998 |
| EP | 0 613 908 | 7/1998 |
| EP | 0 948 432 | 7/1998 |
| EP | 0 958 318 | 7/1998 |
| EP | 0 857 735 | 8/1998 |
| EP | 0 958 313 | 8/1998 |
| EP | 0 958 314 | 8/1998 |
| EP | 0 958 324 | 8/1998 |
| EP | 0 864 593 | 9/1998 |
| EP | 0 500 944 | 10/1998 |
| EP | 0 573 120 | 11/1998 |
| EP | 0 879 849 | 11/1998 |
| EP | 0 977 666 | 11/1998 |
| EP | 0 977 808 | 11/1998 |
| EP | 0 788 521 | 12/1998 |
| EP | 0 882 731 | 12/1998 |
| EP | 0 889 089 | 1/1999 |
| EP | 0 584 609 | 3/1999 |
| EP | 0 627 447 | 4/1999 |
| EP | 0 685 498 | 5/1999 |
| EP | 0 696 303 | 6/1999 |
| EP | 0 922 653 | 6/1999 |
| EP | 1 040 140 | 6/1999 |
| EP | 1 040 146 | 6/1999 |
| EP | 1 044 225 | 6/1999 |
| EP | 0 608 054 | 7/1999 |
| EP | 1 049 730 | 7/1999 |
| EP | 0 827 526 | 8/1999 |
| EP | 0 747 403 | 9/1999 |
| EP | 0 953 581 | 11/1999 |
| EP | 0 602 716 | 12/1999 |
| EP | 0 423 101 | 1/2000 |
| EP | 0 974 601 | 1/2000 |
| EP | 0 909 284 | 2/2000 |
| EP | 0 731 729 | 3/2000 |
| EP | 0 909 283 | 3/2000 |
| EP | 0 985 677 | 3/2000 |
| EP | 0 719 797 | 4/2000 |
| EP | 0 719 802 | 5/2000 |
| EP | 0 769 505 | 5/2000 |
| EP | 1 141 051 | 6/2000 |
| EP | 0 586 168 | 7/2000 |
| EP | 1 031 580 | 8/2000 |
| EP | 0 889 911 | 11/2000 |
| EP | 1 050 558 | 11/2000 |
| EP | 0 654 476 | 1/2001 |
| EP | 1 077 244 | 2/2001 |
| EP | 0 702 030 | 3/2001 |
| EP | 1 081 203 | 3/2001 |
| EP | 1 081 204 | 3/2001 |
| EP | 0 882 069 | 4/2001 |
| EP | 0 882 076 | 4/2001 |
| EP | 1 238 035 | 4/2001 |
| EP | 0 351 392 | 5/2001 |
| EP | 0 882 077 | 5/2001 |
| EP | 1 095 944 | 5/2001 |
| EP | 1 095 951 | 5/2001 |
| EP | 1 100 854 | 5/2001 |
| EP | 0 824 113 | 6/2001 |
| EP | 1 237 963 | 6/2001 |
| EP | 1 252 231 | 7/2001 |
| EP | 0 619 325 | 8/2001 |
| EP | 1 023 379 | 8/2001 |
| EP | 0 886 656 | 9/2001 |
| EP | 1 144 533 | 10/2001 |
| EP | 0 963 382 | 11/2001 |
| EP | 1 153 944 | 11/2001 |
| EP | 0 645 401 | 12/2001 |
| EP | 0 707 010 | 12/2001 |

| | | | | | |
|---|---|---|---|---|---|
| EP | 0 747 402 | 12/2001 | WO | 99/20701 | 4/1999 |
| EP | 0 821 748 | 12/2001 | WO | 99/24516 | 5/1999 |
| EP | 0 891 381 | 12/2001 | WO | 99/29742 | 6/1999 |
| EP | 1 118 637 | 12/2001 | WO | 99/29743 | 6/1999 |
| EP | 1 066 330 | 2/2002 | WO | 99/29749 | 6/1999 |
| EP | 1 181 979 | 2/2002 | WO | 99/32272 | 7/1999 |
| EP | 0 659 757 | 3/2002 | WO | 99/32288 | 7/1999 |
| EP | 1 197 500 | 4/2002 | WO | 99/32525 | 7/1999 |
| EP | 1 089 878 | 5/2002 | WO | 99/37711 | 7/1999 |
| EP | 0 868 498 | 1/2003 | WO | 99/46348 | 9/1999 |
| EP | 1 295 925 | 3/2003 | WO | 99/54421 | 10/1999 |
| EP | 1 295 926 A | 3/2003 | WO | 99/60060 | 11/1999 |
| EP | 1 165 622 | 4/2003 | WO | 99/61487 | 12/1999 |
| FR | 1396054 | 4/1965 | WO | 99/65949 | 12/1999 |
| FR | 1582841 | 10/1969 | WO | 99/67094 | 12/1999 |
| GB | 2323846 | 3/1997 | WO | 00/00565 | 1/2000 |
| JP | 01054010 | 3/1989 | WO | 00/01745 | 1/2000 |
| JP | 0 208 6676 | 3/1990 | WO | 00/23483 | 4/2000 |
| JP | 11115127 | 4/1999 | WO | 00/29655 | 5/2000 |
| JP | 99349634 A | 12/1999 | WO | 00/37514 | 6/2000 |
| WO | 89/12828 | 12/1989 | WO | 00/44799 | 8/2000 |
| WO | WO 91/07472 | 5/1991 | WO | 00/47592 | 8/2000 |
| WO | 94/07930 | 4/1994 | WO | 00/50466 | 8/2000 |
| WO | 94/12193 | 6/1994 | WO | 00/50475 | 8/2000 |
| WO | 94/13715 | 6/1994 | WO | 00/58320 | 10/2000 |
| WO | 94/25498 | 11/1994 | WO | 00/59721 | 10/2000 |
| WO | 94/25526 | 11/1994 | WO | 00/69869 | 11/2000 |
| WO | WO 95/10575 | 4/1995 | WO | 00/69963 | 11/2000 |
| WO | 95/24449 | 9/1995 | WO | 00/75198 | 12/2000 |
| WO | 96/12744 | 5/1996 | WO | 01/00257 | 1/2001 |
| WO | 96/13531 | 5/1996 | WO | 01/00691 | 1/2001 |
| WO | 96/23010 | 8/1996 | WO | 01/02444 | 1/2001 |
| WO | 96/23751 | 8/1996 | WO | WO 01/00693 | 1/2001 |
| WO | 96/26967 | 9/1996 | WO | 01/09200 | 2/2001 |
| WO | 96/27622 | 9/1996 | WO | 01/14429 | 3/2001 |
| WO | 96/29460 | 9/1996 | WO | 01/16189 | 3/2001 |
| WO | 96/37568 | 11/1996 | WO | 01/18109 | 3/2001 |
| WO | 97/04271 | 2/1997 | WO | 01/19609 | 3/2001 |
| WO | 97/12919 | 4/1997 | WO | 01/23396 | 4/2001 |
| WO | WO 97/20872 | 6/1997 | WO | 01/25296 | 4/2001 |
| WO | 97/23577 | 7/1997 | WO | 01/27213 | 4/2001 |
| WO | 97/26287 | 7/1997 | WO | 01/29096 | 4/2001 |
| WO | 97/29138 | 8/1997 | WO | 01/32721 | 5/2001 |
| WO | 97/33921 | 9/1997 | WO | 01/34665 | 5/2001 |
| WO | 97/49738 | 12/1997 | WO | 01/40325 | 6/2001 |
| WO | 98/02467 | 1/1998 | WO | 01/42322 | 6/2001 |
| WO | 98/02471 | 1/1998 | WO | 01/42323 | 6/2001 |
| WO | 98/03603 | 1/1998 | WO | 01/42350 | 6/2001 |
| WO | 98/09996 | 3/1998 | WO | 01/44309 | 6/2001 |
| WO | 98/23690 | 6/1998 | WO | 01/46274 | 6/2001 |
| WO | 98/23699 | 6/1998 | WO | 01/46277 | 6/2001 |
| WO | 98/29249 | 7/1998 | WO | 01/46278 | 6/2001 |
| WO | 98/32784 | 7/1998 | WO | 01/48029 | 7/2001 |
| WO | 98/33860 | 8/1998 | WO | 01/48034 | 7/2001 |
| WO | 98/34965 | 8/1998 | WO | 01/48036 | 7/2001 |
| WO | 98/34970 | 8/1998 | WO | 01/48037 | 7/2001 |
| WO | 98/34971 | 8/1998 | WO | 01/48038 | 7/2001 |
| WO | 98/34985 | 8/1998 | WO | 01/70878 | 9/2001 |
| WO | 98/38374 | 9/1998 | WO | 01/74745 | 10/2001 |
| WO | 98/41574 | 9/1998 | WO | 01/77193 | 10/2001 |
| WO | 98/42780 | 10/1998 | WO | 01/81493 | 11/2001 |
| WO | 98/46694 | 10/1998 | WO | 01/83498 | 11/2001 |
| WO | 98/49229 | 11/1998 | WO | 01/83571 | 11/2001 |
| WO | 98/52686 | 11/1998 | WO | 01/98374 | 12/2001 |
| WO | 98/57998 | 12/1998 | WO | 01/98380 | 12/2001 |
| WO | 99/05152 | 2/1999 | WO | 01/98381 | 12/2001 |
| WO | 99/10425 | 3/1999 | WO | WO 01/96490 | 12/2001 |
| WO | 99/14046 | 3/1999 | WO | 02/35956 | 5/2002 |
| WO | 99/14047 | 3/1999 | WO | 02/36651 A | 5/2002 |
| WO | 99/14262 | 3/1999 | WO | 02/053668 | 7/2002 |
| WO | 99/19394 | 4/1999 | WO | 02/053669 | 7/2002 |
| WO | 99/20664 | 4/1999 | WO | 02/074817 | 9/2002 |
| WO | 99/20694 | 4/1999 | WO | WO 02/070572 | 9/2002 |

| WO | WO 03/091289 | 11/2003 |
| WO | 2004/037872 A | 5/2004 |
| WO | 2004/046214 A | 6/2004 |

OTHER PUBLICATIONS

Chien, et al., "Homogeneous Binary Zirconocenium Catalyst Systems for Propylene Polymerization. 1. Isotactic/Atactic Interfacial Compatibilized Polymers Having Thermoplastic Elastomeric Properties", *Macromolecules*, 1997, 30, pp. 3447-3459.
Mun Fu Tse, "Studies of triblock copolymer-tackifying resin interactions by viscoelasticity and adhesive performance", *J. Adhesion Sci. Technol.*, 1989, vol. 3, No. 7, pp. 551-579.
Markel, et al., "Metallocene-Based Branch-Block Thermoplastic Elastomers", *Macromolecules*, vol. 33, No. 23, pp. 8541-8548.
Sun, et al., "Effect of Short Chain Branching on the Coil Dimensions of Polyolefins in Dilute Solution", *Macromolecules*, 2001, 34, pp. 6812-6820.
Huntsman REXtac APAO Polymers.
Dr. Thomas Sun, "Characterization of Polyolefins Using High Temperature Size Exclusion Chromatography Combined with Multi-Angle Laser Light Scattering and Viscometry", 1999.
"Standard Test Method for Peel Resistance of Adhesives (T-Peel Test)[1]", Designation: D 1876-01, ASTM International, 2002.
Abstract of EP 0 248708, published on Dec. 9, 1987, entitled "Process for Controlling a Plant for Producing Cement by the Dry Way with Precalcination".
Abstract of EP 0 387 691, published on Sep. 19, 1999, entitled, "Process for Preparing a Syndiotactic Polyolefin".
Abstract of EP 0 516 018, published on Dec. 2, 1992, entitled "Process for Preparing Olefin Polymers with Large Molecular Weight Distribution".
Abstract of EP 0 516 019, published on Dec. 2, 1992, entitled "Process for Preparing Syndiotactic Polyolefins with Large Molecular Weight Distribution".
Abstract of EP 0 553 757, published on Aug. 4, 1993, entitled "Catalyst and Process for Polymerisation and Copolymerisation of Olefins".
Abstract of EP 0 557 718, published on Sep. 1, 1993, entitled "Catalyst for Olefin Polymerisation, Process for Preparing the Same and Its Sue".
Abstract of EP 0 563 917, published on Oct. 6, 1993, entitled "Catalyst for the Polymerisation of Olefins, Process for its Preparation and its Use".
Abstract of EP 0 573 120, published on Dec. 8, 1993, entitled "Process for Producing a Catalyst System, Process for the (Co)Polymerisation of Olefins and (Co)Polymers of at Least One Olefin".
Abstract of EP 0 584 609, published on Aug. 24, 1994, entitled "Process for Preparing Polyolefins".
Abstract of EP 0 602 716, published on Jun. 22, 1994, entitled "Catalyst System, Process for its Production and its Use in (Co)Polymerization of Olefins".
Abstract of EP 0 613 908, published on Sep. 7, 1994, entitled "Solid Precursor of a Catalytic System for Polymerization of Olefins, Process for its Preparation and Catalystic System Containing said Precursor".
Abstract of EP 0 627 447, published on Dec. 7, 1994, entitled "Catalyst Support and Catalyst for Alpha-Olefin Polymerization; Processes for Preparing Them and Polymerization of Alpha-Olefins in the Presence of the Catalyst".
Abstract of EP 0 643 100, published on Mar. 15, 1995, entitled "Low temperature Impact-Resistant Composition of Semicrystalline Propylene Homopolymers".
Abstract of EP 0 645 401, published on Mar. 29, 1995, entitled "Process for Producing Polyolefins".
Abstract of EP 0 646 604, published on Apr. 5, 1995, entitled "Process for Olefin Polymerization".
Abstract of EP 0 654 476, published on May 24, 1995, entitled "Metallocenes, Their Preparation and Use as Catalysts".
Abstract of EP 0 659 757, published on Jun. 28, 1995, entitled "Metallocenes".
Abstract of EP 0 661 300, published on Jul. 5, 1995, entitled "Process for the Production of Polyolefins".
Abstract of EP 0 700 934, published on Mar. 13, 1996, entitled "Supported Metallocene Catalyst System".
Abstract of EP 0 700 937, published on Mar. 13, 1996, entitled "Process for Preparing Ethylene Polymers".
Abstract of EP 0 702 030, published on Mar. 20, 1996, entitled "Process for Preparing Olefin Polymers with Large Molecular Weight Distribution".
Abstract of EP 0 707 010, published on Sep. 29, 1999, entitled "Metallocenes".
Abstract of EP 0 719 802, published on Nov. 25, 1998, entitled "Polyolefin Was".
Abstract of EP 0 824 113, published on Feb. 18, 1998, entitled "Supported Catalyst, Process for its Preparation and its Use in Olefin Polymerization".
Abstract of EP 0 832 924, published on Apr. 1, 1998, entitled "Polyolefin Composition for the Preparation of Non-Wovens".
Abstract of EP 0 857 735, published on Jul. 26, 2000, entitled "Process for Producing a Catalyst System, Process for the (Co)Polymerization of Olefins and (Co)Polymers of at Least One Olefin".
Abstract of EP 0 864 593, published on Sep. 16, 1998, entitled "Comb-Polymers Via Metallocene Catalysis".
Abstract of EP 0 882 069, published on Dec. 9, 1998, entitled "Process for Producing Polymers of Alkenes by Suspension Polymerisation".
Abstract of EP 0 882 076, published on Dec. 9, 1998, entitled "Supported Catalyst System".
Abstract of EP 0 882 077, published on Dec. 9, 1998, entitled "Process for Producing Alkene Polymers by Gas Phase Polymerisation".
Abstract of EP 0 882 731, published on May 31, 2000, entitled "Bridged Metallocene Compounds and Their Use as Olefin Polymerization Catalysts".
Abstract of EP 0 909 283, published on Apr. 21, 1999, entitled "Method for Producing High Melting-Point Polyolefins".
Abstract of EP 0 909 284, published on Apr. 21, 1999, entitled "Method for Producing Thermoplastic Elastomers".
Abstract of EP 1 066 330, published on Jan. 10, 2001, entitled "Catalyst System, Method for the Production Thereof, and the Utilization Thereof for the Polymerization of Olefins".
Abstract of EP 1 077 244, published on Sep. 5, 2001, entitled "Use of Reaktive Phenolic Resins in the Preparation of Highly Viscous, Self-Adhesive Materials".
Abstract of EP 1 081 203, published on Mar. 7, 2001, entitled "Use of Isocyanates in the Production of Highly Viscous Self-Sticking Compositions".
Abstract of EP 1 081 204, published on Mar. 7, 2001, entitled "Use of Sulfur for Curing High-Viscocity Pressure-Sensitive self-Adhesive Materials Based on Non-thermoplastic Elastomers".
Abstract of EP 1 089 878, published on Apr. 11, 2001, entitled "Sealable Multilayer Film Made of a Grafted Terpolymer".
Abstract of WO96/23751, published on Aug. 8, 1996, entitled "Process for Preparing Olefin Oligomers".
Abstract of WO99/05152, published on Feb. 4, 1999, entitled "Method for Producing Metallocenes".
Abstract of WO99/61487, published on Dec. 2, 1999, entitled "Catalyst System and the Use of Said Catalyst system for Polymerising Propylene".
Abstract of WO99/67094, published on Dec. 29, 1999, entitled "Sealable Multilayer Film Made of a Grafted Terpolymer".
Abstract of WO/0044799, published on Aug. 3, 2000, entitled "Organometal Compound, Catalyst System Containing Said Organometal Compound and its Use".
Abstract of WO01/14429, published on Mar. 1, 2001, entitled "Supported Catalyst Systems, Method for the Production Thereof and Method for Producing Poly-1 Alkenes with Bimodal or Multimodal Molecular Weight Distribution".
Abstract of WO01/46274, published on Jun. 28, 2001 entitled "Partly Crystalline Propylene Polymerisate Composition for Production of Biaxial-Stretched Polypropylene Films".

Abstract of WO01/48034, published on Jun. 20, 2002 entitled "Transition Metal Compound, Ligand System, Catalyst System and the Use of the Latter for the Polymerisation of Olefins".
Abstract of DE 2316614.
Abstract of CA 2407183.

Markel, et al., "Metallocene-Based Branch-Block Thermoplastic Elastomers", *Macromolecules*, vol. 33, No. 23, pp. 8541-8548, 2000.

* cited by examiner

Example 4

Example 31

Example 32 in Table 6

MUTLIPLE CATALYST SYSTEM FOR OLEFIN POLYMERIZATION AND POLYMERS PRODUCED THEREFROM

RELATED CASE INFORMATION

This application claims priority to provisional U.S. Ser. No. 60/418,482, filed Oct. 15, 2002, entitled "Multiple Catalyst System for Olefin Polymerization and Polymers Produced Therefrom." This application also claims priority from U.S. Ser. No. 60/460,714, filed Apr. 4, 2003 entitled "Polyolefin Adhesive Compositions and Articles Made Therefrom."

This application is related to U.S. Ser. No. 60/199,093, filed on Apr. 21, 2000 and US2000000199093P, filed Apr. 20, 2001 claiming priority from U.S. Ser. No. 60/199,093. The instant application also relates to U.S. Ser. No. 60/171,715, filed Dec. 21, 1999; U.S. Ser. No. 09/745,394, filed Dec. 21, 2000; and U.S. Ser. No. 09/746,332 filed Dec. 21, 2000. The instant application also relates to WO 01/81493.

FIELD OF THE INVENTION

This invention relates to a process to polymerize olefins using multiple catalysts and polymers produced therefrom. In particular this invention relates to a process to produce polyolefin adhesives and the adhesives so produced.

BACKGROUND OF THE INVENTION

For some applications such as adhesives individual polymers do not possess the necessary combination of properties. Individual polyolefins having certain characteristics are often blended together in the hope of combining the positive attributes of the individual components. Typically the result is a blend which displays an average of the individual properties of the individual resins. For example EP 0 527 589 discloses blends of flexible, low molecular weight amorphous polypropylene with higher molecular weight isotactic polypropylene to obtain compositions with balanced mechanical strength and flexibility. These compositions show better flexibility compared to that of the isotactic polypropylene alone, but are still lacking in other physical attributes. Physical blends also have the problems of inadequate miscibility. Unless the components are selected for their compatibility they can phase separate or smaller components can migrate to the surface. Reactor blends, also called intimate blends (a composition comprising two or more polymers made in the same reactor or in a series of reactors) are often used to address these issues, however finding catalyst systems that will operate under the same environments to produce different polymers has been a challenge.

Multiple catalyst systems have been used in the past to produce reactor blends (also called intimate blends) of various polymers and other polymer compositions. Reactor blends and other one-pot polymer compositions are often regarded as superior to physical blends of similar polymers. For example U.S. Pat. No. 6,248,832 discloses a polymer composition produced in the presence of one or more stereospecific metallocene catalyst systems and at least one non-stereospecific metallocene catalyst system. The resultant polymer has advantageous properties over the physical blends disclosed in EP 0 527 589 and U.S. Pat. No. 5,539,056.

Thus there has been interest in the art in developing multiple catalyst systems to produce new polymer compositions. For example, U.S. Pat. No. 5,516,848 discloses the use of two different cyclopentadienyl based transition metal compounds activated with alumoxane or non-coordinating anions. In particular, the examples disclose, among other things, catalyst compounds in combination, such as ($Me_2Si(Me_4C_5)(N-c-C_{12}H_{23})TiCl_2$ and $rac-Me_2Si(H_4Ind)ZrCl_2$, or $Me_2Si(Me_4C_5)(N-c-C_{12}H_{23})TiCl_2$ and $Me_2Si(Ind_2)HfMe_2$, (Ind=indenyl) activated with activators such as methylalumoxane or N,N-dimethyl anilinium tetrakis(pentafluorphenyl) borate to produce polypropylenes having bimodal molecular weight distributions (Mw/Mn), varying amounts of isotacticity (from 12 to 52 weight % isotactic PP in the product in Ex 2, 3 and 4), and having weight average molecular weights over 100,000, and some even as high as 1,200,000 for use as thermoplastics. Likewise, U.S. Pat. No. 6,184,327 discloses a thermoplastic elastomer comprising a branched olefin polymer having crystalline sidechains and an amorphous backbone wherein at least 90 mole percent of the sidechains are isotactic or syndiotactic polypropylene and at least 80 mole percent of the backbone is atactic polypropylene produced by a process comprising: a) contacting, in solution, at a temperature from about 90° C. to about 120° C., propylene monomers with a catalyst composition comprising a chiral, stereorigid transition metal catalyst compound capable of producing isotactic or syndiotactic polypropylene; b) copolymerizing the product of a) with propylene and, optionally, one or more copolymerizable monomers, in a polymerization reactor using an achiral transition metal catalyst capable of producing atactic polypropylene; and c) recovering a branched olefin polymer. Similarly U.S. Pat. No. 6,147,180 discloses the synthesis of a thermoplastic polymer composition, which is produced by first polymerizing monomers to produce at least 40% vinyl terminated macromonomers and then copolymerizing the macromonomers with ethylene. In addition U.S. Pat. No. 6,323,284 discloses a method to produce thermoplastic compositions (mixtures of crystalline and amorphous polyolefin copolymers) by copolymerizing alpha-olefins and alpha, omega dienes using two separate catalyst systems.

Likewise others have experimented with multiple stage processes to produce new polymer compositions. For example EP 0 366 411 discloses a graft polymer having an EPDM backbone with polypropylene grafted thereto at one or more of the diene monomer sites through the use of a two-step process using a different Ziegler-Natta catalyst system in each step. This graft polymer is stated to be useful for improving the impact properties in blended polypropylene compositions.

Although each of the polymers described in the above references has interesting combinations of properties, there remains a need for new composition that offer other new and different property balances tailored for a variety of end uses. In particular, it would be desirable to find a composition that is strong yet has adhesive characteristics and the ability to be applied using adhesive technology and equipment.

For general information in this area, one may refer to:
1. DeSouza and Casagrande, in 2001 addressed the issue of binary catalyst systems in "*Recent Advances in Olefin Polymerization Using Binary Catalyst Systems*, Macromol. Rapid Commun. 2001, 22, No. 16 (pages 1293 to 1301). At page 1299 they report propylene systems that produce a "gooey" product.
2. Studies with respect to the production of stereoblock polypropylene by using in-situ mixtures of metallocene catalysts with different stereoselectivity were recently performed by Lieber and Brintzinger in "Propene Polymerization with Catalyst Mixtures Containing Different Ansa-Zirconocenes: Chain Transfer to Alkylaluminum Cocatalysts and Formation of Stereoblock Polymers", Macromolecules 2000, 33, No.25 (pages 9192-9199). Propylene polymerization reactions were performed using metallocene catalysts $H_4C_2(Flu)_2ZrCl_2$, rac-Me$_2$Si(2-Me-4-tBu-C$_5$H$_2$)$_2$ZrCl$_2$ and rac-Me$_2$Si(2-MeInd)$_2$ZrCl$_2$ in the presence of either MAO (methylalumoxane) or triisobutylaluminium (Al$^i$Bu$_3$)/triphenylcarbenium tetrakis(perfluorophenylborate) (trityl borate) as the cocatalyst. Propylene polymerization using the mixed catalysts, $H_4C_2$ (Flu)$_2$ZrCl$_2$ and rac-Me$_2$Si(2-MeInd)$_2$ZrCl$_2$ in the presence of either MAO or AliBu$_3$/trityl borate produced waxy solids, which are completely separable into an atactic (diethyl ether-soluble) and an isotactic (insoluble) fraction. Neither fraction contained any combination of isotactic and atactic pentad patterns indicating that these catalyst mixtures did not form stereoblock polymers.

3. Aggarwal addressed the various polymers produced in "Structures and Properties of Block Polymers and Multiphase Polymer Systems: An Overview of Present Status and Future Potential", S. L. Aggarwal, Sixth Biennial Manchester Polymer Symposium (UMIST Manchester, March 1976)

4. "Selectivity in Propene Polymerization with Metallocene Catalysts" Resconi, et al, Chem Rev. 2000, 100, 1253-1345.

None of the references above has directly addressed the need for polyolefin based adhesives containing both amorphous and crystalline components. Such adhesives are desired in the industry as a replacement for blends requiring significant amount of hydrocarbon resin tackifiers.

Additional references that are of interest include:
1) EP Patents: EP0 619 325 B1, EP719 802 B1;
2) US Patents/Publications: U.S. Pat. Nos. 6,207,606, 6,258,903; 6,271,323; 6,340,703, 6,297,301, US 2001/0007896 A1, U.S. Pat. Nos. 6,184,327, 6,225,432, 6,342,574, 6,147,180, 6,114,457, 6,143,846, 5,998,547; 5,696,045; 5,350,817, U.S. Pat. No. 6,569,965,
3) PCT Publications: WO 00/37514, WO 01/81493, WO 98/49229, WO 98/32784; and WO 01/09200
4) "Metallocene-Based Branch-Block thermoplastic Elastomers," Markel, et al. Macromolecules 2000, Volume 33, No. 23. pgs. 8541-8548.

SUMMARY OF THE INVENTION

This invention relates to a polymer comprising one or more C3 to C40 olefins, optionally one or more diolefins, and less than 15 mole % of ethylene, where the polymer has:
a) a Dot T-Peel of 1 Newton or more; and
b) a branching index (g') of 0.95 or less measured at the Mz of the polymer;
c) an Mw of 100,000 or less.

This invention also relates to a polymer comprising one or more C3 to C40 olefins where the polymer has:
a) a Dot T-Peel of 1 Newton or more on Kraft paper;
b) a branching index (g') of 0.95 or less measured at the Mz of the polymer;
c) a Mw of 10,000 to 100,000; and
d) a heat of fusion of 1 to 70 J/g.

This invention also relates a polymer comprising one or more C3 to C40 olefins where the polymer has:
a) a Dot T-Peel of 1 Newton or more on Kraft paper;
b) a branching index (g') of 0.98 or less measured at the Mz of the polymer;
c) a Mw of 10,000 to 60,000;
d) a heat of fusion of 1 to 50 J/g.

This invention also relates to a homopolypropylene or a copolymer of propylene and up to 5 mole % ethylene having:
a) an isotactic run length of 1 to 30 (isotactic run length "IRL" is defined to be the percent of mmmm pentad divided by 0.5×percent of mmmr pentad) as determined by Carbon 13 NMR, preferably 3 to 25, more preferably 4 to 20,
b) a percent of r dyad of greater than 20%, preferably from 20 to 70% as determined by Carbon 13 NMR, and
c) a heat of fusion of 70 J/g or less, preferably 60 J/g or less, more preferably between 1 and 55 J/g, more preferably between 4 and 50 J/g.

This invention further relates to a process to produce an olefin polymer comprising:
1) selecting a first catalyst component capable of producing a polymer having an Mw of 100,000 or less and a crystallinity of 5% or less at selected polymerization conditions;
2) selecting a second catalyst component capable of producing polymer having an Mw of 100,000 or less and a crystallinity of 20% or more at the selected polymerization conditions;
3) contacting the catalyst components in the presence of one or more activators with one or more C3 to C40 olefins, at the selected polymerization conditions in a reaction zone;
4) obtaining the polymer.

This invention further relates to a continuous process to produce a branched olefin polymer comprising:
1) selecting a first catalyst component capable of producing a polymer having an Mw of 100,000 or less and a crystallinity of 5% or less under selected polymerization conditions;
2) selecting a second catalyst component capable of producing polymer having an Mw of 100,000 or less and a crystallinity of 20% or more at the selected polymerization conditions;
3) contacting the catalyst components in the presence of one or more activators with one or more C3 to C40 olefins, and, optionally one or more diolefins;
4) at a temperature of greater than 100° C.;
5) at a residence time of 120 minutes or less;
6) wherein the ratio of the first catalyst to the second catalyst is from 1:1 to 50:1;
7) wherein the activity of the catalyst components is at least 100 kilograms of polymer per gram of the catalyst components; and wherein at least 20% of the olefins are converted to polymer.

DETAILED DESCRIPTION

Figure 1:
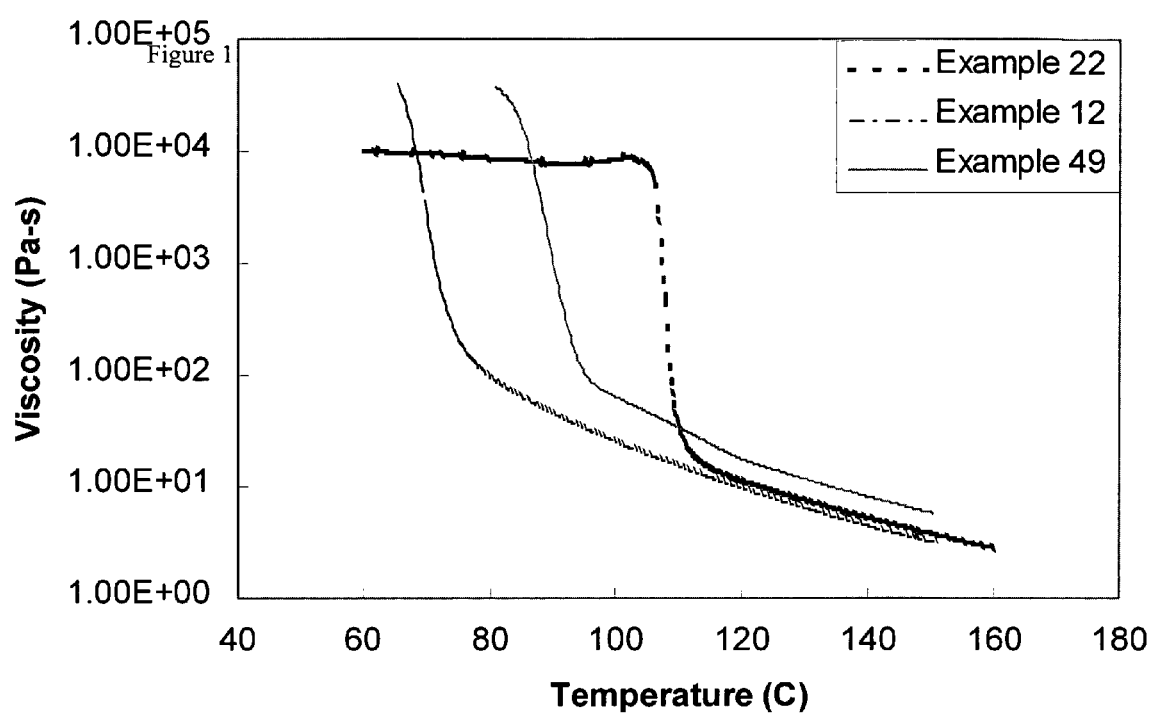
FIG. 1 is an illustration of complex viscosity changes with the temperature when the samples were cooled at 10 C. per minute for Examples 12, 22 and 49.
Figure 2:
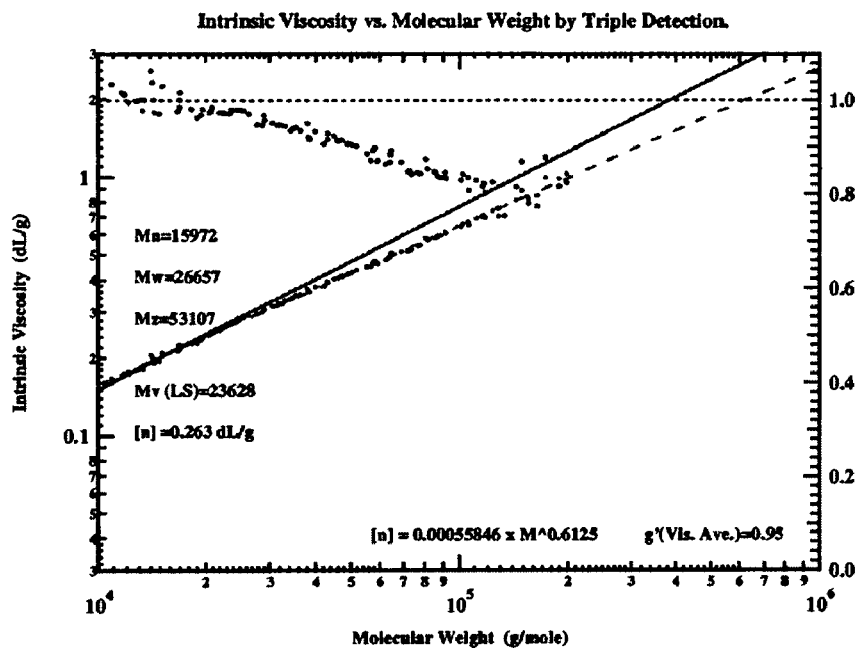
FIG. 2 is a graphic illustration of the relationship between the branching index, g', and the molecular weight for polymers produced in Examples 4 and 31.
Figure 2:
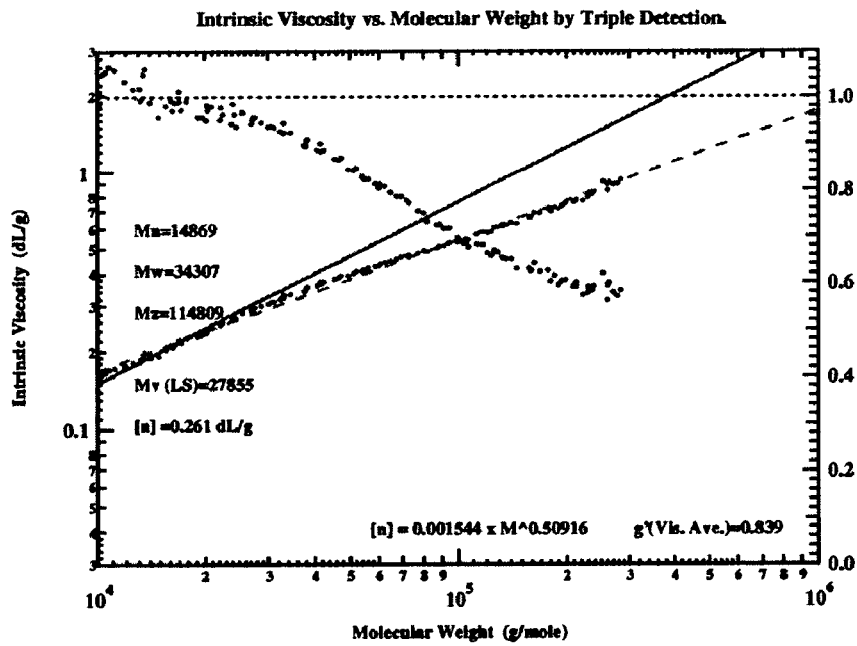
Figure 3:
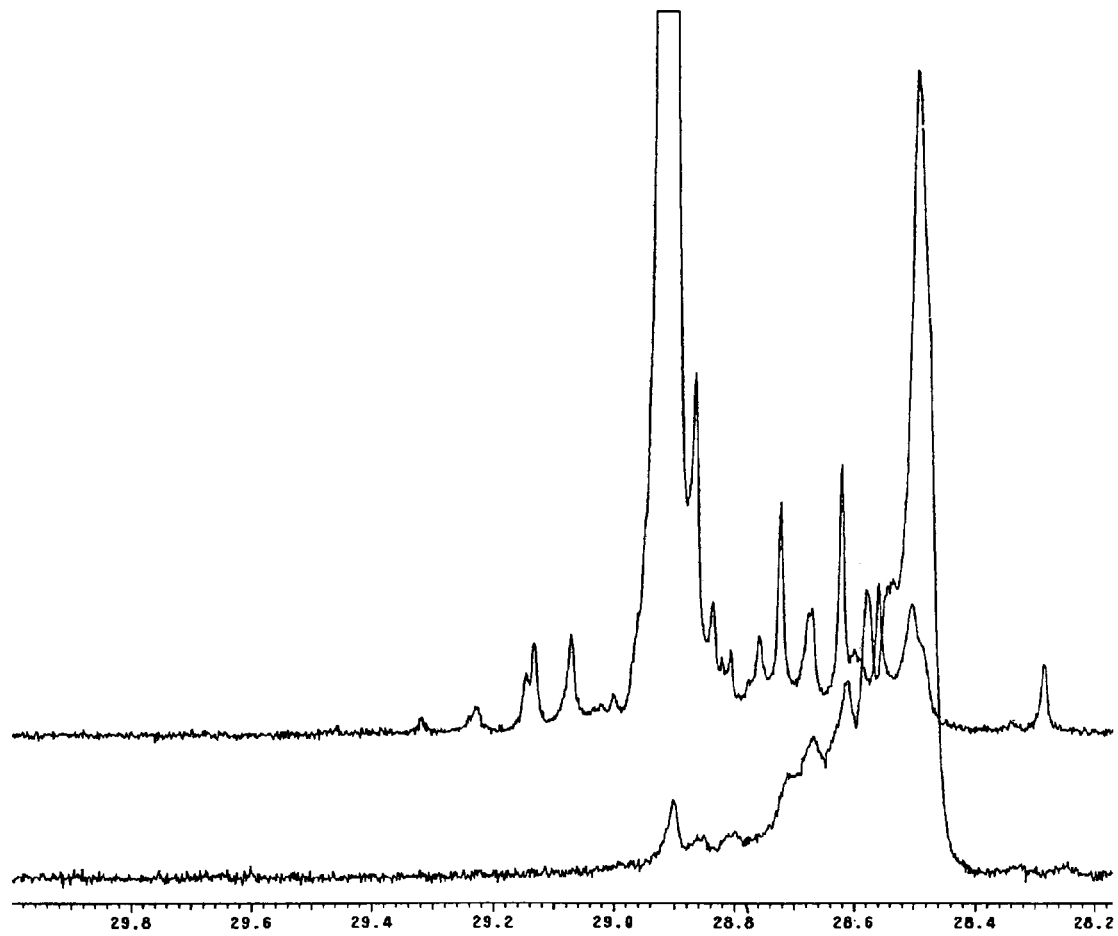
FIG. 3 is the C-13 NMR spectra of heptane soxhlet insoluble (top trace) and hexane room temperature soluble fractions (bottom trace) extracted from Example 4.
Figure 4:
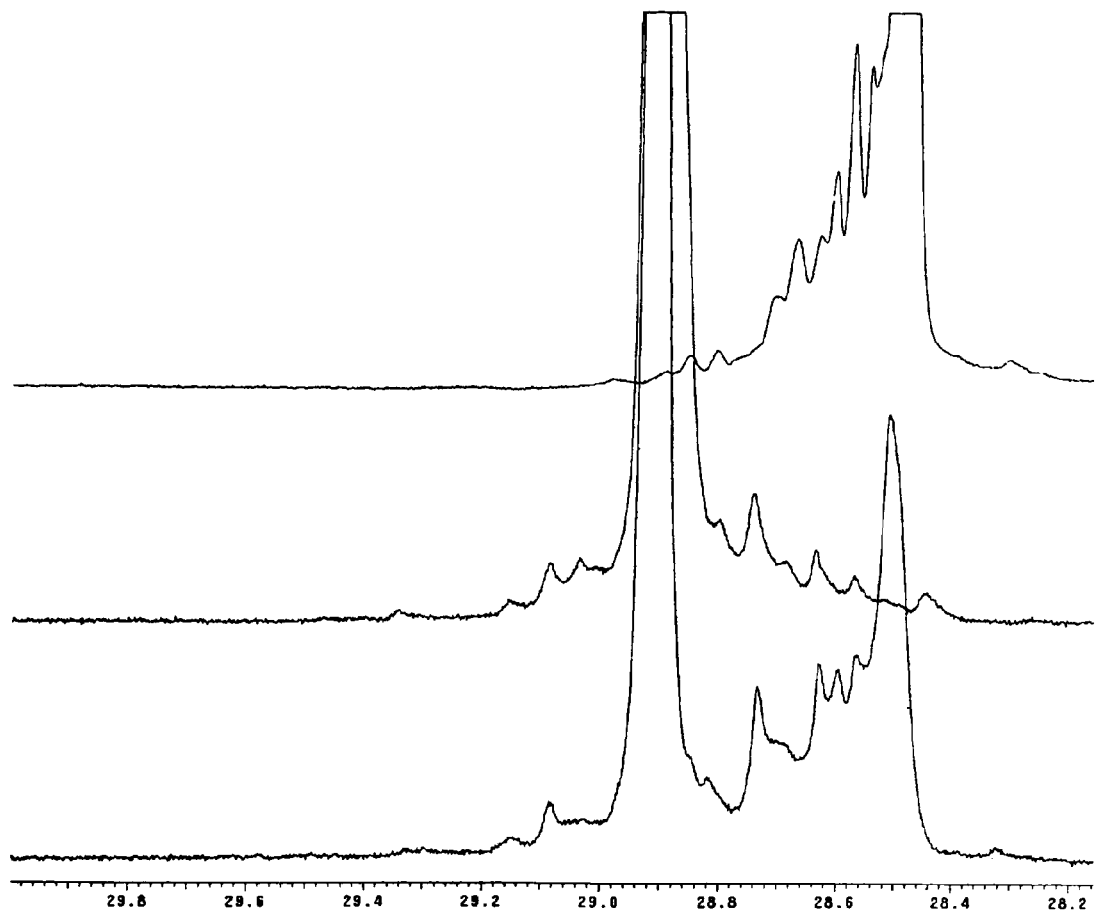
FIG. 4 is the C-13 NMR spectra of aPP/scPP branch block relative to scPP and aPP control. The control samples were produced using one catalyst at a time; aPP was synthesized using a specific catalyst, while the scPP was produced using stereospecific catalyst. The top trace is the aPP control sample. The middle trace is the scPP control sample and the bottom trace is Example 4.

For the purposes of this invention and the claims thereto and for ease of reference when a polymer is referred to as comprising an olefin, the olefin present in the polymer is the polymerized form of the olefin.

In another embodiment this invention relates to a polymer comprising one or more C3 to C40 olefins, preferably propylene, and less than 50 mole % of ethylene, having:
a) a Dot T-Peel between 1 Newton and the 10,000 Newtons; and
b) a Mz/Mn of 2 to 200; and/or
c) an Mw of X and a g' of Y (measured at the Mz of the polymer) according to the following Table C:

TABLE C

| X (Mw) | Y (g') |
|---|---|
| 100,000 or less, preferably 80,000 or less, preferably 70,000 or less, more preferably 60,000 or less, more preferably 50,000 or less, more preferably 40,000 or less, more preferably 30,000 or less, more preferably 20,000 or less, more preferably 10,000 or less. In some embodiments X is also at least 7000, more preferably 10,000, more preferably at least 15,000. | 0.9 or less, preferably 0.7 or less Preferably between 0.5-0.9 |
| 75,000 or less, preferably 70,000 or less, more preferably 60,000 or less, more preferably 50,000 or less, more preferably 40,000 or less, more preferably 30,000 or less, more preferably 20,000 or less, more preferably 10,000 or less. In some embodiments A is also at least 1000, preferably at least 2000, more preferably at least 3000, more preferably at least 4000, more preferably at least 5000, more preferably at least 7000, more preferably 10,000, more preferably at least 15,000. | 0.92 or less, preferably, 0.6 or less preferably between 0.4-0.6- |
| 50,000 or less, more preferably 40,000 or less, more preferably 30,000 or less, more preferably 20,000 or less, more preferably 10,000 or less. In some embodiments A is also at least 1000, preferably at least 2000, more preferably at least 3000, more preferably at least 4000, more preferably at least 5000, more preferably at least 7000, more preferably 10,000, more preferably at least 15,000. | 0.95 or less, preferably 0.7 or less preferably between 0.5-0.7- |
| 30,000 or less, preferably 25,000 or less, more preferably 20,000 or less, more preferably 15,000 or less, more preferably 10,000 or less. In some embodiments A is also at least 1000, preferably at least 2000, more preferably at least 3000, more preferably at least 4000, more preferably at least 5000, more preferably at least 7000, more preferably 10,000, more preferably at least 15,000. | 0.98 or less preferably between 0.7-0.98 |

In another embodiment, when Mw is between 15,000 and 100,000, then g'<($10^{-12}$ Mw$^2$–$10^{-6}$ Mw+1.0178).

In a some embodiments the g' is 0.9 or less, 0.8 or less, 0.7 or less, 0.6 or less, 0.5 or less measured at the Mz of the polymer.

In another embodiment the polymer described above also has a peak melting point (Tm) between 40 and 250° C., or between 60 and 190° C., or between about 60 and 150° C., or between 80 and 130° C. In some embodiments the peak melting point is between 60 and 160° C. In other embodiments the peak melting point is between 124-140° C. In other embodiments the peak melting temperature is between 40-130° C.

In another embodiment the polymer described above also has a viscosity (also referred to a Brookfield Viscosity or Melt Viscosity) of 90,000 mPa·sec or less at 190° C. (as measured by ASTM D 3236 at 190° C.); or 80,000 or less, or 70,000 or less, or 60,000 or less, or 50,000 or less, or 40,000 or less, or 30,000 or less, or 20,000 or less, or 10,000 or less, or 8,000 or less, or 5000 or less, or 4000 or less, or 3000 or less, or 1500 or less, or between 250 and 6000 mPa·sec, or between 500 and 5500 mPa·sec, or between 500 and 3000 mPa·sec, or between 500 and 1500 mPa·sec, and/or a viscosity of 8000 mPa·sec or less at 160° C. (as measured by ASTM D 3236 at 160° C.); or 7000 or less, or 6000 or less, or 5000 or less, or 4000 or less, or 3000 or less, or 1500 or less, or between 250 and 6000 mPa·sec, or between 500 and 5500 mPa·sec, or between 500 and 3000 mPa·sec, or between 500 and 1500 mPa·sec. In other embodiments the viscosity is 200,000 mPa·sec or less at 190° C., depending on the application. In other embodiments the viscosity is 50,000 mPa·sec or less depending on the applications.

In another embodiment the polymer described above also has a heat of fusion of 70 J/g or less, or 60 J/g or less, or 50 J/g or less; or 40 J/g or less, or 30 J/g or less, or 20 J/g or less and greater than zero, or greater than 1 J/g, or greater than 10 J/g, or between 20 and 50 J/g.

In another embodiment the polymer described above also has a Shore A Hardness (as measured by ASTM 2240) of 95 or less, 70 or less, or 60 or less, or 50 or less, or 40 or less or 30 or less, or 20 or less. In other embodiments the Shore A Hardness is 5 or more, 10 or more, or 15 or more. In certain applications, such as packaging, the Shore A Hardness is preferably 60-70.

In another embodiment the polymer of this invention has an Mz/Mn of 2 to 200, preferably 2 to 150, preferably 10 to 100.

In another embodiment the polymer described above also has a Shear Adhesion Fail Temperature (SAFT—as measured by ASTM 4498) of 200° C. or less, or of 40 to 150° C., or 60 to 130° C., or 65 to 110° C., or 70-80° C. In certain embodiments SAFT's of 130-140° C. are preferred.

In another embodiment the polymer described above also has a Dot T-Peel of between 1 Newton and 10,000 Newtons, or 3 and 4000 Newtons, or between 5 and 3000 Newtons, or between 10 and 2000 Newtons, or between 15 and 1000 Newtons. Dot T-Peel is determined according to ASTM D 1876, except that the specimen is produced by combining two 1 inch by 3 inch (2.54 cm×7.62 cm) Kraft paper substrate cut outs with a dot of adhesive with a volume that, when compressed under a 500 gram weight occupies about 1 square inch of area (1 inch=2.54 cm). Once made all the specimens are pulled apart in side by side testing (at a rate of 2 inches per minute) by a machine that records the destructive force of the insult being applied. The maximum force achieved for each sample tested was recorded and averaged, thus producing the Average Maximum Force which is reported as the Dot T-Peel.

In another embodiment the polymer described above also has a set time of several days to 1 second, or 60 seconds or less, or 30 seconds or less, or 20 seconds or less, or 15 seconds or less, or 10 seconds or less, or 5 seconds or less, or 4 seconds or less, or 3 seconds or less, more or 2 seconds or less, or 1 second or less.

In another embodiment the polymer described above also has an Mw/Mn of 2 to 75, or 4 to 60, or 5 to 50, or 6 to 20.

In another embodiment the polymer described above also has an Mz of 1,000,000 or less, preferably 15,000 to 1,000,000, or 20,000 to 800,000, or 25,000 to 350,000.

In another embodiment the polymer described above may also have a strain at break (as measured by ASTM D-1708 at 25° C.) of 50 to 1000%, preferably 80 to 200%. In some other embodiments the strain at break is 100 to 500%.

In another embodiment, the polymer described herein has a tensile strength at break (as measured by ASTM D-1708 at 25° C.) of 0.5 MPa or more, alternatively 0.75 MPa or more, alternatively 1.0 MPa or more, alternatively 1.5 MPa or more, alternatively 2.0 MPa or more, alternatively 2.5 MPa or more, alternatively 3.0 MPa or more, alternatively 3.5 MPa or more.

In another embodiment the polymer described above also has a crystallization point (Tc) between 20 and 110° C. In some embodiments the Tc is between 70 to 100° C. In other embodiments the Tc is between 30 to 80° C. In other embodiments the Tc is between 20 to 50° C.

In some embodiment the polymers described above have a slope of −0.1 or less, preferably −0.15 or less, more preferably −0.25 or less in the trace of complex viscosity versus temperature as shown in FIG. 1 (as measured by ARES dynamic mechanical spectrometer operating at a frequency of 10 rad/s, with a strain of 20% under a nitrogen atmosphere, and a cooling rate of 10° C./min) over the range of temperatures from Tc+10° C. to Tc+40° C. The slope is defined as a derivative of log (complex viscosity) with respect to temperature.

In another embodiment the polymer described above has a Tc that is at least 10° C. below the Tm, preferably at least 20° C. below the Tm, preferably at least 30° C. below the Tm, more preferably at least 35° C. below the Tm.

In another embodiment some polymers described above have a melt index ratio ($I_{10}/I_2$) of 6.5 or less, preferably 6.0 or less, preferably 5.5 or less, preferably 5.0 or less, preferably 4.5 or less, preferably between 1 and 6.0. ($I_{10}$ and $I_2$ are measured according to ASTM 1238 D, 2.16 kg, 190° C.).

In another embodiment some polymers described above have a melt index (as determined by ASTM 1238 D, 2.16 kg, 190 deg. C) of 25 dg/min or more, preferably 50 dg/min or more, preferably 100 dg/min or more, more preferably 200 dg/min or more, more preferably 500 dg/mn or more, more preferably 2000 dg/min or more.

In another embodiment the polymer has a melt index of 900 dg/min or more.

In another embodiment the polymer described above has a range of crystallization of 10 to 60° C. wide, preferably 20 to 50° C., preferably 30 to 45° C. in the DSC traces. In DSC traces where there are two or more non-overlapping peaks, then each peak has a range of crystallization of 10 to 60° C. wide, preferably 20 to 50° C., preferably 30 to 45° C. in the DSC traces.

In another embodiment the polymer produced by this invention has a molecular weight distribution (Mw/Mn) of at least 2, preferably at least 5, preferably at least 10, even more preferably at least 20.

In another embodiment the polymer produced may have a unimodal, bimodal, or multimodal molecular weight distribution (Mw/Mn) distribution of polymer species as determined by Size Exclusion Chromatography (SEC). By bimodal or multimodal is meant that the SEC trace has more than one peak or inflection points. An inflection point is that point where the second derivative of the curve changes in sign (e.g., from negative to positive or vice versus).

In another embodiment the polymer described above has an Energy of activation of 8 to 15 cal/mol Energy of activation was calculated using the relationships of complex viscosity and temperature over the region where thermal effects are responsible for viscosity increase (assuming an Arrhenius-like relationship).

In another embodiment the polymers of this invention may have a crystallinity of at least 5%.

In another embodiment the polymer described above may also have one or more of the following:

a) a peak melting point between 60 and 190° C., or between about 60 and 150° C., or between 80 and 130° C.; and/or b) a viscosity of 8000 mPa·sec or less at 190° C. (as measured by ASTM D 3236 at 190° C.); or 5000 or less, or 4000 or less, or 3000 or less, or 1500 or less, or between 250 and 6000 mPa·sec, or between 500 and 5500 mPa·sec, or between 500 and 3000 mPa·sec, or between 500 and 1500 mPa·sec, or a viscosity of 8000 mPa·sec or less at 160° C. (as measured by ASTM D 3236 at 160° C.); or 7000 or less, or 6000 or less, or 5000 or less, or 4000 or less, or 3000 or less, or 1500 or less, or between 250 and 6000 mPa·sec, or between 500 and 5500 mPa·sec, or between 500 and 3000 mPa·sec, or between 500 and 1500 mPa·sec; and/or c) an Hf(Heat of fusion) of 70 J/g or less, or 60 J/g or less, or 50 J/g or less; or 40 J/g or less, or 30 J/g or less, or 20 J/g or less and greater than zero, or greater than 1 J/g, or greater than 10 J/g, or between 20 and 50 J/g; and or d) a Shore A Hardness (as measured by ASTM 2240) of 90 or less, or 80 or less, or 70 or less, or 60 or less or 50 or less, or 40 or less; and or e) a Shear Adhesion Fail Temperature (SAFT—as measured by ASTM 4498) of 40 to 150° C., or 60 to 130° C., or 65 to 110° C., or 70-80° C.; and or;

f) a Dot T-Peel of between 1 Newton and 10,000 Newtons, or 3 and 4000 Newtons, or between 5 and 3000 Newtons, or between 10 and 2000 Newtons, or between 15 and 1000 Newtons; and/or g) a set time of several days to 0.1 second, or 60 seconds or less, or 30 seconds or less, or 20 seconds or less, or 15 seconds or less, or 10 seconds or less, or 5 seconds or less, or 4 seconds or less, or 3 seconds or less, more or 2 seconds or less, or 1 second or less; and or h) an Mw/Mn of greater than 1 to 75, or 2 to 60, or 2 to 50, or 3 to 20; and/or i) an Mz of 1,000,000 or less, preferably 15,000 to 500,000, or 20,000 to 400,000, or 25,000 to 350,000.

Useful combinations of features include polymers as described above having a Dot T-Peel of between 1 Newton and 10,000 Newtons, or 3 and 4000 Newtons, or between 5 and 3000 Newtons, or between 10 and 2000 Newtons, or between 15 and 1000 Newtons and:

1. an Mw of 30,000 or less, a peak melting point between 60 and 190° C., a Heat of fusion of 1 to 70 J/g, a branching index (g') of 0.90 or less measured at the Mz of the polymer; and a melt viscosity of 8000 mPa·sec or less at 190° C.; or 2. an Mz of 20,000 to 500,000 and a SAFT of 60 to 150° C.; or 3. an Mz/Mn of 2-200 and a set time of 2 seconds or less; or 4. an Hf (heat of fusion) of 20 to 50 J/g, an Mz or 20,000-500,000 and a shore hardness of 50 or less; or 5. an Mw/Mn of greater than 1 to 50, a viscosity of 5000 or less mPa·sec at 190° C.; or 6. an Mw of 50,000 or less, a peak melting point between 60 and 190° C., a heat of fusion of 2 to 70 J/g, a branching index (g') of 0.70 or less measured at the Mz of the polymer, and a melt viscosity of 8000 mPa·sec or less at 190° C.

In a preferred embodiment, the polymer of this invention comprises amorphous, crystalline and branch-block molecular structures.

In a preferred embodiment the polymer comprises at least 50 weight % propylene, preferably at least 60% propylene, alternatively at least 70% propylene, alternatively at least 80% propylene. In another embodiment the polymer comprises propylene and 15 mole % ethylene or less, preferably 10 mole % ethylene or less, more preferably 9 mole % ethylene or less, more preferably 8 mole % ethylene or less, more preferably 7 mole % ethylene or less, more preferably 6 mole % ethylene or less, more preferably 5 mole % ethylene or less, more preferably 4 mole % ethylene or less, more preferably 3 mole % ethylene or less, more preferably 2 mole % ethylene or less, more preferably 1 mole % ethylene or less.

In another embodiment the polymer of this invention comprises less than 5 mole % of ethylene, preferably less than 4.5 mole % ethylene, preferably less than 4.0 mole % ethylene, alternatively less than 3.5 mole % ethylene, alternatively less than 3.0 mole % ethylene, alternatively less than 2.5 mole % ethylene, alternatively less than 2.0 mole % ethylene, alternatively less than 1.5 mole % ethylene, alternatively less than 1.0 mole % ethylene, alternatively less than 0.5 mole % ethylene, alternatively less than 0.25 mole % ethylene, alternatively 0 mole % ethylene.

In another embodiment the polymer produced has a glass transition temperature (Tg) as measured by ASTM E 1356 of 5° C. or less, preferably 0° C. or less, preferably −5° C. or less, alternatively between −5° C. and −40° C., alternatively between −5° C. and −15° C.

In another embodiment the polymer of this invention has an amorphous content of at least 50%, alternatively at least 60%, alternatively at least 70%, even alternatively between 50 and 99%. Percent amorphous content is determined using Differential Scanning Calorimetry measurement according to ASTM E 794-85.

In another embodiment the polymer of this invention has a crystallinity of 40% or less, alternatively 30% or less, alternatively 20% or less, even alternatively between 10% and 30%. Percent crystallinity content is determined using Differential Scanning Calorimetry measurement according to ASTM E 794-85. In another embodiment, the polymers described herein have a percent crystallinity of between 5 and 40%, alternatively between 10 to 30%.

In another embodiment the polymer produced by this invention has a molecular weight distribution (Mw/Mn) of at least 1.5, preferably at least 2, preferably at least 5, preferably at least 10, even alternatively at least 20. In other embodiments the Mw/Mn is 20 or less, 10 or less, even 5 or less. Molecular weight distribution generally depends on the catalysts used and process conditions such as temperature, monomer concentration, catalyst ratio, if multiple catalysts are used, and the presence or absence of hydrogen. Hydrogen may be used at amounts up to 2 weight %, but is preferably used at levels of 50 to 500 ppm.

In another embodiment the polymer produced is found to have at least two molecular weights fractions are present at greater than 2 weight %, preferably greater than 20 weight %, each based upon the weight of the polymer as measured by Gel Permeation Chromatography. The fractions can be identified on the GPC trace by observing two distinct populations of molecular weights. An example would be a GPC trace showing a peak at 20,000 Mw and another peak at 50,000 Mw where the area under the first peak represents more than 2 weight % of the polymer and the area under the second peak represents more than 2 weight % of the polymer.

In another embodiment the polymer of this invention has 20 weight % or more (based upon the weight of the starting polymer) of hexane room temperature soluble fraction, and 70 weight % or less, preferably 50 weight % or less of Soxhlet boiling heptane insolubles, based upon the weight of the polymer. Soxhlet heptane insoluble refers to one of the fractions obtained when a sample is fractionated using successive solvent extraction technique. The fractionations are carried out in two steps: one involves room temperature solvent extraction, the other soxhlet extraction. In the room temperature solvent extraction, about one gram of polymer is dissolved in 50 ml of solvent (e.g., hexane) to isolate the amorphous or very low molecular weight polymer species. The mixture is stirred at room temperature for about 12 hours. The soluble fraction is separated from the insoluble material using filtration under vacuum. The insoluble material is then subjected to a Soxhlet extraction procedure. This involves the separation of polymer fractions based on their solubility in various solvents having boiling points from just above room temperature to 110° C. The insoluble material from the room temperature solvent extraction is first extracted overnight with a solvent such as hexane and heptane (Soxhlet); the extracted material is recovered by evaporating the solvent and weighing the residue. The insoluble sample is then extracted with a solvent having higher boiling temperature such as heptane and after solvent evaporation, it is weighed. The insolubles and the thimble from the final stage are air-dried in a hood to evaporate most of the solvent, then dried in a nitrogen-purged vacuum oven. The amount of insoluble left in the thimble is then calculated, provided the tare weight of the thimble is known.

In another embodiment, the polymers produced in this invention have a heptane insoluble fraction 70 weight % or less, based upon the weight of the starting polymer, and the heptane insoluble fraction has branching index g' of 0.9 (preferably 0.7) or less as measured at the Mz of the polymer. In a preferred embodiment the composition also has at least 20 weight % hexane soluble fraction, based upon the weight of the starting polymer. In another embodiment, the polymers produced in this invention have a heptane insoluble fraction 70 weight % or less, based upon the weight of the starting polymer and a Mz between 20,000 and 5000,000 of the heptane insoluble portion. In a preferred embodiment the composition also has at least 20 weight % hexane soluble fraction, based upon the weight of the starting polymer. In another embodiment the polymers produced have a hexane soluble portion of at least 20 weight %, based upon the weight of the starting polymer.

In another embodiment the polymer comprises propylene and 15 mole % ethylene or less, preferably 10 mole % ethylene or less, more preferably 9 mole % ethylene or less, more preferably 8 mole % ethylene or less, more preferably 7 mole % ethylene or less, more preferably 6 mole % ethylene or less, more preferably 5 mole % ethylene or less, more preferably 4 mole % ethylene or less, more preferably 3 mole % ethylene or less, more preferably 2 mole % ethylene or less, more preferably 1 mole % ethylene or less.

In another embodiment the polymer of this invention comprises less than 5 mole % of ethylene, preferably less than 4.5 mole % ethylene, preferably less than 4.0 mole % ethylene, alternatively less than 3.5 mole % ethylene, alternatively less than 3.0 mole % ethylene, alternatively less than 2.5 mole % ethylene, alternatively less than 2.0 mole % ethylene, alternatively less than 1.5 mole % ethylene, alternatively less than 1.0 mole % ethylene, alternatively less than 0.5 mole % ethylene, alternatively less than 0.25 mole % ethylene, alternatively 0 mole % ethylene.

For ease of reference the polymer produced by the second catalyst having at least 20% crystallinity may also be referred to as the "semi-crystalline polymer" and the polymer produced by the first catalyst component having a crystallinity of less than 5% may be referred to as the "amorphous polymer."

In another embodiment of this invention the polymer produced has a characteristic three-zone complex viscosity-temperature pattern, as shown in FIG. 1. The temperature dependence of complex viscosity was measured using ARES dynamic mechanical spectrometer operating at a frequency of 10 rad/s, with a strain of 20% under a nitrogen atmosphere, and a cooling rate of 10° C./min. The sample was first molten then gradually cooled down to room temperature while monitoring the build-up in complex viscosity. Above the melting point, which is typical of polymer processing temperature, the complex viscosity is relatively low (Zone I) and increases gradually with decreasing temperature. In zone II, a sharp increase in complex viscosity appears as temperature is dropped. The third zone (Zone III) is the high complex viscosity zone, which appears at lower temperatures corresponding to application (end use) temperatures. In Zone III the complex viscosity is high and varies slightly with further decrease in temperature. Such a complex viscosity profile provides, in hot melt adhesive applications, a desirable combination of long opening time at processing temperatures and fast set time at lower temperatures.

In a preferred embodiment, the polymers produced herein having less than 1 mol % ethylene, have at least 2 mol % $(CH_2)_2$ units, preferably 4 mol %, preferably 6 mol %, more preferably 8 mol %, more preferably 10 mol %, more preferably 12 mol %, more preferably 15 mol %, more preferably 18 mol %, more preferably 5 mol % as measured by Carbon 13 NMR as described below.

In an another embodiment, the polymers produced herein having between 1 and 10 mol % ethylene, have at least 2+X mol % $(CH_2)_2$ units, preferably 4+X mol %, preferably 6+X mol %, more preferably 8+X mol %, more preferably 10+X mol %, more preferably 12+X mol %, more preferably 15+X mol %, more preferably 18+X mol %, more preferably 20+X mol %, where X is the mole % of ethylene, and the $(CH_2)_2$ units are determined by Carbon 13 NMR as described below.

In a preferred embodiment, the polymers produced herein, having less than 1 mol % ethylene, have an amorphous component (which is defined to be that portion of the polymer composition that has a crystallinity of less than 5%) which contains at least 3 mol % $(CH_2)_2$ units, preferably 4 mol %, preferably 6 mol %, more preferably 8 mol %, more preferably 10 mol %, more preferably 12 mol %, more preferably 15 mol %, more preferably 18 mol %, more preferably 20 mol % as measured by Carbon 13 NMR as described below.

In an another embodiment, the polymers produced herein having between 1 and 10 mol % ethylene, have an amorphous component (which is defined to be that portion of the polymer composition that has a crystallinity of less than 20%) which contains at least 3+X mol % $(CH_2)_2$ units, preferably 4+X mol %, preferably 6+X mol %, more preferably 8+X mol %, more preferably 10+X mol %, more preferably 12+X mol %, more preferably 15+X mol %, more preferably 18+X mol %, more preferably 20+X mol %, where X is the mole % of ethylene, and the $(CH_2)_2$ units are determined by Carbon 13 NMR as described below.

Monomers

In a preferred embodiment the polymer comprises an olefin homopolymer or copolymer, comprising one or more C3 to C40 alpha olefins. In another preferred embodiment the olefin polymer further comprises one or more diolefin comonomers, preferably one or more C4 to C40 diolefins.

In a preferred embodiment the polymer comprises an olefin homopolymer or copolymer, having less than 5 mol % ethylene, and comprising one or more C3 to C40 alpha olefins. In another preferred embodiment the olefin polymer, having less than 5 mol % ethylene, further comprises one or more diolefin comonomers, preferably one or more C4 to C40 diolefins.

In a preferred embodiment the polymer produced herein is a propylene homopolymer or copolymer. The comonomer is preferably a C4 to C20 linear, branched or cyclic monomer, and in one embodiment is a C4 to C12 linear or branched alpha-olefin, preferably butene, pentene, hexene, heptene, octene, nonene, decene, dodecene, 4-methyl-pentene-1,3-methyl pentene-1,3,5,5-trimethyl-hexene-1, and the like. Ethylene may be present at 5 mol % or less.

In another embodiment the polymer produced herein is a copolymer of one or more linear or branched C3 to C30 prochiral alpha-olefins or C5 to C30 ring containing olefins or combinations thereof capable of being polymerized by either stereospecific and non-stereospecific catalysts. Prochiral, as used herein, refers to monomers that favor the formation of isotactic or syndiotactic polymer when polymerized using stereospecific catalyst(s).

The polymerizable olefinic moiety can be linear, branched, cyclic-containing, or a mixture of these structures. Preferred linear alpha-olefins include C3 to C8 alpha-olefins, more preferably propylene, 1-butene, 1-hexene, and 1-octene, even more preferably propylene or 1-butene. Preferred branched alpha-olefins include 4-methyl-1-pentene, 3-methyl-1-pentene, and 3,5,5-trimethyl-1-hexene, 5-ethyl-1-nonene. Preferred aromatic-group-containing monomers contain up to 30 carbon atoms. Suitable aromatic-group-containing monomers comprise at least one aromatic structure, preferably from one to three, more preferably a phenyl, indenyl, fluorenyl, or naphthyl moiety. The aromatic-group-containing monomer further comprises at least one polymerizable double bond such that after polymerization, the aromatic structure will be pendant from the polymer backbone. The aromatic-group containing monomer may further be substituted with one or more hydrocarbyl groups including but not limited to C1 to C10 alkyl groups. Additionally two adjacent substitutions may be joined to form a ring structure. Preferred aromatic-group-containing monomers contain at least one aromatic structure appended to a polymerizable olefinic moiety. Particularly preferred aromatic monomers include styrene, alpha-methylstyrene, para-alkyl-styrenes, vinyltoluenes, vinylnaphthalene, allyl benzene, and indene, especially styrene, paramethyl styrene, 4-phenyl-1-butene and allyl benzene.

Non aromatic cyclic group containing monomers are also preferred. These monomers can contain up to 30 carbon atoms. Suitable non-aromatic cyclic group containing monomers preferably have at least one polymerizable olefinic group that is either pendant on the cyclic structure or is part of the cyclic structure. The cyclic structure may also be further substituted by one or more hydrocarbyl groups such as, but not limited to, C1 to C10 alkyl groups. Preferred non-aromatic cyclic group containing monomers include vinylcyclohexane, vinylcyclohexene, vinylnorbornene, ethylidene norbornene, cyclopentadiene, cyclopentene, cyclohexene, cyclobutene, vinyladamantane and the like.

Preferred diolefin monomers useful in this invention include any hydrocarbon structure, preferably C4 to C30, having at least two unsaturated bonds, wherein at least two of the unsaturated bonds are readily incorporated into a polymer by either a stereospecific or a non-stereospecific catalyst(s). It is further preferred that the diolefin monomers be selected from alpha, omega-diene monomers (i.e., di-vinyl monomers). More preferably, the diolefin monomers are linear di-vinyl monomers, most preferably those containing from 4 to 30 carbon atoms. Examples of preferred dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Preferred cyclic dienes include cyclopentadiene, vinylnorbornene, norbornadiene, ethylidene norbornene, divinylbenzene, dicyclopentadiene or higher ring containing diolefins with or without substituents at various ring positions.

In a preferred embodiment one or more dienes are present in the polymer produced herein at up to 10 weight %, preferably at 0.00001 to 1.0 weight %, preferably 0.002 to 0.5 weight %, even more preferably 0.003 to 0.2 weight %, based upon the total weight of the composition. In some embodiments 500 ppm or less of diene is added to the polymerization, preferably 400 ppm or less, preferably or 300 ppm or less. In other embodiments at least 50 ppm of diene is added to the polymerization, or 100 ppm or more, or 150 ppm or more.

In a preferred embodiment the olefin polymer is homopolypropylene. In another preferred embodiment the olefin polymer comprises propylene, ethylene, preferably less than 5 mol % ethylene, and at least one divinyl comonomer. In another preferred embodiment the olefin polymer comprises propylene and at least one divinyl comonomer.

In another embodiment, the olefin polymer comprises:
a first monomer present at from 40 to 95 mole %, preferably 50 to 90 mole %, preferably 60 to 80 mole %, and
a comonomer present at from 5 to 40 mole %, preferably 10 to 60 mole %, more preferably 20 to 40 mole %, and
a termonomer present at from 0 to 10 mole %, more preferably from 0.5 to 5 mole %, more preferably 1 to 3 mole %.

In a preferred embodiment the first monomer comprises one or more of any C3 to C8 linear, branched or cyclic alpha-olefins, including propylene, butene (and all isomers thereof), pentene (and all isomers thereof), hexene (and all isomers thereof), heptene (and all isomers thereof), and octene (and all isomers thereof). Preferred monomers include propylene, 1-butene, 1-hexene, 1-octene, and the like.

In a preferred embodiment the comonomer comprises one or more of any C2 to C40 linear, branched or cyclic alpha-olefins (provided ethylene, if present, is present at 5 mole % or less), including ethylene, propylene, butene, pentene, hexene, heptene, and octene, nonene, decene, undecene, dodecene, hexadecene, styrene, 3,5,5-trimethyl-hexene-1,3-methylpentene-1,4-methylpentene-1, norbornene and cyclopentene.

In a preferred embodiment the termonomer comprises one or more of any C2 to C40 linear, branched or cyclic alpha-olefins, (preferably ethylene, if present, is present at 5 mole % or less), including, but not limited to, ethylene, propylene, butene, pentene, hexene, heptene, and octene, nonene, decene, undecene, dodecene, hexadecene, butadiene, 1,5-hexadiene, 1,6-heptadiene, 1,4-pentadiene, 1,7-octadiene, 1,8-nonadiene, 1,9-decadiene, 1,11-dodecadiene, styrene, 3,5,5-trimethylhexene-1,3-methylpentene-1,4-methylpentene-1, and cyclopentadiene.

In a preferred embodiment the polymer comprises propylene and from 0 to 50 mole % ethylene, preferably from 0 to 30 mole % ethylene, more preferably from 0 to 15 mole % ethylene, more preferably from 0 to 10 mole % ethylene, more preferably from 0 to 5 mole % ethylene.

In a preferred embodiment the polymer comprises propylene and from 0 to 50 mole % butene, preferably from 0 to 30 mole % butene, more preferably from 0 to 15 mole % butene, more preferably from 0 to 10 mole % butene, more preferably from 0 to 5 mole % butene.

In a preferred embodiment the polymer comprises propylene and from 0 to 50 mole % hexene, preferably from 0 to 30 mole % hexene, more preferably from 0 to 15 mole % hexene, more preferably from 0 to 10 mole % hexene, more preferably from 0 to 5 mole % hexene.

Process

This invention further relates to a process to produce the olefin polymers described above comprising:
1) selecting a first catalyst component capable of producing a polymer having an Mw of 100,000 or less and a heat of fusion of 10 J/g or less;
2) selecting a second catalyst component capable of producing polymer having an Mw of 100,000 or less and a crystallinity of 20% or more;
3) contacting the catalyst components in the presence of one or more activators with one or more olefins, in a reaction zone.

This invention further relates to a process to produce the olefin polymers described above comprising:
1) selecting a first catalyst component capable of producing a polymer having an Mw of 100,000 or less and a heat of fusion of 10 J/g or less;
2) selecting a second catalyst component capable of producing polymer having an Mw of 100,000 or less and a crystallinity of 20% or more;
3) contacting the catalyst components in the presence of one or more activators with one or more olefins and one or more dienes, in a reaction zone.

This invention further relates to a process to produce the olefin polymers described above comprising:
1) selecting a first catalyst component capable of producing a polymer having an Mw of 100,000 or less and a heat of fusion of 70 J/g or less, capable of polymerizing macromonomers having reactive termini;
2) selecting a second catalyst component capable of producing macromonomers having reactive termini, an Mw of 100,000 or less and a crystallinity of 30% or more;
3) contacting the catalyst components in the presence of one or more activators with one or more olefins, and optionally a diolefin in a reaction zone.

This invention further relates to a process to produce the olefin polymers described above comprising:
1) selecting a first catalyst component capable of producing a polymer having an Mw of 30,000 or less and a heat of fusion of 10 J/g or less, capable of polymerizing macromonomers having reactive termini;

2) selecting a second catalyst component capable of producing macromonomers having reactive termini, an Mw of 30,000 or less and a crystallinity of 20% or more;
3) contacting the catalyst components in the presence of one or more activators with propylene, and optionally other olefins, in a reaction zone In another preferred embodiment this invention relates to a continuous process to produce a branched olefin polymer comprising:
1) selecting a first catalyst component capable of producing a polymer having an Mw of 100,000 or less, preferably 80,000 or less, preferably 60,000 or less and a crystallinity of 5% or less, preferably 3% or less, more preferably 2% or less, under selected polymerization conditions;
2) selecting a second catalyst component capable of producing polymer having an Mw of 100,000 or less, preferably 80,000 or less, preferably 60,000 or less and a crystallinity of 20% or more, preferably 30% or more, more preferably 40% or more at the selected polymerization conditions;
3) contacting, under the selected polymerization conditions, the catalyst components in the presence of one or more activators with one or more C3 to C40 olefins, preferably one or more C3 to C12 olefins, preferably C3 and one or more of ethylene and/or C4 to C20 comonomers, and, optionally one or more diolefins, preferably a C4 to C20 diene;
4) at a temperature of greater than 70° C., preferably greater than 100° C., preferably greater than 105° C., more preferably greater than 110° C., more preferably greater than 115° C.;
5) at a residence time of 120 minutes or less, preferably 60 minutes or less, preferably 50 minutes or less, preferably 40 minutes, preferably 30 minutes or less, preferably 25 minutes or less, more preferably 20 minutes or less, more preferably 15 minutes or less, more preferably at 10 minutes or less, more preferably at 5 minutes or less, more preferably at 3 minutes or less, alternately the residence time may be between 60 and 120 minutes;
6) wherein the ratio of the first catalyst to the second catalyst is from 1:1 to 50:1, preferably 1:1 to 20:1, more preferably 1:1 to 1:10;
7) wherein the activity of the catalyst components is at least 3 kilograms, preferably at least 50 kilograms, more preferably at least 100 kilograms, more preferably at least 200 kilograms, more preferably, 300 kilograms, more preferably 400 kilograms, more preferably 500 kilograms of polymer per gram of the catalyst mixture; and wherein at least 80%, preferably at least 85%, more preferably at least 90%, more preferably at least 95% of the olefins are converted to polymer.

In another embodiment the a first catalyst component is capable of producing a polymer having an Mw of 100,000 or less and a crystallinity of 5% or less at selected polymerization conditions and the second catalyst component is capable of producing polymer having an Mw of 100,000 or less and a crystallinity of 20% or more at the selected polymerization conditions.

In another embodiment at least 20% or more of the olefins are converted to polymer, preferably 20% or more, more preferably 60% or more, more preferably 75% or more, more preferably 85% or more, more preferably 95% or more.

In a preferred embodiment the process described above takes place in a solution phase, slurry or bulk phase polymerization process.

By continuous is meant a system that operates (or is intended to operate) without interruption or cessation. For example a continuous process to produce a polymer would be one where the reactants are continually introduced into one or more reactors and polymer product is continually withdrawn.

In another preferred embodiment, in the process described above the concentrations of the reactants vary by 20% or less in the reaction zone during the residence time, preferably by 15% or less, more preferably by 10% or less. In a preferred embodiment the concentration of the monomer(s) remains constant in the reaction zone during the residence time. Preferably the concentration of the monomer(s) varies by 20% or less, preferably by 15% or less, more preferably by 10% or less, more preferably by 5% or less.

In a preferred embodiment the concentration of the catalyst components remains constant in the reaction zone during the residence time. Preferably the concentration of the monomer(s) varies by 20% or less, preferably by 15% or less, more preferably by 10% or less, more preferably by 5% or less.

In a preferred embodiment the concentration of the activator(s) remains constant in the reaction zone during the residence time. Preferably the concentration of the monomer(s) varies by 20% or less, preferably by 15% or less, more preferably by 10% or less, more preferably by 5% or less.

In another preferred embodiment a third catalyst (or more) may be present in the processes described above. The third catalyst may be any of the catalyst components listed herein. Preferred third catalysts include catalysts that are capable of producing waxes. Other preferred third catalysts may include any catalyst described herein. One may select two or more catalysts to produce various macromonomers having reactive termini, used in combination with a catalyst that can polymerize such macromonomers. One may select two or more catalysts that can polymerize macromonomers and one catalyst that can produce macromonomers with reactive termini. Likewise one could also select three catalysts that produce different polymers under the same reaction conditions. For example one could select a catalyst that produces a somewhat crystalline polymer, one that produces a very crystalline polymer and one that produces an amorphous polymer, any of which may produce macromonomers with reactive termini or polymerize polymers having reactive termini. Similarly one could select two catalysts, one that produces crystalline polymers and one that produces an amorphous polymer, any of which may make macromonomers with reactive termini or polymerize polymers having reactive termini. Likewise one could select a catalyst that produces a somewhat crystalline polymer, one that produces a wax and one that produces an amorphous polymer, any of which may make macromonomers with reactive termini or polymerize polymers having reactive termini.

By reaction zone is meant an area where the activated catalyst and monomers can react.

By macromonomers having reactive termini is meant a polymer having twelve or more carbon atoms (preferably 20 or more, more preferably 30 or more, more preferably between 12 and 8000 carbon atoms) and having a vinyl, vinylidene, vinylene or other terminal group that can be polymerized into a growing polymer chain. By capable of polymerizing macromonomer having reactive termini is meant a catalyst component that can incorporate a macromonomer (which tend to be molecules larger than a typical single monomer such as ethylene or propylene), having reactive termini into a growing polymer chain. Vinyl terminated chains are generally more reactive than vinylene or vinylidene terminated chains.

In a particular embodiment the present invention is directed to a polyolefin polymer produced by copolymerizing one or more $C_3$ or higher alpha-olefins and/or one or more di-vinyl monomers, and optionally up to 5 mol % ethylene, in the presence of at least one stereospecific catalyst system and at least one other catalyst system in the same polymerization medium. Preferably, the polymerizations are carried out simultaneously in the presence of both catalysts. The polymer so produced may contain amorphous polymer segments and crystalline polymer segments in which at least some of the segments are linked. Typically the amorphous and the crystalline polymer segments are copolymers of one or more alpha-olefins (optionally including up to 5 mol % ethylene) and/or one or more monomers having at least two olefinically unsaturated bonds. Both of these unsaturated bonds are suitable for and readily incorporated into a growing polymer chain by coordination polymerization using either the first or second catalyst systems independently such that the di-olefin is incorporated into polymer segments produced by both catalysts in the mixed catalyst system according to this invention. In a preferred embodiment these monomers having at least two olefinically unsaturated bonds are di-olefins, preferably di-vinyl monomers. Crosslinking of at least a portion of the mixture of polymer segments is believed to be accomplished during the polymerization of the composition by incorporation of a portion of di-vinyl comonomers into two polymer segments, thus producing a crosslink between those segments.

In another embodiment, polyolefin branch-block compositions containing amorphous and semi-crystalline components may be prepared in a single reactor to yield desired property balance. In particular, aPP-g-scPP branch structures may be produced in-situ in a continuous solution reactor using mixed catalysts and propylene as the preferred feed. In one embodiment stereospecific bridged bis-indenyl group 4 catalysts can be selected to produce semicrystalline PP macromonomers. (All references to the Periodic Table of the Elements are to the Table published in Chemical and Engineering News, 63(5), 27, 1985.) A bridged mono-cyclopentadienyl heteroatom group 4 catalyst can be used to build amorphous PP (aPP) backbone while simultaneously incorporating some of the semi-crystalline macromonomers (scPP). This is believed to produce a aPP-g-scPP structure where the "-g-" indicates that the polymer types are at least partially grafted. By selecting the catalysts, the polymerization reaction conditions, and/or by introducing a diene modifier, the amorphous and crystalline components can be linked together to produce various branch-block structures. To effectively incorporate into a growing chain, a macromonomer with vinyl end group is preferred. Other types of chain end unsaturations (vinylene and vinylidene) can also be used. While not wishing to be bound by theory, branch-block copolymer is believed to comprise an amorphous backbone having crystalline side chains originating from the scPP macromonomers and the sidechains are believed to be polypropylene macromonomers, which can be prepared under solution polymerization conditions with catalysts suitable for preparing either of isotactic or syndiotactic polypropylene.

A preferred reaction process to produce polypropylene macromonomers having high levels of terminal vinyl unsaturation is described in U.S. Pat. No. 6,117,962. Typically used catalysts are stereorigid, chiral or asymmetric, bridged metallocenes. See, for example, U.S. Pat. No. 4,892,851, U.S. Pat. No. 5,017,714, U.S. Pat. No. 5,132,281, U.S. Pat. No. 5,296,434, U.S. Pat. No. 5,278,264, U.S. Pat. No. 5,304,614, U.S. Pat. No. 5,510,502, WO-A-(PCT/US92/10066) WO-A-93/19103, EP-A2-0 577 581, EP-A1-0 578 838, and academic literature "The Influence of Aromatic Substituents on the Polymerization Behavior of Bridged Zirconocene Catalysts", Spaleck, W., et al., Organometallics 1994, 13, 954-963, and "ansa-Zirconocene Polymerization Catalysts with Annelated Ring Ligands-Effects on Catalytic Activity and Polymer Chain Lengths", Brinzinger, H., et al, Organometallics 1994, 13, 964-970, and documents referred to therein.

In some embodiments, the first catalyst which comprises a stereorigid transition metal pre-catalyst compound used to produce the semi-crystalline polypropylene macromonomers of the present invention is selected from the group consisting of racemic bridged bis(indenyl)zirconocenes or hafnocenes. In a another embodiment, the transition metal pre-catalyst compound is a rac-dimethylsilyl-bridged bis (indenyl)zirconocene or hafnocene. In another embodiment, the transition metal pre-catalyst compound is rac-dimethylsilyl bis(2-methyl-4-phenylindenyl)zirconium or hafnium dichloride or dimethyl. In another preferred embodiment, the transition metal catalyst is a rac-dimethylsilyl-bridged bis(indenyl)hafnocene such as rac-dimethylsilyl bis(indenyl)hafnium dimethyl or dichloride.

It is believed that the fraction of branch-block and the level of branching depend on the availability of macromonomers with unsaturated chain end and macromonomer incorporation capability of the specific catalyst. To increase the population of aPP-g-scPP branch-block composition, one typically operates within a process window that favors macromonomer production and insertion. Such conditions have been described in U.S. Pat. No. 6,117,962 and the journal article by W. Weng et al., Macromol. Rapid Commun., 2000, 21, 1103-1107 and are further illustrated by the examples therein.

It is also believed that the higher the population of vinyl terminated scPP macromonomers the higher the probability of getting them incorporated into aPP backbone and therefore the higher the branch-block population.

To further increase the population of macromonomers having vinyl chain ends diolefin monomers can be introduced into the reaction medium. The resultant product is typically a blend comprised of isotactic polypropylene segments, atactic polypropylene segments, and increased population of branch-block species resulting from the additional couplings brought about by the diolefin crosslinking agent.

Crosslinking typically refers to the connection of two polymer segments by incorporation of each double bond of a diolefin monomer into two different polymer segments. The polymer segments so connected can be the same or different, with respect to their crystallinity. Three or more polymer segments may also be connected via incorporation of two or more diolefins in on polymer segment into two other polymer segments.

A consideration for selection of the monomer, or combinations of monomers, is that, both crystalline and amorphous polymer segments can be formed with the selection of two or more different catalyst systems. In some embodiments it is further desired that the level of incorporation of the diolefin monomer, if present, into the crystalline segments be limited to an amount that will not substantially alter its crystallinity. The diolefin coupling agent is typically kept minimum to insure the overall composition has a viscosity of 8000 mPa·s or less for some adhesive applications.

As mentioned above, to increase the population of aPP-g-scPP branch-block composition, one typically operates within a process window that favors macromonomer production and insertion. Favorable conditions include:
1) High concentration of catalyst producing the semi-crystalline vinyl terminated macromonomers, and or
2) Adjusting the Al/metal ratio; and or
3) High operating temperature; and or
4) Catalyst structure that has a high affinity for macromonomer incorporation; and or
5) Relatively long residence time; and or
6) High monomer conversion (monomer starvation condition enhances the insertion of macromonomer); and or
7) Addition of modifier (diene) to enhance the population of vinyl terminated macromonomers.

Another method of enhancing aPP-g-scPP branch block compositions is to add in a chain transfer agent that transfers a vinyl group to the end of the polymer chain while deactivating the catalyst. Such chain transfer agents include, but are not limited to, vinyl chloride, vinyl fluoride, vinyl bromide. In the process, the catalyst is reactivated by the presence of an aluminum alkyl activator such as an alumoxane (typically methylalumoxane).

Similarly, melting and crystallization characteristics can be controlled through catalyst selection, comonomer addition and changes in process conditions such as temperature and catalyst ratio if more than one catalyst is used.

Catalyst Compounds

Any catalyst compound that can produce the desired polymer species may be used in the practice of this invention. In the description herein the transition metal compound may be described as a catalyst precursor, a pre-catalyst compound or a catalyst compound, and these terms are used interchangeably. A catalyst system is combination of a catalyst precursor and an activator.

Catalyst Compounds and Selection

Any pre-catalyst compound (catalyst precursor compound) that can produce the desired polymer species may be used in the practice of this invention. Pre-catalyst compounds which may be utilized in the process of the invention include metallocene transition metal compounds (containing one, two, or three cyclopentadienyl ligands per metal atom), non-metallocene early transition metal compounds (including those with amide and/or phenoxide type ligands), non-metallocene late transition metal compounds (including those with diimine or diiminepyridyl ligands), and other transition metal compounds.

Generally, bulky ligand metallocene compounds (pre-catalysts) useful in this invention include half and full sandwich compounds having one or more bulky ligands bonded to at least one metal atom. Typical bulky ligand metallocene compounds are generally described as containing one or more bulky ligand(s) and one or more leaving group(s) bonded to at least one metal atom. The bulky ligands are generally represented by one or more open, acyclic, or fused ring(s) or ring system(s) or a combination thereof. These bulky ligands, preferably the ring(s) or ring system(s) are typically composed of atoms selected from Groups 13 to 16 atoms of the Periodic Table of Elements, preferably the atoms are selected from the group consisting of carbon, nitrogen, oxygen, silicon, sulfur, phosphorous, germanium, boron and aluminum or a combination thereof. Most preferably, the ring(s) or ring system(s) are composed of carbon atoms such as but not limited to those cyclopentadienyl ligands or cyclopentadienyl-type ligand structures or other similar functioning ligand structure such as a pentadienyl, a cyclooctatetraendiyl, a cyclobutadienyl, or a substituted allyl ligand. Other ligands that can function similarly to a cyclopentadienyl-type ligand include amides, phosphides, imines, phosphinimines, amidinates, and ortho-substituted phenoxides. The metal atom is preferably selected from Groups 3 through 15 and or lanthanide or actinide series of the Periodic Table of Elements. Preferably the metal is a transition metal from Groups 3 through 12, more preferably Groups 4, 5 and 6, and most preferably the transition metal is from Group 4.

In one embodiment, the catalyst composition useful in the invention includes one or more bulky ligand metallocene catalyst compounds represented by the formula:

$$L^A L^B M Q^*_n \quad (1)$$

where M is a metal atom from the Periodic Table of the Elements and may be a Group 3 to 12 metal or from the lanthanide or actinide series of the Periodic Table of Elements, preferably M is a Group 4, 5 or 6 transition metal, more preferably M is a Group 4 transition metal, even more preferably M is zirconium, hafnium or titanium. The bulky ligands, $L^A$ and $L^B$, are open, acyclic or fused ring(s) or ring system(s) and are any ancillary ligand system, including unsubstituted or substituted, cyclopentadienyl ligands or cyclopentadienyl-type ligands, heteroatom substituted and/or heteroatom containing cyclopentadienyl-type ligands. Non-limiting examples of bulky ligands include cyclopentadienyl ligands, cyclopentaphenanthreneyl ligands, indenyl ligands, benzindenyl ligands, fluorenyl ligands, dibenzo[b,h]fluorenyl ligands, benzo[b]fluorenyl ligands, cyclooctatetraendiyl ligands, cyclopentacyclododecene ligands, azenyl ligands, azulene ligands, pentalene ligands, phosphoyl ligands, phosphinimine (WO 99/40125), pyrrolyl ligands, pyrozolyl ligands, carbazolyl ligands, boratobenzene ligands and the like, including hydrogenated versions thereof, for example tetrahydroindenyl ligands. In one embodiment, $L^A$ and $L^B$ may be any other ligand structure capable of π-bonding to M. In yet another embodiment, the atomic molecular weight (MW) of $L^A$ or $L^B$ exceeds 60 a.m.u., preferably greater than 65 a.m.u. In another embodiment, $L^A$ and $L^B$ may comprise one or more heteroatoms, for example, nitrogen, silicon, boron, germanium, sulfur and phosphorous, in combination with carbon atoms to form an open, acyclic, or preferably a fused, ring or ring system, for example, a hetero-cyclopentadienyl ancillary ligand. Other $L^A$ and $L^B$ bulky ligands include but are not limited to bulky amides, phosphides, alkoxides, aryloxides, imides, carbolides, borollides, porphyrins, phthalocyanines, corrins and other polyazomacrocycles. Independently, each $L^A$ and $L^B$ may be the same or different type of bulky ligand that is bonded to M. In one embodiment of Formula 1 only one of either $L^A$ or $L^B$ is present.

Independently, each $L^A$ and $L^B$ may be unsubstituted or substituted with a combination of substituent groups R*. Non-limiting examples of substituent groups R* include one or more from the group selected from hydrogen, or linear or branched alkyl radicals, alkenyl radicals, alkynyl radicals, cycloalkyl radicals, aryl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals or combination thereof. In a preferred embodiment, substituent groups R* have up to 50 non-hydrogen atoms, preferably from 1 to 30 carbon, that can also be substituted with halogens or heteroatoms or the like.

Non-limiting examples of alkyl substituents R* include methyl, ethyl, propyl, butyl, pentyl, hexyl, cyclopentyl, cyclohexyl, benzyl or phenyl groups and the like, including all their isomers, for example tertiary butyl, isopropyl, and the like. Other hydrocarbyl radicals include fluoromethyl, fluoroethyl, difluoroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)silyl, methyl-bis(difluoromethyl)silyl, bromomethyldimethylgermyl and the like; and disubstituted boron radicals including dimethylboron for example; and disubstituted pnictogen radicals including dimethylamine, dimethylphosphine, diphenylamine, methylphenylphosphine, chalcogen radicals including methoxy, ethoxy, propoxy, phenoxy, methylsulfide and ethylsulfide. Non-hydrogen substituents R* include the atoms carbon, silicon, boron, aluminum, nitrogen, phosphorous, oxygen, tin, sulfur, germanium and the like, including olefins such as but not limited to olefinically unsaturated substituents including vinyl-terminated ligands, for example but-3-enyl, prop-2-enyl, hex-5-enyl and the like. Also, at least two R* groups, preferably two adjacent R groups, are joined to form a ring structure having from 3 to 30 atoms selected from carbon, nitrogen, oxygen, phosphorous, silicon, germanium, aluminum, boron or a combination thereof. Also, a substituent group, R*, may also be a diradical bonded to L at one end and forming a carbon sigma bond to the metal M. Other ligands may be bonded to the metal M, such as at least one leaving group Q*. In one embodiment, Q* is a monoanionic labile ligand having a sigma-bond to M. Depending on the oxidation state of the metal, the value for n is 0, 1 or 2 such that Formula 1 above represents a neutral bulky ligand metallocene catalyst compound. Non-limiting examples of Q* ligands include weak bases such as amines, phosphines, ethers, carboxylates, dienes, hydrocarbyl radicals having from 1 to 20 carbon atoms, hydrides or halogens and the like or a combination thereof. In another embodiment, two or more Q*'s form a part of a fused ring or ring system. Other examples of Q* ligands include those substituents for R* as described above and including cyclobutyl, cyclohexyl, heptyl, tolyl, trifluoromethyl, tetramethylene (both Q*), pentamethylene (both Q*), methylidene (both Q*), methoxy, ethoxy, propoxy, phenoxy, bis(N-methylanilide), dimethylamide, dimethylphosphide radicals and the like.

In another embodiment, the catalyst composition useful in the invention may include one or more bulky ligand metallocene catalyst compounds where $L^A$ and $L^B$ of Formula 1 are bridged to each other by at least one bridging group, A*, as represented by Formula 2.

$$L^A A^* L^B M Q^*_n \qquad (2)$$

The compounds of Formula 2 are known as bridged, bulky ligand metallocene catalyst compounds. $L^A$, $L^B$, M, Q* and n are as defined above. Non-limiting examples of bridging group A* include bridging groups containing at least one Group 13 to 16 atom, often referred to as a divalent moiety such as but not limited to at least one of a carbon, oxygen, nitrogen, silicon, aluminum, boron, germanium and tin atom or a combination thereof. Preferably bridging group A* contains a carbon, silicon or germanium atom, most preferably A* contains at least one silicon atom or at least one carbon atom. The bridging group A* may also contain substituent groups R* as defined above including halogens and iron. Non-limiting examples of bridging group A* may be represented by R'$_2$C, R'$_2$CCR'$_2$, R'$_2$Si, R'$_2$SiCR'$_2$, R'$_2$SiSiR'$_2$ R'$_2$Ge, R'P, R'N, R'B where R' is independently, a radical group which is hydride, hydrocarbyl, substituted hydrocarbyl, halocarbyl, substituted halocarbyl, hydrocarbyl-substituted organometalloid, halocarbyl-substituted organometalloid, disubstituted boron, disubstituted pnictogen, substituted chalcogen, or halogen or two or more R' may be joined to form a ring or ring system. In one embodiment, the bridged, bulky ligand metallocene catalyst compounds of Formula 2 have two or more bridging groups A* (EP 664 301 B1). In another embodiment, the bulky ligand metallocene catalyst compounds are those where the R* substituents on the bulky ligands $L^A$ and $L^B$ of Formulas 1 and 2 are substituted with the same or different number of substituents on each of the bulky ligands. In another embodiment, the bulky ligands $L^A$ and $L^B$ of Formulas 1 and 2 are different from each other.

Other bulky ligand metallocene catalyst compounds and catalyst systems useful in the invention may include those described in U.S. Pat. Nos. 5,064,802, 5,145,819, 5,149,819, 5,243,001, 5,239,022, 5,276,208, 5,296,434, 5,321,106, 5,329,031, 5,304,614, 5,677,401, 5,723,398, 5,753,578, 5,854,363, 5,856,547 5,858,903, 5,859,158, 5,900,517 and 5,939,503 and PCT publications WO 93/08221, WO 93/08199, WO 95/07140, WO 98/11144, WO 98/41530, WO 98/41529, WO 98/46650, WO 99/02540 and WO 99/14221 and European publications EP-A-0 578 838, EP-A-0 638 595, EP-B-0 513 380, EP-A1-0 816 372, EP-A2-0 839 834, EP-B1-0 632 819, EP-B1-0 748 821 and EP-B1-0 757 996, all of which are herein fully incorporated by reference.

In another embodiment, the catalyst compositions useful in the invention may include bridged heteroatom, monobulky ligand metallocene compounds. These types of catalysts and catalyst systems are described in, for example, PCT publication WO 92/00333, WO 94/07928, WO 91/04257, WO 94/03506, WO96/00244, WO 97/15602 and WO 99/20637 and U.S. Pat. Nos. 5,057,475, 5,096,867, 5,055, 438, 5,198,401, 5,227,440 and 5,264,405 and European publication EP-A-0 420 436, all of which are herein fully incorporated by reference.

In another embodiment, the catalyst composition useful in the invention includes one or more bulky ligand metallocene catalyst compounds represented by Formula 3:

$$L^C A^* J^* M Q^*_n \qquad (3)$$

where M is a Group 3 to 16 metal atom or a metal selected from the Group of actinides and lanthanides of the Periodic Table of Elements, preferably M is a Group 3 to 12 transition metal, and more preferably M is a Group 4, 5 or 6 transition metal, and most preferably M is a Group 4 transition metal in any oxidation state, and is especially titanium; $L^C$ is a substituted or unsubstituted bulky ligand bonded to M; J* is bonded to M; A* is bonded to J* and $L^C$; J* is a heteroatom ancillary ligand; and A* is a bridging group; Q* is a univalent anionic ligand; and n is the integer 0, 1 or 2. In Formula 3 above, $L^C$, A* and J* form a fused ring system. In an embodiment, Lc of Formula 3 is as defined above for LA. A*, M and Q* of Formula 3 are as defined above in Formula 1. In Formula 3, J* is a heteroatom containing ligand in which J* is an element with a coordination number of three from Group 15 or an element with a coordination number of two from Group 16 of the Periodic Table of Elements. Preferably J* contains a nitrogen, phosphorus, oxygen or sulfur atom with nitrogen being most preferred. In an embodiment of the invention, the bulky ligand metallocene catalyst compounds are heterocyclic ligand complexes where the bulky ligands, the ring(s) or ring system(s), include one or more heteroatoms or a combination thereof. Non-limiting examples of heteroatoms include a Group 13 to 16 element, preferably nitrogen, boron, sulfur, oxygen, aluminum, silicon, phosphorous and tin. Examples of these bulky ligand metallocene catalyst compounds are described in WO 96/33202, WO 96/34021, WO 97/17379 and WO 98/22486 and EP-A1-0 874 005 and U.S. Pat. Nos. 5,637,660, 5,539,124, 5,554,775, 5,756,611, 5,233,049, 5,744,417, and 5,856,258 all of which are herein incorporated by reference.

In one embodiment, the bulky ligand metallocene compounds (pre-catalysts) are those complexes based on bidentate ligands containing pyridine or quinoline moieties, such as those described in U.S. application Ser. No. 09/103,620 filed Jun. 23, 1998, which is herein incorporated by reference. In another embodiment, the bulky ligand metallocene catalyst compounds are those described in PCT publications WO 99/01481 and WO 98/42664, which are fully incorporated herein by reference.

In another embodiment, the bulky ligand metallocene catalyst compound is a complex of a metal, preferably a transition metal, a bulky ligand, preferably a substituted or unsubstituted pi-bonded ligand, and one or more heteroallyl moieties, such as those described in U.S. Pat. Nos. 5,527,752 and 5,747,406 and EP-B 1-0 735 057, all of which are herein fully incorporated by reference.

In another embodiment, the bulky ligand metallocene catalyst compounds are those described in PCT publications WO 99/01481 and WO 98/42664, which are fully incorporated herein by reference.

Useful Group 6 bulky ligand metallocene catalyst Systems are described in U.S. Pat. No. 5,942,462, which is incorporated herein by reference.

Still other useful catalysts include those multinuclear metallocene catalysts as described in WO 99/20665 and 6,010,794, and transition metal metaaracyle structures described in EP 0 969 101 A2, which are herein incorporated herein by reference. Other metallocene catalysts include those described in EP 0 950 667 A1, double cross-linked metallocene catalysts (EP 0 970 074 A1), tethered metallocenes (EP 970 963 A2) and those sulfonyl catalysts described in U.S. Pat. No. 6,008,394, which are incorporated herein by reference.

It is also contemplated that in one embodiment the bulky ligand metallocene catalysts, described above, include their structural or optical or enantiomeric isomers (meso and racemic isomers, for example see U.S. Pat. No. 5,852,143, incorporated herein by reference) and mixtures thereof.

It is further contemplated that any one of the bulky ligand metallocene catalyst compounds, described above, have at least one fluoride or fluorine containing leaving group as described in U.S. application Ser. No. 09/191,916 filed Nov. 13, 1998.

The Group 15 containing metal compounds utilized in the catalyst composition of the invention are prepared by methods known in the art, such as those disclosed in EP 0 893 454 A1, U.S. Pat. No. 5,889,128 and the references cited in U.S. Pat. No. 5,889,128 which are all herein incorporated by reference. U.S. application Ser. No. 09/312,878, filed May 17, 1999, discloses a gas or slurry phase polymerization process using a supported bisamide catalyst, which is also incorporated herein by reference.

For additional information of Group 15 containing metal compounds, please see Mitsui Chemicals, Inc. in EP 0 893 454 A1 which discloses transition metal amides combined with activators to polymerize olefins.

In one embodiment the Group 15 containing metal compound is allowed to age prior to use as a polymerization. It has been noted on at least one occasion that one such catalyst compound (aged at least 48 hours) performed better than a newly prepared catalyst compound.

It is further contemplated that bis-amide based pre-catalysts may be used. Exemplary compounds include those described in the patent literature. International patent publications WO 96/23010, WO 97/48735 and Gibson, et al., *Chem. Comm.*, pp. 849-850 (1998), which disclose diimine-based ligands for Group-8-10 compounds that undergo ionic activation and polymerize olefins. Polymerization catalyst systems from Group-5-10 metals, in which the active center is highly oxidized and stabilized by low-coordination-number, polyanionic, ligand systems, are described in U.S. Pat. No. 5,502,124 and its divisional U.S. Pat. No. 5,504,049. See also the Group-5 organometallic catalyst compounds of U.S. Pat. No. 5,851,945 and the tridentate-ligand-containing, Group-5-10, organometallic catalysts of U.S. Pat. No. 6,294,495. Group-11 catalyst precursor compounds, activatable with ionizing cocatalysts, useful for olefin and vinylic polar molecules are described in WO 99/30822.

Other useful catalyst compounds are those Group 5 and 6 metal imido complexes described in EP-A2-0 816 384 and U.S. Pat. No. 5,851,945, which is incorporated herein by reference. In addition, metallocene catalysts include bridged bis(arylamido) Group 4 compounds described by D. H. McConville, et al., in Organometallics 1995, 14, 5478-5480, which is herein incorporated by reference. In addition, bridged bis(amido) catalyst compounds are described in WO 96/27439, which is herein incorporated by reference. Other useful catalysts are described as bis(hydroxy aromatic nitrogen ligands) in U.S. Pat. No. 5,852,146, which is incorporated herein by reference. Other useful catalysts containing one or more Group 15 atoms include those described in WO 98/46651, which is herein incorporated herein by reference.

U.S. Pat. No. 5,318,935 describes bridged and unbridged, bisamido catalyst compounds of Group-4 metals capable of alpha-olefins polymerization. Bridged bi(arylamido)-Group-4 compounds for olefin polymerization are described by D. H. McConville, et al., in *Organometallics* 1995, 14, 5478-5480. This reference presents synthetic methods and compound characterizations. Further work appearing in D. H. McConville, et al, *Macromolecules* 1996, 29, 5241-5243, describes bridged bis(arylamido)-Group-4 compounds that are polymerization catalysts for 1-hexene. Additional invention-suitable transition metal compounds include those described in WO 96/40805. Cationic Group-3- or Lanthanide-metal olefin polymerization complexes are disclosed in copending U.S. application Ser. No. 09/408,050, filed 29 Sep. 1999. A monoanionic bidentate ligand and two monoanionic ligands stabilize those catalyst precursors, which can be activated with this invention's ionic cocatalysts.

The literature describes many additional suitable catalyst-precursor compounds. Compounds that contain abstractable ligands or that can be alkylated to contain abstractable ligands suit this invention. See, for instance, V. C. Gibson, et al; "The Search for New-Generation Olefin Polymerization Catalysts: Life Beyond Metallocenes", *Angew. Chem. Int. Ed.*, 38, 428-447 (1999).

This invention may also be practiced with the catalysts containing phenoxide ligands such as those disclosed in EP 0 874 005 A1, which in incorporated by reference herein.

In another embodiment, conventional-type transition metal catalysts may be used in the practice of this invention. Conventional-type transition metal catalysts are those traditional Ziegler-Natta, vanadium and Phillips-type catalysts well known in the art. Such as, for example Ziegler-Natta catalysts as described in *Ziegler-Natta Catalysts and Polymerizations*, John Boor, Academic Press, New York, 1979. Examples of conventional-type transition metal catalysts are also discussed in U.S. Pat. Nos. 4,115,639, 4,077,904, 4,482,687, 4,564,605, 4,721,763, 4,879,359 and 4,960,741, all of which are herein fully incorporated by reference. The conventional-type transition metal catalyst compounds that may be used in the present invention include transition metal compounds from Groups 3 to 17, preferably 4 to 12, more preferably 4 to 6 of the Periodic Table of Elements.

Preferred conventional-type transition metal catalysts may be represented by the formula: $MR_x$, where M is a metal from Groups 3 to 17, preferably Group 4 to 6, more preferably Group 4, most preferably titanium; R is a halogen or a hydrocarbyloxy group; and x is the oxidation state of the metal M. Non-limiting examples of R include alkoxy, phenoxy, bromide, chloride and fluoride. Non-limiting examples of conventional-type transition metal catalysts where M is titanium include $TiCl_4$, $TiBr_4$, $Ti(OC_2H_5)_3Cl$, $Ti(OC_2H_5)Cl_3$, $Ti(OC_4H_9)_3Cl$, $Ti(OC_3H_7)_2Cl_2$, $Ti(OC_2H_5)_2Br_2$, $TiCl_3.1/3AlCl_3$ and $Ti(OC_{12}H_{25})Cl_3$.

Conventional-type transition metal catalyst compounds based on magnesium/titanium electron-donor complexes that are useful in the invention are described in, for example, U.S. Pat. Nos. 4,302,565 and 4,302,566, which are herein fully incorporate by reference. The $MgTiCl_6$ (ethyl acetate)$_4$ derivative is particularly preferred.

British Patent Application 2,105,355 and U.S. Pat. No. 5,317,036, herein incorporated by reference, describes various conventional-type vanadium catalyst compounds. Non-limiting examples of conventional-type vanadium catalyst compounds include vanadyl trihalide, alkoxy halides and alkoxides such as $VOCl_3$, $VOCl_2(OBu)$ where Bu=butyl and $VO(OC_2H_5)_3$; vanadium tetra-halide and vanadium alkoxy halides such as $VCl_4$ and $VCl_3(OBu)$; vanadium and vanadyl acetyl acetonates and chloroacetyl acetonates such as $V(AcAc)_3$ and $VOCl_2(AcAc)$ where (AcAc) is an acetyl acetonate. The preferred conventional-type vanadium catalyst compounds are $VOCl_3$, $VCl_4$ and $VOCl_2$—OR where R is a hydrocarbon radical, preferably a $C_1$ to $C_{10}$ aliphatic or aromatic hydrocarbon radical such as ethyl, phenyl, isopropyl, butyl, propyl, n-butyl, iso-butyl, tertiary-butyl, hexyl, cyclohexyl, naphthyl, etc., and vanadium acetyl acetonates.

Conventional-type chromium catalyst compounds, often referred to as Phillips-type catalysts, suitable for use in the present invention include $CrO_3$, chromocene, silyl chromate, chromyl chloride ($CrO_2Cl_2$), chromium-2-ethyl-hexanoate, chromium acetylacetonate ($Cr(AcAc)_3$), and the like. Non-limiting examples are disclosed in U.S. Pat. Nos. 3,709,853, 3,709,954, 3,231,550, 3,242,099 and 4,077,904, which are herein fully incorporated by reference.

Still other conventional-type transition metal catalyst compounds and catalyst systems suitable for use in the present invention are disclosed in U.S. Pat. Nos. 4,124,532, 4,302,565, 4,302,566, 4,376,062, 4,379,758, 5,066,737, 5,763,723, 5,849,655, 5,852,144, 5,854,164 and 5,869,585 and published EP-A2 0 416 815 A2 and EP-A1 0 420 436, which are all herein incorporated by reference.

Other catalysts may include cationic catalysts such as $AlCl_3$, and other cobalt, iron, nickel and palladium catalysts well known in the art. See for example U.S. Pat. Nos. 3,487,112, 4,472,559, 4,182,814 and 4,689,437, all of which are incorporated herein by reference.

It is also contemplated that other catalysts can be combined with the catalyst compounds in the catalyst composition useful in the invention. For example, see U.S. Pat. Nos. 4,937,299, 4,935,474, 5,281,679, 5,359,015, 5,470,811, and 5,719,241 all of which are herein fully incorporated herein reference.

It is further contemplated that one or more of the catalyst compounds described above or catalyst systems may be used in combination with one or more conventional catalyst compounds or catalyst systems. Non-limiting examples of mixed catalysts and catalyst systems are described in U.S. Pat. Nos. 4,159,965, 4,325,837, 4,701,432, 5,124,418, 5,077,255, 5,183,867, 5,391,660, 5,395,810, 5,691,264, 5,723,399 and 5,767,031 and PCT Publication WO 96/23010 published Aug. 1, 1996, all of which are herein fully incorporated by reference.

Preferred metallocene catalysts used in this invention can more specifically be represented by one of the following general formulae (all references to Groups being the new Group notation of the Period Table of the Elements as described by Chemical and Engineering News, 63(5), 27, 1985):

  (4)

  (5)

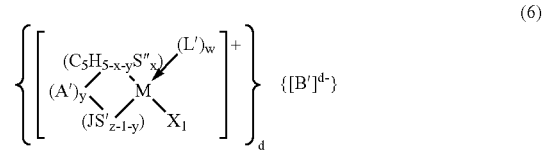  (6)

wherein:

(A-Cp) is either (Cp), (Cp*) or Cp-A'-Cp*; Cp and Cp* are the same or different cyclopentadienyl rings substituted with from zero to five substituent groups S", each substituent group S" being, independently, a radical group which is a hydrocarbyl, substituted-hydrocarbyl, halocarbyl, substituted-halocarbyl, hydrocarbyl-substituted organometalloid, halocarbyl-substituted organometalloid, disubstituted boron, disubstituted pnictogen, substituted chalcogen or halogen radicals, or Cp and Cp* are cyclopentadienyl rings in which any two adjacent S" groups are joined forming a $C_4$ to $C_{20}$ ring to give a saturated or unsaturated polycyclic cyclopentadienyl ligand; Cp and Cp* may also have one or two carbon atoms within the ring replaced by a Group 15 or 16 element especially, S, O, N or P;

A' is a bridging group;

$(C_5H_{5-y-x}S"_x)$ is a cyclopentadienyl ring substituted with from zero to five S" radicals as defined above;

x is from 0 to 5 denoting the degree of substitution;

M is titanium, zirconium or hafnium;

$X_1$ is a hydride radical, hydrocarbyl radical, substituted-hydrocarbyl radical, hydrocarbyl-substituted organometalloid radical or halocarbyl-substituted organometalloid radical which radical may optionally be covalently bonded to both or either M and L or L' or all or any M, S" or S', and provided that $X_1$ is not a substituted or unsubstituted cyclopentadienyl ring;

$(JS'_{z-1-y})$ is a heteroatom ligand in which J is an element from Group 15 of the Periodic Table of Elements with a coordination number of 3 or an element from Group 16 with a coordination number of 2; S' is a radical group which is a hydrocarbyl, substituted hydrocarbyl, halocarbyl, substituted halocarbyl, hydrocarbyl-substituted organometalloid, or halocarbyl-substituted organometalloid; and z is the coordination number of the element J;

y is 0 or 1;

L is an olefin, diolefin or aryne ligand. L' is the same as L, and can additionally be an amine, phosphine, ether, or sulfide ligand, or any other neutral Lewis base; L' can also be a second transition metal compound of the same type such that the two metal center M and M* are bridged by $X_1$ and $X'_1$, wherein M* has the same meaning as M, $X'_1$, $X_2$ and $X'_2$ have the same meaning as $X_1$, where such dimeric compounds which are precursors to the cationic portion of the catalyst are represented by the formula:

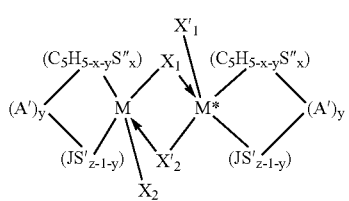 (7)

wherein w is an integer from 0 to 3;

B' is a chemically stable, non-nucleophilic anionic complex having a molecular diameter about or greater than 4 Angstroms or an anionic Lewis-acid activator resulting from the reaction of a Lewis-acid activator with the precursor to the cationic portion of the catalyst system described in formulae 1-4. When B' is a Lewis-acid activator, $X_1$ can also be an alkyl group donated by the Lewis-acid activator; and d is an integer representing the charge of B'.

The catalysts are preferably prepared by combining at least two components. In one preferred method, the first component is a cyclopentadienyl derivative of a Group 4 metal compound containing at least one ligand which will combine with the second component or at least a portion thereof such as a cation portion thereof. The second component is an ion-exchange compound comprising a cation which will irreversibly react with at least one ligand contained in said Group 4 metal compound (first component) and a non-coordinating anion which is either a single coordination complex comprising a plurality of lipophilic radicals covalently coordinated to and shielding a central formally charge-bearing metal or metalloid atom or an anion comprising a plurality of boron atoms such as polyhedral boranes, carboranes and metallacarboranes.

In general, suitable anions for the second component may be any stable and bulky anionic complex having the following molecular attributes: 1) the anion should have a molecular diameter greater than 4 Angstroms; 2) the anion should form stable ammonium salts; 3) the negative charge on the anion should be delocalized over the framework of the anion or be localized within the core of the anion; 4) the anion should be a relatively poor nucleophile; and 5) the anion should not be a powerful reducing or oxidizing agent. Anions meeting these criteria—such as polynuclear boranes, carboranes, metallacarboranes, polyoxoanions and anionic coordination complexes are well described in the chemical literature.

The cation portion of the second component may comprise Bronsted acids such as protons or protonated Lewis bases or may comprise Lewis acids such as ferricinum, tropylium, triphenylcarbenium or silver cations.

In another preferred method, the second component is a Lewis-acid complex which will react with at least one ligand of the first component, thereby forming an ionic species described in formulae 4-6 with the ligand abstracted from the first component now bound to the second component. Alumoxanes and especially methylalumoxane, the product formed from the reaction of trimethylaluminum in an aliphatic or aromatic hydrocarbon with stoichiometric quantities of water, are particularly preferred Lewis-acid second components. Modified alumoxanes are also preferred. Alumoxanes are well known in the art and methods for their preparation are illustrated by U.S. Pat. Nos. 4,542,199; 4,544,762; 5,015,749; and 5,041,585. A technique for preparing modified alumoxanes has been disclosed in U.S. Pat. No. 5,041,584, in EPA 0 516 476, and in EPA 0 561 476, which are incorporated by reference herein.

Upon combination of the first and second components, the second component reacts with one of the ligands of the first component, thereby generating an anion pair consisting of a Group 4 metal cation and the aforementioned anion, which anion is compatible with and non-coordinating towards the Group 4 metal cation formed from the first component. The anion of the second compound must be capable of stabilizing the Group 4 metal cation's ability to function as a catalyst and must be sufficiently labile to permit displacement by an olefin, diolefin or an acetylenically unsaturated monomer during polymerization. The catalysts of this invention may be supported. U.S. Pat. No. 4,808,561, issued Feb. 28, 1989; U.S. Pat. No. 4,897,455 issued Jan. 3, 1990; U.S. Pat. No. 5,057,475 issued Oct. 15, 1991; U.S. patent application Ser. No. 459,921 (published as PCT International publication WO 91/09882), Canadian Patent 1,268,753, U.S. Pat. No. 5,240,894 and WO 94 03506 disclose such supported catalysts and the methods to produce such and are herein incorporated by reference.

The Group 4 metal compounds; i.e., titanium, zirconium and hafnium metallocene compounds, useful as first compounds (pre-catalysts) in the preparation of the preferred metallocene catalysts of this invention are cyclopentadienyl derivatives of titanium, zirconium and hafnium. In general, useful titanocenes, zirconocenes and hafnocenes may be represented by the following general formulae:

 (8)

 (9)

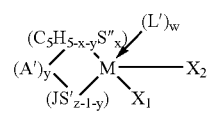 (10)

wherein:

(A-Cp) is either (Cp)(Cp*) or Cp-A'-Cp*; Cp and Cp* are the same or different cyclopentadienyl rings substituted with from zero to five substituent groups S", each substituent group S" being, independently, a radical group which is a hydrocarbyl, substituted-hydrocarbyl, halocarbyl, substituted-halocarbyl, hydrocarbyl-substituted organometalloid, halocarbyl-substituted organometalloid, disubstituted boron, disubstituted pnictogen, substituted chalcogen or halogen radicals, or Cp and Cp* are cyclopentadienyl rings in which any two adjacent S" groups are joined forming a $C_4$ to $C_{20}$ ring to give a saturated or unsaturated polycyclic cyclopentadienyl ligand;

A' is a bridging group;
y is 0 or 1;
$(C_5H_{5-y-x}S''_x)$ is a cyclopentadienyl ring substituted with from zero to five S'' radicals as defined above;
x is from 0 to 5 denoting the degree of substitution;
$(JS'_{z-1-y})$ is a heteroatom ligand in which J is an element from Group 15 of the Periodic Table of Elements with a coordination number of 3 or an element from Group 16 with a coordination number of 2, S' is a radical group which is a hydrocarbyl, substituted hydrocarbyl, halocarbyl, substituted halocarbyl, hydrocarbyl-substituted organometalloid, or halocarbyl-substituted organometalloid; and z is the coordination number of the element J;
L is an olefin, diolefin or aryne ligand. L' is the same as L and can additionally be an amine, phosphine, ether, or sulfide ligand, or any other neutral Lewis base; L' can also be a second transition metal compound of the same type such that the two metal centers M and M* are bridged by $X_1$ and $X'_1$, wherein M* has the same meaning as M, $X'_1$, has the same meaning as $X_1$ and $X'_2$ has the same meaning as $X_2$ where such dimeric compounds which are precursors to the cationic portion of the catalyst are represented by formula 7 above;
w is an integer from 0 to 3; and
$X_1$ and $X_2$ are, independently, hydride radicals, hydrocarbyl radicals, substituted hydrocarbyl radicals, halocarbyl radicals, substituted halocarbyl radicals, and hydrocarbyl- and halocarbyl-substituted organometalloid radicals, substituted pnictogen radicals, or substituted chalcogen radicals; or $X_1$ and $X_2$ are joined and bound to the metal atom to form a metallacycle ring containing from about 3 to about 20 carbon atoms; or $X_1$ and $X_2$ together can be an olefin, diolefin or aryne ligand; or when Lewis-acid activators, such as methylalumoxane, which are capable of donating an $X_1$ ligand as described above to the transition metal component are used, $X_1$ and $X_2$ may independently be a halogen, alkoxide, aryloxide, amide, phosphide or other univalent anionic ligand or both $X_1$ and $X_2$ can also be joined to form a anionic chelating ligand and with the proviso that $X_1$ and $X_2$ are not a substituted or unsubstituted cyclopentadienyl ring.

Table A depicts representative constituent moieties for the metallocene components of formulae 7-10. The list is for illustrative purposes only and should not be construed to be limiting in any way. A number of final components may be formed by permuting all possible combinations of the constituent moieties with each other. When hydrocarbyl radicals including alkyl, alkenyl, alkynyl, cycloalkyl, cycloalkenyl, cycloalkynyl and aromatic radicals are disclosed in this application the term includes all isomers. For example, butyl includes n-butyl, 2-methylpropyl, 1-methylpropyl, tert-butyl, and cyclobutyl; pentyl includes n-pentyl, 1-methylbutyl, 2-methylbutyl, 3-methylbutyl, 1-ethylpropyl, neopentyl, cyclopentyl and methylcyclobutyl; butenyl includes E and Z forms of 1-butenyl, 2-butenyl, 3-butenyl, 1-methyl-1-propenyl, 1-methyl-2-propenyl, 2-methyl-1-propenyl and 2-methyl-2-propenyl. This includes when a radical is bonded to another group, for example, propylcyclopentadienyl include n-propylcyclopentadienyl, isopropylcyclopentadienyl and cyclopropylcyclopentadienyl. In general, the ligands or groups illustrated in Table A include all isomeric forms. For example, dimethylcyclopentadienyl includes 1,2-dimethylcyclopentadienyl and 1,3-dimethylcyclopentadienyl; methylindenyl includes 1-methylindenyl, 2-methylindenyl, 3-methylindenyl, 4-methylindenyl, 5-methylindenyl, 6-methylindenyl and 7-methylindenyl; methylethylphenyl includes ortho-methylethylphenyl, meta-methylethylphenyl and para-methylethylphenyl. Examples of specific invention catalyst precursors take the following formula where some components are listed in Table A. To illustrate members of the transition metal component, select any combination of the species listed in Tables A. For nomenclature purposes, for the bridging group, A', the words "silyl" and "silylene" are used interchangeably, and represent a diradical species. For the bridging group A', "ethylene" refers to a 1,2-ethylene linkage and is distinguished from ethene-1,1-diyl. Thus, for the bridging group A', "ethylene" and "1,2-ethylene" are used interchangeably. For compounds processing a bridging group, A', the bridge position on the cyclopentadienyl-type ring is always considered the 1-position. Thus, for example, the use of "1-fluorenyl" is interchangeable with the use of "fluorenyl"

Illustrative compounds of the formula 8 type are: bis(cyclopentadienyl)hafnium dimethyl, ethylenebis(tetrahydroindenyl)zirconium dihidryde, bis(pentamethyl)zirconium diethyl, dimethylsilyl(1-fluorenyl)(cyclopentadienyl) titanium dichloride and the like. Illustrative compounds of the formula 9 type are: bis(cyclopentadienyl)(1,3-butadiene)zirconium, bis(cyclopentadienyl)(2,3-dimethyl-1,3-butadiene)zirconium, bis(pentamethylcyclopentadienyl)(benzene)zirconium, bis(pentamethylcyclopentadienyl)titanium ethylene and the like. Illustrative compounds of the formula 10 type are: dimethylsilyl(tetramethylcyclopentadienyl)(t-butylamido)zirconium dichloride, ethylene(methylcyclopentadienyl)(phenylamido)titanium dimethyl, methylphenylsilyl(indenyl)(phenylphosphido)hafnium dihydride and (pentamethylcyclopentadienyl)(di-t-butylamido)hafnium dimethoxide.

The conditions under which complexes containing neutral Lewis base ligands such as ether or those which form dimeric compounds is determined by the steric bulk of the ligands about the metal center. For example, the t-butyl group in $Me_2Si(Me_4C_5)(N-t-Bu)ZrCl_2$ has greater steric requirements that the phenyl in $Me_2Si(Me_4C_5)(NPh)ZrCl_2 \cdot Et_2O$ thereby not permitting ether coordination in the former compound in its solid state. Similarly, due to the decreased steric bulk of the trimethylsilylcyclopentadienyl group in $[Me_2Si(Me_3SiC_5H_3)(N-t-Bu)ZrCl_2]_2$ versus that of the tetramethylcyclopentadienyl group in $Me_2Si(Me_4C_5)(N-t-Bu)ZrCl_2$, the former compound is dimeric and the latter is not.

TABLE A

A'

Dimethylsilylene
Diethylsilylene
dipropylsilylene
dibutylsilylene
dipentylsilylene
dihexylsilylene
diheptylsilylene
dioctylsilylene
dinonylsilylene
didecylsilylene
diundecylsilylene
didodecylsilylene
ditridecylsilylene
ditetradecylsilylene
dipentadecylsilylene
dihexadecylsilylene
diheptadecylsilylene
dioctadecylsilylene
dinonadecylsilylene
dieicosylsilylene
diheneicosylsilylene
didocosylsilylene TABLE A-continued ditricosylsilylene
ditetracosylsilylene
dipentacosylsilylene
dihexacosylsilylene
diheptacosylsilylene
dioctacosylsilylene
dinonacosylsilylene
ditriacontylsilylene
dicyclohexylsilylene
dicyclopentylsilylene
dicycloheptylsilylene
dicyclooctylsilylene
dicyclodecylsilylene
dicyclododecylsilylene
dinapthylsilylene
diphenylsilylene
ditolylsilylene
dibenzylsilylene
diphenethylsilylene
di(butylphenethyl)silylene
methylethylsilylene
methylpropylsilylene
methylbutylsilylene
methylhexylsilylene
methylphenylsilylene
ethylphenylsilylene
ethylpropylsilylene
ethylbutylsilylene
propylphenylsilylene
dimethylgermylene
diethylgermylene
diphenylgermylene
methylphenylgermylene
Cyclotetramethylenesilylene
Cyclopentamethylenesilylene
cyclotrimethylenesilylene
cyclohexylazanediyl
butylazanediyl
methylazanediyl
phenylazanediyl
perfluorophenylazanediyl
methylphosphanediyl
ethylphosphanediyl
propylphosphanediyl
butylphosphanediyl
cyclohexylphosphanediyl
phenylphosphanediyl
methylboranediyl
phenylboranediyl
methylene
dimethylmethylene
diethylmethylene
dibutylmethylene
dipropylmethylene
diphenylmethylene
ditolylmethylene
di(butylphenyl)methylene
di(trimethylsilylphenyl)met
di(triethylsilylphenyl)meth
dibenzylmethylene
Cyclotetramethylenemethyl
Cyclopentamethylenemeth
ethylene
methylethylene
dimethylethylene
trimethylethylene
tetramethylethylene
cyclopentylene
cyclohexylene
cycloheptylene
cyclooctylene
propanediyl
methylpropanediyl
dimethylpropanediyl
trimethylpropanediyl
tetramethylpropanediyl
pentamethylpropanediyl
hexamethylpropanediyl
tetramethyldisiloxylene TABLE A-continued vinylene
ethene-1,1-diyl
divinylsilylene
dipropenylsilylene
dibutenylsilylene
methylvinylsilylene
methylpropenylsilylene
methylbutenylsilylene
dimethylsilylmethylene
diphenylsilylmethylene
dimethylsilylethylene
diphenylsilylethylene
dimethylsilylpropylene
diphenylsilylpropylene
dimethylstannylene
diphenylstannylene
Cp, Cp*, CpR or $(C_5H_{5-y-x}S''_x)$ Cyclopentadienyl
Methylcyclopentadienyl
Dimethylcyclopentadienyl
Trimethylcyclopentadienyl
Tetramethylcyclopentadienyl
Pentamethylcyclopentadienyl (no A')
Ethylcyclopentadienyl
Diethylcyclopentadienyl
Propylcyclopentadienyl
Dipropylcyclopentadienyl
Butylcyclopentadienyl
Dibutylcyclopentadienyl
Pentylcyclopentadienyl
Dipentylcyclopentadienyl
Hexylcyclopentadienyl
Dihexylcyclopentadienyl
Heptylcyclopentadienyl
Diheptylcyclopentadienyl
octylcyclopentadienyl
dioctylcyclopentadienyl
nonylcyclopentadienyl
dinonylcyclopentadienyl
decylcyclopentadienyl
didecylcyclopentadienyl
undecylcyclopentadienyl
dodecylcyclopentadienyl
tridecylcyclopentadienyl
tetradecylcyclopentadienyl
pentadecylcyclopentadienyl (no A')
hexadecylcyclopentadienyl
heptadecylcyclopentadienyl
octadecylcyclopentadienyl
nonadecylcyclopentadienyl
eicosylcyclopentadienyl
heneicosylcyclopentadienyl
docosylcyclopentadienyl
tricosylcyclopentadienyl
tetracosylcyclopentadienyl
pentacosylcyclopentadienyl
hexacosylcyclopentadienyl
heptacosylcyclopentadienyl
octacosylcyclopentadienyl
nonacosylcyclopentadienyl
triacontylcyclopentadienyl
cyclohexylcyclopentadienyl
phenylcyclopentadienyl
diphenylcyclopentadienyl
triphenylcyclopentadienyl
tetraphenylcyclopentadienyl
pentaphenylcyclopentadienyl
tolylcyclopentadineyl
benzylcyclopentadienyl
phenethylcyclopentadienyl
cyclohexylmethylcyclopentadienyl
napthylcyclopentadienyl
methylphenylcyclopentadienyl
methyltolylcyclopentadienyl
methylethylcyclopentadienyl
methylpropylcyclopentadienyl
methylbutylcyclopentadienyl
methylpentylcyclopentadienyl TABLE A-continued methylhexylcyclopentadienyl
methylheptylcyclpentadienyl
methyloctylcyclopentadienyl
methylnonylcyclopentadienyl
methyldecylcyclopentadienyl
vinylcyclopentadienyl
propenylcyclopentadienyl
butenylcyclopentadienyl
indenyl
methylindenyl
dimethylindenyl
trimethylindenyl
methylpropylindenyl
dimethylpropylindenyl
methyldipropylindenyl
methylethylindenyl
methylbutylindenyl
ethylindenyl
propylindenyl
butylindenyl
pentylindenyl
hexylindenyl
heptylindenyl
octylindenyl
nonylindenyl
decylindenyl
phenylindenyl
(fluorophenyl)indenyl
(methylphenyl)indenyl
biphenylindenyl
(bis(trifluoromethyl)phenyl)indenyl
napthylindenyl
phenanthrylindenyl
benzylindenyl
benzindenyl
cyclohexylindenyl
methylphenylindenyl
ethylphenylindenyl
propylphenylindenyl
methylnapthylindenyl
ethylnapthylindenyl
propylnapthylindenyl
(methylphenyl)indenyl
(dimethylphenyl)indenyl
(ethylphenyl)indenyl
(diethylphenyl)indenyl
(propylphenyl)indenyl
(dipropylphenyl)indenyl
methyltetrahydroindenyl
dimethyltetrahydroindenyl
dimethyldihydroindenyl
dimethyltrihydroindenyl
methylphenyltetrahydroindenyl
methylphenyldihydroindenyl
methylphenyltrihydroindenyl
ethyltetrahydroindenyl
propyltetrahydroindenyl
butyltetrahydroindenyl
phenyltetrahydroindenyl
fluorenyl
methylfluorenyl
dimethylfluorenyl
trimethylfluorenyl
ethylfluorenyl
propylfluorenyl
butylfluorenyl
dibutylfluorenyl
pentylfluorenyl
hexylfluorenyl
heptylfluorenyl
octylfluorenyl
nonylfluorenyl
decylfluorenyl
phenylfluorenyl
napthylfluorenyl
benzylfluorenyl
methylphenylfluorenyl
ethylphenylfluorenyl
propylphenylfluorenyl TABLE A-continued methylnapthylfluorenyl
ethylnapthylfluorenyl
propylnapthylfluorenyl
octahydrofluorenyl
tetrahydrofluorenyl
octamethyloctahydrodibenzo[b,h]fluorenyl
tetramethyltetrahydrobenzo[b]fluorenyl
diphenylmethylcyclopentadienyl
trimethylsilylcyclopentadienyl
triethylsilylcyclopentadienyl
trimethylgermylcyclopentadienyl
trimethylstannylcyclopentadienyl
triethylplumbylcyclopentadienyl
trifluromethylcyclopentadienyl
N,N-dimethylamidocyclopentadienyl
P,P-dimethylphosphidocyclopentadienyl
N,N-diethylamidocyclopentadienyl
methoxycyclopentadienyl
ethoxycyclopentadienyl
trimethylsilyoxycyclopentadienyl
(N,N-dimethylamidomethyl)cyclopentadienyl
methyoxyindenyl
dimethyoxyindenyl
N,N-dimethylaminoindenyl
trimethylsiloxyindenyl
butyldimethylsiloxyindenyl
bis(N,N-dimethylamino)indenyl
di(trimethylsiloxy)indenyl
di(butyldimethylsiloxy)indenyl
methoxyfluorenyl
dimethoxyfluorenyl
N,N-dimethylaminofluorenyl
trimethylsiloxyfluorenyl
butyldimethylsiloxyfluorenyl
dimethoxyfluorenyl
bis(N,N-dimethylamino)fluorenyl
di(trimethylsiloxy)fluorenyl
di(butyldimethylsiloxy)fluorenyl
$(JS'_{z-1-y})$ $(y = 1)$ methylamido
ethylamido
propylamido
nutylamido
pentylamido
hexylamido
heptylamido
octylamido
nonylamido
decylamido
eicosylamido
heneicosylamido
docosylamido
tricosylamido
tetracosylamido
pentacosylamido
hexacosylamido
heptacosylamido
octacosylamido
nonacosylamido
triacontylamido
phenylamido
tolylamido
phenethylamido
benzylamido
cyclobutylamido
cyclopentylamido
cyclohexylamido
cycloheptylamido
cyclooctylamido
cyclononylamido
cyclodecylamido
cyclododecylamido
adamantylamido
norbornylamido
perfluorophenylamido
fluorophenylamido
difluorophenylamido
oxo TABLE A-continued sulfido
(JS'$_{z-1-y}$) (y = 0)

methoxide
ethoxide
phenoxide
dimethylphenoxide
dipropylphenoxide
methylthio
ethylthio
phenylthio
dimethylphenylthio
dipropylphenylthio
$X_1$ or $X_2$ chloride
bromide
iodide
fluoride
hydride
methyl
ethyl
propyl
butyl
pentyl
hexyl
heptyl
octyl
nonyl
decyl
undecyl
dodecyl
tridecyl
tetradecyl
pentadecyl
hexadecyl
heptadecyl
octadecyl
nonadecyl
eicosyl
heneicosyl
docosyl
tricosyl
tetracosyl
pentacosyl
hexacosyl
heptacosyl
octacosyl
nonacosyl
triacontyl
phenyl
benzyl
phenethyl
tolyl
methoxy
ethoxy
propoxy
butoxy
dimethylamido
diethylamido
methylethylamido
phenoxy
benzoxy
allyl
$X_1$ and $X_2$ together methylidene
ethylidene
propylidene
tetramethylene
pentamethylene
hexamethylene
ethylenedihydroxy
butadiene
methylbutadiene
dimethylbutadiene
pentadiene
methylpentadiene
dimethylpentadiene TABLE A-continued hexadiene
methylhexadiene
dimethylhexadiene
M titanium
zirconium
hafnium
L or L' (optional)

ethylene
propylene
butene
hexene
styrene
hexadiene
butadiene
dimethylbutadiene
pentadiene
methylhexadiene
dimethylhexadiene
acetylene
methylacetylene
ethylacetylene
benzyne
cyclopentene
cyclohexene
L' (optional)

diethylether
dimethylether
trimethylamine
triphenylamine
triethylamine
tricyclohexylphosp
triphenylphosphine
trimethylphosphin
tetrahydrofuran
furan
thiophene
dimethylsulfide
diphenylsulfide Additional preferred catalysts include those described in WO 01/48034, which is incorporated herein by reference. Particularly preferred catalyst compounds include those disclosed at page 9, line 38 to page 25, line 42, page 28, lines 5 to 17, and page 30, line 37 to page 35, line 28.

Activators and Activation Methods for Catalyst Compounds

The polymerization pre-catalyst compounds, described above, are typically activated in various ways to yield compounds having a vacant coordination site that will coordinate, insert, and polymerize olefin(s). For the purposes of this patent specification and appended claims, the terms "cocatalyst" and "activator" are used herein interchangeably and are defined to be any compound which can activate any one of the catalyst compounds described above by converting the neutral catalyst compound to a catalytically active catalyst compound cation. Non-limiting activators, for example, include alumoxanes, aluminum alkyls, ionizing activators, which may be neutral or ionic, and conventional-type cocatalysts. Preferred activators typically include alumoxane compounds, modified alumoxane compounds, and ionizing anion precursor compounds that abstract one reactive, σ-bound, metal ligand making the metal complex cationic and providing a charge-balancing noncoordinating or weakly coordinating anion.

Aluminoxane and Aluminum Alkyl Activators

In one embodiment, alumoxane activators are utilized as an activator in the catalyst composition useful in the invention. Alumoxanes are generally oligomeric compounds containing —Al(R¹)—O— sub-units, where R¹ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is a halide, alkoxide or amide. Mixtures of different alumoxanes and modified alumoxanes may also be used.

The activator compounds comprising Lewis-acid activators and in particular alumoxanes are represented by the following general formulae:

   (11)

   (12)

   (13)

An alumoxane is generally a mixture of both the linear and cyclic compounds. In the general alumoxane formula, $R^3$, $R^4$, $R^5$ and $R^6$ are, independently a $C_1$-$C_{30}$ alkyl radical, for example, methyl, ethyl, propyl, butyl, pentyl, hexyl, heptyl, octyl, nonyl, decyl, and "p" is an integer from 1 to about 50. Most preferably, $R^3$, $R^4$, $R^5$ and $R^6$ are each methyl and "p" is a least 4. When an alkyl aluminum halide or alkoxide is employed in the preparation of the alumoxane, one or more $R^{3-6}$ groups may be halide or alkoxide. M' is a metal or metalloid, and Q' is a partially or fully fluorinated hydrocarbyl.

It is recognized that alumoxane is not a discrete material. A typical alumoxane will contain free trisubstituted or trialkyl aluminum, bound trisubstituted or trialkyl aluminum, and alumoxane molecules of varying degree of oligomerization. Those methylalumoxanes most preferred contain lower levels of trimethylaluminum. Lower levels of trimethylaluminum can be achieved by reaction of the trimethylaluminum with a Lewis base or by vacuum distillation of the trimethylaluminum or by any other means known in the art. It is also recognized that after reaction with the transition metal compound, some alumoxane molecules are in the anionic form as represented by the anion in equations 4-6, thus for our purposes are considered "non-coordinating" anions.

For further descriptions, see U.S. Pat. Nos. 4,665,208, 4,952,540, 5,041,584, 5,091,352, 5,206,199, 5,204,419, 4,874,734, 4,924,018, 4,908,463, 4,968,827, 5,329,032, 5,248,801, 5,235,081, 5,157,137, 5,103,031 and EP 0 561 476 A1, EP 0 279 586 B1, EP0 516 476 A, EP 0 594 218 A1 and WO 94/10180.

When the activator is an alumoxane (modified or unmodified), some embodiments select the maximum amount of activator at a 5000-fold molar excess Al/M over the catalyst precursor (per metal catalytic site). The minimum activator-to-catalyst-precursor is a 1:1 molar ratio.

Alumoxanes may be produced by the hydrolysis of the respective trialkylaluminum compound. MMAO may be produced by the hydrolysis of trimethylaluminum and a higher trialkylaluminum such as triisobutylaluminum. MMAO's are generally more soluble in aliphatic solvents and more stable during storage. There are a variety of methods for preparing alumoxane and modified alumoxanes, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,103,031, 5,391,793, 5,391,529, 5,693,838, 5,731,253, 5,731,451, 5,744,656, 5,847,177, 5,854,166, 5,856,256 and 5,939,346 and European publications EP-A-0 561 476, EP-B1-0 279 586, EP-A-0 594-218 and EP-B1-0 586 665, and PCT publications WO 94/10180 and WO 99/15534, all of which are herein fully incorporated by reference. It may be preferable to use a visually clear methylalumoxane. A cloudy or gelled alumoxane can be filtered to produce a clear solution or clear alumoxane can be decanted from the cloudy solution. Another alumoxane is a modified methyl alumoxane (MMAO) cocatalyst type 3A (commercially available from Akzo Chemicals, Inc. under the trade name Modified Methylalumoxane type 3A, covered under patent number U.S. Pat. No. 5,041,584).

Aluminum alkyl or organoaluminum compounds which may be utilized as activators (or scavengers) include trimethylaluminum, triethylaluminum, triisobutylaluminum, tri-n-hexylaluminum, tri-n-octylaluminum and the like.

Ionizing Activators

It is within the scope of this invention to use an ionizing or stoichiometric activator, neutral or ionic, such as tri(n-butyl)ammonium tetrakis (pentafluorophenyl)boron, a trisperfluorophenyl boron metalloid precursor or a trisperfluoronaphtyl boron metalloid precursor, polyhalogenated heteroborane anions (WO 98/43983), boric acid (U.S. Pat. No. 5,942,459) or combination thereof. It is also within the scope of this invention to use neutral or ionic activators alone or in combination with alumoxane or modified alumoxane activators.

Examples of neutral stoichiometric activators include tri-substituted boron, tellurium, aluminum, gallium and indium or mixtures thereof. The three substituent groups are each independently selected from alkyls, alkenyls, halogen, substituted alkyls, aryls, arylhalides, alkoxy and halides. Preferably, the three groups are independently selected from halogen, mono or multicyclic (including halosubstituted) aryls, alkyls, and alkenyl compounds and mixtures thereof, preferred are alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls). More preferably, the three groups are alkyls having 1 to 4 carbon groups, phenyl, napthyl or mixtures thereof. Even more preferably, the three groups are halogenated, preferably fluorinated, aryl groups. Most preferably, the neutral stoichiometric activator is trisperfluorophenyl boron or trisperfluoronapthyl boron.

Ionic stoichiometric activator compounds may contain an active proton, or some other cation associated with, but not coordinated to, or only loosely coordinated to, the remaining ion of the ionizing compound. Such compounds and the like are described in European publications EP-A-0 570 982, EP-A-0 520 732, EP-A-0 495 375, EP-B1-0 500 944, EP-A-0 277 003 and EP-A-0 277 004, and U.S. Pat. Nos. 5,153,157, 5,198,401, 5,066,741, 5,206,197, 5,241,025, 5,384,299 and 5,502,124 and U.S. patent application Ser. No. 08/285,380, filed Aug. 3, 1994, all of which are herein fully incorporated by reference.

Ionic catalysts can be preparedly reacting a transition metal compound with some neutral Lewis acids, such as $B(C_6F_6)_3$, which upon reaction with the hydrolyzable ligand (X) of the transition metal compound forms an anion, such as $([B(C_6F_5)_3(X)]^-)$, which stabilizes the cationic transition metal species generated by the reaction. The catalysts can be, and preferably are, prepared with activator components which are ionic compounds or compositions. However preparation of activators utilizing neutral compounds is also contemplated by this invention.

Compounds useful as an activator component in the preparation of the ionic catalyst systems used in the process of this invention comprise a cation, which is preferably a Bronsted acid capable of donating a proton, and a compatible non-coordinating anion which anion is relatively large (bulky), capable of stabilizing the active catalyst species (the Group 4 cation) which is formed when the two compounds are combined and said anion will be sufficiently labile to be displaced by olefinic diolefinic and acetylenically unsaturated substrates or other neutral Lewis bases such as ethers, nitrites and the like. Two classes of compatible non-coordinating anions have been disclosed in EPA 277,003 and EPA 277,004 published 1988: 1) anionic coordination complexes comprising a plurality of lipophilic radicals covalently coordinated to and shielding a central charge-bearing metal or metalloid core, and 2) anions comprising a plurality of boron atoms such as carboranes, metallacarboranes and boranes.

In a preferred embodiment, the stoichiometric activators include a cation and an anion component, and may be represented by the following formula:

$$(L-H)_d^+(A^{d-}) \qquad (14)$$

wherein L is an neutral Lewis base;

H is hydrogen;

$(L-H)^+$ is a Bronsted acid $A^{d-}$ is a non-coordinating anion having the charge d− d is an integer from 1 to 3.

The cation component, $(L-H)_d^+$ may include Bronsted acids such as protons or protonated Lewis bases or reducible Lewis acids capable of protonating or abstracting a moiety, such as an alkyl or aryl, from the bulky ligand metallocene containing transition metal catalyst precursor, resulting in a cationic transition metal species.

The activating cation $(L-H)_d^+$ may be a Bronsted acid, capable of donating a proton to the transition metal catalytic precursor resulting in a transition metal cation, including ammoniums, oxoniums, phosphoniums, silyliums, and mixtures thereof, preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxomiuns from ethers such as dimethyl ether diethyl ether, tetrahydrofuran and dioxane, sulfoniums from thioethers, such as diethyl thioethers and tetrahydrothiophene, and mixtures thereof. The activating cation $(L-H)_d^+$ may also be a moiety such as silver, tropylium, carbeniums, ferroceniums and mixtures, preferably carboniums and ferroceniums. Most preferably $(L-H)_d^+$ is triphenyl carbonium.

The anion component $A^{d-}$ include those having the formula $[M^{k+}Q_n]^{d-}$ wherein k is an integer from 1 to 3; n is an integer from 2-6; n−k=d; M is an element selected from Group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than 1 occurrence is Q a halide. Preferably, each Q is a fluorinated hydrocarbyl group having 1 to 20 carbon atoms, more preferably each Q is a fluorinated aryl group, and most preferably each Q is a pentafluoryl aryl group. Examples of suitable $A^{d-}$ also include diboron compounds as disclosed in U.S. Pat. No. 5,447,895, which is fully incorporated herein by reference.

Illustrative, but not limiting examples of boron compounds which may be used as an activating cocatalyst in the preparation of the improved catalysts of this invention are tri-substituted ammonium salts such as: trimethylammonium tetraphenylborate, triethylammonium tetraphenylborate, tripropylammonium tetraphenylborate, tri(n-butyl)ammonium tetraphenylborate, tri(t-butyl)ammonium tetraphenylborate, N,N-dimethylanilinium tetraphenylborate, N,N-diethylanilinium tetraphenylborate, N,N-dimethyl-(2,4,6-trimethylanilinium)tetraphenylborate, tropillium tetraphenylborate, triphenylcarbenium tetraphenylborate, triphenylphosphonium tetraphenylborate triethylsilylium tetraphenylborate, benzene(diazonium)tetraphenylborate, trimethylammonium tetrakis(pentafluorophenyl)borate, triethylammonium tetrakis(pentafluorophenyl)borate, tripropylammonium tetrakis(pentafluorophenyl)borate, tri(n-butyl)ammonium tetrakis(pentafluorophenyl)borate, tri(sec-butyl)ammonium tetrakis(pentafluorophenyl)borate, N,N-dimethylanilinium tetrakis(pentafluorophenyl)borate, N,N-diethylanilinium tetrakis(pentafluorophenyl)borate, N,N-dimethyl-(2,4,6-trimethylanilinium)tetrakis(pentafluorophenyl)borate, tropillium tetrakis(pentafluorophenyl)borate, triphenylcarbenium tetrakis(pentafluorophenyl)borate, triphenylphosphonium tetrakis(pentafluorophenyl)borate, triethylsilylium tetrakis(pentafluorophenyl)borate, benzene(diazonium)tetrakis(pentafluorophenyl)borate, trimethylammonium tetrakis-(2,3,4,6-tetrafluorophenyl)borate, triethylammonium tetrakis-(2,3,4,6-tetrafluorophenyl)borate, tripropylammonium tetrakis-(2,3,4,6-tetrafluorophenyl)borate, tri(n-butyl) ammonium tetrakis-(2,3,4,6-tetrafluorophenyl)borate, dimethyl(t-butyl)ammonium tetrakis-(2,3,4,6-tetrafluorophenyl)borate, N,N-dimethylanilinium tetrakis-(2,3,4,6-tetrafluorophenyl)borate, N,N-diethylanilinium tetrakis-(2,3,4,6-tetrafluorophenyl)borate, N,N-dimethyl-(2,4,6-trimethylanilinium)tetrakis-(2,3,4,6-tetrafluorophenyl) borate, tropillium tetrakis-(2,3,4,6-tetrafluorophenyl)borate, triphenylcarbenium tetrakis-(2,3,4,6-tetrafluorophenyl)borate, triphenylphosphonium tetrakis-(2,3,4,6-tetrafluorophenyl)borate, triethylsilylium tetrakis-(2,3,4,6-tetrafluorophenyl)borate, benzene(diazonium)tetrakis-(2,3,4,6-tetrafluorophenyl)borate, trimethylammonium tetrakis (perfluoronapthyl)borate, triethylammonium tetrakis (perfluoronapthyl)borate, tripropylammonium tetrakis (perfluoronapthyl)borate, tri(n-butyl)ammonium tetrakis (perfluoronapthyl)borate, tri(t-butyl)ammonium tetrakis (perfluoronapthyl)borate, N,N-dimethylanilinium tetrakis (perfluoronapthyl)borate, N,N-diethylanilinium tetrakis (perfluoronapthyl)borate, N,N-dimethyl-(2,4,6-trimethylanilinium)tetrakis(perfluoronapthyl)borate, tropillium tetrakis(perfluoronapthyl)borate, triphenylcarbenium tetrakis(perfluoronapthyl)borate, triphenylphosphonium tetrakis(perfluoronapthyl)borate, triethylsilylium tetrakis(perfluoronapthyl)borate, benzene(diazonium)tetrakis (perfluoronapthyl)borate, trimethylammonium tetrakis (perfluorobiphenyl)borate, triethylammonium tetrakis (perfluorobiphenyl)borate, tripropylammonium tetrakis (perfluorobiphenyl)borate, tri(n-butyl)ammonium tetrakis (perfluorobiphenyl)borate, tri(t-butyl)ammonium tetrakis (perfluorobiphenyl)borate, N,N-dimethylanilinium tetrakis (perfluorobiphenyl)borate, N,N-diethylanilinium tetrakis (perfluorobiphenyl)borate, N,N-dimethyl-(2,4,6-trimethylanilinium)tetrakis(perfluorobiphenyl)borate, tropillium tetrakis(perfluorobiphenyl)borate, triphenylcarbenium tetrakis(perfluorobiphenyl)borate, triphenylphosphonium tetrakis(perfluorobiphenyl)borate, triethylsilylium tetrakis(perfluorobiphenyl)borate, benzene(diazonium)tetrakis(perfluorobiphenyl)borate, trimethylammonium tetrakis(3,5-bis(trifluoromethyl)phenyl)borate, triethylammonium tetrakis(3,5-bis(trifluoromethyl)phenyl)borate, tripropylammonium tetrakis(3,5-bis(trifluoromethyl)phenyl)borate, tri(n-butyl)ammonium tetrakis(3,5-bis(trifluoromethyl)phenyl)borate, tri(t-butyl)ammonium tetrakis(3,5-bis(trifluoromethyl)phenyl)borate, N,N-dimethylanilinium tetrakis(3,5-bis(trifluoromethyl)phenyl)borate, N,N-diethylanilinium tetrakis(3,5-bis(trifluoromethyl)phenyl)borate, N,N-dimethyl-(2,4,6-trimethylanilinium)tetrakis(3,5-bis(trifluoromethyl)phenyl)borate, tropillium tetrakis(3,5-bis(trifluoromethyl)phenyl)borate, triphenylcarbenium tetrakis(3,5-bis(trifluoromethyl)phenyl)borate, triphenylphosphonium tetrakis(3,5-bis(trifluoromethyl)phenyl)borate, triethylsilylium tetrakis(3,5-bis(trifluoromethyl)phenyl)borate, benzene(diazonium)tetrakis(3,5-bis(trifluoromethyl)phenyl)borate, and dialkyl ammonium salts such as: di-(i-propyl) ammonium tetrakis(pentafluorophenyl)borate, and dicyclohexylammonium tetrakis(pentafluorophenyl)borate; and additional tri-substituted phosphonium salts such as tri(o-tolyl)phosphonium tetrakis(pentafluorophenyl)borate, and tri(2,6-dimethylphenyl)phosphonium tetrakis(pentafluorophenyl)borate.

Most preferably, the ionic stoichiometric activator $(L-H)_d^+ (A^{d-})$ is N,N-dimethylanilinium tetra(perfluorophenyl)borate, N,N-dimethylanilinium tetrakis(perfluoronapthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronapthyl)borate, triphenylcarbenium tetrakis(perfluorobiphenyl)borate, triphenylcarbenium tetrakis(3,5-bis(trifluoromethyl)phenyl)borate, or triphenylcarbenium tetra(perfluorophenyl)borate.

In one embodiment, an activation method using ionizing ionic compounds not containing an active proton but capable of producing a bulky ligand metallocene catalyst cation and their non-coordinating anion are also contemplated, and are described in EP-A-0 426 637, EP-A-0 573 403 and U.S. Pat. No. 5,387,568, which are all herein incorporated by reference.

The term "non-coordinating anion" (NCA) means an anion which either does not coordinate to said cation or which is only weakly coordinated to said cation thereby remaining sufficiently labile to be displaced by a neutral Lewis base. "Compatible" non-coordinating anions are those which are not degraded to neutrality when the initially formed complex decomposes. Further, the anion will not transfer an anionic substituent or fragment to the cation so as to cause it to form a neutral four coordinate metallocene compound and a neutral by-product from the anion. Non-coordinating anions useful in accordance with this invention are those that are compatible, stabilize the metallocene cation in the sense of balancing its ionic charge at +1, yet retain sufficient lability to permit displacement by an ethylenically or acetylenically unsaturated monomer during polymerization. These types of cocatalysts sometimes use tri-isobutyl aluminum or tri-octyl aluminum as a scavenger.

Invention process also can employ cocatalyst compounds or activator compounds that are initially neutral Lewis acids but form a cationic metal complex and a noncoordinating anion, or a zwitterionic complex upon reaction with the invention compounds. For example, tris(pentafluorophenyl) boron or aluminum act to abstract a hydrocarbyl or hydride ligand to yield an invention cationic metal complex and stabilizing noncoordinating anion, see EP-A-0 427 697 and EP-A-0 520 732 for illustrations of analogous Group-4 metallocene compounds. Also, see the methods and compounds of EP-A-0 495 375. For formation of zwitterionic complexes using analogous Group 4 compounds, see U.S. Pat. Nos. 5,624,878; 5,486,632; and 5,527,929.

When the cations of noncoordinating anion precursors are Bronsted acids such as protons or protonated Lewis bases (excluding water), or reducible Lewis acids such as ferrocenium or silver cations, or alkali or alkaline earth metal cations such as those of sodium, magnesium or lithium, the catalyst-precursor-to-activator molar ratio may be any ratio. Combinations of the described activator compounds may also be used for activation. For example, tris(perfluorophenyl)boron can be used with methylalumoxane.

Conventional-Type Cocatalysts (Activators)

Typically, conventional transition metal catalyst compounds excluding some conventional-type chromium catalyst compounds are activated with one or more of the conventional cocatalysts which may be represented by the formula:

$$M^3 M^4_v X^2_c R^2_{b-c} \qquad (15)$$

wherein $M^3$ is a metal from Group 1 to 3 and 12 to 13 of the Periodic Table of Elements; $M^4$ is a metal of Group 1 of the Periodic Table of Elements; v is a number from 0 to 1; each $X^2$ is any halogen; c is a number from 0 to 3; each $R^2$ is a monovalent hydrocarbon radical or hydrogen; b is a number from 1 to 4; and wherein b minus c is at least 1. Other conventional-type organometallic cocatalyst compounds for the above conventional-type transition metal catalysts have the formula $M^3 R^2_k$, where $M^3$ is a Group IA, IIA, IIB or IIIA metal, such as lithium, sodium, beryllium, barium, boron, aluminum, zinc, cadmium, and gallium; k equals 1, 2 or 3 depending upon the valency of $M^3$ which valency in turn normally depends upon the particular Group to which $M^3$ belongs; and each $R^2$ may be any monovalent hydrocarbon radical.

Non-limiting examples of conventional-type organometallic cocatalyst compounds useful with the conventional-type catalyst compounds described above include methyllithium, butyllithium, dihexylmercury, butylmagnesium, diethylcadmium, benzylpotassium, diethylzinc, tri-n-butylaluminum, diisobutyl ethylboron, diethylcadmium, di-n-butylzinc and tri-n-amylboron, and, in particular, the aluminum alkyls, such as tri-hexyl-aluminum, triethylaluminum, trimethylaluminum, and tri-isobutylaluminum. Other conventional-type cocatalyst compounds include mono-organohalides and hydrides of Group 2 metals, and mono- or di-organohalides and hydrides of Group 3 and 13 metals. Non-limiting examples of such conventional-type cocatalyst compounds include di-isobutylaluminum bromide, isobutylboron dichloride, methyl magnesium chloride, ethylberyllium chloride, ethylcalcium bromide, di-isobutylaluminum hydride, methylcadmium hydride, diethylboron hydride, hexylberyllium hydride, dipropylboron hydride, octylmagnesium hydride, butylzinc hydride, dichloroboron hydride, di-bromo-aluminum hydride and bromocadmium hydride. Conventional-type organometallic cocatalyst compounds are known to those in the art and a more complete discussion of these compounds may be found in U.S. Pat. Nos. 3,221,002 and 5,093,415, which are herein fully incorporated by reference.

Additional Activators

Other activators include those described in PCT publication WO 98/07515 such as tris(2,2',2"-nonafluorobiphenyl) fluoroaluminate, which publication is fully incorporated herein by reference. Combinations of activators are also contemplated by the invention, for example, alumoxanes and ionizing activators in combinations, see for example, EP-B1 0 573 120, PCT publications WO 94/07928 and WO 95/14044 and U.S. Pat. Nos. 5,153,157 and 5,453,410 all of which are herein fully incorporated by reference.

Other suitable activators are disclosed in WO 98/09996, incorporated herein by reference, which describes activating bulky ligand metallocene catalyst compounds with perchlorates, periodates and iodates including their hydrates. WO 98/30602 and WO 98/30603, incorporated by reference, describe the use of lithium(2,2'-bisphenyl-ditrimethylsilicate).4THF as an activator for a bulky ligand metallocene catalyst compound. WO 99/18135, incorporated herein by reference, describes the use of organo-boron-aluminum activators. EP-B 1-0 781 299 describes using a silylium salt in combination with a non-coordinating compatible anion. Also, methods of activation such as using radiation (see EP-B 1-0 615 981 herein incorporated by reference), electrochemical oxidation, and the like are also contemplated as activating methods for the purposes of rendering the neutral bulky ligand metallocene catalyst compound or precursor to a bulky ligand metallocene cation capable of polymerizing olefins. Other activators or methods for activating a bulky ligand metallocene catalyst compound are described in for example, U.S. Pat. Nos. 5,849,852, 5,859,653 and 5,869,723 and WO 98/32775, WO 99/42467 (dioctadecylmethylammonium-bis(tris(pentafluorophenyl)borane)benzimidazolide), which are herein incorporated by reference.

Another suitable ion forming, activating cocatalyst comprises a salt of a cationic oxidizing agent and a noncoordinating, compatible anion represented by the formula:

$$(OX^{e+})_d(A^{d-})_e \qquad (16)$$

wherein $OX^{e+}$ is a cationic oxidizing agent having a charge of e+; e is an integer from 1 to 3; and $A^-$, and d are as previously defined. Examples of cationic oxidizing agents include: ferrocenium, hydrocarbyl-substituted ferrocenium, $Ag^+$, or $Pb^{+2}$. Preferred embodiments of $A^{d-}$ are those anions previously defined with respect to the Bronsted acid containing activators, especially tetrakis(pentafluorophenyl)borate.

It is within the scope of this invention that catalyst compounds can be combined one or more activators or activation methods described above. For example, a combination of activators have been described in U.S. Pat. Nos. 5,153,157 and 5,453,410, European publication EP-B1 0 573 120, and PCT publications WO 94/07928 and WO 95/14044. These documents all discuss the use of an alumoxane and an ionizing activator with a bulky ligand metallocene catalyst compound.

The Choice of Transition Metal Catalyst Components

The catalyst system of this invention comprises two or more transition metal compounds as described above. At least one of the compounds must be capable of producing a crystalline poly-alpha-olefin, preferably isotactic polypropylene or syndiotactic polypropylene, having a crystallinity of 40% or more. The other compound must be capable of producing an amorphous poly-alpha-olefin, preferably atactic polypropylene, having a crystallinity of 20% or less.

The choice of transition metal component for the crystalline polymer fraction is a subset of the transition metal component of equations 8-9. This preferred component is illustrated in equation 17:

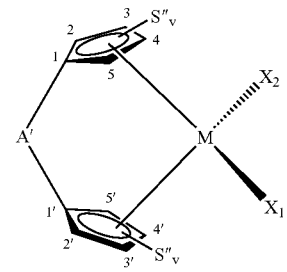

(17)

wherein A', M, $X_1$ and $X_2$ are as previously defined. Substituents $S''_v$ are independently defined as S" in equations 8-9 where the subscript "v" denotes the carbon atom on the Cp-ring to which the substituent is bonded.

Preferably metallocene precursors for producing poly-alpha-olefins having enhanced isotactic character are those of Equation 17 where $S''_v$ are independently chosen such that the metallocene framework 1) has no plane of symmetry containing the metal center, and 2) has a $C_2$-axis of symmetry through the metal center. Such complexes, such as rac-$Me_2Si(indenyl)_2ZrMe_2$ and rac-$Me_2Si(indenyl)_2HfMe_2$ are well known in the art and generally produce isotactic polymers with higher degrees of stereoregularity than the less symmetric chiral systems. Likewise another preferred class of transition metal compounds that can produce isotactic polymers useful in this invention are those monocyclopentadienyl catalysts disclosed in U.S. Pat. No. 5,026,798, which is incorporated by reference herein.

Preferred chiral racemic metallocene compounds which, according to the present invention, provide catalyst systems which are specific to the production of isotactic poly-alpha-olefins include the racemic versions of: dimethylsilylbis(indenyl)zirconium dichloride, dimethylsilylbis(indenyl)zirconium dimethyl, diphenylsilylbis(indenyl)zirconium dichloride, diphenylsilylbis(indenyl)zirconium dimethyl, methylphenylsilylbis(indenyl)zirconium dichloride, methylphenylsilylbis(indenyl)zirconium dimethyl, ethylenebis(indenyl)zirconium dichloride, ethylenebis(indenyl)zirconium dimethyl, methylenebis(indenyl)zirconium dichloride, methylenebis(indenyl)zirconium dimethyl, dimethylsilylbis(indenyl)hafnium dichloride, dimethylsilylbis(indenyl) hafnium dimethyl, diphenylsilylbis(indenyl)hafnium dichloride, diphenylsilylbis(indenyl)hafnium dimethyl, methylphenylsilylbis(indenyl)hafnium dichloride, methylphenylsilylbis(indenyl)hafnium dimethyl, ethylenebis(indenyl)hafnium dichloride, ethylenebis(indenyl)hafnium dimethyl, methylenebis(indenyl)hafnium dichloride, methylenebis(indenyl)hafnium dimethyl, dimethylsilylbis(tetrahydroindenyl)zirconium dichloride, dimethylsilylbis(tetrahydroindenyl)zirconium dimethyl, diphenylsilylbis(tetrahydroindenyl)zirconium dichloride, diphenylsilylbis(tetrahydroindenyl)zirconium dimethyl, methylphenylsilylbis(tetrahydroindenyl)zirconium dichloride, methylphenylsilylbis(tetrahydroindenyl)zirconium dimethyl, ethylenebis(tetrahydroindenyl)zirconium dichloride, ethylenebis(tetrahydroindenyl)zirconium dimethyl, methylenebis(tetrahydroindenyl)zirconium dichloride, methylenebis(tetrahydroindenyl)zirconium dimethyl, dimethylsilylbis(tetrahydroindenyl)hafnium dichloride, dimethylsilylbis(tetrahydroindenyl)hafnium dimethyl, diphenylsilylbis(tetrahydroindenyl)hafnium dichloride, diphenylsilylbis(tetrahydroindenyl)hafnium dimethyl, methylphenylsilylbis(tetrahydroindenyl)hafnium dichloride, methylphenylsilylbis(tetrahydroindenyl)hafnium dimethyl, ethylenebis(tetrahydroindenyl)hafnium dichloride, ethylenebis(tetrahydroindenyl)hafnium dimethyl, methylenebis (tetrahydroindenyl)hafnium dichloride, methylenebis(tetrahydroindenyl)hafnium dimethyl, dimethylsilylbis(2-methylindenyl)zirconium dichloride, dimethylsilylbis(2-methylindenyl)zirconium dimethyl, diphenylsilylbis(2-methylindenyl)zirconium dichloride, diphenylsilylbis(2-methylindenyl)zirconium dimethyl, methylphenylsilylbis(2-methylindenyl)zirconium dichloride, methylphenylsilylbis (2-methylindenyl)zirconium dimethyl, ethylenebis(2-methylindenyl)zirconium dichloride, ethylenebis(2-methylindenyl)zirconium dimethyl, methylenebis(2-methylindenyl)zirconium dichloride, methylenebis(2-methylindenyl)zirconium dimethyl, dimethylsilylbis(2-methylindenyl)hafnium dichloride, dimethylsilylbis(2-methylindenyl)hafnium dimethyl, diphenylsilylbis(2-methylindenyl)hafnium dichloride, diphenylsilylbis(2-methylindenyl)hafnium dimethyl, methylphenylsilylbis(2-methylindenyl)hafnium dichloride, methylphenylsilylbis(2-methylindenyl)hafnium dimethyl, ethylenebis(2-methylindenyl)hafnium dichloride, ethylenebis(2-methylindenyl)hafnium dimethyl, methylenebis(2-methylindenyl)hafnium dichloride, methylenebis(2-methylindenyl)hafnium dimethyl, rac-dimethylsilylbis(2-methyl-4-phenylindenyl)zirconium dichloride, diphenylsilylbis(2-methyl-4-phenylindenyl)zirconium dimethyl, diphenylsilylbis(2-methyl-4-phenylindenyl)zirconium dichloride, diphenylsilylbis(2-methyl-4-phenylindenyl)zirconium dimethyl, methylphenylsilylbis(2-methyl-4-phenylindenyl)zirconium dichloride, methylphenylsilylbis (2-methyl-4-phenylindenyl)zirconium dimethyl, ethylenebis (2-methyl-4-phenylindenyl)zirconium dichloride, ethylenebis(2-methyl-4-phenylindenyl)zirconium dimethyl, methylenebis(2-methyl-4-phenylindenyl)zirconium dichloride, methylenebis(2-methyl-4-phenylindenyl)zirconium dimethyl, dimethylsilylbis(2-methyl-4-phenylindenyl) hafnium dichloride, dimethylsilylbis(2-methyl-4-phenylindenyl)hafnium dimethyl, diphenylsilylbis(2-methyl-4-phenylindenyl)hafnium dichloride, diphenylsilylbis(2-methyl-4-phenylindenyl)hafnium dimethyl, methylphenylsilylbis(2-methyl-4-phenylindenyl)hafnium dichloride, methylphenylsilylbis(2-methyl-4-phenylindenyl)hafnium dimethyl, ethylenebis(2-methyl-4-phenylindenyl)hafnium dichloride, ethylenebis(2-methyl-4-phenylindenyl)hafnium dimethyl, methylenebis(2-methyl-4-phenylindenyl)hafnium dichloride, methylenebis(2-methyl-4-phenylindenyl) hafnium dimethyl, dimethylsilylbis(4,7-dimethylindenyl) zirconium dichloride, dimethylsilylbis(4,7-dimethylindenyl)zirconium dimethyl, diphenylsilylbis(4,7-dimethylindenyl)zirconium dichloride, diphenylsilylbis(4,7-dimethylindenyl)zirconium dimethyl, methylphenylsilylbis (4,7-dimethylindenyl)zirconium dichloride, methylphenylsilylbis(4,7-dimethylindenyl)zirconium dimethyl, ethylenebis(4,7-dimethylindenyl)zirconium dichloride, ethylenebis(4,7-dimethylindenyl)zirconium dimethyl, methylenebis(4,7-dimethylindenyl)zirconium dichloride, methylenebis(4,7-dimethylindenyl)zirconium dimethyl, dimethylsilylbis(4,7-dimethylindenyl)hafnium dichloride, dimethylsilylbis(4,7-dimethylindenyl)hafnium dimethyl, diphenylsilylbis(4,7-dimethylindenyl)hafnium dichloride, diphenylsilylbis(4,7-dimethylindenyl)hafnium dimethyl, methylphenylsilylbis(4,7-dimethylindenyl)hafnium dichloride, methylphenylsilylbis(4,7-dimethylindenyl)hafnium dimethyl, ethylenebis(4,7-dimethylindenyl)hafnium dichloride, ethylenebis(4,7-dimethylindenyl)hafnium dimethyl, methylenebis(4,7-dimethylindenyl)hafnium dichloride, methylenebis(4,7-dimethylindenyl)hafnium dimethyl, dimethylsilylbis(2-methyl-4-napthylindenyl)zirconium dichloride, dimethylsilylbis(2-methyl-4-napthylindenyl)zirconium dimethyl, diphenylsilylbis(2-methyl-4-napthylindenyl)zirconium dichloride, diphenylsilylbis(2-methyl-4-napthylindenyl)zirconium dimethyl, methylphenylsilylbis(2-methyl-4-napthylindenyl)zirconium dichloride, methylphenylsilylbis(2-methyl-4-napthylindenyl)zirconium dimethyl, ethylenebis(2-methyl-4-napthylindenyl)zirconium dichloride, ethylenebis(2-methyl-4-napthylindenyl)zirconium dimethyl, methylenebis(2-methyl-4-napthylindenyl)zirconium dichloride, methylenebis(2-methyl-4-napthylindenyl)zirconium dimethyl, dimethylsilylbis(2-methyl-4-napthylindenyl)hafnium dichloride, dimethylsilylbis(2-methyl-4-napthylindenyl)hafnium dimethyl, diphenylsilylbis(2-methyl-4-napthylindenyl)hafnium dichloride, diphenylsilylbis(2-methyl-4-napthylindenyl) hafnium dimethyl, methylphenylsilylbis(2-methyl-4-napthylindenyl)hafnium dichloride, methylphenylsilylbis(2-methyl-4-napthylindenyl)hafnium dimethyl, ethylenebis(2-methyl-4-napthylindenyl)hafnium dichloride, ethylenebis (2-methyl-4-napthylindenyl)hafnium dimethyl, methylenebis(2-methyl-4-napthylindenyl)hafnium dichloride, methylenebis(2-methyl-4-napthylindenyl)hafnium dimethyl, dimethylsilylbis(2,3-dimethylcyclopentadienyl) zirconium dichloride, dimethylsilylbis(2,3-dimethylcyclopentadienyl)zirconium dimethyl, diphenylsilylbis(2,3-dimethylcyclopentadienyl)zirconium dichloride, diphenylsilylbis(2,3-dimethylcyclopentadienyl)zirconium dimethyl, methylphenylsilylbis(2,3-dimethylcyclopentadienyl)zirconium dichloride, methylphenylsilylbis(2,3-dimethylcyclopentadienyl)zirconium dimethyl, ethylenebis(2,3-dimethylcyclopentadienyl)zirconium dichloride, ethylenebis(2,3-dimethylcyclopentadienyl)zirconium dimethyl, methylenebis(2,3-dimethylcyclopentadienyl)zirconium dichloride, methylenebis(2,3-dimethylcyclopentadienyl)zirconium dimethyl, dimethylsilylbis(2,3-dimethylcyclopentadienyl)hafnium dichloride, dimethylsilylbis(2,3dimethylcyclopentadienyl)hafnium dimethyl, diphenylsilylbis(2,3-dimethylcyclopentadienyl) hafnium dichloride, diphenylsilylbis(2,3-dimethylcyclopentadienyl)hafnium dimethyl, methylphenylsilylbis(2,3-dimethylcyclopentadienyl)hafnium dichloride, methylphenylsilylbis(2,3-dimethylcyclopentadienyl) hafnium dimethyl, ethylenebis(2,3-dimethylcyclopentadienyl)hafnium dichloride, ethylenebis(2,3-dimethylcyclopentadienyl)hafnium dimethyl, methylenebis(2,3-dimethylcyclopentadienyl)hafnium dichloride, methylenebis(2,3-dimethylcyclopentadienyl)hafnium dimethyl, dimethylsilylbis(3-trimethylsilylcyclopentadienyl)zirconium dichloride, dimethylsilylbis(3-trimethylsilylcyclopentadienyl)zirconium dimethyl, diphenylsilylbis(3-trimethylsilylcyclopentadienyl)zirconium dichloride, diphenylsilylbis(3-trimethylsilylcyclopentadienyl)zirconium dimethyl, methylphenylsilylbis(3-trimethylsilylcyclopentadienyl)zirconium dichloride, methylphenylsilylbis(3-trimethylsilylcyclopentadienyl)zirconium dimethyl, ethylenebis(3-trimethylsilylcyclopentadienyl)zirconium dichloride, ethylenebis(3-trimethylsilylcyclopentadienyl) zirconium dimethyl, methylenebis(3-trimethylsilylcyclopentadienyl)zirconium dichloride, methylenebis(3-trimethylsilylcyclopentadienyl)zirconium dimethyl, dimethylsilylbis(3-trimethylsilylcyclopentadienyl)hafnium dichloride, dimethylsilylbis(3-trimethylsilylcyclopentadienyl)hafnium dimethyl, diphenylsilylbis(3-trimethylsilylcyclopentadienyl)hafnium dichloride, diphenylsilylbis(3-trimethylsilylcyclopentadienyl)hafnium dimethyl, methylphenylsilylbis(3-trimethylsilylcyclopentadienyl) hafnium dichloride, methylphenylsilybis(3-trimethylsilylcyclopentadienyl)hafnium dimethyl, ethylenebis(3-trimethylsilylcyclopentadienyl)hafnium dichloride, ethylenebis(3-trimethylsilylcyclopentadienyl)hafnium dimethyl, methylenebis(3-trimethylsilylcyclopentadienyl)hafnium dichloride, methylenebis(3-trimethylsilylcyclopentadienyl) hafnium dimethyl, dimethylsiladiyl(2-methyl, 4-[3',5'-di-tbutylphenyl]indenyl)$_2$zirconium dichloride; dimethylsiladiyl(2-ethyl, 4-[3',5'-di-tbutylphenyl]indenyl)$_2$zirconium dichloride; dimethylsiladiyl(2-n-propyl, 4-[3',5'-di-tbutylphenyl]indenyl)$_2$zirconium dichloride; dimethylsiladiyl(2-iso-propyl, 4-[3',5'-di-tbutylphenyl]indenyl)$_2$zirconium dichloride; dimethylsiladiyl(2-n-butyl, 4-[3',5'-di-tbutylphenyl]indenyl)$_2$zirconium dichloride; dimethylsiladiyl(2-iso-butyl, 4-[3',5'-di-tbutylphenyl]indenyl)$_2$zirconium dichloride; dimethylsiladiyl(2-sec-butyl, 4-[3',5'-di-tbutylphenyl]indenyl)$_2$zirconium dichloride; dimethylsiladiyl(2-tert-butyl, 4-[3',5'-di-tbutylphenyl]indenyl)$_2$zirconium dichloride; dimethylsiladiyl(2-methyl, 4-[3',5'-di-tbutylphenyl]indenyl)$_2$hafnium dichloride; dimethylsiladiyl(2-ethyl, 4-[3',5'-di-tbutylphenyl]indenyl)$_2$hafnium dichloride; dimethylsiladiyl(2-n-propyl, 4-[3',5'-di-tbutylphenyl]indenyl)$_2$hafnium dichloride; dimethylsiladiyl(2-iso-propyl, 4-[3',5'-di-tbutylphenyl]indenyl)$_2$hafnium dichloride; dimethylsiladiyl(2-butyl, 4-[3',5'-di-tbutylphenyl]indenyl)$_2$hafnium dichloride; 9-silafluorendiyl(2-methyl, 4-[3',5'-di-tbutylphenyl]indenyl)$_2$zirconium dichloride; 9-silafluorendiyl(2-ethyl, 4-[3',5'-di-tbutylphenyl]indenyl)$_2$zirconium dichloride; 9-silafluorendiyl(2-n-propyl, 4-[3',5'-di-tbutylphenyl]indenyl)$_2$zirconium dichloride; 9-silafluorendiyl(2-iso-propyl, 4-[3',5'-di-tbutylphenyl]indenyl)$_2$zirconium dichloride; 9-silafluorendiyl(2-n-butyl, 4-[3',5'-di-tbutylphenyl]indenyl)$_2$zirconium dichloride; 9-silafluorendiyl(2-iso-butyl, 4-[3',5'-di-tbutylphenyl]indenyl)$_2$zirconium dichloride; 9-silafluorendiyl(2-sec-butyl, 4-[3',5'-di-tbutylphenyl]indenyl)$_2$zirconium dichloride; 9-silafluorendiyl(2-tert-butyl, 4-[31,5'-di-tbutylphenyl]indenyl)$_2$zirconium dichloride; 9-silafluorendiyl(2-methyl, 4-[3',5'-di-tbutylphenyl]indenyl)$_2$hafnium dichloride; 9-silafluorendiyl(2-ethyl, 4-[3',5'-di-tbutylphenyl]indenyl)$_2$hafnium dichloride; 9-silafluorendiyl(2-n-propyl, 4-[3',5'-di-tbutylphenyl]indenyl)$_2$hafnium dichloride; 9-silafluorendiyl(2-iso-propyl, 4-[3',5'-di-tbutylphenyl]indenyl)$_2$hafnium dichloride; 9-silafluorendiyl(2-n-butyl, 4-[3',5'-di-tbutylphenyl]indenyl)$_2$hafnium dichloride; 9-silafluorendiyl(2-iso-butyl, 4-[3',5'-di-tbutylphenyl]indenyl)$_2$hafnium dichloride; 9-silafluorendiyl(2-sec-butyl, 4-[3',5'-di-tbutylphenyl]indenyl)$_2$hafnium dichloride; 9-silafluorendiyl(2-tert-butyl, 4-[3',5'-di-tbutylphenyl]indenyl)$_2$hafnium dichloride; dimethylsiladiyl(2-methyl, 4-[3',5'-di-tbutylphenyl]indenyl)$_2$zirconium dimethyl; dimethylsiladiyl(2-ethyl, 4-[3',5'-di-tbutylphenyl]indenyl)$_2$zirconium dimethyl; dimethylsiladiyl(2-n-propyl, 4-[3',5'-di-tbutylphenyl]indenyl)$_2$zirconium dimethyl; dimethylsiladiyl(2-iso-propyl, 4-[3',5'-di-tbutylphenyl]indenyl)$_2$zirconium dimethyl; dimethylsiladiyl(2-n-butyl, 4-[3',5'-di-tbutylphenyl]indenyl)$_2$zirconium dimethyl; dimethylsiladiyl(2-iso-butyl, 4-[3',5'-di-tbutylphenyl]indenyl)$_2$zirconium dimethyl; dimethylsiladiyl(2-sec-butyl, 4-[3',5'-di-tbutylphenyl]indenyl)$_2$zirconium dimethyl; dimethylsiladiyl(2-tert-butyl, 4-[3',5'-di-tbutylphenyl]indenyl)$_2$zirconium dimethyl; dimethylsiladiyl(2-methyl, 4-[3',5'-di-tbutylphenyl]indenyl)$_2$hafnium dimethyl; dimethylsiladiyl(2-ethyl, 4-[3',5'-di-tbutylphenyl]indenyl)$_2$hafnium dimethyl; dimethylsiladiyl(2-n-propyl, 4-[3',5'-di-tbutylphenyl]indenyl)$_2$hafnium dimethyl; dimethylsiladiyl(2-iso-propyl, 4-[3',5'-di-tbutylphenyl]indenyl)$_2$hafnium dimethyl; dimethylsiladiyl(2-n-butyl, 4-[3',5'-di-tbutylphenyl]indenyl)$_2$hafnium dimethyl; dimethylsiladiyl(2-iso-butyl, 4-[3',5'-di-tbutylphenyl]indenyl)$_2$hafnium dimethyl; dimethylsiladiyl(2-sec-butyl, 4-[3',5'-di-tbutylphenyl]indenyl)$_2$hafnium dimethyl; dimethylsiladiyl(2-tert-butyl, 4-[3',5'-di-tbutylphenyl]indenyl)$_2$hafnium dimethyl; 9-silafluorendiyl(2-methyl, 4-[3',5'-di-tbutylphenyl]indenyl)$_2$zirconium dimethyl; 9-silafluorendiyl(2-ethyl, 4-[3',5'-di-tbutylphenyl]indenyl)$_2$zirconium dimethyl; 9-silafluorendiyl(2-n-propyl, 4-[3',5'-di-tbutylphenyl]indenyl)$_2$zirconium dimethyl; 9-silafluorendiyl(2-iso-propyl, 4-[3',5'-di-tbutylphenyl]indenyl)$_2$zirconium dimethyl; 9-silafluorendiyl(2-n-butyl, 4-[3',5'-di-tbutylphenyl]indenyl)$_2$zirconium dimethyl; 9-silafluorendiyl(2-iso-butyl, 4-[3',5'-di-tbutylphenyl]indenyl)$_2$zirconium dimethyl; 9-silafluorendiyl(2-sec-butyl, 4-[3',5'-di-tbutylphenyl]indenyl)$_2$zirconium dimethyl; 9-silafluorendiyl(2-tert-butyl, 4-[3',5'-di-tbutylphenyl]indenyl)$_2$zirconium dimethyl; 9-silafluorendiyl(2-methyl, 4-[3',5'-di-tbutylphenyl]indenyl)$_2$hafnium dimethyl; 9-silafluorendiyl(2-ethyl, 4-[3',5'-di-tbutylphenyl]indenyl)$_2$hafnium dimethyl; 9-silafluorendiyl(2-n-propyl, 4-[3',5'-di-tbutylphenyl]indenyl)$_2$hafnium dimethyl; 9-silafluorendiyl(2-iso-propyl, 4-[3',5'-di-tbutylphenyl]indenyl)$_2$hafnium dimethyl; 9-silafluorendiyl(2-n-butyl, 4-[3',5'-di-tbutylphenyl]indenyl)$_2$hafnium dimethyl; 9-silafluorendiyl(2-iso-butyl, 4-[3',5'-di-tbutylphenyl]indenyl)$_2$hafnium dimethyl; 9-silafluorendiyl(2-sec-butyl, 4-[3',5'-di-tbutylphenyl]indenyl)$_2$hafnium dimethyl; 9-silafluorendiyl(2-tert-butyl, 4-[3',5'-di-tbutylphenyl]indenyl)$_2$hafnium dimethyl; dimethylsiladiyl(2-methyl, 4-[3',5'-bis-trifluoromethylphenyl]indenyl)$_2$zirconium dichloride; dimethylsiladiyl(2-ethyl, 4-[3',5'-bis-trifluoromethylphenyl]indenyl)$_2$zirconium dichloride; dimethylsiladiyl(2-n-propyl, 4-[3',5'-bis-trifluoromethylphenyl]indenyl)$_2$zirconium dichloride; dimethylsiladiyl(2-iso-propyl, 4-[3',5'-bis-trifluoromethylphenyl]indenyl)$_2$zirconium dichloride; dimethylsiladiyl(2-n-butyl, 4-[3',5'-bis-trifluoromethylphenyl]indenyl)$_2$zirconium dichloride; dimethylsiladiyl(2-iso-butyl, 4-[3',5'-bis-trifluoromethylphenyl]indenyl)$_2$zirconium dichloride; dimethylsiladiyl(2-sec-butyl, 4-[3',5'-bis-trifluoromethylphenyl]indenyl)$_2$zirconium dichloride; dimethylsiladiyl(2-tert-butyl, 4-[3',5'-bis-trifluoromethylphenyl]indenyl)$_2$zirconium dichloride; dimethylsiladiyl(2-methyl, 4-[3',5'-bis-trifluoromethylphenyl]indenyl)$_2$hafnium dichloride; dimethylsiladiyl(2-ethyl, 4-[3',5'-bis-trifluoromethylphenyl]indenyl)$_2$hafnium dichloride; dimethylsiladiyl(2-n-propyl, 4-[3',5'-bis-trifluoromethylphenyl]indenyl)$_2$hafnium dichloride; dimethylsiladiyl(2-iso-propyl, 4-[3',5'-bis-trifluoromethylphenyl]indenyl)$_2$hafnium dichloride; dimethylsiladiyl(2-n-butyl, 4-[3',5'-bis-trifluoromethylphenyl]indenyl)$_2$hafnium dichloride; dimethylsiladiyl(2-iso-butyl, 4-[3',5'-bis-trifluoromethylphenyl]indenyl)$_2$hafnium dichloride; dimethylsiladiyl(2-sec-butyl, 4-[3',5'-bis-trifluoromethylphenyl]indenyl)$_2$hafnium dichloride; dimethylsiladiyl(2-tert-butyl, 4-[3',5'-bis-trifluoromethylphenyl]indenyl)$_2$hafnium dichloride; 9-silafluorendiyl(2-methyl, 4-[3',5'-bis-trifluoromethylphenyl]indenyl)$_2$zirconium dichloride; dimethylsiladiyl(2-ethyl, 4-[3',5'-bis-trifluoromethylphenyl]indenyl)$_2$hafnium dichloride; 9-silafluorendiyl(2-n-propyl, 4-[3',5'-bis-trifluoromethylphenyl]indenyl)$_2$zirconium dichloride; 9-silafluorendiyl(2-iso-propyl, 4-[3',5'-bis-trifluoromethylphenyl]indenyl)$_2$zirconium dichloride; 9-silafluorendiyl(2-n-butyl, 4-[3',5'-bis-trifluoromethylphenyl]indenyl)$_2$zirconium dichloride; 9-silafluorendiyl(2-iso-butyl, 4-[3',5'-bis-trifluoromethylphenyl]indenyl)$_2$zirconium dichloride; 9-silafluorendiyl(2-sec-butyl, 4-[3',5'-bis-trifluoromethylphenyl]indenyl)$_2$ zirconium dichloride; 9-silafluorendiyl(2-tert-butyl, 4-[3',5'-bis-trifluoromethylphenyl]indenyl)₂zirconium dichloride; 9-silafluorendiyl(2-methyl, 4-[3',5'-bis-trifluoromethylphenyl]indenyl)₂hafnium dichloride; 9-silafluorendiyl(2-ethyl, 4-[3',5'-bis-trifluoromethylphenyl]indenyl)₂hafnium dichloride; 9-silafluorendiyl(2-n-propyl, 4-[3',5'-bis-trifluoromethylphenyl]indenyl)₂hafnium dichloride; 9-silafluorendiyl(2-iso-propyl, 4-[3',5'-bis-trifluoromethylphenyl]indenyl)₂hafnium dichloride; 9-silafluorendiyl(2-n-butyl, 4-[3',5'-bis-trifluoromethylphenyl]indenyl)₂ hafnium dichloride; 9-silafluorendiyl(2-iso-butyl, 4-[3',5'-bis-trifluoromethylphenyl]indenyl)₂hafnium dichloride; 9-silafluorendiyl(2-sec-butyl, 4-[3',5'-bis-trifluoromethylphenyl]indenyl)₂hafnium dichloride; 9-silafluorendiyl(2-tert-butyl, 4-[3',5'-bis-trifluoromethylphenyl]indenyl)₂ hafnium dichloride; dimethylsiladiyl(2-methyl, 4-[3',5'-bis-trifluoromethylphenyl]indenyl)₂zirconium dimethyl; dimethylsiladiyl(2-ethyl, 4-[3',5'-bis-trifluoromethylphenyl]indenyl)₂zirconium dimethyl; dimethylsiladiyl(2-n-propyl, 4-[3',5'-bis-trifluoromethylphenyl]indenyl)₂zirconium dimethyl; dimethylsiladiyl(2-iso-propyl, 4-[3',5'-bis-trifluoromethylphenyl]indenyl)₂zirconium dimethyl; dimethylsiladiyl(2-n-butyl, 4-[3',5'-bis-trifluoromethylphenyl]indenyl)₂ zirconium dimethyl; dimethylsiladiyl(2-iso-butyl, 4-[3',5'-bis-trifluoromethylphenyl]indenyl)₂zirconium dimethyl; dimethylsiladiyl(2-sec-butyl, 4-[3',5'-bis-trifluoromethylphenyl]indenyl)₂zirconium dimethyl; dimethylsiladiyl(2-tert-butyl, 4-[3',5'-bis-trifluoromethylphenyl]indenyl)₂zirconium dimethyl; dimethylsiladiyl(2-methyl, 4-[3',5'-bis-trifluoromethylphenyl]indenyl)₂hafnium dimethyl; dimethylsiladiyl(2-ethyl, 4-[3',5'-bis-trifluoromethylphenyl]indenyl)₂hafnium dimethyl; dimethylsiladiyl(2-n-propyl, 4-[3',5'-bis-trifluoromethylphenyl]indenyl)₂hafnium dimethyl; dimethylsiladiyl(2-iso-propyl, 4-[3',5'-bis-trifluoromethylphenyl]indenyl)₂hafnium dimethyl; dimethylsiladiyl(2-n-butyl, 4-[3',5'-bis-trifluoromethylphenyl]indenyl)₂ hafnium dimethyl; dimethylsiladiyl(2-iso-butyl, 4-[3',5'-bis-trifluoromethylphenyl]indenyl)₂hafnium dimethyl; dimethylsiladiyl(2-sec-butyl, 4-[3',5'-bis-trifluoromethylphenyl]indenyl)₂hafnium dimethyl; dimethylsiladiyl(2-tert-butyl, 4-[3',5'-bis-trifluoromethylphenyl]indenyl)₂hafnium dimethyl; 9-silafluorendiyl(2-methyl, 4-[3',5'-bis-trifluoromethylphenyl]indenyl)₂zirconium dimethyl; dimethylsiladiyl(2-ethyl, 4-[3',5'-bis-trifluoromethylphenyl]indenyl)₂hafnium dimethyl; 9-silafluorendiyl(2-n-propyl, 4-[3',5'-bis-trifluoromethylphenyl]indenyl)₂zirconium dimethyl; 9-silafluorendiyl(2-iso-propyl, 4-[3',5'-bis-trifluoromethylphenyl]indenyl)₂zirconium dimethyl; 9-silafluorendiyl(2-n-butyl, 4-[3',5'-bis-trifluoromethylphenyl]indenyl)₂zirconium dimethyl; 9-silafluorendiyl(2-iso-butyl, 4-[3',5'-bis-trifluoromethylphenyl]indenyl)₂zirconium dimethyl; 9-silafluorendiyl(2-sec-butyl, 4-[3',5'-bis-trifluoromethylphenyl]indenyl)₂ zirconium dimethyl; 9-silafluorendiyl(2-tert-butyl, 4-[3',5'-bis-trifluoromethylphenyl]indenyl)₂zirconium dimethyl; 9-silafluorendiyl(2-methyl, 4-[3',5'-bis-trifluoromethylphenyl]indenyl)₂hafnium dimethyl; 9-silafluorendiyl(2-ethyl, 4-[3',5'-bis-trifluoromethylphenyl]indenyl)₂hafnium dimethyl; 9-silafluorendiyl(2-n-propyl, 4-[3',5'-bis-trifluoromethylphenyl]indenyl)₂hafnium dimethyl; 9-silafluorendiyl(2-iso-propyl, 4-[3',5'-bis-trifluoromethylphenyl]indenyl)₂ hafnium dimethyl; 9-silafluorendiyl(2-n-butyl, 4-[3',5'-bis-trifluoromethylphenyl]indenyl)₂hafnium dimethyl; 9-silafluorendiyl(2-iso-butyl, 4-[3',5'-bis-trifluoromethylphenyl]indenyl)₂hafnium dimethyl; 9-silafluorendiyl(2-sec-butyl, 4-[3',5'-bis-trifluoromethylphenyl]indenyl)₂hafnium dimethyl; 9-silafluorendiyl(2-tert-butyl, 4-[3',5'-bis-trifluoromethylphenyl]indenyl)₂hafnium dimethyl; dimethylsiladiyl(2-ethyl, 4-[3',5'-di-iso-propylphenyl]indenyl)₂zirconium dichloride; dimethylsiladiyl(2-n-propyl, 4-[3',5'-di-iso-propylphenyl]indenyl)₂zirconium dichloride dimethylsiladiyl(2-iso-propyl, 4-[3',5'-di-iso-propylphenyl]indenyl)₂zirconium dichloride; dimethylsiladiyl(2-n-butyl, 4-[3',5'-di-iso-propylphenyl]indenyl)₂zirconium dichloride; dimethylsiladiyl(2-iso-butyl, 4-[3',5'-di-iso-propylphenyl]indenyl)₂zirconium dichloride; dimethylsiladiyl(2-sec-butyl, 4-[3',5'-di-iso-propylphenyl]indenyl)₂zirconium dichloride; dimethylsiladiyl(2-tert-butyl, 4-[3',5'-di-iso-propylphenyl]indenyl)₂zirconium dichloride; dimethylsiladiyl(2-ethyl, 4-[3',5'-di-iso-propylphenyl]indenyl)₂hafnium dichloride; dimethylsiladiyl(2-n-propyl, 4-[3',5'-di-iso-propylphenyl]indenyl)₂hafnium dichloride; dimethylsiladiyl(2-iso-propyl, 4-[3',5'-di-iso-propylphenyl]indenyl)₂hafnium dichloride; dimethylsiladiyl(2-n-butyl, 4-[3',5'-di-iso-propylphenyl]indenyl)₂hafnium dichloride; dimethylsiladiyl(2-iso-butyl, 4-[3',5'-di-iso-propylphenyl]indenyl)₂hafnium dichloride; dimethylsiladiyl(2-sec-butyl, 4-[3',5'-di-iso-propylphenyl]indenyl)₂hafnium dichloride; dimethylsiladiyl(2-tert-butyl, 4-[3',5'-di-iso-propylphenyl]indenyl)₂hafnium dichloride; 9-silafluorendiyl(2-ethyl, 4-[3',5'-di-iso-propylphenyl]indenyl)₂zirconium dichloride; 9-silafluorendiyl(2-n-propyl, 4-[3',5'-di-iso-propylphenyl]indenyl)₂zirconium dichloride; 9-silafluorendiyl(2-iso-propyl, 4-[3',5'-di-iso-propylphenyl]indenyl)₂zirconium dichloride; 9-silafluorendiyl(2-n-butyl, 4-[3',5'-di-iso-propylphenyl]indenyl)₂zirconium dichloride; 9-silafluorendiyl(2-iso-butyl, 4-[3',5'-di-iso-propylphenyl]indenyl)₂zirconium dichloride; 9-silafluorendiyl(2-sec-butyl, 4-[3',5'-di-iso-propylphenyl]indenyl)₂zirconium dichloride; 9-silafluorendiyl(2-tert-butyl, 4-[3',5'-di-iso-propylphenyl]indenyl)₂zirconium dichloride; 9-silafluorendiyl(2-ethyl, 4-[3',5'-di-iso-propylphenyl]indenyl)₂hafnium dichloride; 9-silafluorendiyl(2-n-propyl, 4-[3',5'-di-iso-propylphenyl]indenyl)₂hafnium dichloride; 9-silafluorendiyl(2-iso-propyl, 4-[3',5'-di-iso-propylphenyl]indenyl)₂hafnium dichloride; 9-silafluorendiyl(2-n-butyl, 4-[3',5'-di-iso-propylphenyl]indenyl)₂hafnium dichloride; 9-silafluorendiyl(2-iso-butyl, 4-[3',5'-di-iso-propylphenyl]indenyl)₂hafnium dichloride; 9-silafluorendiyl(2-sec-butyl, 4-[3',5'-di-iso-propylphenyl]indenyl)₂hafnium dichloride; 9-silafluorendiyl(2-tert-butyl, 4-[3',5'-di-iso-propylphenyl]indenyl)₂hafnium dichloride; dimethylsiladiyl(2-ethyl, 4-[3',5'-di-iso-propylphenyl]indenyl)₂zirconium dimethyl; dimethylsiladiyl(2-n-propyl, 4-[3',5'-di-iso-propylphenyl]indenyl)₂zirconium dimethyl dimethylsiladiyl(2-iso-propyl, 4-[3',5'-di-iso-propylphenyl]indenyl)₂zirconium dimethyl; dimethylsiladiyl(2-n-butyl, 4-[3',5'-di-iso-propylphenyl]indenyl)₂zirconium dimethyl; dimethylsiladiyl(2-isobutyl, 4-[3',5'-di-iso-propylphenyl]indenyl)₂zirconium dimethyl; dimethylsiladiyl(2-sec-butyl, 4-[3',5'-di-iso-propylphenyl]indenyl)₂zirconium dimethyl; dimethylsiladiyl(2-tert-butyl, 4-[3',5'-di-iso-propylphenyl]indenyl)₂zirconium dimethyl; dimethylsiladiyl(2-ethyl, 4-[3',5'-di-iso-propylphenyl]indenyl)₂hafnium dimethyl; dimethylsiladiyl(2-n-propyl, 4-[3',5'-di-iso-propylphenyl]indenyl)₂hafnium dimethyl; dimethylsiladiyl(2-iso-propyl, 4-[3',5'-di-iso-propylphenyl]indenyl)₂hafnium dimethyl; dimethylsiladiyl(2-n-butyl, 4-[3',5'-di-iso-propylphenyl]indenyl)₂hafnium dimethyl; dimethylsiladiyl(2-iso-butyl, 4-[3',5'-di-iso-propylphenyl]indenyl)₂zirconium dimethyl; dimethylsiladiyl(2-sec-butyl, 4-[3',5'-di-iso-propylphenyl]indenyl)₂zirconium dimethyl; dimethylsiladiyl(2-tert-butyl, 4-[3',5'-di-iso-propylphenyl]indenyl)₂zirconium dimethyl; 9-silafluorendiyl(2-ethyl, 4-[3',5'-di-iso-propylphenyl]indenyl)₂zirconium dimethyl; 9-silafluorendiyl(2-n-propyl, 4-[3',5'-di-iso-propylphenyl]

indenyl)₂zirconium dimethyl; 9-silafluorendiyl(2-iso-propyl, 4-[3',5'-di-iso-propylphenyl]indenyl)₂zirconium dimethyl; 9-silafluorendiyl(2-n-butyl, 4-[3',5'-di-iso-propylphenyl]indenyl)₂zirconium dimethyl; 9-silafluorendiyl(2-iso-butyl, 4-[3',5'-di-iso-propylphenyl]indenyl)₂zirconium dimethyl; 9-silafluorendiyl(2-sec-butyl, 4-[3',5'-di-iso-propylphenyl]indenyl)₂zirconium dimethyl; 9-silafluorendiyl(2-tert-butyl, 4-[3',5'-di-iso-propylphenyl]indenyl)₂zirconium dimethyl; 9-silafluorendiyl(2-ethyl, 4-[3',5'-di-iso-propylphenyl]indenyl)₂hafnium dimethyl; 9-silafluorendiyl(2-n-propyl, 4-[3',5'-di-iso-propylphenyl]indenyl)₂hafnium dimethyl; 9-silafluorendiyl(2-iso-propyl, 4-[3',5'-di-iso-propylphenyl]indenyl)₂hafnium dimethyl; 9-silafluorendiyl(2-n-butyl, 4-[3',5'-di-iso-propylphenyl]indenyl)₂hafnium dimethyl; 9-silafluorendiyl(2-iso-butyl, 4-[3',5'-di-iso-propylphenyl]indenyl)₂hafnium dimethyl; 9-silafluorendiyl(2-sec-butyl, 4-[3',5'-di-iso-propylphenyl]indenyl)₂hafnium dimethyl; 9-silafluorendiyl(2-tert-butyl, 4-[3',5'-di-iso-propylphenyl]indenyl)₂hafnium dimethyl; dimethylsiladiyl(2-methyl, 4-[3',5'-di-phenylphenyl]indenyl)₂zirconium dichloride; dimethylsiladiyl(2-ethyl, 4-[3',5'-di-phenylphenyl]indenyl)₂zirconium dichloride; dimethylsiladiyl(2-n-propyl, 4-[3',5'-di-phenylphenyl]indenyl)₂zirconium dichloride; dimethylsiladiyl(2-iso-propyl, 4-[3',5'-di-phenylphenyl]indenyl)₂zirconium dichloride; dimethylsiladiyl(2-n-butyl, 4-[3',5'-di-phenylphenyl]indenyl)₂zirconium dichloride; dimethylsiladiyl(2-iso-butyl, 4-[3',5'-di-phenylphenyl]indenyl)₂zirconium dichloride; dimethylsiladiyl(2-sec-butyl, 4-[3',5'-di-phenylphenyl]indenyl)₂zirconium dichloride; dimethylsiladiyl(2-tert-butyl, 4-[3',5'-di-phenylphenyl]indenyl)₂zirconium dichloride; dimethylsiladiyl(2-methyl, 4-[3',5'-di-phenylphenyl]indenyl)₂hafnium dichloride; dimethylsiladiyl(2-ethyl, 4-[3',5'-di-phenylphenyl]indenyl)₂hafnium dichloride; dimethylsiladiyl(2-n-propyl, 4-[3',5'-di-phenylphenyl]indenyl)₂hafnium dichloride; dimethylsiladiyl(2-iso-propyl, 4-[3',5'-di-phenylphenyl]indenyl)₂hafnium dichloride; dimethylsiladiyl(2-n-butyl, 4-[3',5'-di-phenylphenyl]indenyl)₂hafnium dichloride; dimethylsiladiyl(2-iso-butyl, 4-[3',5'-di-phenylphenyl]indenyl)₂hafnium dichloride; dimethylsiladiyl(2-sec-butyl, 4-[3',5'-di-phenylphenyl]indenyl)₂hafnium dichloride; dimethylsiladiyl(2-tert-butyl, 4-[3',5'-di-phenylphenyl]indenyl)₂hafnium dichloride; 9-silafluorendiyl(2-methyl, 4-[3',5'-di-phenylphenyl]indenyl)₂zirconium dichloride; 9-silafluorendiyl(2-ethyl, 4-[3',5'-di-phenylphenyl]indenyl)₂zirconium dichloride; 9-silafluorendiyl(2-n-propyl, 4-[3',5'-di-phenylphenyl]indenyl)₂zirconium dichloride; 9-silafluorendiyl(2-iso-propyl, 4-[3',5'-di-phenylphenyl]indenyl)₂zirconium dichloride; 9-silafluorendiyl(2-n-butyl, 4-[3',5'-di-phenylphenyl]indenyl)₂zirconium dichloride; 9-silafluorendiyl(2-iso-butyl, 4-[3',5'-di-phenylphenyl]indenyl)₂zirconium dichloride; 9-silafluorendiyl(2-sec-butyl, 4-[3',5'-di-phenylphenyl]indenyl)₂zirconium dichloride; 9-silafluorendiyl(2-tert-butyl, 4-[3',5'-di-phenylphenyl]indenyl)₂zirconium dichloride; 9-silafluorendiyl(2-methyl, 4-[3',5'-di-phenylphenyl]indenyl)₂hafnium dichloride; 9-silafluorendiyl(2-ethyl, 4-[3',5'-di-phenylphenyl]indenyl)₂hafnium dichloride; 9-silafluorendiyl(2-n-propyl, 4-[3',5'-di-phenylphenyl]indenyl)₂hafnium dichloride; 9-silafluorendiyl(2-iso-propyl, 4-[3',5'-di-phenylphenyl]indenyl)₂hafnium dichloride; 9-silafluorendiyl(2-n-butyl, 4-[3',5'-di-phenylphenyl]indenyl)₂hafnium dichloride; 9-silafluorendiyl(2-iso-butyl, 4-[3',5'-di-phenylphenyl]indenyl)₂hafnium dichloride; 9-silafluorendiyl(2-sec-butyl, 4-[3',5'-di-phenylphenyl]indenyl)₂hafnium dichloride; 9-silafluorendiyl(2-tert-butyl, 4-[3',5'-di-phenylphenyl]indenyl)₂hafnium dichloride; dimethylsiladiyl(2-methyl, 4-[3',5'-di-phenylphenyl]indenyl)₂zirconium dimethyl; dimethylsiladiyl(2-ethyl, 4-[3',5'-di-phenylphenyl]indenyl)₂zirconium dimethyl; dimethylsiladiyl(2-n-propyl, 4-[3',5'-di-phenylphenyl]indenyl)₂zirconium dimethyl; dimethylsiladiyl(2-iso-propyl, 4-[3',5'-di-phenylphenyl]indenyl)₂zirconium dimethyl; dimethylsiladiyl(2-n-butyl, 4-[3',5'-di-phenylphenyl]indenyl)₂zirconium dimethyl; dimethylsiladiyl(2-iso-butyl, 4-[3',5'-di-phenylphenyl]indenyl)₂zirconium dimethyl; dimethylsiladiyl(2-sec-butyl, 4-[3',5'-di-phenylphenyl]indenyl)₂zirconium dimethyl; dimethylsiladiyl(2-tert-butyl, 4-[3',5'-di-phenylphenyl]indenyl)₂zirconium dimethyl; dimethylsiladiyl(2-methyl, 4-[3',5'-di-phenylphenyl]indenyl)₂hafnium dimethyl; dimethylsiladiyl(2-ethyl, 4-[3',5'-di-phenylphenyl]indenyl)₂hafnium dimethyl; dimethylsiladiyl(2-n-propyl, 4-[3',5'-di-phenylphenyl]indenyl)₂hafnium dimethyl; dimethylsiladiyl(2-iso-propyl, 4-[3',5'-di-phenylphenyl]indenyl)₂hafnium dimethyl; dimethylsiladiyl(2-n-butyl, 4-[3',5'-di-phenylphenyl]indenyl)₂hafnium dimethyl; dimethylsiladiyl(2-iso-butyl, 4-[3',5'-di-phenylphenyl]indenyl)₂hafnium dimethyl; dimethylsiladiyl(2-sec-butyl, 4-[3',5'-di-phenylphenyl]indenyl)₂hafnium dimethyl; dimethylsiladiyl(2-tert-butyl, 4-[3',5'-di-phenylphenyl]indenyl)₂hafnium dimethyl; 9-silafluorendiyl(2-methyl, 4-[3',5'-di-phenylphenyl]indenyl)₂zirconium dimethyl; 9-silafluorendiyl(2-ethyl, 4-[3',5'-di-phenylphenyl]indenyl)₂zirconium dimethyl; 9-silafluorendiyl(2-n-propyl, 4-[3',5'-di-phenylphenyl]indenyl)₂zirconium dimethyl; 9-silafluorendiyl(2-iso-propyl, 4-[3',5'-di-phenylphenyl]indenyl)₂zirconium dimethyl; 9-silafluorendiyl(2-n-butyl, 4-[3',5'-di-phenylphenyl]indenyl)₂zirconium dimethyl; 9-silafluorendiyl(2-iso-butyl, 4-[3',5'-di-phenylphenyl]indenyl)₂zirconium dimethyl; 9-silafluorendiyl(2-sec-butyl, 4-[3',5'-di-phenylphenyl]indenyl)₂zirconium dimethyl; 9-silafluorendiyl(2-tert-butyl, 4-[3',5'-di-phenylphenyl]indenyl)₂zirconium dimethyl; 9-silafluorendiyl(2-methyl, 4-[3',5'-di-phenylphenyl]indenyl)₂hafnium dimethyl; 9-silafluorendiyl(2-ethyl, 4-[3',5'-di-phenylphenyl]indenyl)₂hafnium dichloride; 9-silafluorendiyl(2-n-propyl, 4-[3',5'-di-phenylphenyl]indenyl)₂hafnium dimethyl; 9-silafluorendiyl(2-iso-propyl, 4-[3',5'-di-phenylphenyl]indenyl)₂hafnium dimethyl; 9-silafluorendiyl(2-n-butyl, 4-[3',5'-di-phenylphenyl]indenyl)₂hafnium dimethyl; 9-silafluorendiyl(2-iso-butyl, 4-[3',5'-di-phenylphenyl]indenyl)₂hafnium dimethyl; 9-silafluorendiyl(2-sec-butyl, 4-[3',5'-di-phenylphenyl]indenyl)₂hafnium dimethyl; 9-silafluorendiyl(2-tert-butyl, 4-[3',5'-di-phenylphenyl]indenyl)₂hafnium dimethyl; dimethylsiladiyl(2-methyl, 4-[3',5'-di-tbutylphenyl]indenyl)₂η⁴-1,4-diphenyl-1,3-butadiene; dimethylsiladiyl(2-ethyl, 4-[3',5'-di-tbutylphenyl]indenyl)₂η⁴-1,4-diphenyl-1,3-butadiene; dimethylsiladiyl(2-n-propyl, 4-[3',5'-di-tbutylphenyl]indenyl)₂η⁴-1,4-diphenyl-1,3-butadiene; dimethylsiladiyl(2-iso-propyl, 4-[3',5'-di-tbutylphenyl]indenyl)₂η⁴-1,4-diphenyl-1,3-butadiene; dimethylsiladiyl(2-n-butyl, 4-[3',5'-di-tbutylphenyl]indenyl)₂η⁴-1,4-diphenyl-1,3-butadiene; dimethylsiladiyl(2-iso-butyl, 4-[3',5'-di-tbutylphenyl]indenyl)₂η⁴-1,4-diphenyl-1,3-butadiene; dimethylsiladiyl(2-sec-butyl, 4-[3',5'-di-tbutylphenyl]indenyl)₂η⁴-1,4-diphenyl-1,3-butadiene; dimethylsiladiyl(2-tert-butyl, 4-[3',5'-di-tbutylphenyl]indenyl)₂η⁴-1,4-diphenyl-1,3-butadiene; dimethylsiladiyl(2-ethyl, 4-[3',5'-bis-trifluoromethylphenyl]indenyl)₂η⁴-1,4-diphenyl-1,3-butadiene; dimethylsiladiyl(2-n-propyl, 4-[3',5'-bis-trifluoromethylphenyl]indenyl)₂η⁴-1,4-diphenyl-1,3-butadiene; dimethylsiladiyl(2-iso-propyl, 4-[3',5'-bis-trifluoromethylphenyl]indenyl)₂η⁴-1,4-diphenyl-1,3-butadiene; dimethylsiladiyl(2-n-butyl, 4-[3',5'-bis-trifluoromethylphenyl]indenyl)₂η⁴-1,4-diphenyl-1,3-butadiene; dimethylsiladiyl(2-iso-butyl, 4-[3',5'-bis-trifluoromethylphenyl]indenyl)$_2\eta^4$-1,4-diphenyl-1,3-butadiene; dimethylsiladiyl(2-sec-butyl, 4-[3',5'-bis-trifluoromethylphenyl]indenyl)$_2\eta^4$-1,4-diphenyl-1,3-butadiene; dimethylsiladiyl(2-tert-butyl, 4-[3',5'-bis-trifluoromethylphenyl]indenyl)$_2\eta^4$-1,4-diphenyl-1,3-butadiene; dimethylsiladiyl(2-ethyl, 4-[3',5'-di-iso-propylphenyl]indenyl)$_2\eta^4$-1,4-diphenyl-1,3-butadiene; dimethylsiladiyl(2-n-propyl, 4-[3',5'-di-iso-propylphenyl]indenyl)$_2\eta^4$-1,4-diphenyl-1,3-butadiene; dimethylsiladiyl(2-iso-propyl, 4-[3',5'-di-iso-propylphenyl]indenyl)$_2\eta^4$-1,4-diphenyl-1,3-butadiene; dimethylsiladiyl(2-n-butyl, 4-[3',5'-di-iso-propylphenyl]indenyl)$_2\eta^4$-1,4-diphenyl-1,3-butadiene; dimethylsiladiyl(2-iso-butyl, 4-[3',5'-di-iso-propylphenyl]indenyl)$_2\eta^4$-1,4-diphenyl-1,3-butadiene; dimethylsiladiyl(2-sec-butyl, 4-[3',5'-di-iso-propylphenyl]indenyl)$_2\eta^4$-1,4-diphenyl-1,3-butadiene; dimethylsiladiyl(2-tert-butyl, 4-[3',5'-di-iso-propylphenyl]indenyl)$_2\eta^4$-1,4-diphenyl-1,3-butadiene; dimethylsiladiyl(2-methyl, 4-[3',5'-di-phenylphenyl]indenyl)$_2\eta^4$-1,4-diphenyl-1,3-butadiene; dimethylsiladiyl(2-ethyl, 4-[3',5'-di-phenylphenyl]indenyl)$_2\eta^4$-1,4-diphenyl-1,3-butadiene; dimethylsiladiyl(2-n-propyl, 4-[3',5'-di-phenylphenyl]indenyl)$_2\eta^4$-1,4-diphenyl-1,3-butadiene; dimethylsiladiyl(2-iso-propyl, 4-[3',5'-di-phenylphenyl]indenyl)$_2\eta^4$-1,4-diphenyl-1,3-butadiene; dimethylsiladiyl(2-n-butyl, 4-[3',5'-di-phenylphenyl]indenyl)$_2\eta^4$-1,4-diphenyl-1,3-butadiene; dimethylsiladiyl(2-iso-butyl, 4-[3',5'-di-phenylphenyl]indenyl)$_2\eta^4$-1,4-diphenyl-1,3-butadiene; dimethylsiladiyl(2-sec-butyl, 4-[3',5'-di-phenylphenyl]indenyl)$_2\eta^4$-1,4-diphenyl-1,3-butadiene; dimethylsiladiyl(2-tert-butyl, 4-[3',5'-di-phenylphenyl]indenyl)$_2\eta^4$-1,4-diphenyl-1,3-butadiene; 9-silafluorendiyl(2-methyl, 4-[3',5'-di-tbutylphenyl]indenyl)$_2\eta^4$-1,4-diphenyl-1,3-butadiene; 9-silafluorendiyl(2-ethyl, 4-[3',5'-di-tbutylphenyl]indenyl)$_2\eta^4$-1,4-diphenyl-1,3-butadiene; 9-silafluorendiyl(2-n-propyl, 4-[3',5'-di-tbutylphenyl]indenyl)$_2\eta^4$-1,4-diphenyl-1,3-butadiene; 9-silafluorendiyl(2-iso-propyl, 4-[3',5'-di-tbutylphenyl]indenyl)$_2\eta^4$-1,4-diphenyl-1,3-butadiene; 9-silafluorendiyl(2-n-butyl, 4-[3',5'-di-tbutylphenyl]indenyl)$_2\eta^4$-1,4-diphenyl-1,3-butadiene; 9-silafluorendiyl(2-iso-butyl, 4-[3',5'-di-tbutylphenyl]indenyl)$_2\eta^4$-1,4-diphenyl-1,3-butadiene; 9-silafluorendiyl(2-sec-butyl, 4-[3',5'-di-tbutylphenyl]indenyl)$_2\eta^4$-1,4-diphenyl-1,3-butadiene; 9-silafluorendiyl(2-tert-butyl, 4-[3',5'-di-tbutylphenyl]indenyl)$_2\eta^4$-1,4-diphenyl-1,3-butadiene; 9-silafluorendiyl(2-ethyl, 4-[3',5'-bis-trifluoromethylphenyl]indenyl)$_2\eta^4$-1,4-diphenyl-1,3-butadiene; 9-silafluorendiyl(2-n-propyl, 4-[3',5'-bis-trifluoromethylphenyl]indenyl)$_2\eta^4$-1,4-diphenyl-1,3-butadiene; 9-silafluorendiyl(2-iso-propyl, 4-[3',5'-bis-trifluoromethylphenyl]indenyl)$_2\eta^4$-1,4-diphenyl-1,3-butadiene; 9-silafluorendiyl(2-n-butyl, 4-[3',5'-bis-trifluoromethylphenyl]indenyl)$_2\eta^4$-1,4-diphenyl-1,3-butadiene; 9-silafluorendiyl(2-iso-butyl, 4-[3',5'-bis-trifluoromethylphenyl]indenyl)$_2\eta^4$-1,4-diphenyl-1,3-butadiene; 9-silafluorendiyl(2-sec-butyl, 4-[3',5'-bis-trifluoromethylphenyl]indenyl)$_2\eta^4$-1,4-diphenyl-1,3-butadiene; 9-silafluorendiyl(2-tert-butyl, 4-[3',5'-bis-trifluoromethylphenyl]indenyl)$_2\eta^4$-1,4-diphenyl-1,3-butadiene; 9-silafluorendiyl(2-ethyl, 4-[3',5'-di-iso-propylphenyl]indenyl)$_2\eta^4$-1,4-diphenyl-1,3-butadiene; 9-silafluorendiyl(2-n-propyl, 4-[3',5'-di-iso-propylphenyl]indenyl)$_2\eta^4$-1,4-diphenyl-1,3-butadiene; 9-silafluorendiyl(2-iso-propyl, 4-[3',5'-di-iso-propylphenyl]indenyl) 4$\eta^4$-1,4-diphenyl-1,3-butadiene; 9-silafluorendiyl(2-n-butyl, 4-[3',5'-di-iso-propylphenyl]indenyl)$_2\eta^4$-1,4-diphenyl-1,3-butadiene; 9-silafluorendiyl(2-iso-butyl, 4-[3',5'-di-iso-propylphenyl]indenyl)$_2\eta^4$-1,4-diphenyl-1,3-butadiene; 9-silafluorendiyl(2-sec-butyl, 4-[3',5'-di-iso-propylphenyl]indenyl)$_2\eta^4$-1,4-diphenyl-1,3-butadiene; 9-silafluorendiyl(2-tert-butyl, 4-[3',5'-di-iso-propylphenyl]indenyl)$_2\eta^4$-1,4-diphenyl-1,3-butadiene; 9-silafluorendiyl(2-methyl, 4-[3',5'-di-phenylphenyl]indenyl)$_2\eta^4$-1,4-diphenyl-1,3-butadiene; 9-silafluorendiyl(2-ethyl, 4-[3',5'-di-phenylphenyl]indenyl)$_2\eta^4$-1,4-diphenyl-1,3-butadiene; 9-silafluorendiyl(2-n-propyl, 4-[3',5'-di-phenylphenyl]indenyl)$_2\eta^4$-1,4-diphenyl-1,3-butadiene; 9-silafluorendiyl(2-iso-propyl, 4-[3',5'-di-phenylphenyl]indenyl)$_2\eta^4$-1,4-diphenyl-1,3-butadiene; 9-silafluorendiyl(2-n-butyl, 4-[3',5'-di-phenylphenyl]indenyl)$_2\eta^4$-1,4-diphenyl-1,3-butadiene; 9-silafluorendiyl(2-iso-butyl, 4-[3',5'-di-phenylphenyl]indenyl)$_2\eta^4$-1,4-diphenyl-1,3-butadiene; 9-silafluorendiyl(2-sec-butyl, 4-[3',5'-di-phenylphenyl]indenyl)$_2\eta^4$-1,4-diphenyl-1,3-butadiene; 9-silafluorendiyl(2-tert-butyl, 4-[3',5'-di-phenylphenyl]indenyl)$_2\eta^4$-1,4-diphenyl-1,3-butadiene; dimethylamidoborane(2-methyl, 4-[3',5'-di-tbutylphenyl]indenyl)$_2$zirconium dichloride; dimethylamidoborane(2-ethyl, 4-[3',5'-di-tbutylphenyl]indenyl)$_2$zirconium dichloride; dimethylamidoborane(2-n-propyl, 4-[3',5'-di-tbutylphenyl]indenyl)$_2$zirconium dichloride; dimethylamidoborane(2-iso-propyl, 4-[3',5'-di-tbutylphenyl]indenyl)$_2$zirconium dichloride; dimethylamidoborane(2-n-butyl, 4-[3',5'-di-tbutylphenyl]indenyl)$_2$zirconium dichloride; dimethylamidoborane(2-iso-butyl, 4-[3',5'-di-tbutylphenyl]indenyl)$_2$zirconium dichloride; dimethylamidoborane(2-sec-butyl, 4-[3',5'-di-tbutylphenyl]indenyl)$_2$zirconium dichloride; dimethylamidoborane(2-tert-butyl, 4-[3',5'-di-tbutylphenyl]indenyl)$_2$zirconium dichloride; dimethylamidoborane(2-ethyl, 4-[3',5'-bis-trifluoromethylphenyl]indenyl)$_2$zirconium dichloride; dimethylamidoborane(2-n-propyl, 4-[3',5'-bis-trifluoromethylphenyl]indenyl)$_2$zirconium dichloride; dimethylamidoborane(2-iso-propyl, 4-[3',5'-bis-trifluoromethylphenyl]indenyl)$_2$zirconium dichloride; dimethylamidoborane(2-n-butyl, 4-[3',5'-bis-trifluoromethylphenyl]indenyl)$_2$zirconium dichloride; dimethylamidoborane(2-iso-butyl, 4-[3',5'-bis-trifluoromethylphenyl]indenyl)$_2$zirconium dichloride; dimethylamidoborane(2-sec-butyl, 4-[3',5'-bis-trifluoromethylphenyl]indenyl)$_2$zirconium dichloride; dimethylamidoborane(2-tert-butyl, 4-[3',5'-bis-trifluoromethylphenyl]indenyl)$_2$zirconium dichloride; dimethylamidoborane(2-ethyl, 4-[3',5'-di-iso-propylphenyl]indenyl)$_2$zirconium dichloride; dimethylamidoborane(2-n-propyl, 4-[3',5'-di-iso-propylphenyl]indenyl)$_2$zirconium dichloride dimethylamidoborane(2-iso-propyl, 4-[3',5'-di-iso-propylphenyl]indenyl)$_2$zirconium dichloride; dimethylamidoborane(2-n-butyl, 4-[3',5'-di-iso-propylphenyl]indenyl)$_2$zirconium dichloride; dimethylamidoborane(2-iso-butyl, 4-[3',5'-di-iso-propylphenyl]indenyl)$_2$zirconium dichloride; dimethylamidoborane(2-sec-butyl, 4-[3',5'-di-iso-propylphenyl]indenyl)$_2$zirconium dichloride; dimethylamidoborane(2-tert-butyl, 4-[3',5'-di-iso-propylphenyl]indenyl)$_2$zirconium dichloride; dimethylamidoborane(2-methyl, 4-[3',5'-di-phenylphenyl]indenyl)$_2$zirconium dichloride; dimethylamidoborane(2-ethyl, 4-[3',5'-di-phenylphenyl]indenyl)$_2$zirconium dichloride; dimethylamidoborane(2-n-propyl, 4-[3',5'-di-phenylphenyl]indenyl)$_2$zirconium dichloride; dimethylamidoborane(2-iso-propyl, 4-[3',5'-di-phenylphenyl]indenyl)$_2$zirconium dichloride; dimethylamidoborane(2-n-butyl, 4-[3',5'-di-phenylphenyl]indenyl)$_2$zirconium dichloride; dimethylamidoborane(2-iso-butyl, 4-[3',5'-di-phenylphenyl]indenyl)$_2$zirconium dichloride; dimethylamidoborane(2-sec-butyl, 4-[3',5'-di-phenylphenyl]indenyl)$_2$zirconium dichloride; dimethylamidoborane(2-tert-butyl, 4-[3',5'-di-phenylphenyl]indenyl)$_2$zirconium dichloride; dimethylamidoborane (2-methyl, 4-[3',5'-di-tbutylphenyl]indenyl)$_2$$\eta^4$-1,4-diphenyl-1,3-butadiene; dimethylamidoborane(2-ethyl, 4-[3',5'-di-tbutylphenyl]indenyl)$_2$$\eta^4$-1,4-diphenyl-1,3-butadiene; dimethylamidoborane(2-n-propyl, 4-[3',5'-di-tbutylphenyl]indenyl)$_2$$\eta^4$-1,4-diphenyl-1,3-butadiene; dimethylamidoborane(2-iso-propyl, 4-[3',5'-di-tbutylphenyl]indenyl)$_2$$\eta^4$-1,4-diphenyl-1,3-butadiene; dimethylamidoborane(2-n-butyl, 4-[3',5'-di-tbutylphenyl]indenyl)$_2$$\eta^4$-1,4-diphenyl-1,3-butadiene; dimethylamidoborane(2-iso-butyl, 4-[3',5'-di-tbutylphenyl]indenyl)$_2$$\eta^4$-1,4-diphenyl-1,3-butadiene; dimethylamidoborane(2-sec-butyl, 4-[3',5'-di-tbutylphenyl]indenyl)$_2$$\eta^4$-1,4-diphenyl-1,3-butadiene; dimethylamidoborane(2-tert-butyl, 4-[3',5'-di-tbutylphenyl]indenyl)$_2$$\eta^4$-1,4-diphenyl-1,3-butadiene; dimethylamidoborane(2-ethyl, 4-[3',5'-bis-trifluoromethylphenyl]indenyl)$_2$ $\eta^4$-1,4-diphenyl-1,3-butadiene; dimethylamidoborane(2-n-propyl, 4-[3',5'-bis-trifluoromethylphenyl]indenyl)$_2$$\eta^4$-1,4-diphenyl-1,3-butadiene; dimethylamidoborane(2-iso-propyl, 4-[3',5'-bis-trifluoromethylphenyl]indenyl)$_2$$\eta^4$-1,4-diphenyl-1,3-butadiene; dimethylamidoborane(2-n-butyl, 4-[3',5'-bis-trifluoromethylphenyl]indenyl)$_2$$\eta^4$-1,4-diphenyl-1,3-butadiene; dimethylamidoborane(2-iso-butyl, 4-[3',5'-bis-trifluoromethylphenyl]indenyl)$_2$$\eta^4$-1,4-diphenyl-1,3-butadiene; dimethylamidoborane(2-sec-butyl, 4-[3',5'-bis-trifluoromethylphenyl]indenyl)$_2$$\eta^4$-1,4-diphenyl-1,3-butadiene; dimethylamidoborane(2-tert-butyl, 4-[3',5'-bis-trifluoromethylphenyl]indenyl)$_2$$\eta^4$-1,4-diphenyl-1,3-butadiene; dimethylamidoborane(2-ethyl, 4-[3',5'-di-iso-propylphenyl]indenyl)$_2$$\eta^4$-1,4-diphenyl-1,3-butadiene; dimethylamidoborane(2-n-propyl, 4-[3',5'-di-iso-propylphenyl]indenyl)$_2$$\eta^4$-1,4-diphenyl-1,3-butadiene; dimethylamidoborane(2-iso-propyl, 4-[3',5'-di-iso-propylphenyl]indenyl) 41,4-diphenyl-1,3-butadiene; dimethylamidoborane(2-n-butyl, 4-[3',5'-di-iso-propylphenyl]indenyl)$_2$$\eta^4$-1,4-diphenyl-1,3-butadiene; dimethylamidoborane(2-iso-butyl, 4-[3',5'-di-iso-propylphenyl]indenyl)$_2$$\eta^4$-1,4-diphenyl-1,3-butadiene; dimethylamidoborane(2-sec-butyl, 4-[3',5'-di-iso-propylphenyl]indenyl)$_2$$\eta^4$-1,4-diphenyl-1,3-butadiene; dimethylamidoborane(2-tert-butyl, 4-[3',5'-di-iso-propylphenyl]indenyl)$_2$$\eta^4$-1,4-diphenyl-1,3-butadiene; dimethylamidoborane(2-methyl, 4-[3',5'-di-phenylphenyl]indenyl)$_2$ $\eta^4$-1,4-diphenyl-1,3-butadiene; dimethylamidoborane(2-ethyl, 4-[3',5'-di-phenylphenyl]indenyl)$_2$$\eta^4$-1,4-diphenyl-1,3-butadiene; dimethylamidoborane(2-n-propyl, 4-[3',5'-di-phenylphenyl]indenyl)$_2$$\eta^4$-1,4-diphenyl-1,3-butadiene; dimethylamidoborane(2-iso-propyl, 4-[3',5'-di-phenylphenyl]indenyl)$_2$$\eta^4$-1,4-diphenyl-1,3-butadiene; dimethylamidoborane(2-n-butyl, 4-[3',5'-di-phenylphenyl]indenyl)$_2$$\eta^4$-1,4-diphenyl-1,3-butadiene; dimethylamidoborane(2-iso-butyl, 4-[3',5'-di-phenylphenyl]indenyl)$_2$$\eta^4$-1,4-diphenyl-1,3-butadiene; dimethylamidoborane(2-sec-butyl, 4-[3',5'-di-phenylphenyl]indenyl)$_2$$\eta^4$-1,4-diphenyl-1,3-butadiene; dimethylamidoborane(2-tert-butyl, 4-[3',5'-di-phenylphenyl]indenyl)$_2$$\eta^4$-1,4-diphenyl-1,3-butadiene; dimethylamidoborane(2-methyl, 4-[3',5'-di-tbutylphenyl]indenyl)$_2$ zirconium dimethyl; dimethylamidoborane(2-ethyl, 4-[3',5'-di-tbutylphenyl]indenyl)$_2$zirconium dimethyl; dimethylamidoborane(2-n-propyl, 4-[3',5'-di-tbutylphenyl]indenyl)$_2$zirconium dimethyl; dimethylamidoborane(2-iso-propyl, 4-[3',5'-di-tbutylphenyl]indenyl)$_2$zirconium dimethyl; dimethylamidoborane(2-n-butyl, 4-[3',5'-di-tbutylphenyl]indenyl)$_2$zirconium dimethyl; dimethylamidoborane(2-iso-butyl, 4-[3',5'-di-tbutylphenyl]indenyl)$_2$zirconium dimethyl; dimethylamidoborane(2-sec-butyl, 4-[31,5'-di-tbutylphenyl]indenyl)$_2$zirconium dimethyl; dimethylamidoborane(2-tert-butyl, 4-[3',5'-di-tbutylphenyl]indenyl)$_2$zirconium dimethyl; dimethylamidoborane(2-ethyl, 4-[3',5'-bis-trifluoromethylphenyl]indenyl)$_2$zirconium dimethyl; dimethylamidoborane(2-n-propyl, 4-[3',5'-bis-trifluoromethylphenyl]indenyl)$_2$ zirconium dimethyl; dimethylamidoborane(2-iso-propyl, 4-[3',5'-bis-trifluoromethylphenyl]indenyl)$_2$ zirconium dimethyl; dimethylamidoborane(2-n-butyl, 4-[3',5'-bis-trifluoromethylphenyl]indenyl)$_2$zirconium dimethyl; dimethylamidoborane(2-iso-butyl, 4-[3',5'-bis-trifluoromethylphenyl]indenyl)$_2$zirconium dimethyl; dimethylamidoborane(2-sec-butyl, 4-[3',5'-bis-trifluoromethylphenyl]indenyl)$_2$zirconium dimethyl; dimethylamidoborane(2-tert-butyl, 4-[3',5'-bis-trifluoromethylphenyl]indenyl)$_2$zirconium dimethyl; dimethylamidoborane(2-ethyl, 4-[3',5'-di-iso-propylphenyl]indenyl)$_2$zirconium dimethyl; dimethylamidoborane(2-n-propyl, 4-[3',5'-di-iso-propylphenyl]indenyl)$_2$zirconium dimethyl dimethylamidoborane(2-iso-propyl, 4-[3',5'-di-iso-propylphenyl]indenyl)$_2$zirconium dimethyl; dimethylamidoborane(2-n-butyl, 4-[3',5'-di-iso-propylphenyl]indenyl)$_2$zirconium dimethyl; dimethylamidoborane(2-iso-butyl, 4-[3',5'-di-iso-propylphenyl]indenyl)$_2$zirconium dimethyl; dimethylamidoborane(2-sec-butyl, 4-[3',5'-di-iso-propylphenyl]indenyl)$_2$zirconium dimethyl; dimethylamidoborane(2-tert-butyl, 4-[3',5'-di-iso-propylphenyl]indenyl)$_2$zirconium dimethyl; dimethylamidoborane(2-methyl, 4-[3',5'-di-phenylphenyl]indenyl)$_2$zirconium dimethyl; dimethylamidoborane(2-ethyl, 4-[3',5'-di-phenylphenyl]indenyl)$_2$zirconium dimethyl; dimethylamidoborane(2-n-propyl, 4-[3',5'-di-phenylphenyl]indenyl)$_2$zirconium dimethyl; dimethylamidoborane(2-iso-propyl, 4-[3',5'-di-phenylphenyl]indenyl)$_2$zirconium dimethyl; dimethylamidoborane(2-n-butyl, 4-[3',5'-di-phenylphenyl]indenyl)$_2$zirconium dimethyl; dimethylamidoborane(2-iso-butyl, 4-[3',5'-di-phenylphenyl]indenyl)$_2$zirconium dimethyl; dimethylamidoborane(2-sec-butyl, 4-[3',5'-di-phenylphenyl]indenyl)$_2$zirconium dimethyl; dimethylamidoborane(2-tert-butyl, 4-[3',5'-di-phenylphenyl]indenyl)$_2$zirconium dimethyl; diisopropylamidoborane(2-methyl, 4-[3',5'-di-tbutylphenyl]indenyl)$_2$zirconium dichloride; diisopropylamidoborane(2-ethyl, 4-[3',5'-di-tbutylphenyl]indenyl)$_2$zirconium dichloride; diisopropylamidoborane(2-n-propyl, 4-[3',5'-di-tbutylphenyl]indenyl)$_2$zirconium dichloride; diisopropylamidoborane(2-iso-propyl, 4-[31,5'-di-tbutylphenyl]indenyl)$_2$zirconium dichloride; diisopropylamidoborane(2-n-butyl, 4-[3',5'-di-tbutylphenyl]indenyl)$_2$zirconium dichloride; diisopropylamidoborane(2-iso-butyl, 4-[31,5'-di-tbutylphenyl]indenyl)$_2$zirconium dichloride; diisopropylamidoborane(2-sec-butyl, 4-[3',5'-di-tbutylphenyl]indenyl)$_2$zirconium dichloride; diisopropylamidoborane (2-tert-butyl, 4-[3',5'-di-tbutylphenyl]indenyl)$_2$zirconium dichloride; diisopropylamidoborane(2-ethyl, 4-[3',5'-bis-trifluoromethylphenyl]indenyl)$_2$zirconium dichloride; diisopropylamidoborane(2-n-propyl, 4-[3',5'-bis-trifluoromethylphenyl]indenyl)$_2$zirconium dichloride; diisopropylamidoborane(2-iso-propyl, 4-[3',5'-bis-trifluoromethylphenyl]indenyl)$_2$zirconium dichloride; diisopropylamidoborane(2-n-butyl, 4-[3',5'-bis-trifluoromethylphenyl]indenyl)$_2$zirconium dichloride; diisopropylamidoborane(2-iso-butyl, 4-[3',5'-bis-trifluoromethylphenyl]indenyl)$_2$zirconium dichloride; diisopropylamidoborane(2-sec-butyl, 4-[3',5'-bis-trifluoromethylphenyl]indenyl)$_2$zirconium dichloride; diisopropylamidoborane(2-tert-butyl, 4-[3',5'-bis-trifluoromethylphenyl]indenyl)$_2$zirconium dichloride; diisopropylamidoborane(2-ethyl, 4-[3',5'-di-iso-propylphenyl]indenyl)$_2$zirconium dichloride; diisopropylamidoborane (2-n-propyl, 4-[3',5'-di-iso-propylphenyl]indenyl)$_2$zirconium dichloride diisopropylamidoborane(2-iso-propyl, 4-[3',5'-di-iso-propylphenyl]indenyl)$_2$zirconium dichloride;

diisopropylamidoborane(2-n-butyl, 4-[3',5'-di-iso-propylphenyl]indenyl)₂zirconium dichloride; diisopropylamidoborane(2-iso-butyl, 4-[3',5'-di-iso-propylphenyl]indenyl)₂zirconium dichloride; diisopropylamidoborane(2-sec-butyl, 4-[3',5'-di-iso-propylphenyl]indenyl)₂zirconium dichloride; diisopropylamidoborane(2-tert-butyl, 4-[3',5'-di-iso-propylphenyl]indenyl)₂zirconium dichloride; diisopropylamidoborane(2-methyl, 4-[3',5'-di-phenylphenyl]indenyl)₂zirconium dichloride; diisopropylamidoborane(2-ethyl, 4-[3',5'-di-phenylphenyl]indenyl)₂zirconium dichloride; diisopropylamidoborane(2-n-propyl, 4-[3',5'-di-phenylphenyl]indenyl)₂zirconium dichloride; diisopropylamidoborane(2-iso-propyl, 4-[3',5'-di-phenylphenyl]indenyl)₂zirconium dichloride; diisopropylamidoborane(2-n-butyl, 4-[3',5'-di-phenylphenyl]indenyl)₂zirconium dichloride; diisopropylamidoborane(2-iso-butyl, 4-[3',5'-di-phenylphenyl]indenyl)₂zirconium dichloride; diisopropylamidoborane(2-sec-butyl, 4-[3',5'-di-phenylphenyl]indenyl)₂zirconium dichloride; diisopropylamidoborane(2-tert-butyl, 4-[3',5'-di-phenylphenyl]indenyl)₂zirconium dichloride; diisopropylamidoborane(2-methyl, 4-[3',5'-di-tbutylphenyl]indenyl)₂$\eta^4$-1,4-diphenyl-1,3-butadiene; diisopropylamidoborane(2-ethyl, 4-[3',5'-di-tbutylphenyl]indenyl)₂$\eta^4$-1,4-diphenyl-1,3-butadiene; diisopropylamidoborane(2-n-propyl, 4-[3',5'-di-tbutylphenyl]indenyl)₂$\eta^4$-1,4-diphenyl-1,3-butadiene; diisopropylamidoborane(2-iso-propyl, 4-[3',5'-di-tbutylphenyl]indenyl)₂$\eta^4$-1,4-diphenyl-1,3-butadiene; diisopropylamidoborane(2-n-butyl, 4-[3',5'-di-tbutylphenyl]indenyl)₂$\eta^4$-1,4-diphenyl-1,3-butadiene; diisopropylamidoborane(2-iso-butyl, 4-[3,5-di-tbutylphenyl]indenyl)₂$\eta^4$-1,4-diphenyl-1,3-butadiene; diisopropylamidoborane(2-sec-butyl, 4-[3',5'-di-tbutylphenyl]indenyl)₂$\eta^4$-1,4-diphenyl-1,3-butadiene; diisopropylamidoborane(2-tert-butyl, 4-[3',5'-di-tbutylphenyl]indenyl)₂$\eta^4$-1,4-diphenyl-1,3-butadiene; diisopropylamidoborane(2-ethyl, 4-[3',5'-bis-trifluoromethylphenyl]indenyl)₂$\eta^4$-1,4-diphenyl-1,3-butadiene; diisopropylamidoborane(2-n-propyl, 4-[3',5'-bis-trifluoromethylphenyl]indenyl)₂$\eta^4$-1,4-diphenyl-1,3-butadiene; diisopropylamidoborane(2-iso-propyl, 4-[3',5'-bis-trifluoromethylphenyl]indenyl)₂$\eta^4$-1,4-diphenyl-1,3-butadiene; diisopropylamidoborane(2-n-butyl, 4-[3',5'-bis-trifluoromethylphenyl]indenyl)₂$\eta^4$-1,4-diphenyl-1,3-butadiene; diisopropylamidoborane(2-iso-butyl, 4-[3',5'-bis-trifluoromethylphenyl]indenyl)₂$\eta^4$-1,4-diphenyl-1,3-butadiene; diisopropylamidoborane(2-sec-butyl, 4-[3',5'-bis-trifluoromethylphenyl]indenyl)₂$\eta^4$-1,4-diphenyl-1,3-butadiene; diisopropylamidoborane(2-tert-butyl, 4-[3',5'-bis-trifluoromethylphenyl]indenyl)₂$\eta^4$-1,4-diphenyl-1,3-butadiene; diisopropylamidoborane(2-ethyl, 4-[3',5'-di-iso-propylphenyl]indenyl)₂$\eta^4$-1,4-diphenyl-1,3-butadiene; diisopropylamidoborane(2-n-propyl, 4-[3',5'-di-iso-propylphenyl]indenyl)₂$\eta^4$-1,4-diphenyl-1,3-butadiene; diisopropylamidoborane(2-iso-propyl, 4-[3',5'-di-iso-propylphenyl]indenyl$\eta^4$-1,4-diphenyl-1,3-butadiene; diisopropylamidoborane(2-n-butyl, 4-[3',5'-di-iso-propylphenyl]indenyl)₂$\eta^4$-1,4-diphenyl-1,3-butadiene; diisopropylamidoborane(2-iso-butyl, 4-[3',5'-di-iso-propylphenyl]indenyl)₂$\eta^4$-1,4-diphenyl-1,3-butadiene; diisopropylamidoborane(2-sec-butyl, 4-[3',5'-di-iso-propylphenyl]indenyl)₂$\eta^4$-1,4-diphenyl-1,3-butadiene; diisopropylamidoborane(2-tert-butyl, 4-[3',5'-di-iso-propylphenyl]indenyl)₂$\eta^4$-1,4-diphenyl-1,3-butadiene; diisopropylamidoborane(2-methyl, 4-[3',5'-di-phenylphenyl]indenyl)₂$\eta^4$-1,4-diphenyl-1,3-butadiene; diisopropylamidoborane(2-ethyl, 4-[3',5'-di-phenylphenyl]indenyl)₂$\eta^4$-1,4-diphenyl-1,3-butadiene; diisopropylamidoborane(2-n-propyl, 4-[3',5'-di-phenylphenyl]indenyl)₂$\eta^4$-1,4-diphenyl-1,3-butadiene; diisopropylamidoborane(2-iso-butyl, 4-[3',5'-di-phenylphenyl]indenyl)₂$\eta^4$-1,4-diphenyl-1,3-butadiene; diisopropylamidoborane(2-sec-butyl, 4-[3',5'-di-phenylphenyl]indenyl)₂$\eta^4$-1,4-diphenyl-1,3-butadiene; diisopropylamidoborane(2-tert-butyl, 4-[3',5'-di-phenylphenyl]indenyl)₂$\eta^4$-1,4-diphenyl-1,3-butadiene; diisopropylamidoborane(2-methyl, 4-[3',5'-di-tbutylphenyl]indenyl)₂zirconium dimethyl; diisopropylamidoborane(2-ethyl, 4-[3',5'-di-tbutylphenyl]indenyl)₂zirconium dimethyl; diisopropylamidoborane(2-n-propyl, 4-[3',5'-di-tbutylphenyl]indenyl)₂zirconium dimethyl; diisopropylamidoborane(2-iso-propyl, 4-[3',5'-di-tbutylphenyl]indenyl)₂zirconium dimethyl; diisopropylamidoborane(2-n-butyl, 4-[3',5'-di-tbutylphenyl]indenyl)₂zirconium dimethyl; diisopropylamidoborane(2-iso-butyl, 4-[3',5'-di-tbutylphenyl]indenyl)₂zirconium dimethyl; diisopropylamidoborane(2-sec-butyl, 4-[3',5'-di-tbutylphenyl]indenyl)₂zirconium dimethyl; diisopropylamidoborane(2-tert-butyl, 4-[3',5'-di-tbutylphenyl]indenyl)₂zirconium dimethyl; diisopropylamidoborane(2-ethyl, 4-[3',5'-bis-trifluoromethylphenyl]indenyl)₂zirconium dimethyl; diisopropylamidoborane(2-n-propyl, 4-[3',5'-bis-trifluoromethylphenyl]indenyl)₂zirconium dimethyl; diisopropylamidoborane(2-iso-propyl, 4-[3',5'-bis-trifluoromethylphenyl]indenyl)₂zirconium dimethyl; diisopropylamidoborane(2-n-butyl, 4-[3',5'-bis-trifluoromethylphenyl]indenyl)₂zirconium dimethyl; diisopropylamidoborane(2-iso-butyl, 4-[3',5'-bis-trifluoromethylphenyl]indenyl)₂zirconium dimethyl; diisopropylamidoborane(2-sec-butyl, 4-[3',5'-bis-trifluoromethylphenyl]indenyl)₂zirconium dimethyl; diisopropylamidoborane(2-tert-butyl, 4-[3',5'-bis-trifluoromethylphenyl]indenyl)₂zirconium dimethyl; diisopropylamidoborane(2-ethyl, 4-[3',5'-di-iso-propylphenyl]indenyl)₂zirconium dimethyl; diisopropylamidoborane(2-n-propyl, 4-[3',5'-di-iso-propylphenyl]indenyl)₂zirconium dimethyl diisopropylamidoborane(2-iso-propyl, 4-[3',5'-di-iso-propylphenyl]indenyl)₂zirconium dimethyl; diisopropylamidoborane(2-n-butyl, 4-[3',5'-di-iso-propylphenyl]indenyl)₂zirconium dimethyl; diisopropylamidoborane(2-iso-butyl, 4-[3',5'-di-iso-propylphenyl]indenyl)₂zirconium dimethyl; diisopropylamidoborane(2-sec-butyl, 4-[3',5'-di-iso-propylphenyl]indenyl)₂zirconium dimethyl; diisopropylamidoborane(2-tert-butyl, 4-[3',5'-di-iso-propylphenyl]indenyl)₂zirconium dimethyl; diisopropylamidoborane(2-methyl, 4-[3',5'-di-phenylphenyl]indenyl)₂zirconium dimethyl; diisopropylamidoborane(2-ethyl, 4-[3',5'-di-phenylphenyl]indenyl)₂zirconium dimethyl; diisopropylamidoborane(2-n-propyl, 4-[3',5'-di-phenylphenyl]indenyl)₂zirconium dimethyl; diisopropylamidoborane(2-iso-propyl, 4-[3',5'-di-phenylphenyl]indenyl)₂zirconium dimethyl; diisopropylamidoborane(2-n-butyl, 4-[3',5'-di-phenylphenyl]indenyl)₂zirconium dimethyl; diisopropylamidoborane(2-iso-butyl, 4-[3',5'-di-phenylphenyl]indenyl)₂zirconium dimethyl; diisopropylamidoborane(2-sec-butyl, 4-[3',5'-di-phenylphenyl]indenyl)₂zirconium dimethyl; diisopropylamidoborane(2-tert-butyl, 4-[3',5'-di-phenylphenyl]indenyl)₂zirconium dimethyl; bis(trimethylsilyl)amidoborane(2-methyl, 4-[3',5'-di-tbutylphenyl]indenyl)₂zirconium dichloride; bis(trimethylsilyl)amidoborane(2-ethyl, 4-[3',5'-di-tbutylphenyl]indenyl)₂zirconium dichloride; bis(trimethylsilyl)amidoborane(2-n-propyl, 4-[3',5'-di-tbutylphenyl]indenyl)₂zirconium dichloride; bis(trimethylsilyl)amidoborane(2-iso-propyl, 4-[3',5'-di-tbutylphenyl]indenyl)₂zirconium dichloride; bis(trimethylsilyl)amidoborane(2-n-butyl, 4-[3',5'-di-tbutylphenyl]indenyl)₂zirconium dichloride; bis (trimethylsilyl)amidoborane(2-iso-butyl, 4-[3',5'-di-tbutylphenyl]indenyl)$_2$zirconium dichloride; bis(trimethylsilyl)amidoborane(2-sec-butyl, 4-[3',5'-di-tbutylphenyl]indenyl)$_2$zirconium dichloride; bis(trimethylsilyl)amidoborane(2-tert-butyl, 4-[3',5'-di-tbutylphenyl]indenyl)$_2$ zirconium dichloride; bis(trimethylsilyl)amidoborane(2-ethyl, 4-[3',5'-bis-trifluoromethylphenyl]indenyl)$_2$zirconium dichloride; bis(trimethylsilyl)amidoborane(2-n-propyl, 4-[3',5'-bis-trifluoromethylphenyl]indenyl)$_2$zirconium dichloride; bis(trimethylsilyl)amidoborane(2-iso-propyl, 4-[3',5'-bis-trifluoromethylphenyl]indenyl)$_2$zirconium dichloride; bis(trimethylsilyl)amidoborane(2-n-butyl, 4-[3',5'-bis-trifluoromethylphenyl]indenyl)$_2$zirconium dichloride; bis(trimethylsilyl)amidoborane(2-iso-butyl, 4-[3',5'-bis-trifluoromethylphenyl]indenyl)$_2$zirconium dichloride; bis(trimethylsilyl)amidoborane(2-sec-butyl, 4-[3',5'-bis-trifluoromethylphenyl]indenyl)$_2$zirconium dichloride; bis(trimethylsilyl)amidoborane(2-tert-butyl, 4-[3',5'-bis-trifluoromethylphenyl]indenyl)$_2$zirconium dichloride; bis(trimethylsilyl)amidoborane(2-ethyl, 4-[3',5'-di-iso-propylphenyl]indenyl)$_2$zirconium dichloride; bis(trimethylsilyl)amidoborane(2-n-propyl, 4-[3',5'-di-iso-propylphenyl]indenyl)$_2$zirconium dichloride; bis(trimethylsilyl)amidoborane(2-iso-propyl, 4-[3',5'-di-iso-propylphenyl]indenyl)$_2$zirconium dichloride; bis(trimethylsilyl)amidoborane(2-n-butyl, 4-[3',5'-di-iso-propylphenyl]indenyl)$_2$zirconium dichloride; bis(trimethylsilyl)amidoborane(2-iso-butyl, 4-[3',5'-di-iso-propylphenyl]indenyl)$_2$zirconium dichloride; bis(trimethylsilyl)amidoborane(2-sec-butyl, 4-[3',5'-di-iso-propylphenyl]indenyl)$_2$zirconium dichloride; bis(trimethylsilyl)amidoborane(2-tert-butyl, 4-[3',5'-di-iso-propylphenyl]indenyl)$_2$zirconium dichloride; bis(trimethylsilyl)amidoborane(2-methyl, 4-[3',5'-di-phenylphenyl]indenyl)$_2$zirconium dichloride; bis(trimethylsilyl)amidoborane(2-ethyl, 4-[3',5'-di-phenylphenyl]indenyl)$_2$zirconium dichloride; bis(trimethylsilyl)amidoborane(2-n-propyl, 4-[3',5'-di-phenylphenyl]indenyl)$_2$zirconium dichloride; bis(trimethylsilyl)amidoborane(2-iso-propyl, 4-[3',5'-di-phenylphenyl]indenyl)$_2$zirconium dichloride; bis(trimethylsilyl)amidoborane(2-n-butyl, 4-[3',5'-di-phenylphenyl]indenyl)$_2$zirconium dichloride; bis(trimethylsilyl)amidoborane(2-iso-butyl, 4-[3',5'-di-phenylphenyl]indenyl)$_2$zirconium dichloride; bis(trimethylsilyl)amidoborane(2-sec-butyl, 4-[3',5'-di-phenylphenyl]indenyl)$_2$zirconium dichloride; bis(trimethylsilyl)amidoborane(2-tert-butyl, 4-[3',5'-di-phenylphenyl]indenyl)$_2$zirconium dichloride; bis(trimethylsilyl)amidoborane(2-methyl, 4-[3',5'-di-tbutylphenyl]indenyl)$_2\eta^4$-1,4-diphenyl-1,3-butadiene; bis(trimethylsilyl)amidoborane(2-ethyl, 4-[3',5'-di-tbutylphenyl]indenyl)$_2\eta^4$-1,4-diphenyl-1,3-butadiene; bis(trimethylsilyl)amidoborane(2-n-propyl, 4-[3',5'-di-tbutylphenyl]indenyl)$_2\eta^4$-1,4-diphenyl-1,3-butadiene; bis(trimethylsilyl)amidoborane(2-iso-propyl, 4-[3',5'-di-tbutylphenyl]indenyl)$_2\eta^4$-1,4-diphenyl-1,3-butadiene; bis(trimethylsilyl)amidoborane(2-n-butyl, 4-[3',5'-di-tbutylphenyl]indenyl)$_2\eta^4$-1,4-diphenyl-1,3-butadiene; bis(trimethylsilyl)amidoborane(2-iso-butyl, 4-[3',5'-di-tbutylphenyl]indenyl)$_2\eta^4$-1,4-diphenyl-1,3-butadiene; bis(trimethylsilyl)amidoborane(2-sec-butyl, 4-[3',5'-di-tbutylphenyl]indenyl)$_2$72 $^4$-1,4-diphenyl-1,3-butadiene; bis(trimethylsilyl)amidoborane(2-tert-butyl, 4-[3',5'-di-tbutylphenyl]indenyl)$_2\eta^4$-1,4-diphenyl-1,3-butadiene; bis(trimethylsilyl)amidoborane(2-ethyl, 4-[3',5'-bis-trifluoromethylphenyl]indenyl)$_2\eta^4$-1,4-diphenyl-1,3-butadiene; bis(trimethylsilyl)amidoborane(2-n-propyl, 4-[3',5'-bis-trifluoromethylphenyl]indenyl)$_2\eta^4$-1,4-diphenyl-1,3-butadiene; bis(trimethylsilyl)amidoborane(2-iso-propyl, 4-[3',5'-bis-trifluoromethylphenyl]indenyl)$_2\eta^4$-1,4-diphenyl-1,3-butadiene; bis(trimethylsilyl)amidoborane(2-n-butyl, 4-[3',5'-bis-trifluoromethylphenyl]indenyl)$_2\eta^4$-1,4-diphenyl-1,3-butadiene; bis(trimethylsilyl)amidoborane(2-iso-butyl, 4-[3',5'-bis-trifluoromethylphenyl]indenyl)$_2\eta^4$-1,4-diphenyl-1,3-butadiene; bis(trimethylsilyl)amidoborane(2-sec-butyl, 4-[3',5'-bis-trifluoromethylphenyl]indenyl)$_2$ $\eta^4$-1,4-diphenyl-1,3-butadiene; bis(trimethylsilyl)amidoborane(2-tert-butyl, 4-[3',5'-bis-trifluoromethylphenyl]indenyl)$_2\eta^4$-1,4-diphenyl-1,3-butadiene; bis(trimethylsilyl)amidoborane(2-ethyl, 4-[3',5'-di-iso-propylphenyl]indenyl)$_2\eta^4$-1,4-diphenyl-1,3-butadiene; bis(trimethylsilyl)amidoborane(2-n-propyl, 4-[3',5'-di-iso-propylphenyl]indenyl)$_2\eta^4$-1,4-diphenyl-1,3-butadiene; bis(trimethylsilyl)amidoborane(2-iso-propyl, 4-[3',5'-di-iso-propylphenyl]indenyl)$\eta^4$-1,4-diphenyl-1,3-butadiene; bis(trimethylsilyl)amidoborane(2-n-butyl, 4-[3',5'-di-iso-propylphenyl]indenyl)$_2\eta^4$-1,4-diphenyl-1,3-butadiene; bis(trimethylsilyl)amidoborane(2-iso-butyl, 4-[3',5'-di-iso-propylphenyl]indenyl)$_2\eta^4$-1,4-diphenyl-1,3-butadiene; bis(trimethylsilyl)amidoborane(2-sec-butyl, 4-[3',5'-di-iso-propylphenyl]indenyl)$_2\eta^4$-1,4-diphenyl-1,3-butadiene; bis(trimethylsilyl)amidoborane(2-tert-butyl, 4-[3',5'-di-iso-propylphenyl]indenyl)$_2\eta^4$-1,4-diphenyl-1,3-butadiene; bis(trimethylsilyl)amidoborane(2-methyl, 4-[3',5'-di-phenylphenyl]indenyl)$_2\eta_4$-1,4-diphenyl-1,3-butadiene; bis(trimethylsilyl)amidoborane(2-ethyl, 4-[3',5'-di-phenylphenyl]indenyl)$_2\eta^4$-1,4-diphenyl-1,3-butadiene; bis(trimethylsilyl)amidoborane(2-n-propyl, 4-[3',5'-di-phenylphenyl]indenyl)$_2\eta^4$-1,4-diphenyl-1,3-butadiene; bis(trimethylsilyl)amidoborane(2-iso-propyl, 4-[3',5'-di-phenylphenyl]indenyl)$_2\eta^4$-1,4-diphenyl-1,3-butadiene; bis(trimethylsilyl)amidoborane(2-n-butyl, 4-[3',5'-di-phenylphenyl]indenyl)$_2\eta^4$-1,4-diphenyl-1,3-butadiene; bis(trimethylsilyl)amidoborane(2-iso-butyl, 4-[3',5'-di-phenylphenyl]indenyl)$_2\eta^4$-1,4-diphenyl-1,3-butadiene; bis(trimethylsilyl)amidoborane(2-sec-butyl, 4-[3',5'-di-phenylphenyl]indenyl)$_2$ 1'-1,4-diphenyl-1,3-butadiene; bis(trimethylsilyl)amidoborane(2-tert-butyl, 4-[3',5'-di-phenylphenyl]indenyl)$_2\eta^4$-1,4-diphenyl-1,3-butadiene; bis(trimethylsilyl)amidoborane(2-methyl, 4-[3',5'-di-tbutylphenyl]indenyl)$_2$zirconium dimethyl; bis(trimethylsilyl)amidoborane(2-ethyl, 4-[3',5'-di-tbutylphenyl]indenyl)$_2$zirconium dimethyl; bis(trimethylsilyl)amidoborane(2-n-propyl, 4-[3',5'-di-tbutylphenyl]indenyl)$_2$zirconium dimethyl; bis(trimethylsilyl)amidoborane(2-iso-propyl, 4-[3',5'-di-tbutylphenyl]indenyl)$_2$zirconium dimethyl; bis(trimethylsilyl)amidoborane(2-n-butyl, 4-[3',5'-di-tbutylphenyl]indenyl)$_2$zirconium dimethyl; bis(trimethylsilyl)amidoborane(2-iso-butyl, 4-[3',5'-di-tbutylphenyl]indenyl)$_2$zirconium dimethyl; bis(trimethylsilyl)amidoborane(2-sec-butyl, 4-[3',5'-di-tbutylphenyl]indenyl)$_2$zirconium dimethyl; bis(trimethylsilyl)amidoborane(2-tert-butyl, 4-[3',5'-di-tbutylphenyl]indenyl)$_2$zirconium dimethyl; bis(trimethylsilyl)amidoborane(2-ethyl, 4-[3',5'-bis-trifluoromethylphenyl]indenyl)$_2$zirconium dimethyl; bis(trimethylsilyl)amidoborane(2-n-propyl, 4-[3',5'-bis-trifluoromethylphenyl]indenyl)$_2$zirconium dimethyl; bis(trimethylsilyl)amidoborane(2-iso-propyl, 4-[3',5'-bis-trifluoromethylphenyl]indenyl)$_2$zirconium dimethyl; bis(trimethylsilyl)amidoborane(2-n-butyl, 4-[3',5'-bis-trifluoromethylphenyl]indenyl)$_2$zirconium dimethyl; bis (trimethylsilyl)amidoborane(2-iso-butyl, 4-[3',5'-bis-trifluoromethylphenyl]indenyl)$_2$zirconium dimethyl; bis(trimethylsilyl)amidoborane(2-sec-butyl, 4-[3',5'-bis-trifluoromethylphenyl]indenyl)$_2$zirconium dimethyl; bis(trimethylsilyl)amidoborane(2-tert-butyl, 4-[3',5'-bis-trifluoromethylphenyl]indenyl)$_2$zirconium dimethyl; bis(trimethylsilyl)amidoborane(2-ethyl, 4-[3',5'-di-iso-propylphenyl]indenyl)$_2$zirconium dimethyl; bis(trimethylsilyl)amidoborane(2-n-propyl, 4-[3',5'-di-iso-propylphenyl]indenyl)$_2$zirconium dimethyl bis(trimethylsilyl)amidoborane(2-iso-propyl, 4-[3',5'-di-iso-propylphenyl]indenyl)$_2$zirconium dimethyl; bis(trimethylsilyl)amidoborane(2-n-butyl, 4-[3',5'-di-iso-propylphenyl]indenyl)$_2$zirconium dimethyl; bis(trimethylsilyl)amidoborane(2-iso-butyl, 4-[3',5'-di-iso-propylphenyl]indenyl)$_2$zirconium dimethyl; bis(trimethylsilyl)amidoborane(2-sec-butyl, 4-[3',5'-di-iso-propylphenyl]indenyl)$_2$zirconium dimethyl; bis(trimethylsilyl)amidoborane(2-tert-butyl, 4-[3',5'-di-iso-propylphenyl]indenyl)$_2$zirconium dimethyl; bis(trimethylsilyl)amidoborane(2-methyl, 4-[3',5'-di-phenylphenyl]indenyl)$_2$zirconium dimethyl; bis(trimethylsilyl)amidoborane(2-ethyl, 4-[3',5'-di-phenylphenyl]indenyl)$_2$zirconium dimethyl; bis(trimethylsilyl)amidoborane(2-n-propyl, 4-[3',5'-di-phenylphenyl]indenyl)$_2$zirconium dimethyl; bis(trimethylsilyl)amidoborane(2-iso-propyl, 4-[3',5'-di-phenylphenyl]indenyl)$_2$zirconium dimethyl; bis(trimethylsilyl)amidoborane(2-n-butyl, 4-[3',5'-di-phenylphenyl]indenyl)$_2$zirconium dimethyl; bis(trimethylsilyl)amidoborane(2-iso-butyl, 4-[3',5'-di-phenylphenyl]indenyl)$_2$zirconium dimethyl; bis(trimethylsilyl)amidoborane(2-sec-butyl, 4-[3',5'-di-phenylphenyl]indenyl)$_2$zirconium dimethyl; and bis(trimethylsilyl)amidoborane(2-tert-butyl, 4-[3',5'-di-phenylphenyl]indenyl)$_2$zirconium dimethyl; and the like.

The most preferred species are the racemic versions of: dimethylsilylbis(indenyl)zirconium dichloride, dimethylsilylbis(indenyl)zirconium dimethyl, ethylenebis(indenyl)zirconium dichloride, ethylenebis(indenyl)zirconium dimethyl, dimethylsilylbis(tetrahydorindenyl)zirconium dichloride, dimethylsilylbis(tetrahydorindenyl)zirconium dimethyl, ethylenebis(tetrahydorindenyl)zirconium dichloride, ethylenebis(tetrahydorindenyl)zirconium dimethyl, dimethylsilylbis(2-methylindenyl)zirconium dichloride, dimethylsilylbis(2-methylindenyl)zirconium dimethyl, ethylenebis(2-methylindenyl)zirconium dichloride, ethylenebis(2-methylindenyl)zirconium dimethyl, dimethylsilylbis(2-methyl-4phenylindenyl)zirconium dichloride, dimethylsilylbis(2-methyl-4-phenylindenyl)zirconium dimethyl, ethylenebis(2-methyl-4-phenylindenyl)zirconium dichloride, ethylenebis(2-methyl-4-phenylindenyl)zirconium dimethyl, dimethylsilylbis(4,7-dimethylindenyl)zirconium dichloride, dimethylsilylbis(4,7-dimethylindenyl)zirconium dimethyl, ethylenebis(4,7-dimethylindenyl)zirconium dichloride, ethylenebis(4,7-dimethylindenyl)zirconium dimethyl, dimethylsilylbis(indenyl)hafnium dichloride, dimethylsilylbis(indenyl)hafnium dimethyl, ethylenebis(indenyl)hafnium dichloride, ethylenebis(indenyl)hafnium dimethyl, dimethylsilylbis(tetrahydorindenyl)hafnium dichloride, dimethylsilylbis(tetrahydorindenyl)hafnium dimethyl, ethylenebis(tetrahydorindenyl)hafnium dichloride, ethylenebis(tetrahydorindenyl)hafnium dimethyl, dimethylsilylbis(2-methylindenyl)hafnium dichloride, dimethylsilylbis(2-methylindenyl)hafnium dimethyl, ethylenebis(2-methylindenyl)hafnium dichloride, ethylenebis(2-methylindenyl)hafnium dimethyl, dimethylsilylbis(2-methyl-4-phenylindenyl)hafnium dichloride, dimethylsilylbis(2-methyl-4-phenylindenyl)hafnium dimethyl, ethylenebis(2-methyl-4-phenylindenyl)hafnium dichloride, ethylenebis(2-methyl-4-phenylindenyl)hafnium dimethyl, dimethylsilylbis(4,7-dimethylindenyl)hafnium dichloride, dimethylsilylbis(4,7-dimethylindenyl)hafnium dimethyl, ethylenebis(4,7-dimethylindenyl)hafnium dichloride, and ethylenebis(4,7-dimethylindenyl)hafnium dimethyl.

Similarly, metallocene precursors providing tacticity control exist where (A-Cp) is (Cp) (Cp*), both Cp and Cp* having substituents on the cyclopentadienyl rings of sufficient steric bulk to restrict rotation of the cyclopentadienyl ligands such that the aforementioned symmetry conditions are satisfied. Preferable chiral racemic metallocenes of this type include bis(tricyclo[5.2.1.0$^{2,6}$]deca-2,5-dienyl)zirconium and -hafnium dimethyl, bis((1R)-9,9-dimethyltricyclo[6.1.1.0$^{2,6}$]deca-2,5-dienyl)zirconium dimethyl, bis(tricyclo[5.2.1.0$^{2,6}$]deca-2,5,8-trienyl)zirconium dimethyl, bis(tricyclo[5.2.2.0$^{2,6}$]undeca-2,5,8-trienyl)zirconium and -hafnium dimethyl and bis((1R,8R)-7,7,9,9-tetramethyl[6.1.0.1.0$^{2,6}$]deca-2,5-dienyl)zirconium and -hafnium dimethyl.

Preferably metallocene precursors for the production of poly-alpha-olefins having enhanced syndiotactic character are also those of Equation 17 where S" are independently chosen such that the two Cp-ligands have substantially different steric bulk. In order to produce a syndiotactic polymer the pattern of the groups substituted on the Cp-rings is important. Thus, by steric difference or sterically different as used herein, it is intended to imply a difference between the steric characteristics of the Cp and Cp* rings that renders each to be symmetrical With respect to the A bridging group but different with respect to each other that controls the approach of each successive monomer unit that is added to the polymer chain. The steric difference between the Cp and Cp* rings act to block the approaching monomer from a random approach such that the monomer is added to the polymer chain in the syndiotactic configuration.

Preferable metallocene precursors for the production of syndiotactic polymers are those of Equation 17 where S" are independently chosen such that 1) the steric difference between the two Cp-ligands is maximized and 2) there remains a plane of symmetry through the metal center and the $C_1$ and $C_1$, carbon atoms of the Cp-rings in Equation 17. Thus, complexes such as $Me_2C(\square^5-C_5H_4)(1\text{-fluorenyl})$ $MMe_2$ (where M=Ti, Zr, or Hf) which possess this symmetry are preferred, and generally produce the syndiotactic polymer with higher degrees of stereoregularity than similar, but less symmetric, systems. Additionally, in the above equation, 1-fluorenyl may be substituted with 3,8-di-t-butylfluorenyl, octahydrofluorenyl or 3,3,6,6,9,9,12,12-octamethyl-4,4,5,5,10,10,11,11-octahydrodibenzo[b,h]fluorene. Because pre-catalysts of this type often lose there ability to control the stereoregularity of the polymer under high temperature reaction conditions, to insure higher crystallinity in the material requires using these catalysts at lower reactor temperatures, preferably at temperatures below 80° C.

Preferred catalysts that can produce the lower molecular weight isotactic polypropylene are those described in U.S. Pat. No. 5,120,867, which is incorporated by reference herein. Any mixture of catalysts, including supported catalysts, which can be used together in a single reactor or in a series reactor configuration, that can also produce the desired polypropylene can be utilized in this invention to produce the in situ blend. Preferred catalysts include cyclopentadienyl transition metals compounds and derivatives thereof used in conjunction with an alumoxane and/or a compatible non-coordinating anion.

Additional preferred catalysts that produce crystalline polypropylene are discussed in Chem. rev. 2000, 100, 1253-1345, which is incorporated by reference herein.

The preferred choice of transition metal component for the amorphous polymer fraction is the mono-cyclopentadienyl transition metal component of equation 10 where y is equal to 1. This preferred component is illustrated in equation 18:

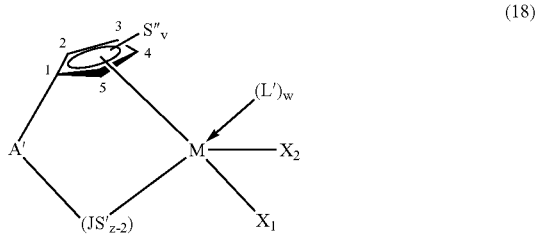

(18)

where A', J, S', $X_1$, $X_2$, L', z and w as are previously defined and M is titanium. Substituent $S''_v$ is defined to be the same as S'' in equation 10 where the subscript "v" denotes the carbon atom on the cyclopentadienyl ring to which the substituent is bonded and where there can be zero, two or four substituents, S'', on the cyclopentadienyl ring provided that the cyclopentadienyl ring is symmetrically substituted. Symmetrically substituted is defined to mean that the cyclopentadienyl ring is substituted in the 2 and 5 positions and/or 3 and 4 positions with S'' groups that are of approximately of the same steric bulk. Typically the size of these S'' groups are within 2 carbons of each other. Thus a cyclopentadienyl substituted at the 2 and the 5 positions with methyl and ethyl respectively, or substituted at the 3 and the 4 positions with hexyl and octyl, respectively, would be considered symmetric. Likewise, the cyclopentadienyl ring may be substituted at all four sites with S'' groups and be considered symmetric as long as each of the symmetrical pairs are of similar steric bulk. Additionally, two adjacent S''-groups in the 3 and 4 position may be linked to form a ring provided that the new ring is also symmetrically substituted.

Catalyst systems of this type are known to impart 2,1-mistakes when incorporating C3 and higher alpha-olefins. The pre-catalysts where S' is bonded to the nitrogen ligand (J) via a 3° carbon (for example when S' is tert-butyl or 1-adamantyl) have fewer 2,1-mistakes then when S' is bonded to the nitrogen ligand (J) via a 1° carbon (for example when S' is n-butyl, methyl, or benzyl) or 2° carbon (for example when S' is cyclododecyl, cyclohexyl, or sec-butyl). The 2,1-mistakes in the polymer backbone impart $(CH_2)_2$ units that can be beneficial to the polymer properties. Polymers of this type, the characterization of such polymers and the catalyst systems used to produce such polymers are described in U.S. Pat. No. 5,723,560 and is incorporated herein by reference. Lower Mw versions of such polymers can be produced by changing process condition, for example, by increasing reactor temperature.

Preferred mono-cyclopentadienyl transition metal compounds which, according to the present invention, provide catalyst systems which are specific to the production of atactic poly-alpha-olefins include: dimethylsilyl(tetramethylcyclopentadienyl)(cyclododecylamido)titanium dichloride, dimethylsilyl(tetramethylcyclopentadienyl)(cyclohexylamido)titanium dichloride, dimethylsilyl(tetramethylcyclopentadienyl)(1-adamantylamido)titanium dichloride, dimethylsilyl(tetramethylcyclopentadienyl)(t-butylamido)titanium dichloride, dimethylsilyl(tetramethylcyclopentadienyl)(s-butylamido)titanium dichloride, dimethylsilyl(tetramethylcyclopentadienyl)(n-butylamido)titanium dichloride, dimethylsilyl(tetramethylcyclopentadienyl)(exo-2-norbornylamido)titanium dichloride, diethylsilyl(tetramethylcyclopentadienyl)(cyclododecylamido)titanium dichloride, diethylsilyl(tetramethylcyclopentadienyl)(exo-2-norbornylamido)titanium dichloride, diethylsilyl(tetramethylcyclopentadienyl)(cyclohexylamido)titanium dichloride, diethylsilyl(tetramethylcyclopentadienyl)(1-adamantylamido)titanium dichloride, diethylsilyl(tetramethylcyclopentadienyl)(t-butylamido)titanium dichloride, methylene(tetramethylcyclopentadienyl)(cyclododecylamido)titanium dichloride, methylene(tetramethylcyclopentadienyl)(exo-2-norbornylamido)titanium dichloride, methylene(tetramethylcyclopentadienyl)(cyclohexylamido)titanium dichloride, methylene(tetramethylcyclopentadienyl)(1-adamantylamido)titanium dichloride, methylene(tetramethylcyclopentadienyl)(t-butylamido)titanium dichloride, ethylene(tetramethylcyclopentadienyl)(cyclododecylamido)titanium dichloride, ethylene(tetramethylcyclopentadienyl)(exo-2-norbornylamido)titanium dichloride, ethylene(tetramethylcyclopentadienyl)(cyclohexylamido)titanium dichloride, ethylene(tetramethylcyclopentadienyl)(1-adamantylamido)titanium dichloride, ethylene(tetramethylcyclopentadienyl)(t-butylamido)titanium dichloride, dimethylsilyl(tetramethylcyclopentadienyl)(cyclododecylamido)titanium dimethyl, dimethylsilyl(tetramethylcyclopentadienyl)(cyclohexylamido)titanium dimethyl, dimethylsilyl(tetramethylcyclopentadienyl)(1-adamantylamido)titanium dimethyl, dimethylsilyl(tetramethylcyclopentadienyl)(t-butylamido)titanium dimethyl, dimethylsilyl(tetramethylcyclopentadienyl)(s-butylamido)titanium dimethyl, dimethylsilyl(tetramethylcyclopentadienyl)(n-butylamido)titanium dimethyl, dimethylsilyl(tetramethylcyclopentadienyl)(exo-2-norbornylamido)titanium dimethyl, diethylsilyl(tetramethylcyclopentadienyl)(cyclododecylamido)titanium dimethyl, diethylsilyl(tetramethylcyclopentadienyl)(exo-2-norbornylamido)titanium dimethyl, diethylsilyl(tetramethylcyclopentadienyl)(cyclohexylamido)titanium dimethyl, diethylsilyl(tetramethylcyclopentadienyl)(1-adamantylamido)titanium dimethyl, diethylsilyl(tetramethylcyclopentadienyl)(t-butylamido)titanium dimethyl, methylene(tetramethylcyclopentadienyl)(cyclododecylamido)titanium dimethyl, methylene(tetramethylcyclopentadienyl)(exo-2-norbornylamido)titanium dimethyl, methylene(tetramethylcyclopentadienyl)(cyclohexylamido)titanium dimethyl, methylene(tetramethylcyclopentadienyl)(1-adamantylamido)titanium dimethyl, methylene(tetramethylcyclopentadienyl)(t-butylamido)titanium dimethyl, ethylene(tetramethylcyclopentadienyl)(cyclododecylamido)titanium dimethyl, ethylene(tetramethylcyclopentadienyl)(exo-2-norbornylamido)titanium dimethyl, ethylene(tetramethylcyclopentadienyl)(cyclohexylamido)titanium dimethyl, ethylene(tetramethylcyclopentadienyl)(1-adamantylamido)titanium dimethyl, ethylene(tetramethylcyclopentadienyl)(t-butylamido)titanium dimethyl, dimethylsilyl(2,5-dimethylcyclopentadienyl)(cyclododecylamido)titanium dichloride, dimethylsilyl(2,5-dimethylcyclopentadienyl)(exo-2-norbornylamido)titanium dichloride, dimethylsilyl(2,5-dimethylcyclopentadienyl)(cyclohexylamido)titanium dichloride, dimethylsilyl(2,5-dimethylcyclopentadienyl)(1-adamantylamido)titanium dichloride, dimethylsilyl(2,5-dimethylcyclopentadienyl)(t-butylamido)titanium dichloride, dimethylsilyl(3,4-dimethylcyclopentadienyl)(cyclododecylamido)titanium dichloride, dimethylsilyl(3,4-dimethylcyclopentadienyl)(exo-2-norbornylamido)titanium dichloride, dimethylsilyl(3,4-dimethylcyclopentadienyl)(cyclohexylamido)titanium dichloride, dimethylsilyl(3,4-dimethylcyclopentadienyl)(1-adamantylamido)titanium dichloride, dimethylsilyl(3,4-dimethylcyclopentadienyl)(t-butylamido)titanium dichloride, dimethylsilyl(2-ethyl-5-methylcyclopentadienyl)(cyclododecylamido)titanium dichloride, dimethylsilyl(2-ethyl-5-methylcyclopentadienyl)(exo-2-norbornylamido)titanium dichloride, dimethylsilyl(2-ethyl-5-methylcyclopentadienyl)(cyclohexylamido)titanium dichloride, dimethylsilyl(2-ethyl-5-methylcyclopentadienyl)(1-adamantylamido)titanium dichloride, dimethylsilyl(2-ethyl-5-methylcyclopentadienyl)(t-butylamido)titanium dichloride, dimethylsilyl(3-ethyl-4-methylcyclopentadienyl)(cyclododecylamido)titanium dichloride, dimethylsilyl(3-ethyl-4-methylcyclopentadienyl)(exo-2-norbornylamido)titanium dichloride, dimethylsilyl(3-ethyl-4-methylcyclopentadienyl)(cyclohexylamido)titanium dichloride, dimethylsilyl(3-ethyl-4-methylcyclopentadienyl)(1-adamantylamido)titanium dichloride, dimethylsilyl(3-ethyl-4-methylcyclopentadienyl)(t-butylamido)titanium dichloride, dimethylsilyl(2-ethyl-3-hexyl-5-methyl-4-octylcyclopentadienyl)(cyclododecylamido)titanium dichloride, dimethylsilyl(2-ethyl-3-hexyl-5-methyl-4-octylcyclopentadienyl)(exo-2-norbornylamido)titanium dichloride, dimethylsilyl(2-ethyl-3-hexyl-5-methyl-4-octylcyclopentadienyl)(cyclohexylamido)titanium dichloride, dimethylsilyl(2-ethyl-3-hexyl-5-methyl-4-octylcyclopentadienyl)(1-adamantylamido)titanium dichloride, dimethylsilyl(2-ethyl-3-hexyl-5-methyl-4-octylcyclopentadienyl)(t-butylamido)titanium dichloride, dimethylsilyl(2-tetrahydroindenyl)(cyclododecylamido)titanium dichloride, dimethylsilyl(2-tetrahydroindenyl)(exo-2-norbornylamido)titanium dichloride, dimethylsilyl(2-tetrahydroindenyl)(cyclohexylamido)titanium dichloride, dimethylsilyl(2-tetrahydroindenyl)(1-adamantylamido)titanium dichloride, dimethylsilyl(2-tetrahydroindenyl)(t-butylamido)titanium dichloride, dimethylsilyl(2,5-dimethylcyclopentadienyl)(cyclododecylamido)titanium dimethyl, dimethylsilyl(2,5-dimethylcyclopentadienyl)(exo-2-norbornylamido)titanium dimethyl, dimethylsilyl(2,5-dimethylcyclopentadienyl)(cyclohexylamido)titanium dimethyl, dimethylsilyl(2,5-dimethylcyclopentadienyl)(1-adamantylamido)titanium dimethyl, dimethylsilyl(2,5-dimethylcyclopentadienyl)(t-butylamido)titanium dimethyl, dimethylsilyl(3,4-dimethylcyclopentadienyl)(cyclododecylamido)titanium dimethyl, dimethylsilyl(3,4-dimethylcyclopentadienyl)(exo-2-norbornylamido)titanium dimethyl, dimethylsilyl(3,4-dimethylcyclopentadienyl)(cyclohexylamido)titanium dimethyl, dimethylsilyl(3,4-dimethylcyclopentadienyl)(1-adamantylamido)titanium dimethyl, dimethylsilyl(3,4-dimethylcyclopentadienyl)(t-butylamido)titanium dimethyl, dimethylsilyl(2-ethyl-5-methylcyclopentadienyl)(cyclododecylamido)titanium dimethyl, dimethylsilyl(2-ethyl-5-methylcyclopentadienyl)(exo-2-norbornylamido)titanium dimethyl, dimethylsilyl(2-ethyl-5-methylcyclopentadienyl)(cyclohexylamido)titanium dimethyl, dimethylsilyl(2-ethyl-5-methylcyclopentadienyl)(1-adamantylamido)titanium dimethyl, dimethylsilyl(2-ethyl-5-methylcyclopentadienyl)(t-butylamido)titanium dimethyl, dimethylsilyl(3-ethyl-4-methylcyclopentadienyl)(cyclododecylamido)titanium dimethyl, dimethylsilyl(3-ethyl-4-methylcyclopentadienyl)(exo-2-norbornylamido)titanium dimethyl, dimethylsilyl(3-ethyl-4-methylcyclopentadienyl)(cyclohexylamido)titanium dimethyl, dimethylsilyl(3-ethyl-4-methylcyclopentadienyl)(1-adamantylamido)titanium dimethyl, dimethylsilyl(3-ethyl-4-methylcyclopentadienyl)(t-butylamido)titanium dimethyl, dimethylsilyl(2-ethyl-3-hexyl-5-methyl-4-octylcyclopentadienyl)(cyclododecylamido)titanium dimethyl, dimethylsilyl(2-ethyl-3-hexyl-5-methyl-4-octylcyclopentadienyl)(exo-2-norbornylamido)titanium dimethyl, dimethylsilyl(2-ethyl-3-hexyl-5-methyl-4-octylcyclopentadienyl)(cyclohexylamido)titanium dimethyl, dimethylsilyl(2-ethyl-3-hexyl-5-methyl-4-octylcyclopentadienyl)(1-adamantylamido)titanium dimethyl, dimethylsilyl(2-ethyl-3-hexyl-5-methyl-4-octylcyclopentadienyl)(t-butylamido)titanium dimethyl, dimethylsilyl(2-tetrahydroindenyl)(cyclododecylamido)titanium dimethyl, dimethylsilyl(2-tetrahydroindenyl)(exo-2-norbornylamido)titanium dimethyl, dimethylsilyl(2-tetrahydroindenyl)(cyclohexylamido)titanium dimethyl, dimethylsilyl(2-tetrahydroindenyl)(1-adamantylamido)titanium dimethyl, dimethylsilyl(2-tetrahydroindenyl)(t-butylamido)titanium dimethyl and the like.

The most preferred species are: dimethylsilyl(tetramethylcyclopentadienyl)(cyclododecylamido)titanium dichloride, dimethylsilyl(tetramethylcyclopentadienyl)(t-butylamido)titanium dichloride, dimethylsilyl(tetramethylcyclopentadienyl)(cyclohexylamido)titanium dichloride, dimethylsilyl(tetramethylcyclopentadienyl)(1-adamantylamido)titanium dichloride, dimethylsilyl(tetramethylcyclopentadienyl)(exo-2-norbornylamido)titanium dichloride, dimethylsilyl(tetramethylcyclopentadienyl)(cyclododecylamido)titanium dimethyl, dimethylsilyl(tetramethylcyclopentadienyl)(t-butylamido)titanium dimethyl, dimethylsilyl(tetramethylcyclopentadienyl)(cyclohexylamido)titanium dimethyl, dimethylsilyl(tetramethylcyclopentadienyl)(1-adamantylamido)titanium dimethyl, and dimethylsilyl(tetramethylcyclopentadienyl)(exo-2-norbornylamido)titanium dimethyl.

Additionally, at higher reaction temperatures, some catalysts that produce syndiotactic poly-alpha-olefin at lower temperatures, will produce virtually non-crystalline poly-alpha-olefins at higher temperatures. The choice of transition metal component for this amorphous polymer fraction is a subset of the transition metal component of equations 8-9. Preferred components of this type are illustrated in equation 19:

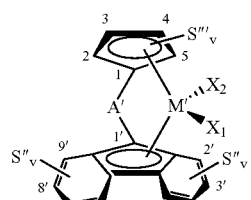

(19)

wherein A', M, $X_1$ and $X_2$ are as previously defined. Substituents $S''_v$ and $S'''_v$ are independently defined as $S''$ in equations 8-9 where the subscript "v" denotes the carbon atom on the Cp-ring or Flu-ring (fluorenyl-ring) to which the substituent is bonded.

Preferably metallocene precursors for producing poly-alpha-olefins having largely amorphous character (when used as catalysts under higher reactor temperature conditions) are those of Equation 19 where $S'''_v$ are independently chosen such that the metallocene framework has a plane of symmetry containing the metal center and bisecting the Flu- and Cp-rings. The A' ligand need not be symmetrical—for example dimethylsilyl or methylphenylsilyl will not effect the stereochemisty of the polymer produced. Substituent $S'''_v$ is defined to be the same as $S''$ in equation 8-9 where the subscript "v" denotes the carbon atom on the cyclopentadienyl ring to which the substituent is bonded and where there can be zero, two or four substituents, $S'''$, on the cyclopentadienyl ring provided that the cyclopentadienyl ring is symmetrically substituted. Symmetrically substituted is defined to mean that the cyclopentadienyl ring is substituted in the 2 and 5 positions and/or 3 and 4 positions with $S'''$ groups that are of approximately of the same steric bulk. Typically the size of these $S'''$ groups are within 2 carbons of each other. Thus a cyclopentadienyl substituted at the 2 and the 5 positions with methyl and ethyl respectively, or substituted at the 3 and the 4 positions with hexyl and octyl, respectively, would be considered symmetric. Likewise, the cyclopentadienyl ring may be substituted at all four sites with $S'''$ groups and be considered symmetric as long as each of the symmetrical pairs are of similar steric bulk. Additionally, two adjacent $S'''$-groups in the 3 and 4 position may be linked to form a ring provided that the new ring is also symmetrically substituted. Because of the distant placement of the $S''_v$ substituents on the fluorenyl ring, these substitutents need not be symmetrically placed on the fluorenyl ring. Hence, the fluorenyl ring may be substituted with form 0-7 substituents that may be the same or different. Two or more adjacent $S''$-groups may optionally be linked to form a ring.

Preferred metallocene transition metal compounds which, according to the present invention, provide catalyst systems which are specific to the production of amorphous or low crystallinity poly-alpha-olefins include: isopropylidene(cyclopentadienyl)(fluorenyl)zirconium dichloride, isopropylidene(cyclopentadienyl)(fluorenyl)zirconium dimethyl, methylene(cyclopentadienyl)(fluorenyl)zirconium dichloride, methylene(cyclopentadienyl)(fluorenyl)zirconium dimethyl, diphenylmethylene(cyclopentadienyl)(fluorenyl)zirconium dichloride, diphenylmethylene(cyclopentadienyl)(fluorenyl)zirconium dimethyl, di(p-triethylsilylphenyl)methylene(cyclopentadienyl)(fluorenyl)zirconium dichloride, di(p-triethylsilylphenyl)methylene(cyclopentadienyl)(fluorenyl)zirconium dimethyl, di(p-trimethylsilylphenyl)methylene(cyclopentadienyl)(fluorenyl)zirconium dichloride, di(p-trimethylsilylphenyl)methylene(cyclopentadienyl)(fluorenyl)zirconium dimethyl, diphenylsilyl(cyclopentadienyl)(fluorenyl)zirconium dichloride, diphenylsilyl(cyclopentadienyl)(fluorenyl)zirconium dimethyl, dimethylsilyl(cyclopentadienyl)(fluorenyl)zirconium dichloride, dimethylsilyl(cyclopentadienyl)(fluorenyl)zirconium dimethyl, methylphenylsilyl(cyclopentadienyl)(fluorenyl)zirconium dichloride, methylphenylsilyl(cyclopentadienyl)(fluorenyl)zirconium dimethyl, isopropylidene(cyclopentadienyl)(fluorenyl)hafnium dichloride, isopropylidene(cyclopentadienyl)(fluorenyl)hafnium dimethyl, methylene(cyclopentadienyl)(fluorenyl)hafnium dichloride, methylene(cyclopentadienyl)(fluorenyl)hafnium dimethyl, diphenylmethylene(cyclopentadienyl)(fluorenyl)hafnium dichloride, diphenylmethylene(cyclopentadienyl)(fluorenyl)hafnium dimethyl, di(p-triethylsilylphenyl)methylene(cyclopentadienyl)(fluorenyl)hafnium dichloride, di(p-triethylsilylphenyl)methylene(cyclopentadienyl)(fluorenyl)hafnium dimethyl, di(p-trimethylsilylphenyl)methylene(cyclopentadienyl)(fluorenyl)hafnium dichloride, di(p-trimethysilylphenyl)methylene(cyclopentadienyl)(fluorenyl)hafnium dimethyl, diphenylsilyl(cyclopentadienyl)(fluorenyl)hafnium dichloride, diphenylsilyl(cyclopentadienyl)(fluorenyl)hafnium dimethyl, dimethylsilyl(cyclopentadienyl)(fluorenyl)hafnium dichloride, dimethylsilyl(cyclopentadienyl)(fluorenyl)hafnium dimethyl, methylphenylsilyl(cyclopentadienyl)(fluorenyl)hafnium dichloride, methylphenylsilyl(cyclopentadienyl)(fluorenyl)hafnium dimethyl, isopropylidene(cyclopentadienyl)(3,8-di-t-butylfluorenyl)zirconium dichloride, isopropylidene(cyclopentadienyl)(3,8-di-t-butylfluorenyl)zirconium dimethyl, methylene(cyclopentadienyl)(3,8-di-t-butylfluorenyl)zirconium dichloride, methylene(cyclopentadienyl)(3,8-di-t-butylfluorenyl)zirconium dimethyl, diphenylmethylene(cyclopentadienyl)(3,8-di-t-butylfluorenyl)zirconium dichloride, diphenylmethylene(cyclopentadienyl)(3,8-di-t-butylfluorenyl)zirconium dimethyl, di(p-triethylsilylphenyl)methylene(cyclopentadienyl)(3,8-di-t-butylfluorenyl)zirconium dichloride, di(p-triethylsilylphenyl)methylene(cyclopentadienyl)(3,8-di-t-butylfluorenyl)zirconium dimethyl, di(p-trimethylsilylphenyl)methylene(cyclopentadienyl)(3,8-di-t-butylfluorenyl)zirconium dichloride, di(p-trimethylsilylphenyl)methylene(cyclopentadienyl)(3,8-di-t-butylfluorenyl)zirconium dimethyl, diphenylsilyl(cyclopentadienyl)(3,8-di-t-butylfluorenyl)zirconium dichloride, diphenylsilyl(cyclopentadienyl)(3,8-di-t-butylfluorenyl)zirconium dimethyl, dimethylsilyl(cyclopentadienyl)(3,8-di-t-butylfluorenyl)zirconium dichloride, dimethylsilyl(cyclopentadienyl)(3,8-di-t-butylfluorenyl)zirconium dimethyl, methylphenylsilyl(cyclopentadienyl)(3,8-di-t-butylfluorenyl)zirconium dichloride, methylphenylsilyl(cyclopentadienyl)(3,8-di-t-butylfluorenyl)zirconium dimethyl, isopropylidene(cyclopentadienyl)(3,8-di-t-butylfluorenyl)hafnium dichloride, isopropylidene(cyclopentadienyl)(3,8-di-t-butylfluorenyl)hafnium dimethyl, methylene(cyclopentadienyl)(3,8-di-t-butylfluorenyl)hafnium dichloride, methylene(cyclopentadienyl)(3,8-di-t-butylfluorenyl)hafnium dimethyl, diphenylmethylene(cyclopentadienyl)(3,8-di-t-butylfluorenyl)hafnium dichloride, diphenylmethylene(cyclopentadienyl)(3,8-di-t-butylfluorenyl)hafnium dimethyl, di(p-triethylsilylphenyl)methylene(cyclopentadienyl)(3,8-di-t-butylfluorenyl)hafnium dichloride, di(p-triethylsilylphenyl)methylene(cyclopentadienyl)(3,8-di-t-butylfluorenyl)hafnium dimethyl, di(p-trimethylsilylphenyl)methylene(cyclopentadienyl)(3,8-di-t-butylfluorenyl)hafnium dichloride, di(p-trimethylsilylphenyl)methylene(cyclopentadienyl)(3,8-di-t-butylfluorenyl)hafnium dimethyl, diphenylsilyl(cyclopentadienyl)(3,8-di-t-butylfluorenyl)hafnium dichloride, diphenylsilyl(cyclopentadienyl)(3,8-di-t-butylfluorenyl)hafnium dimethyl, dimethylsilyl(cyclopentadienyl)(3,8-di-t-butylfluorenyl)hafnium dichloride, dimethylsilyl(cyclopentadienyl)(3,8-di-t-butylfluorenyl)hafnium dimethyl, methylphenylsilyl(cyclopentadienyl)(3,8-di-t-butylfluorenyl)hafnium dichloride, methylphenylsilyl(cyclopentadienyl)(3,8-di-t-butylfluorenyl)hafnium dimethyl, isopropylidene(cyclopentadienyl)(3,3,6,6,9,9,12,12-octamethyl-4,4,5,5,8,8,9,9-octahydrodibenzyl[b,h]fluorenyl)zirconium dichloride, isopropylidene(cyclopentadienyl)(3,3,6,6,9,9,12,12-octamethyl-4,4,5,5,8,8,9,9-octahydrodibenzyl[b,h]fluorenyl)zirconium dimethyl, methylene(cyclopentadienyl)(3,3,6,6,9,9,12,12-octamethyl-4,4,5,5,8,8,9,9-octahydrodibenzyl[b,h]fluorenyl)zirconium dichloride, methylene(cyclopentadienyl)(3,3,6,6,9,9,12,12-octamethyl-4,4,5,5,8,8,9,9-octahydrodibenzyl[b,h]fluorenyl)zirconium dimethyl, diphenylmethylene(cyclopentadienyl)(3,3,6,6,9,9,12,12-octamethyl-4,4,5,5,8,8,9,9-octahydrodibenzyl[b,h]fluorenyl)zirconium dichloride, diphenylmethylene(cyclopentadienyl)(3,3,6,6,9,9,12,12-octamethyl-4,4,5,5,8,8,9,9-octahydrodibenzyl[b,h]fluorenyl)zirconium dimethyl, di(p-triethylsilylphenyl)methylene(cyclopentadienyl)(3,3,6,6,9,9,12,12-octamethyl-4,4,5,5,8,8,9,9-octahydrodibenzyl[b,h]fluorenyl)zirconium dichloride, di(p-triethylsilylphenyl)methylene(cyclopentadienyl)(3,3,6,6,9,9,12,12-octamethyl-4,4,5,5,8,8,9,9-octahydrodibenzyl[b,h]fluorenyl)zirconium dimethyl, di(p-trimethylsilylphenyl)methylene(cyclopentadienyl)(3,3,6,6,9,9,12,12-octamethyl-4,4,5,5,8,8,9,9-octahydrodibenzyl[b,h]fluorenyl)zirconium dichloride, di(p-trimethylsilylphenyl)methylene(cyclopentadienyl)(3,3,6,6,9,9,12,12-octamethyl-4,4,5,5,8,8,9,9-octahydrodibenzyl[b,h]fluorenyl)zirconium dimethyl, diphenylsilyl(cyclopentadienyl)(3,3,6,6,9,9,12,12-octamethyl-4,4,5,5,8,8,9,9-octahydrodibenzyl[b,h]fluorenyl)zirconium dichloride, diphenylsilyl(cyclopentadienyl)(3,3,6,6,9,9,12,12-octamethyl-4,4,5,5,8,8,9,9-octahydrodibenzyl[b,h]fluorenyl)zirconium dimethyl, dimethylsilyl(cyclopentadienyl)(3,3,6,6,9,9,12,12-octamethyl-4,4,5,5,8,8,9,9-octahydrodibenzyl[b,h]fluorenyl)zirconium dichloride, dimethylsilyl(cyclopentadienyl)(3,3,6,6,9,9,12,12-octamethyl-4,4,5,5,8,8,9,9-octahydrodibenzyl[b,h]fluorenyl)zirconium dimethyl, methylphenylsilyl(cyclopentadienyl)(3,3,6,6,9,9,12,12-octamethyl-4,4,5,5,8,8,9,9-octahydrodibenzyl[b,h]fluorenyl)zirconium dichloride, methylphenylsilyl(cyclopentadienyl)(3,3,6,6,9,9,12,12-octamethyl-4,4,5,5,8,8,9,9-octahydrodibenzyl[b,h]fluorenyl)zirconium dimethyl, isopropylidene(cyclopentadienyl)(3,3,6,6,9,9,12,12-octamethyl-4,4,5,5,8,8,9,9-octahydrodibenzyl[b,h]fluorenyl)hafnium dichloride, isopropylidene(cyclopentadienyl)(3,3,6,6,9,9,12,12-octamethyl-4,4,5,5,8,8,9,9-octahydrodibenzyl[b,h]fluorenyl)hafnium dimethyl, methylene(cyclopentadienyl)(3,3,6,6,9,9,12,12-octamethyl-4,4,5,5,8,8,9,9-octahydrodibenzyl[b,h]fluorenyl)hafnium dichloride, methylene(cyclopentadienyl)(3,3,6,6,9,9,12,12-octamethyl-4,4,5,5,8,8,9,9-octahydrodibenzyl[b,h]fluorenyl)hafnium dimethyl, diphenylmethylene(cyclopentadienyl)(3,3,6,6,9,9,12,12-octamethyl-4,4,5,5,8,8,9,9-octahydrodibenzyl[b,h]fluorenyl)hafnium dichloride, diphenylmethylene(cyclopentadienyl)(3,3,6,6,9,9,12,12-octamethyl-4,4,5,5,8,8,9,9-octahydrodibenzyl[b,h]fluorenyl)hafnium dimethyl, di(p-triethylsilylphenyl)methylene(cyclopentadienyl)(3,3,6,6,9,9,12,12-octamethyl-4,4,5,5,8,8,9,9-octahydrodibenzyl[b,h]fluorenyl)hafnium dichloride, di(p-triethylsilylphenyl)methylene(cyclopentadienyl)(3,3,6,6,9,9,12,12-octamethyl-4,4,5,5,8,8,9,9-octahydrodibenzyl[b,h]fluorenyl)hafnium dimethyl, di(p-trimethylsilylphenyl)methylene(cyclopentadienyl)(3,3,6,6,9,9,12,12-octamethyl-4,4,5,5,8,8,9,9-octahydrodibenzyl[b,h]fluorenyl)hafnium dichloride, di(p-trimethylsilylphenyl)methylene(cyclopentadienyl)(3,3,6,6,9,9,12,12-octamethyl-4,4,5,5,8,8,9,9-octahydrodibenzyl[b,h]fluorenyl)hafnium dimethyl, diphenylsilyl(cyclopentadienyl)(3,3,6,6,9,9,12,12-octamethyl-4,4,5,5,8,8,9,9-octahydrodibenzyl[b,h]fluorenyl)hafnium dichloride, diphenylsilyl(cyclopentadienyl)(3,3,6,6,9,9,12,12-octamethyl-4,4,5,5,8,8,9,9-octahydrodibenzyl[b,h]fluorenyl)hafnium dimethyl, dimethylsilyl(cyclopentadienyl)(3,3,6,6,9,9,12,12-octamethyl-4,4,5,5,8,8,9,9-octahydrodibenzyl[b,h]fluorenyl)hafnium dichloride, dimethylsilyl(cyclopentadienyl)(3,3,6,6,9,9,12,12-octamethyl-4,4,5,5,8,8,9,9-octahydrodibenzyl[b,h]fluorenyl)hafnium dimethyl, methylphenylsilyl(cyclopentadienyl)(3,3,6,6,9,9,12,12-octamethyl-4,4,5,5,8,8,9,9-octahydrodibenzyl[b,h]fluorenyl)hafnium dichloride, methylphenylsilyl(cyclopentadienyl)(3,3,6,6,9,9,12,12-octamethyl-4,4,5,5,8,8,9,9-octahydrodibenzyl[b,h]fluorenyl)hafnium dimethyl, and the like.

The most preferred species are: di(p-triethylsilylphenyl)methylene(cyclopentadienyl)(3,8-di-t-butylfluorenyl)zirconium dichloride, di(p-triethylsilylphenyl)methylene(cyclopentadienyl)(3,8-di-t-butylfluorenyl)hafnium dichloride, di(p-triethylsilylphenyl)methylene(cyclopentadienyl)(3,8-di-t-butylfluorenyl)zirconium dimethyl, di(p-triethylsilylphenyl)methylene(cyclopentadienyl)(3,8-di-t-butylfluorenyl)hafnium dimethyl, di(p-triethylsilylphenyl)methylene(cyclopentadienyl)(3,3,6,6,9,9, 12,12-octamethyl-4,4,5,5,8,8,9,9-octahydrodibenzyl[b,h]fluorenyl)zirconium dichloride, di(p-triethylsilylphenyl)methylene(cyclopentadienyl)(3,3,6,6,9,9,12,12-octamethyl-4,4,5,5,8,8,9,9-octahydrodibenzyl[b,h]fluorenyl)hafnium dichloride, di(p-triethylsilylphenyl)methylene(cyclopentadienyl)(3,3,6,6,9,9,12,12-octamethyl-4,4,5,5,8,8,9,9-octahydrodibenzyl[b,h]fluorenyl)zirconium dimethyl, and di(p-triethylsilylphenyl)methylene(cyclopentadienyl)(3,3,6,6,9,9,12,12-octamethyl-4,4,5,5,8,8,9,9-octahydrodibenzyl[b,h]fluorenyl)hafnium dimethyl.

Additionally, compounds of formula 20 may be used to produce the amorphous polymer fraction.

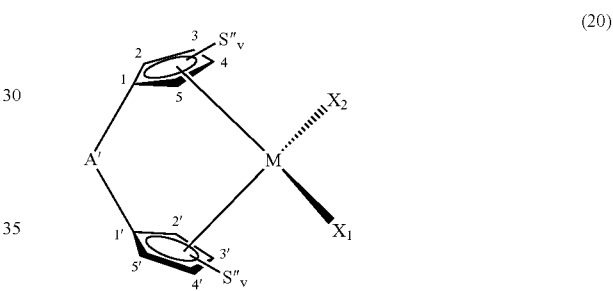

(20)

In this case, $S''_v$ are independently chosen such that the metallocene framework has a plane of symmetry that bisects M and A'. Substituents $S''_v$ are independently defined to be the same as $S''$ in equation 8-9 where the subscript "v" denotes the carbon atom on the cyclopentadienyl ring to which the substituent is bonded and where there can be zero to four substituents, $S''$, on the cyclopentadienyl ring provided that the cyclopentadienyl ring is symmetrically substituted. Symmetrically substituted is defined to mean that the cyclopentadienyl ring is substituted in the 2 and 2' positions and/or 3 and 3' positions and/or 4 and 4' positions and/or 5 and 5' positions with $S''$ groups that are of approximately of the same steric bulk. Typically the size of these $S''$ groups are within 2 carbons of each other. Thus a cyclopentadienyl substituted at the 2 and the 2' positions with methyl and ethyl respectively, or substituted at the 3 and the 3' positions with hexyl and octyl, respectively, would be considered symmetric. Likewise, the cyclopentadienyl ring may be substituted at all four sites with $S''$ groups and be considered symmetric as long as each of the symmetrical pairs are of similar steric bulk. Additionally, two adjacent $S''$-groups may be linked to form a ring provided that the new ring is also symmetrically substituted. Such complexes such as meso-Me$_2$Si(indenyl)$_2$ZrMe$_2$ meso-CH$_2$CH$_2$(indenyl)$_2$ZrCl$_2$ are well known in the art and generally produce amorphous polymers useful in this invention.

Preferred meso-metallocene compounds which, according to the present invention, provide catalyst systems which are specific to the production of amorphous poly-alpha-olefins include the meso versions of: dimethylsilylbis(indenyl)zirconium dichloride, dimethylsilylbis(indenyl)zirconium dimethyl, diphenylsilylbis(indenyl)zirconium dichloride, diphenylsilylbis(indenyl)zirconium dimethyl, methylphenylsilylbis(indenyl)zirconium dichloride, methylphenylsilylbis(indenyl)zirconium dimethyl, ethylenebis(indenyl)zirconium dichloride, ethylenebis(indenyl)zirconium dimethyl, methylenebis(indenyl)zirconium dichloride, methylenebis(indenyl)zirconium dimethyl, dimethylsilylbis(indenyl)hafnium dichloride, dimethylsilylbis(indenyl)hafnium dimethyl, diphenylsilylbis(indenyl)hafnium dichloride, diphenylsilylbis(indenyl)hafnium dimethyl, methylphenylsilylbis(indenyl)hafnium dichloride, methylphenylsilylbis(indenyl)hafnium dimethyl, ethylenebis(indenyl)hafnium dichloride, ethylenebis(indenyl)hafnium dimethyl, methylenebis(indenyl)hafnium dichloride, methylenebis(indenyl)hafnium dimethyl, dimethylsilylbis(tetrahydroindenyl)zirconium dichloride, dimethylsilylbis(tetrahydroindenyl)zirconium dimethyl, diphenylsilylbis(tetrahydroindenyl)zirconium dichloride, diphenylsilylbis(tetrahydroindenyl)zirconium dimethyl, methylphenylsilylbis(tetrahydroindenyl)zirconium dichloride, methylphenylsilylbis(tetrahydroindenyl)zirconium dimethyl, ethylenebis(tetrahydroindenyl)zirconium dichloride, ethylenebis(tetrahydroindenyl)zirconium dimethyl, methylenebis(tetrahydroindenyl)zirconium dichloride, methylenebis(tetrahydroindenyl)zirconium dimethyl, dimethylsilylbis(tetrahydroindenyl)hafnium dichloride, dimethylsilylbis(tetrahydroindenyl)hafnium dimethyl, diphenylsilylbis(tetrahydroindenyl)hafnium dichloride, diphenylsilylbis(tetrahydroindenyl)hafnium dimethyl, methylphenylsilylbis(tetrahydroindenyl)hafnium dichloride, methylphenylsilylbis(tetrahydroindenyl)hafnium dimethyl, ethylenebis(tetrahydroindenyl)hafnium dichloride, ethylenebis(tetrahydroindenyl)hafnium dimethyl, methylenebis(tetrahydroindenyl)hafnium dichloride, methylenebis(tetrahydroindenyl)hafnium dimethyl, dimethylsilylbis(2-methylindenyl)zirconium dichloride, dimethylsilylbis(2-methylindenyl)zirconium dimethyl, diphenylsilylbis(2-methylindenyl)zirconium dichloride, diphenylsilylbis(2-methylindenyl)zirconium dimethyl, methylphenylsilylbis(2-methylindenyl)zirconium dichloride, methylphenylsilylbis(2-methylindenyl)zirconium dimethyl, ethylenebis(2-methylindenyl)zirconium dichloride, ethylenebis(2-methylindenyl)zirconium dimethyl, methylenebis(2-methylindenyl)zirconium dichloride, methylenebis(2-methylindenyl)zirconium dimethyl, dimethylsilylbis(2-methylindenyl)hafnium dichloride, dimethylsilylbis(2-methylindenyl)hafnium dimethyl, diphenylsilylbis(2-methylindenyl)hafnium dichloride, diphenylsilylbis(2-methylindenyl)hafnium dimethyl, methylphenylsilylbis(2-methylindenyl)hafnium dichloride, methylphenylsilylbis(2-methylindenyl)hafnium dimethyl, ethylenebis(2-methylindenyl)hafnium dichloride, ethylenebis(2-methylindenyl)hafnium dimethyl, methylenebis(2-methylindenyl)hafnium dichloride, methylenebis(2-methylindenyl)hafnium dimethyl, dimethylsilylbis(2-methyl-4-phenylindenyl)zirconium dichloride, diphenylsilylbis(2-methyl-4-phenylindenyl)zirconium dimethyl, diphenylsilylbis(2-methyl-4-phenylindenyl)zirconium dichloride, diphenylsilylbis(2-methyl-4-phenylindenyl)zirconium dimethyl, methylphenylsilylbis(2-methyl-4-phenylindenyl)zirconium dichloride, methylphenylsilylbis(2-methyl-4-phenylindenyl)zirconium dimethyl, ethylenebis(2-methyl-4-phenylindenyl)zirconium dichloride, ethylenebis(2-methyl-4-phenylindenyl)zirconium dimethyl, methylenebis(2-methyl-4-phenylindenyl)zirconium dichloride, methylenebis(2-methyl-4-phenylindenyl)zirconium dimethyl, dimethylsilylbis(2-methyl-4-phenylindenyl)hafnium dichloride, dimethylsilylbis(2-methyl-4-phenylindenyl)hafnium dimethyl, diphenylsilylbis(2-methyl-4-phenylindenyl)hafnium dichloride, diphenylsilylbis(2-methyl-4-phenylindenyl)hafnium dimethyl, methylphenylsilylbis(2-methyl-4-phenylindenyl)hafnium dichloride, methylphenylsilylbis(2-methyl-4-phenylindenyl)hafnium dimethyl, ethylenebis(2-methyl-4-phenylindenyl)hafnium dichloride, ethylenebis(2-methyl-4-phenylindenyl)hafnium dimethyl, methylenebis(2-methyl-4-phenylindenyl)hafnium dichloride, methylenebis(2-methyl-4-phenylindenyl)hafnium dimethyl, dimethylsilylbis(4,7-dimethylindenyl)zirconium dichloride, dimethylsilylbis(4,7-dimethylindenyl)zirconium dimethyl, diphenylsilylbis(4,7-dimethylindenyl)zirconium dichloride, diphenylsilylbis(4,7-dimethylindenyl)zirconium dimethyl, methylphenylsilylbis(4,7-dimethylindenyl)zirconium dichloride, methylphenylsilylbis(4,7-dimethylindenyl)zirconium dimethyl, ethylenebis(4,7-dimethylindenyl)zirconium dichloride, ethylenebis(4,7-dimethylindenyl)zirconium dimethyl, methylenebis(4,7-dimethylindenyl)zirconium dichloride, methylenebis(4,7-dimethylindenyl)zirconium dimethyl, dimethylsilylbis(4,7-dimethylindenyl)hafnium dichloride, dimethylsilylbis(4,7-dimethylindenyl)hafnium dimethyl, diphenylsilylbis(4,7-dimethylindenyl)hafnium dichloride, diphenylsilylbis(4,7-dimethylindenyl)hafnium dimethyl, methylphenylsilylbis(4,7-dimethylindenyl)hafnium dichloride, methylphenylsilylbis(4,7-dimethylindenyl)hafnium dimethyl, ethylenebis(4,7-dimethylindenyl)hafnium dichloride, ethylenebis(4,7-dimethylindenyl)hafnium dimethyl, methylenebis(4,7-dimethylindenyl)hafnium dichloride, methylenebis(4,7-dimethylindenyl)hafnium dimethyl, and the like.

The most preferred species are the racemic versions of: dimethylsilylbis(indenyl)zirconium dichloride, dimethylsilylbis(indenyl)zirconium dimethyl, ethylenebis(indenyl)zirconium dichloride, ethylenebis(indenyl)zirconium dimethyl, dimethylsilylbis(indenyl)hafnium dichloride, dimethylsilylbis(indenyl)hafnium dimethyl, ethylenebis(indenyl)hafnium dichloride, ethylenebis(indenyl)hafnium dimethyl, dimethylsilylbis(tetrahydroindenyl)zirconium dichloride, dimethylsilylbis(tetrahydroindenyl)zirconium dimethyl, ethylenebis(tetrahydroindenyl)zirconium dichloride, ethylenebis(tetrahydroindenyl)zirconium dimethyl, dimethylsilylbis(tetrahydroindenyl)hafnium dichloride, dimethylsilylbis(tetrahydroindenyl)hafnium dimethyl, ethylenebis(tetrahydroindenyl)hafnium dichloride, ethylenebis(tetrahydroindenyl)hafnium dimethyl, dimethylsilylbis(2-methylindenyl)zirconium dichloride, dimethylsilylbis(2-methylindenyl)zirconium dimethyl, ethylenebis(2-methylindenyl)zirconium dichloride, ethylenebis(2-methylindenyl)zirconium dimethyl, dimethylsilylbis(2-methylindenyl)hafnium dichloride, dimethylsilylbis(2-methylindenyl)hafnium dimethyl, ethylenebis(2-methylindenyl)hafnium dichloride, and ethylenebis(2-methylindenyl)hafnium dimethyl When two transition metal compound based catalysts are used in one reactor as a mixed catalyst system, the two transition metal compounds should be chosen such that the two are compatible. A simple screening method such as by $^1$H or $^{13}$C NMR, known to those of ordinary skill in the art, can be used to determine which transition metal compounds are compatible.

It is preferable to use the same activator for the transition metal compounds, however, two different activators, such as a non-coordinating anion activator and an alumoxane, can be used in combination. If one or more transition metal compounds contain an $X_1$ or $X_2$ ligand which is not a hydride, hydrocarbyl, or substituted hydrocarbyl, then the alumoxane should be contacted with the transition metal compounds prior to addition of the non-coordinating anion activator.

Particularly preferred combinations of transition metal compounds include:

(1) $Me_2Si(Me_4C_5)(N-c-C_{12}H_{23})TiCl_2$ and rac-$Me_2Si(2-Me-4-PhInd)_2ZrCl_2$ (2-Me-4-PhInd=2-methyl-4-phenylindenyl, c-$C_{12}H_{23}$=cyclododecyl, $Me_4C_5$-tetramethylcyclopentadienyl) activated with an alumoxane, such as methylalumoxane or modified methylalumoxane;

(2) $Me_2Si(Me_4C_5)(N-c-C_{12}H_{23})TiMe_2$ and rac-$Me_2Si(2-Me-4-PhInd)_2ZrMe_2$ activated with a non-coordinating anion activator, such as N,N-dimethylanilinium tetrakis (pentaflourophenyl)boron or triphenylcarbonium tetrakis (pentaflourophenyl)boron;

(3) $Me_2Si(Me_4C_5)(N-c-C_{12}H_{23})TiCl_2$ and rac-$Me_2Si(2-MeInd)_2ZrCl_2$ (2-MeInd=2-methyl-indenyl) activated with an alumoxane, such as methylalumoxane or modified methylalumoxane;

(4) $Me_2Si(Me_4C_5)(N-c-C_{12}H_{23})TiMe_2$ and rac-$Me_2Si(2-MeInd)_2ZrMe_2$ activated with a non-coordinating anion activator, such as N,N-dimethylanilinium tetrakis(pentaflourophenyl)boron or triphenylcarbonium tetrakis(pentaflourophenyl)boron;

(5) $Me_2Si(Me_4C_5)(N-1-adamantyl)TiCl_2$ and rac-$Me_2Si(2-Me-4-PhInd)_2ZrCl_2$ activated with an alumoxane, such as methylalumoxane or modified methylalumoxane;

(6) $Me_2Si(Me_4C_5)(N-1-adamantyl)TiMe_2$ and rac-$Me_2Si(2-Me-4-PhInd)_2ZrMe_2$ activated with a non-coordinating anion activator, such as N,N-dimethylanilinium tetrakis (pentaflourophenyl)boron or triphenylcarbonium tetrakis (pentaflourophenyl)boron;

(7) $Me_2Si(Me_4C_5)(N-1-adamantyl)TiCl_2$ and rac-$Me_2Si(2-MeInd)_2ZrCl_2$ activated with an alumoxane, such as methylalumoxane or modified methylalumoxane;

(8) $Me_2Si(Me_4C_5)(N-1-adamantyl)TiMe_2$ and rac-$Me_2Si(2-MeInd)_2ZrMe_2$ activated with a non-coordinating anion activator, such as N,N-dimethylanilinium tetrakis(pentaflourophenyl)boron or triphenylcarbonium tetrakis(pentaflourophenyl)boron;

(9) $Me_2Si(Me_4C_5)(N-t-butyl)TiCl_2$ and rac-$Me_2Si(2-Me-4-PhInd)_2ZrCl_2$ activated with an alumoxane, such as methylalumoxane or modified methylalumoxane;

(10) $Me_2Si(Me_4C_5)(N-t-butyl)TiMe_2$ and rac-$Me_2Si(2-Me-4-PhInd)_2ZrMe_2$ activated with a non-coordinating anion activator, such as N,N-dimethylanilinium tetrakis(pentaflourophenyl)boron or triphenylcarbonium tetrakis(pentaflourophenyl)boron;

(11) $Me_2Si(Me_4C_5)(N-t-butyl)TiCl_2$ and rac-$Me_2Si(2-MeInd)$ activated with an alumoxane, such as methylalumoxane or modified methylalumoxane;

(12) $Me_2Si(Me_4C_5)(N-t-butyl)TiMe_2$ and rac-$Me_2Si(2-MeInd)_2ZrMe_2$ activated with a non-coordinating anion activator, such as N,N-dimethylanilinium tetrakis(pentaflourophenyl)boron or triphenylcarbonium tetrakis(pentaflourophenyl)boron;

(13) $Me_2Si(Me_4C_5)(N-exo-norbornyl)TiCl_2$ and rac-$Me_2Si(2-Me-4-PhInd)_2ZrCl_2$ activated with an alumoxane, such as methylalumoxane or modified methylalumoxane;

(14) $Me_2Si(Me_4C_5)(N-exo-norbornyl)TiMe_2$ and rac-$Me_2Si(2-Me-4-PhInd)_2ZrMe_2$ activated with a non-coordinating anion activator, such as N,N-dimethylanilinium tetrakis (pentaflourophenyl)boron or triphenylcarbonium tetrakis (pentaflourophenyl)boron;

(15) $Me_2Si(Me_4C_5)(N-exo-norbornyl)TiCl_2$ and rac-$Me_2Si(2-MeInd)_2ZrCl_2$ activated with an alumoxane, such as methylalumoxane or modified methylalumoxane;

(16) $Me_2Si(Me_4C_5)(N-exo-norbornyl)TiMe_2$ and rac-$Me_2Si(2-MeInd)_2ZrMe_2$ activated with a non-coordinating anion activator, such as N,N-dimethylanilinium tetrakis (pentaflourophenyl)boron or triphenylcarbonium tetrakis (pentaflourophenyl)boron;

(17) $(p-Et_3SiPh)_2C(Cp)(3,8-di-t-BuFlu)HfCl_2$ and rac-$Me_2Si(2-Me-4-PhInd)_2ZrCl_2$ (3,8-di-t-BuFlu=3,8-di-tert-butylfluorenyl, Cp=cyclopentadienyl) activated with an alumoxane, such as methylalumoxane or modified methylalumoxane;

(18) $(p-Et_3SiPh)_2C(Cp)(3,8-di-t-BuFlu)HfMe_2$ and rac-$Me_2Si(2-Me-4-PhInd)_2ZrMe_2$ activated with a non-coordinating anion activator, such as N,N-dimethylanilinium tetrakis(pentaflourophenyl)boron or triphenylcarbonium tetrakis(pentaflourophenyl)boron;

(19) $(p-Et_3SiPh)_2C(Cp)(3,8-di-t-BuFlu)HfCl_2$ and rac-$Me_2Si(2-MeInd)_2ZrCl_2$ activated with an alumoxane, such as methylalumoxane or modified methylalumoxane;

(20) $(p-Et_3SiPh)_2C(Cp)(3,8-di-t-BuFlu)HfMe_2$ and rac-$Me_2Si(2-MeInd)_2ZrMe_2$ activated with a non-coordinating anion activator, such as N,N-dimethylanilinium tetrakis(pentaflourophenyl)boron or triphenylcarbonium tetrakis(pentaflourophenyl)boron;

(21) meso-$CH_2CH_2(Ind)_2ZrCl_2$ and rac-$Me_2Si(H_4Ind)_2ZrCl_2$ (Ind=indenyl, $H_4$Ind=tetrahydroindenyl) activated with an alumoxane, such as methylalumoxane or modified methylalumoxane;

(22) meso-$CH_2CH_2(Ind)_2ZrMe_2$ and rac-$Me_2Si(H_4Ind)_2ZrMe_2$ activated with a non-coordinating anion activator, such as N,N-dimethylanilinium tetrakis(pentaflourophenyl)boron or triphenylcarbonium tetrakis(pentaflourophenyl)boron;

(23) meso-$CH_2CH_2(Ind)_2ZrCl_2$ and rac-$Me_2Si(2-MeInd)_2ZrCl_2$ activated with an alumoxane, such as methylalumoxane or modified methylalumoxane;

(24) meso-$CH_2CH_2(Ind)_2ZrMe_2$ and rac-$Me_2Si(2-MeInd)_2ZrMe_2$ activated with a non-coordinating anion activator, such as N,N-dimethylanilinium tetrakis(pentaflourophenyl)boron or triphenylcarbonium tetrakis(pentaflourophenyl)boron;

(25) meso-$Me_2Si(Ind)_2ZrCl_2$ and rac-$Me_2Si(H_4Ind)_2ZrCl_2$ activated with an alumoxane, such as methylalumoxane or modified methylalumoxane;

(26) meso-$Me_2Si(Ind)_2ZrMe_2$ and rac-$Me_2Si(H_4Ind)_2ZrMe_2$ activated with a non-coordinating anion activator, such as N,N-dimethylanilinium tetrakis(pentaflourophenyl)boron or triphenylcarbonium tetrakis(pentaflourophenyl)boron;

(27) meso-$Me_2Si(Ind)_2ZrCl_2$ and rac-$Me_2Si(2-MeInd)_2ZrCl_2$ activated with an alumoxane, such as methylalumoxane or modified methylalumoxane;

(28) meso-$Me_2Si(Ind)_2ZrMe_2$ and rac-$Me_2Si(2-MeInd)_2ZrMe_2$ activated with a non-coordinating anion activator, such as N,N-dimethylanilinium tetrakis(pentaflourophenyl)boron or triphenylcarbonium tetrakis(pentaflourophenyl)boron;

(29) meso-$Me_2Si(2-MeInd)_2ZrCl_2$ and rac-$Me_2Si(2-Me-4-PhInd)_2ZrCl_2$ activated with an alumoxane, such as methylalumoxane or modified methylalumoxane;

(30) meso-$Me_2Si(2-MeInd)_2ZrMe_2$ and rac-$Me_2Si(2-Me-4-PhInd)_2ZrMe_2$ activated with a non-coordinating anion activator, such as N,N-dimethylanilinium tetrakis(pentaflourophenyl)boron or triphenylcarbonium tetrakis(pentaflourophenyl)boron;

(31) meso-Me$_2$Si(2-MeInd)$_2$ZrCl$_2$ and rac-Me$_2$Si(2-MeInd)$_2$ ZrCl$_2$ activated with an alumoxane, such as methylalumoxane or modified methylalumoxane;

(32) meso-Me$_2$Si(2-MeInd)$_2$ZrMe$_2$ and rac-Me$_2$Si(2-MeInd)$_2$ZrMe$_2$ activated with a non-coordinating anion activator, such as N,N-dimethylanilinium tetrakis(pentaflourophenyl)boron or triphenylcarbonium tetrakis(pentaflourophenyl)boron;

(33) meso-CH$_2$CH$_2$(2-MeInd)$_2$ZrCl$_2$ and rac-Me$_2$Si(2-Me-4-PhInd)$_2$ZrCl$_2$ activated with an alumoxane, such as methylalumoxane or modified methylalumoxane;

(34) meso-CH$_2$CH$_2$(2-MeInd)$_2$ZrMe$_2$ and rac-Me$_2$Si(2-Me-4-PhInd)$_2$ZrMe$_2$ activated with a non-coordinating anion activator, such as N,N-dimethylanilinium tetrakis(pentaflourophenyl)boron or triphenylcarbonium tetrakis(pentaflourophenyl)boron;

(35) meso-CH$_2$CH$_2$(2-MeInd)$_2$ZrCl$_2$ and rac-Me$_2$Si(2-MeInd)$_2$ZrCl$_2$ activated with an alumoxane, such as methylalumoxane or modified methylalumoxane;

(36) meso-CH$_2$CH$_2$(2-MeInd)$_2$ZrMe$_2$ and rac-Me$_2$Si(2-MeInd)$_2$ZrMe$_2$ activated with a non-coordinating anion activator, such as N,N-dimethylanilinium tetrakis(pentaflourophenyl)boron or triphenylcarbonium tetrakis(pentaflourophenyl)boron;

(37) meso-Me$_2$Si(2-Me-4-PhInd)$_2$ZrCl$_2$ and rac-Me$_2$Si(2-Me-4-PhInd)$_2$ZrCl$_2$ activated with an alumoxane, such as methylalumoxane or modified methylalumoxane;

(38) meso-Me$_2$Si(2-Me-4-PhInd)$_2$ZrMe$_2$ and rac-Me$_2$Si(2-Me-4-PhInd)$_2$ZrMe$_2$ activated with a non-coordinating anion activator, such as N,N-dimethylanilinium tetrakis(pentaflourophenyl)boron or triphenylcarbonium tetrakis(pentaflourophenyl)boron;

(39) meso-CH$_2$CH$_2$(2-Me-4-PhInd)$_2$ZrCl$_2$ and rac-CH$_2$CH$_2$(2-Me-4-PhInd)$_2$ZrCl$_2$ activated with an alumoxane, such as methylalumoxane or modified methylalumoxane;

(40) meso-CH$_2$CH$_2$(2-Me-4-PhInd)$_2$ZrMe$_2$ and rac-CH$_2$CH$_2$(2-Me-4-PhInd)$_2$ZrMe$_2$ activated with a non-coordinating anion activator, such as N,N-dimethylanilinium tetrakis(pentaflourophenyl)boron or triphenylcarbonium tetrakis(pentaflourophenyl)boron;

(41) meso-CH$_2$CH$_2$(2-MeInd)$_2$ZrCl$_2$ and rac-CH$_2$CH$_2$(2-MePhInd)$_2$ZrCl$_2$ activated with an alumoxane, such as methylalumoxane or modified methylalumoxane;

(42) meso-CH$_2$CH$_2$(2-MeInd)$_2$ZrMe$_2$ and rac-CH$_2$CH$_2$(2-MeInd)$_2$ZrMe$_2$ activated with a non-coordinating anion activator, such as N,N-dimethylanilinium tetrakis(pentaflourophenyl)boron or triphenylcarbonium tetrakis(pentaflourophenyl)boron;

(43) meso-CH$_2$CH$_2$(Ind)$_2$ZrCl$_2$ and rac-CH$_2$CH$_2$(Ind)$_2$ZrCl$_2$ activated with an alumoxane, such as methylalumoxane or modified methylalumoxane;

(44) meso-CH$_2$CH$_2$(Ind)$_2$ZrMe$_2$ and rac-CH$_2$CH$_2$(Ind)$_2$ZrMe$_2$ activated with a non-coordinating anion activator, such as N,N-dimethylanilinium tetrakis(pentaflourophenyl)boron or triphenylcarbonium tetrakis(pentaflourophenyl)boron;

(45) meso-Me$_2$Si(Ind)$_2$ZrCl$_2$ and rac-Me$_2$Si(Ind)$_2$ZrCl$_2$ activated with an alumoxane, such as methylalumoxane or modified methylalumoxane;

(46) meso-Me$_2$Si(Ind)$_2$ZrMe$_2$ and rac-Me$_2$Si(Ind)$_2$ZrMe$_2$ activated with a non-coordinating anion activator, such as N,N-dimethylanilinium tetrakis(pentaflourophenyl)boron or triphenylcarbonium tetrakis(pentaflourophenyl)boron;

(47) meso-CH$_2$CH$_2$(Ind)$_2$ZrCl$_2$ and rac-CH$_2$CH$_2$(4,7-Me$_2$Ind)$_2$ZrCl$_2$ (4,7-Me$_2$Ind=4,7-dimethylindenyl) activated with an alumoxane, such as methylalumoxane or modified methylalumoxane;

(48) meso-CH$_2$CH$_2$(Ind)$_2$ZrMe$_2$ and rac-CH$_2$CH$_2$(4,7-Me$_2$Ind)$_2$ZrMe$_2$ activated with a non-coordinating anion activator, such as N,N-dimethylanilinium tetrakis(pentaflourophenyl)boron or triphenylcarbonium tetrakis(pentaflourophenyl)boron;

(49) meso-Me$_2$Si(Ind)$_2$ZrCl$_2$ and rac-CH$_2$CH$_2$(4,7-Me$_2$Ind)$_2$ZrCl$_2$ activated with an alumoxane, such as methylalumoxane or modified methylalumoxane;

(50) meso-Me$_2$Si(Ind)$_2$ZrMe$_2$ and rac-CH$_2$CH$_2$(4,7-Me$_2$Ind)$_2$ZrMe$_2$ activated with a non-coordinating anion activator, such as N,N-dimethylanilinium tetrakis(pentaflourophenyl)boron or triphenylcarbonium tetrakis(pentaflourophenyl)boron;

(51) meso-CH$_2$CH$_2$(2-MeInd)$_2$ZrCl$_2$ and rac-CH$_2$CH$_2$(4,7-Me$_2$Ind)$_2$ZrCl$_2$ (4,7-Me$_2$Ind=4,7-dimethylindenyl) activated with an alumoxane, such as methylalumoxane or modified methylalumoxane;

(52) meso-CH$_2$CH$_2$(2-MeInd)$_2$ZrMe$_2$ and rac-CH$_2$CH$_2$(4,7-Me$_2$Ind)$_2$ZrMe$_2$ activated with a non-coordinating anion activator, such as N,N-dimethylanilinium tetrakis(pentaflourophenyl)boron or triphenylcarbonium tetrakis(pentaflourophenyl)boron;

(53) meso-Me$_2$Si(2-MeInd)$_2$ZrCl$_2$ and rac-CH$_2$CH$_2$(4,7-Me$_2$Ind)$_2$ZrCl$_2$ activated with an alumoxane, such as methylalumoxane or modified methylalumoxane; and

(54) meso-Me$_2$Si(2-MeInd)$_2$ZrMe$_2$ and rac-CH$_2$CH$_2$(4,7-Me$_2$Ind)$_2$ZrMe$_2$ activated with a non-coordinating anion activator, such as N,N-dimethylanilinium tetrakis(pentaflourophenyl)boron or triphenylcarbonium tetrakis(pentaflourophenyl)boron.

The two transition metal compounds (pre-catalysts) may be used in any ratio. Preferred molar ratios of (A) transition metal compound to produce amorphous polymer to (B) transition metal compound to produce crystalline polymer fall within the range of (A:B) 1:1000 to 1000:1, alternatively 1:100 to 500:1, alternatively 1:10 to 200:1, alternatively 1:1 to 100:1, and alternatively 1:1 to 75:1, and alternatively 5:1 to 50:1. The particular ratio chosen will depend on the exact pre-catalysts chosen, the method of activation, and the end product desired. In a particular embodiment, when using the two pre-catalysts (A-"amorphous polymer producing pre-catalyst" and B-"crystalline polymer producing catalyst"), where both are activated with the same activator, the preferred mole percents, based upon the molecular weight of the pre-catalysts, are 10 to 99.9% A to 0.1 to 90% B, alternatively 25 to 99% A to 0.5 to 50% B, alternatively 50 to 99% A to 1 to 25% B, and alternatively 75 to 99% A to 1 to 10% B.

In general the combined pre-catalyst compounds and the activator are combined in ratios of about 1:10,000 to about 10:1. When alumoxane or aluminum alkyl activators are used, the combined pre-catalyst-to-activator molar ratio is from 1:5000 to 10:1, alternatively from 1:1000 to 10:1; alternatively, 1:500 to 2:1; or 1:300 to 1:1. When ionizing activators are used, the combined pre-catalyst-to-activator molar ratio is from 10:1 to 1:10; 5:1 to 1:5; 2:1 to 1:2; or 1.2:1 to 1:1. Multiple activators may be used, including using mixes of alumoxanes or aluminum alkyls with ionizing activators.

In another preferred embodiment a third catalyst (pre-catalyst plus activator) is present in the processes described above. The third catalyst may be any of the pre-catalyst components listed herein. Preferred third pre-catalysts include those that are capable of producing waxes. Preferred examples include: rac-dimethylsilylbis(4,7-dimethylindenyl)hafnium dichloride, rac-dimethylsilylbis(4,7-dimethylindenyl)hafnium dimethyl, rac-dimethylsilylbis(4,7-dimethylindenyl)zirconium dichloride, rac-dimethylsilylbis(4,7-dimethylindenyl)zirconium dimethyl, rac-dimethylsilylbis(indenyl)hafnium dichloride, rac-dimethylsilylbis(indenyl) hafnium dimethyl, rac-dimethylsilylbis(indenyl)zirconium dichloride, rac-dimethylsilylbis(indenyl)zirconium dimethyl, rac-dimethylsilylbis(tetrahydroindenyl)hafnium dichloride, rac-dimethylsilylbis(tetrahydroindenyl)hafnium dimethyl, rac-dimethylsilylbis(tetrahydroindenyl)zirconium dichloride, rac-dimethylsilylbis(tetrahydroindenyl)zirconium dimethyl, rac-diphenylsilylbis(4,7-dimethylindenyl)hafnium dichloride, rac-diphenylsilylbis(4,7-dimethylindenyl)hafnium dimethyl, rac-diphenylsilylbis(4,7-dimethylindenyl)zirconium dichloride, rac-diphenylsilylbis(4,7-dimethylindenyl)zirconium dimethyl, rac-diphenylsilylbis(indenyl)hafnium dichloride, rac-diphenylsilylbis(indenyl)hafnium dimethyl, rac-diphenylsilylbis(indenyl)zirconium dichloride, rac-diphenylsilylbis(indenyl)zirconium dimethyl, rac-diphenylsilylbis(tetrahydroindenyl)hafnium dichloride, rac-diphenylsilylbis(tetrahydroindenyl)hafnium dimethyl, rac-diphenylsilylbis(tetrahydroindenyl)zirconium dichloride, rac-diphenylsilylbis(tetrahydroindenyl)zirconium dimethyl, rac-methylphenylsilylbis(4,7-dimethylindenyl)hafnium dichloride, rac-methylphenylsilylbis(4,7-dimethylindenyl)hafnium dimethyl, rac-methylphenylsilylbis(4,7-dimethylindenyl)zirconium dichloride, rac-methylphenylsilylbis(4,7-dimethylindenyl)zirconium dimethyl, rac-methylphenylsilylbis(indenyl)hafnium dichloride, rac-methylphenylsilylbis(indenyl)hafnium dimethyl, rac-methylphenylsilylbis(indenyl)zirconium dichloride, rac-methylphenylsilylbis(indenyl)zirconium dimethyl, rac-methylphenylsilylbis(tetrahydroindenyl)hafnium dichloride, rac-methylphenylsilylbis(tetrahydroindenyl)hafnium dimethyl, rac-methylphenylsilylbis(tetrahydroindenyl)zirconium dichloride, rac-methylphenylsilylbis(tetrahydroindenyl)zirconium dimethyl, rac-ethylenebis(4,7-dimethylindenyl)hafnium dichloride, rac-ethylenebis(4,7-dimethylindenyl)hafnium dimethyl, rac-ethylenebis(4,7-dimethylindenyl)zirconium dichloride, rac-ethylenebis(4,7-dimethylindenyl)zirconium dimethyl, rac-ethylenebis(indenyl)hafnium dichloride, rac-ethylenebis(indenyl) hafnium dimethyl, rac-ethylenebis(indenyl)zirconium dichloride, rac-ethylenebis(indenyl)zirconium dimethyl, rac-ethylenebis(tetrahydroindenyl)hafnium dichloride, rac-ethylenebis(tetrahydroindenyl)hafnium dimethyl, rac-ethylenebis(tetrahydroindenyl)zirconium dichloride, and rac-ethylenebis(tetrahydroindenyl)zirconium dimethyl Three transition metal compounds (pre-catalysts) may be used in any ratio. Preferred molar ratios of (A) transition metal compound to produce amorphous polypropylene to (B) transition metal compound to produce crystalline polypropylene to (C) transition metal compound to produce wax fall within the range of (A:B:C) 1:1000:500 to 1000: 1:1, alternatively 1:100:50 to 500:1:1, alternatively 1:10:10 to 200:1:1, alternatively 1:1:1 to 100:1:50, and alternatively 1:1:10 to 75:1:50, and alternatively 5:1:1 to 50:1:50. The particular ratio chosen will depend on the exact pre-catalysts chosen, the method of activation, and the end product desired.

Additional preferred catalysts and process are described in U.S. Pat. Nos. 6,376,410 and 6,380,122, which are incorporated by reference herein.

In another embodiment the catalyst compositions of this invention include a support material or carrier. For example, the one or more catalyst components and/or one or more activators may be deposited on, contacted with, vaporized with, bonded to, or incorporated within, adsorbed or absorbed in, or on, one or more supports or carriers.

The support material is any of the conventional support materials. Preferably the supported material is a porous support material, for example, talc, inorganic oxides and inorganic chlorides. Other support materials include resinous support materials such as polystyrene, functionalized or crosslinked organic supports, such as polystyrene divinyl benzene polyolefins or polymeric compounds, zeolites, clays, or any other organic or inorganic support material and the like, or mixtures thereof.

The preferred support materials are inorganic oxides that include those Group 2, 3, 4, 5, 13 or 14 metal oxides. The preferred supports include silica, which may or may not be dehydrated, fumed silica, alumina (WO 99/60033), silica-alumina and mixtures thereof. Other useful supports include magnesia, titania, zirconia, magnesium chloride (U.S. Pat. No. 5,965,477), montmorillonite (European Patent EP-B 1 0 511 665), phyllosilicate, zeolites, talc, clays (U.S. Pat. No. 6,034,187) and the like. Also, combinations of these support materials may be used, for example, silica-chromium, silica-alumina, silica-titania and the like. Additional support materials may include those porous acrylic polymers described in EP 0 767 184 B 1, which is incorporated herein by reference. Other support materials include nanocomposites as described in PCT WO 99/47598, aerogels as described in WO 99/48605, spherulites as described in U.S. Pat. No. 5,972,510 and polymeric beads as described in WO 99/50311, which are all herein incorporated by reference.

It is preferred that the support material, most preferably an inorganic oxide, has a surface area in the range of from about 10 to about 700 m$^2$/g, pore volume in the range of from about 0.1 to about 4.0 cc/g and average particle size in the range of from about 5 to about 500 µm. More preferably, the surface area of the support material is in the range of from about 50 to about 500 m$^2$/g, pore volume of from about 0.5 to about 3.5 cc/g and average particle size of from about 10 to about 200 µm. Most preferably the surface area of the support material is in the range is from about 100 to about 400 m$^2$/g, pore volume from about 0.8 to about 3.0 cc/g and average particle size is from about 5 to about 100 µm. The average pore size of the carrier useful in the invention typically has pore size in the range of from 10 to 1000 Å, preferably 50 to about 500 Å, and most preferably 75 to about 350 Å.

As is well known in the art, the catalysts may also be supported together on one inert support, or the catalysts may be independently placed on two inert supports and subsequently mixed. Of the two methods, the former is preferred.

In another embodiment the support may comprise one or more types of support material which may be treated differently. For example one could use tow different silicas that had different pore volumes or had been calcined at different temperatures. Likewise one could use a silica that had been treated with a scavenger or other additive and a silica that had not.

The stereospecific catalysts may be used to prepare macromonomer having a Mw of 100,000 or less and a crystallinity of 30% or more preferably having vinyl termini.

As a specific example, a method for preparing propylene-based macromonomers having a high percentage of vinyl terminal bonds involves:

a) contacting, in solution, propylene, optionally a minor amount of copolymerizable monomer, with a catalyst composition containing the stereorigid, activated transition metal catalyst compound at a temperature from about 80° C. to about 140° C.; and b) recovering isotactic or syndiotactic polypropylene chains having number average molecular weights of about 2,000 to about 30,000 Daltons.

Preferably, the solution comprises a hydrocarbon solvent. More preferably, the hydrocarbon solvent is aliphatic or aromatic. Also, the propylene monomers are preferably contacted at a temperature from 90° C. to 120° C. More preferably, a temperature from 95° C. to 115° C. is used. Most preferably, the propylene monomers are contacted at a temperature from 100° C. to 110° C. Reactor pressure generally can vary from atmospheric to 345 MPa, preferably to 182 MPa. The reactions can be run in batch or in continuous mode. Conditions for suitable slurry-type reactions will also be suitable and are similar to solution conditions, the polymerization typically being run in liquid propylene under pressures suitable to such.

The catalyst pair selection criteria were discussed earlier. One catalyst typically is stereospecific with the ability to produce significant population of vinyl-terminated macromonomers, the other typically is a specific and capable of incorporating the reactive macromonomers. In general it is believed that C2 symmetric bulky ligand metallocene catalysts can produce vinyl terminated isotactic polypropylene macromonomers. Catalysts that favor betamethyl-elimination also often appear to also favor isotactic polypropylene macromonomer formation. Rac-dimethylsilyl bis(indenyl) hafnium dimethyl, dimethylsilyl bis(2-methyl-4-phenylindenyl)zirconium dichloride, and rac-ethylene bis(4,7-dimethylindenyl)hafnium dimethyl are catalysts capable of producing isotactic polypropylene having high vinyl chain termination for use in this invention. High temperatures, typically above 80° C., appear to positively influence vinyl termination. Likewise, $Me_2Si(Me_4C_5)(N-c-C_2H_{23})TiMe_2$ and $Me_2Si(Me_4C_5)(N-c-C_{12}H_{23})TiMe_2$ produce amorphous polypropylene useful in this invention and are believed to incorporate the vinyl terminated macromonomers to also produce a grafted structure of scPP side chains on an amorphous backbone.

In alternate embodiments dienes such as 1,9-decadiene are introduced into the reaction zone to promote the production of vinyl-terminated aPP and scPP macromonomers that help increase the population of branch-block species.

Polymerization Processes

The catalysts and catalyst systems described above are suitable for use in a solution, bulk, gas or slurry polymerization process or a combination thereof, preferably solution phase or bulk phase polymerization process.

In one embodiment, this invention is directed toward the solution, bulk, slurry or gas phase polymerization reactions involving the polymerization of one or more of monomers having from 3 to 30 carbon atoms, preferably 3-12 carbon atoms, and more preferably 3 to 8 carbon atoms. Preferred monomers include one or more of propylene, butene-1, pentene-1,4-methyl-pentene-1, hexene-1, octene-1, decene-1,3-methyl-pentene-1, and cyclic olefins or a combination thereof. Other monomers can include vinyl monomers, diolefins such as dienes, polyenes, norbornene, norbornadiene, vinyl norbornene, ethylidene norbornene monomers.

Preferably a homopolymer or copolymer of propylene is produced. In another embodiment, both a homopolymer of propylene and a copolymer of propylene and one or more of the monomers listed above are produced.

One or more reactors in series or in parallel may be used in the present invention. Catalyst component and activator may be delivered as a solution or slurry, either separately to the reactor, activated in-line just prior to the reactor, or preactivated and pumped as an activated solution or slurry to the reactor. A preferred operation is two solutions activated in-line. For more information on methods to introduce multiple catalysts into reactors, please see U.S. Pat. No. 6,399,722, and WO0130862A1. While these references may emphasize gas phase reactors, the techniques described are equally applicable to other types of reactors, including continuous stirred tank reactors, slurry loop reactors and the like. Polymerizations are carried out in either single reactor operation, in which monomer, comonomers, catalyst/activator, scavenger, and optional modifiers are added continuously to a single reactor or in series reactor operation, in which the above components are added to each of two or more reactors connected in series. The catalyst components can be added to the first reactor in the series. The catalyst component may also be added to both reactors, with one component being added to first reaction and another component to other reactors.

In one embodiment 500 ppm or less of hydrogen is added to the polymerization, or 400 ppm or less, or 300 ppm or less. In other embodiments at least 50 ppm of hydrogen is added to the polymerization, or 100 ppm or more, or 150 ppm or more.

Gas Phase Polymerization

Generally, in a fluidized gas bed process used for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See for example U.S. Pat. Nos. 4,543,399, 4,588,790, 5,028,670, 5,317,036, 5,352,749, 5,405,922, 5,436,304, 5,453,471, 5,462,999, 5,616,661 and 5,668,228 all of which are fully incorporated herein by reference.)

Slurry Phase Polymerization

A slurry polymerization process generally operates between 1 to about 50 atmosphere pressure range (15 psi to 735 psi, 103 kPa to 5068 kPa) or even greater and temperatures in the range of 0° C. to about 120° C. In a slurry polymerization, a suspension of solid, particulate polymer is formed in a liquid polymerization diluent medium to which monomer and comonomers along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used the process must be operated above the reaction diluent critical temperature and pressure. Preferably, a hexane or an isobutane medium is employed.

In one embodiment, a preferred polymerization technique useful in the invention is referred to as a particle form polymerization, or a slurry process where the temperature is kept below the temperature at which the polymer goes into solution. Such technique is well known in the art, and described in for instance U.S. Pat. No. 3,248,179 which is fully incorporated herein by reference. The preferred temperature in the particle form process is within the range of about 85° C. to about 110° C. Two preferred polymerization methods for the slurry process are those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484, which is herein fully incorporated by reference.

In another embodiment, the slurry process is carried out continuously in a loop reactor. The catalyst, as a slurry in isobutane or as a dry free flowing powder, is injected regularly to the reactor loop, which is itself filled with circulating slurry of growing polymer particles in a diluent of isobutane containing monomer and comonomer. Hydrogen, optionally, may be added as a molecular weight control. (In one embodiment 500 ppm or less of hydrogen is added, or 400 ppm or less or 300 ppm or less. In other embodiments at least 50 ppm of hydrogen is added, or 100 ppm or more, or 150 ppm or more.)

The reactor is maintained at a pressure of 3620 kPa to 4309 kPa and at a temperature in the range of about 60° C. to about 104° C. depending on the desired polymer melting characteristics. Reaction heat is removed through the loop wall since much of the reactor is in the form of a double-jacketed pipe. The slurry is allowed to exit the reactor at regular intervals or continuously to a heated low pressure flash vessel, rotary dryer and a nitrogen purge column in sequence for removal of the isobutane diluent and all unreacted monomer and comonomers. The resulting hydrocarbon free powder is then compounded for use in various applications.

In another embodiment, the reactor used in the slurry process useful in the invention is capable of and the process useful in the invention is producing greater than 2000 lbs. of polymer per hour (907 Kg/hr), more preferably greater than 5000 lb./hr (2268 Kg/hr), and most preferably greater than 10,000 lbs./hr (4540 Kg/hr). In another embodiment the slurry reactor used in the process useful in the invention is producing greater than 15,000 lbs. of polymer per hour (6804 Kg/hr), preferably greater than 25,000 lbs./hr (11,340 Kg/hr) to about 100,000 lbs./hr (45,500 Kg/hr).

In another embodiment in the slurry process useful in the invention the total reactor pressure is in the range of from 400 psig (2758 kPa) to 800 psig (5516 kPa), preferably 450 psig (3103 kPa) to about 700 psig (4827 kPa), more preferably 500 psig (3448 kPa) to about 650 psig (4482 kPa), most preferably from about 525 psig (3620 kPa) to 625 psig (4309 kPa).

In yet another embodiment in the slurry process useful in the invention the concentration of predominant monomer in the reactor liquid medium is in the range of from about 1 to 10 weight percent, preferably from about 2 to about 7 weight percent, more preferably from about 2.5 to about 6 weight percent, most preferably from about 3 to about 6 weight percent.

Another process useful in the invention is where the process, preferably a slurry process is operated in the absence of or essentially free of any scavengers, such as triethylaluminum, trimethylaluminum, tri-isobutylaluminum and tri-n-hexylaluminum and diethyl aluminum chloride, dibutyl zinc and the like. This process is described in PCT publication WO 96/08520 and U.S. Pat. No. 5,712,352, which are herein fully incorporated by reference.

In another embodiment the process is run with scavengers. Typical scavengers include trimethyl aluminum, tri-isobutyl aluminum and an excess of alumoxane or modified alumoxane.

Homogeneous, Bulk, or Solution Phase Polymerization

The catalysts described herein can be used advantageously in homogeneous solution processes. Generally this involves polymerization in a continuous reactor in which the polymer formed and the starting monomer and catalyst materials supplied, are agitated to reduce or avoid concentration gradients. Suitable processes operate above the melting point of the polymers at high pressures, from 1 to 3000 bar (10-30,000 MPa), in which the monomer acts as diluent or in solution polymerization using a solvent.

Temperature control in the reactor is obtained by balancing the heat of polymerization with reactor cooling by reactor jackets or cooling coils to cool the contents of the reactor, auto refrigeration, pre-chilled feeds, vaporization of liquid medium (diluent, monomers or solvent) or combinations of all three. Adiabatic reactors with pre-chilled feeds may also be used. The reactor temperature depends on the catalyst used. In general, the reactor temperature preferably can vary between about 30° C. and about 160° C., more preferably from about 90° C. to about 150° C., and most preferably from about 100° C. to about 140° C. Polymerization temperature may vary depending on catalyst choice. For example a diimine Ni catalyst may be used at 40° C., while a metallocene Ti catalyst can be used at 100° C. or more. In series operation, the second reactor temperature is preferably higher than the first reactor temperature. In parallel reactor operation, the temperatures of the two reactors are independent. The pressure can vary from about 1 mm Hg to 2500 bar (25,000 MPa), preferably from 0.1 bar to 1600 bar (1-16,000 MPa), most preferably from 1.0 to 500 bar (10-5000 MPa).

In one embodiment 500 ppm or less of hydrogen is added to the polymerization, or 400 ppm or less or 300 ppm or less. In other embodiments at least 50 ppm of hydrogen is added to the polymerization, or 100 ppm or more, or 150 ppm or more.

Each of these processes may also be employed in single reactor, parallel or series reactor configurations. The liquid processes comprise contacting olefin monomers with the above described catalyst system in a suitable diluent or solvent and allowing said monomers to react for a sufficient time to produce the desired polymers. Hydrocarbon solvents are suitable, both aliphatic and aromatic. Alkanes, such as hexane, pentane, isopentane, and octane, are preferred.

The process can be carried out in a continuous stirred tank reactor, batch reactor or plug flow reactor, or more than one reactor operated in series or parallel. These reactors may have or may not have internal cooling or heating and the monomer feed may or may not be refrigerated. See the general disclosure of U.S. Pat. No. 5,001,205 for general process conditions. See also, international application WO 96/33227 and WO 97/22639. All documents are incorporated by reference for US purposes for description of polymerization processes, metallocene selection and useful scavenging compounds.

This invention further relates to a continuous process to prepare an adhesive comprising:

1) combining monomer, optional solvent, catalyst and activator in a reactor system, 2) withdrawing polymer solution from the reactor system, 3) removing at least 10% solvent, if present, from the polymer solution,
4) quenching the reaction,
5) devolatilizing the polymer solution to form molten polymer,
6) combining the molten polymer and one or more additives (such as those described below) in a mixer, such as a static mixer, (in a preferred embodiment tackifier is not added or is added in amounts of less than 30 weight %, preferably less than 20 weight %, more preferably in amounts of less than 10 weight %),
7) removing the polymer combination from the mixer, and
8) pelletizing or drumming the polymer combination; where step 1) comprises any of the processes described above.

In another embodiment this invention relates to a continuous process to prepare an adhesive comprising:
1) combining monomer, optional solvent, catalyst and activator in a reactor system,
2) withdrawing polymer solution from the reactor system,
3) removing at least 10% solvent, if present, from the polymer solution,
4) quenching the reaction,
5) devolatilizing the polymer solution to form molten polymer,
6) combining the molten polymer and one or more additives in a mixer, such as a static mixer,
7) removing the polymer combination from the mixer, and
8) pelletizing or drumming the polymer combination.

In a particularly preferred embodiment, this invention relates to a continuous process to make an adhesive comprising
1) selecting a first catalyst component capable of producing a polymer having an Mw of 100,000 or less and a crystallinity of 20% or less under selected polymerization conditions;
2) selecting a second catalyst component capable of producing polymer having an Mw of 100,000 or less and a crystallinity of 40% or more at the selected polymerization conditions;
3) contacting, in a solvent and in a reaction zone under the selected polymerization conditions, the catalyst components in the presence of one or more activators with one or more C3 to C40 olefins, and, optionally one or more diolefins;
4) at a temperature of greater than 100° C.;
5) at a residence time of 120 minutes or less (preferably 60 to 120 minutes);
6) wherein the ratio of the first catalyst to the second catalyst is from 1:1 to 50:1;
7) wherein the activity of the catalyst components is at least 50 kilograms of polymer per gram of the catalyst components; and wherein at least 20% of the olefins are converted to polymer;
8) withdrawing polymer solution from the reaction zone;
9) removing at least 10% solvent from the polymer solution;
10) quenching the reaction;
11) devolatilizing the polymer solution to form molten polymer;
12) combining the molten polymer and one or more additives in a mixer, such as a static mixer;
13) removing the polymer combination from the mixer; and
14) pelletizing or drumming the polymer combination.

In a particularly preferred embodiment, this invention relates to a continuous process to make an adhesive comprising
1) selecting a first catalyst component capable of producing a polymer having an Mw of 100,000 or less and a crystallinity of 20% or less under selected polymerization conditions;
2) selecting a second catalyst component capable of producing polymer having an Mw of 100,000 or less and a crystallinity of 40% or more at the selected polymerization conditions;
3) contacting, in a solvent and in a reaction zone under the selected polymerization conditions, the catalyst components in the presence of one or more activators with one or more C3 to C40 olefins, and, optionally one or more diolefins;
4) at a temperature of greater than 100° C.;
5) at a residence time of 120 minutes or less;
6) wherein the ratio of the first catalyst to the second catalyst is from 1:1 to 50:1;
7) wherein the activity of the catalyst components is at least 50 kilograms of polymer per gram of the catalyst components; and wherein at least 50% of the olefins are converted to polymer;
8) withdrawing polymer solution from the reaction zone;
9) removing at least 10% solvent from the polymer solution;
10) quenching the reaction;
11) forming molten polymer
where the polymer comprises one or more C3 to C40 olefins, and less than 50 mole % of ethylene, and where the polymer has:
a) a Dot T-Peel of 1 Newton or more; and
b) a branching index (g') of 0.95 or less measured at the Mz of the polymer; and
c) an Mw of 100,000 or less; and
12) combining the molten polymer and one or more additives in a mixer, such as a static mixer;
13) removing the polymer combination from the mixer; and
14) pelletizing or drumming the polymer combination.

In a particularly preferred embodiment, this invention relates to a continuous process to make an adhesive comprising
1) selecting a first catalyst component capable of producing a polymer having an Mw of 100,000 or less and a crystallinity of 20% or less under selected polymerization conditions;
2) selecting a second catalyst component capable of producing polymer having an Mw of 100,000 or less and a crystallinity of 40% or more at the selected polymerization conditions;
3) contacting, in a solvent and in a reaction zone under the selected polymerization conditions, the catalyst components in the presence of one or more activators with one or more C3 to C40 olefins, and, optionally one or more diolefins;
4) at a temperature of greater than 100° C.;
5) at a residence time of 120 minutes or less;
6) wherein the ratio of the first catalyst to the second catalyst is from 1:1 to 50:1;
7) wherein the activity of the catalyst components is at least 50 kilograms of polymer per gram of the catalyst components; and wherein at least 50% of the olefins are converted to polymer;
8) withdrawing polymer solution from the reaction zone;
9) removing at least 10% solvent from the polymer solution;
10) quenching the reaction;
11) forming molten polymer where the polymer comprises one or more C3 to C40 olefins (preferably propylene), and less than 50 mole % of ethylene, and where the polymer has:
a) a Dot T-Peel of 3 Newton or more; and
b) a branching index (g') of 0.90 or less measured at the Mz of the polymer; and
c) an Mw of 30,000 or less;
d) a peak melting point between 60 and 190° C.,
e) a Heat of fusion of 1 to 70 J/g,
f) a melt viscosity of 8000 mPa·sec or less at 190° C.; and
12) combining the molten polymer and one or more additives in a mixer, such as a static mixer;
13) removing the polymer combination from the mixer; and
14) pelletizing or drumming the polymer combination.

In another embodiment this invention relates to a continuous process to prepare an adhesive comprising:
1) combining monomer, catalyst and activator in a reactor system,
2) withdrawing polymer from the reactor system,
3) quenching the reaction,
4) forming molten polymer,
5) combining the molten polymer and one or more additives, and
6) pelletizing or drumming the polymer combination.

Formulations of the Polymers

The polymers produced herein then can be used directly as an adhesive or blended with other components to form an adhesive.

Tackifiers are typically not needed with the polymers of this invention. However if tackifier is desired, the tackifiers that may be blended with the polymers described above are those typically used in the art. Examples include, but are not limited to, aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, and hydrogenated rosin esters. In some embodiments the tackifier is hydrogenated. In other embodiments the tackifier is non-polar. (Non-polar meaning that the tackifier is substantially free of monomers having polar groups. Preferably the polar groups are not present, however if they are preferably they are not present at more that 5 weight %, preferably not more that 2 weight %, even more preferably no more than 0.5 weight %.) In some embodiments the tackifier has a softening point (Ring and Ball, as measured by ASTM E-28) of 80° C. to 150° C., preferably 100° C. to 130° C.

The tackifier, if present, is typically present at about 1 weight % to about 80 weight %, based upon the weight of the blend, more preferably 2 weight % to 40 weight %, even more preferably 3 weight % to 30 weight %.

Preferred hydrocarbon resins for use as tackifiers or modifiers include:
1. Resins such as C5/C6 terpene resins, styrene terpenes, alpha-methyl styrene terpene resins, C9 terpene resins, aromatic modified C5/C6, aromatic modified cyclic resins, aromatic modified dicyclopentadiene based resins or mixtures thereof. Additional preferred resins include those described in WO 91/07472, U.S. Pat. No. 5,571,867, U.S. Pat. No. 5,171,793 and U.S. Pat. No. 4,078,132. Typically these resins are obtained from the cationic polymerization of compositions containing one or more of the following monomers: C5 diolefins (such as 1-3 pentadiene, isoprene, etc); C5 olefins (such as 2-methylbutenes, cyclopentene, etc.); C6 olefins (such as hexene), C9 vinylaromatics (such as styrene, alpha methyl styrene, vinyltoluene, indene, methyl indene, etc.); cyclics (such as dicyclopentadiene, methyldicyclopentadiene, etc.); and or terpenes (such as limonene, carene, etc).
2. Resins obtained by the thermal polymerization of dicyclopentadiene, and/or the thermal polymerization of dimers or oligomers of cyclopentadiene and/or methylcyclopentadiene, optionally with vinylaromatics (such as styrene, alpha-methyl styrene, vinyl toluene, indene, methyl indene).

The resins obtained after polymerization and separation of unreacted materials, can be hydrogenated if desired. Examples of preferred resins include those described in U.S. Pat. No. 4,078,132; WO 91/07472; U.S. Pat. No. 4,994,516; EP 0 046 344 A; EP 0 082 726 A; and U.S. Pat. No. 5,171,793.

In another embodiment an adhesive composition comprising polymer product of this invention further comprises a crosslinking agent. Preferred crosslinking agents include those having functional groups that can react with the acid or anhydride group. Preferred crosslinking agents include alcohols, multiols, amines, diamines and/or triamines. Examples of crosslinking agents useful in this invention include polyamines such as ethylenediamine, diethylenetriamine, hexamethylenediamine, diethylaniinopropylamine, and/or menthanediamine.

In another embodiment an adhesive composition comprising the polymer product of this invention further comprises typical additives known in the art such as fillers, antioxidants, adjuvants, adhesion promoters, oils, and/or plasticizers. Preferred fillers include titanium dioxide, calcium carbonate, barium sulfate, silica, silicon dioxide, carbon black, sand, glass beads, mineral aggregates, talc, clay and the like. Preferred antioxidants include phenolic antioxidants, such as Irganox 1010, Irganox, 1076 both available from Ciba-Geigy. Preferred oils include paraffinic or napthenic oils such as Primol 3 52, or Primol 876 available from ExxonMobil Chemical France, S.A. in Paris, France. Preferred plasticizers include polybutenes, such as Parapol 950 and Parapol 1300 available from ExxonMobil Chemical Company in Houston Tex. Other preferred additives include block, antiblock, pigments, processing aids, UV stabilizers, neutralizers, lubricants, surfactants and/or nucleating agents may also be present in one or more than one layer in the films. Preferred additives include silicon dioxide, titanium dioxide, polydimethylsiloxane, talc, dyes, wax, calcium sterate, carbon black, low molecular weight resins and glass beads. Preferred adhesion promoters include polar acids, polyaminoamides (such as Versamid 115, 125, 140, available from Henkel), urethanes (such as isocyanate/hydroxy terminated polyester systems, e.g. bonding agent TN/Mondur Cb-75(Miles, Inc.), coupling agents, (such as silane esters (Z-6020 from Dow Corning)), titanate esters (such as Kr-44 available from Kenrich), reactive acrylate monomers (such as sarbox SB-600 from Sartomer), metal acid salts (such as Saret 633 from Sartomer), polyphenylene oxide, oxidized polyolefins, acid modified polyolefins, and anhydride modified polyolefins.

In another embodiment the polymers of this invention are combined with less than 3 wt % anti-oxidant, less than 3 wt % flow improver, less than 10 wt % wax, and or less than 3 wt % crystallization aid.

Other optional components that may be combined with the polymer product of this invention are plasticizers or other additives such as oils, surfactants, fillers, color masterbatches, and the like. Preferred plasticizers include mineral oils, polybutenes, phthalates and the like. Particularly preferred plasticizers include phthalates such as diisoundecyl phthalate (DIUP), diisononylphthalate (DINP), dioctylphthalates (DOP) and the like. Particularly preferred oils include aliphatic naphthenic oils.

Other optional components that may be combined with the polymer product of this invention are low molecular weight products such as wax, oil or low Mn polymer, (low meaning below Mn of 5000, preferably below 4000, more preferably below 3000, even more preferably below 2500). Preferred waxes include polar or non-polar waxes, functionalized waxes, polypropylene waxes, polyethylene waxes, and wax modifiers. Preferred waxes include ESCOMER™ 101. Preferred functionalized waxes include those modified with an alcohol, an acid, a ketone, an anhydride and the like. Preferred examples include waxes modified by methyl ketone, maleic anhydride or maleic acid. Preferred oils include aliphatic napthenic oils, white oils or the like. Preferred low Mn polymers include polymers of lower alpha olefins such as propylene, butene, pentene, hexene and the like. A particularly preferred polymer includes polybutene having an Mn of less than 1000. An example of such a polymer is available under the trade name PARAPOL™ 950 from ExxonMobil Chemical Company. PARAPOL™ 950 is a liquid polybutene polymer having an Mn of 950 and a kinematic viscosity of 220 cSt at 100° C., as measured by ASTM D 445. In some embodiments the polar and non-polar waxes are used together in the same composition.

In some embodiments, however, wax may not be desired and is present at less than 5 weight %, preferably less than 3 weight %, more preferably less than 1 weight %, more preferably less than 0.5 weight %, based upon the weight of the composition.

In another embodiment the polymers of this invention have less than 30 weight % total of any combination of additives described above, preferably less than 25 weight %, preferably less than 20 weight %, preferably less than 15 weight %, preferably less than 10 weight %, preferably less than 5 weight %, based upon the weight of the polymer and the additives.

In another embodiment the polymer produced by this invention may be blended with elastomers (preferred elastomers include all natural and synthetic rubbers, including those defined in ASTM D1566). In a preferred embodiment elastomers are blended with the polymer produced by this invention to form rubber toughened compositions. In a particularly preferred embodiment the rubber toughened composition is a two (or more) phase system where the rubber is a discontinuous phase and the polymer is a continuous phase. Examples of preferred elastomers include one or more of the following: ethylene propylene rubber, ethylene propylene diene monomer rubber, neoprene rubber, styrenic block copolymer rubbers (including SI, SIS, SB, SBS, SIBS and the like), butyl rubber, halobutyl rubber, copolymers of isobutylene and para-alkylstyrene, halogenated copolymers of isobutylene and para-alkylstyrene. This blend may be combined with the tackifiers and/or other additives as described above.

In another embodiment the polymer produced by this invention may be blended with impact copolymers. Impact copolymers are defined to be a blend of isotactic PP and an elastomer such as an ethylene-propylene rubber. In a preferred embodiment the blend is a two (or more) phase system where the impact copolymer is a discontinuous phase and the polymer is a continuous phase.

In another embodiment the polymer produced by this invention may be blended with ester polymers. In a preferred embodiment the blend is a two (or more) phase system where the polyester is a discontinuous phase and the polymer is a continuous phase.

In a preferred embodiment the polymers of the invention described above are combined with metallocene polyethylenes (mPE's) or metallocene polypropylenes (mPP's). The mPE and mPP homopolymers or copolymers are typically produced using mono- or bis-cyclopentadienyl transition metal catalysts in combination with an activator of alumoxane and/or a non-coordinating anion in solution, slurry, high pressure or gas phase. The catalyst and activator may be supported or unsupported and the cyclopentadienyl rings by may substituted or unsubstituted. Several commercial products produced with such catalyst/activator combinations are commercially available from ExxonMobil Chemical Company in Baytown, Tex. under the tradenames EXCEED™, ACHIEVE™ and EXACT™. For more information on the methods and catalysts/activators to produce such mPE homopolymers and copolymers see WO 94/26816; WO 94/03506; EPA 277,003; EPA 277,004; U.S. Pat. No. 5,153, 157; U.S. Pat. No. 5,198,401; U.S. Pat. No. 5,240,894; U.S. Pat. No. 5,017,714; CA 1,268,753; U.S. Pat. No. 5,324,800; EPA 129,368; U.S. Pat. No. 5,264,405; EPA 520,732; WO 92 00333; U.S. Pat. No. 5,096,867; U.S. Pat. No. 5,507,475; EPA 426 637; EPA 573 403; EPA 520 732; EPA 495 375; EPA 500 944; EPA 570 982; WO91/09882; WO94/03506 and U.S. Pat. No. 5,055,438.

In another embodiment the olefin polymer of this invention, preferably the polypropylene homopolymer or copolymer of this invention, can be blended with another homopolymer and/or copolymer, including but not limited to, homopolypropylene, propylene copolymerized with up to 50 weight % of ethylene or a C4 to C20 alpha-olefin, isotactic polypropylene, highly isotactic polypropylene, syndiotactic polypropylene, random copolymer of propylene and ethylene and/or butene and/or hexene, polybutene, ethylene vinyl acetate, low density polyethylene (density 0.915 to less than 0.935 g/cm$^3$) linear low density polyethylene, ultra low density polyethylene (density 0.86 to less than 0.90 g/cm$^3$), very low density polyethylene (density 0.90 to less than 0.915 g/cm$^3$), medium density polyethylene (density 0.935 to less than 0.945 g/cm$^3$), high density polyethylene (density 0.945 to 0.98 g/cm$^3$), ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, elastomers such as ethylene-propylene rubber (EPR), vulcanized EPR, EPDM, block copolymer elastomers such as SBS, nylons (polyamides), polycarbonates, PET resins, crosslinked polyethylene, copolymers of ethylene and vinyl alcohol (EVOH), polymers of aromatic monomers such as polystyrene, poly-1 esters, high molecular weight polyethylene having a density of 0.94 to 0.98 g/cm$^3$ low molecular weight polyethylene having a density of 0.94 to 0.98 g/cm$^3$, graft copolymers generally, polyacrylonitrile homopolymer or copolymers, thermoplastic polyamides, polyacetal, polyvinylidine fluoride and other fluorinated elastomers, polyethylene glycols and polyisobutylene.

In a preferred embodiment the olefin polymer of this invention, preferably the polypropylene polymer of this invention, is present in the blend at from 10 to 99 weight %, based upon the weight of the polymers in the blend, preferably 20 to 95 weight %, even more preferably at least 30 to 90 weight %, even more preferably at least 40 to 90 weight %, even more preferably at least 50 to 90 weight %, even more preferably at least 60 to 90 weight %, even more preferably at least 70 to 90 weight %.

The blends described above may be produced by mixing the two or more polymers together, by connecting reactors together in series to make reactor blends or by using more than one catalyst in the same reactor to produce multiple species of polymer. The polymers can be mixed together prior to being put into the extruder or may be mixed in an extruder.

Any of the above polymers, including the polymers produced by this invention, may be functionalized. Preferred functional groups include maleic acid and maleic anhydride. By functionalized is meant that the polymer has been contacted with an unsaturated acid or anhydride. Preferred unsaturated acids or anhydrides include any unsaturated organic compound containing at least one double bond and at least one carbonyl group. Representative acids include carboxylic acids, anhydrides, esters and their salts, both metallic and non-metallic. Preferably the organic compound contains an ethylenic unsaturation conjugated with a carbonyl group ($-C=O$). Examples include maleic, fumaric, acrylic, methacrylic, itaconic, crotonic, alpha.methyl crotonic, and cinnamic acids as well as their anhydrides, esters and salt derivatives. Maleic anhydride is particularly preferred. The unsaturated acid or anhydride is preferably present at about 0.1 weight % to about 10 weight %, preferably at about 0.5 weight % to about 7 weight %, even more preferably at about 1 to about 4 weight %, based upon the weight of the hydrocarbon resin and the unsaturated acid or anhydride.

In a preferred embodiment the unsaturated acid or anhydried comprises a carboxylic acid or a derivative thereof selected from the group consisting of unsaturated carboxylic acids, unsaturated carboxylic acid derivatives selected from esters, imides, amides, anhydrides and cyclic acid anhydrides or mixtures thereof.

Applications

For purposes of this invention and the claims thereto, the following tests are used, unless otherwise indicated.

Tensile strength, Tensile strength at break and elongation at break are measured by ASTM D 1708. Elongation at break is also called strain at break or percent elongation.

Peel strength—ASTM D-1876 (also referred to as Peel adhesion at 180° peel angle, 180° peel strength, 180° peel adhesion, T-Peel strength, T-Peel.)

Dynamic Storage modulus also called storage modulus is G'.

Creep resistance ASTM D-2293

Rolling Ball Tack PSTC 6

Hot Shear Strength is determined by suspending a 1000 gram weight from a 25 mm wide strip of MYLAR polyester film coated with the polymer or adhesive formulation which is adhered to a stainless steel plate with a contact area of 12.5 mm×25 mm. The sample is placed in a ventilated oven at 40° C. time is recorded until stress failure occurs.

Probe tack (also called Polyken probe tack) ASTM D 2979

Holding Power—PSTC 7, also called Shear adhesion or Shear strength?.

Density—ASTM D792 at 25° C.

Gardner color ASTM D 1544-68.

SAFT is also called heat resistance.

Tensile Strength Modulus at 100% elongation and Young's Modulus are determined according to ASTM E-1876.

Luminence is the reflectance "Y" in the CIE color coordinates as determined by ASTM D 1925 divided by 100.

The polymer product of this invention or formulations thereof may then be applied directly to a substrate or may be sprayed thereon, typically the polymer is molten. Spraying is defined to include atomizing, such as producing an even dot pattern, spiral spraying such as Nordson Controlled Fiberization or oscillating a stretched filament like is done in the ITW Dynafiber/Omega heads or Summit technology from Nordson, as well as melt blown techniques. Melt blown techniques are defined to include the methods described in U.S. Pat. No. 5,145,689 or any process where air streams are used to break up filaments of the extrudate and then used to deposit the broken filaments on a substrate. In general, melt blown techniques are processes that use air to spin hot melt adhesive fibers and convey them onto a substrate for bonding. Fibers sizes can easily be controlled from 20-200 microns by changing the melt to air ratio. Few, preferably no, stray fibers are generated due to the inherent stability of adhesive melt blown applicators. Under UV light the bonding appears as a regular, smooth, stretched dot pattern. Atomization is a process that uses air to atomize hot melt adhesive into very small dots and convey them onto a substrate for bonding.

Lamination Melt Coating

The adhesives of this invention can be used in any adhesive application, including but not limited to, disposables, packaging, laminates, pressure sensitive adhesives, tapes labels, wood binding, paper binding, non-wovens, road marking, reflective coatings, and the like.

In a preferred embodiment the adhesives of this invention can be used for disposable diaper and napkin chassis construction, elastic attachment in disposable goods converting, packaging, labeling, bookbinding, woodworking, and other assembly applications. Particularly preferred applications include: baby diaper leg elastic, diaper frontal tape, diaper standing leg cuff, diaper chassis construction, diaper core stabilization, diaper liquid transfer layer, diaper outer cover lamination, diaper elastic cuff lamination, feminine napkin core stabilization, feminine napkin adhesive strip, industrial filtration bonding, industrial filter material lamination, filter mask lamination, surgical gown lamination, surgical drape lamination, and perishable products packaging.

The adhesives described above may be applied to any substrate. Preferred substrates include wood, paper, cardboard, plastic, thermoplastic, rubber, metal, metal foil (such as aluminum foil and tin foil), metallized surfaces, cloth, non-wovens (particularly polypropylene spun bonded fibers or non-wovens), spunbonded fibers, cardboard, stone, plaster, glass (including silicon oxide ($SiO_x$)coatings applied by evaporating silicon oxide onto a film surface), foam, rock, ceramics, films, polymer foams (such as polyurethane foam), substrates coated with inks, dyes, pigments, PVDC and the like or combinations thereof.

Additional preferred substrates include polyethylene, polypropylene, polyacrylates, acrylics, polyethylene terephthalate, or any of the polymers listed above as suitable for blends.

Any of the above substrates, and/or the polymers of this invention, may be corona discharge treated, flame treated, electron beam irradiated, gamma irradiated, microwaved, or silanized.

The adhesives produced herein, when coated in some fashion between two adherends, preferably perform such that the materials are held together in a sufficient fashion compared to a standard specification or a standard adhesive similarly constructed.

The polymer product of this invention may be used in any adhesive application described in WO 97/33921 in combination with the polymers described therein or in place of the polymers described therein.

The polymer product of this invention, alone or in combination with other polymers and or additives, may also be used to form hook and loop fasteners as described in WO 02/35956.

Characterization and Tests

Molecular weights (number average molecular weight (Mn), weight average molecular weight (Mw), and z-average molecular weight (Mz)) are determined using a Waters 150 Size Exclusion Chromatograph (SEC) equipped with a differential refractive index detector (DR1), an online low angle light scattering (LALLS) detector and a viscometer (VIS). The details of the detector calibrations have been described elsewhere [Reference: T. Sun, P. Brant, R. R. Chance, and W. W. Graessley, *Macromolecules*, Volume 34, Number 19, 6812-6820, (2001)]; attached below are brief descriptions of the components.

The SEC with three Polymer Laboratories PLgel 10 mm Mixed-B columns, a nominal flow rate 0.5 cm$^3$/min, and a nominal injection volume 300 microliters is common to both detector configurations. The various transfer lines, columns and differential refractometer (the DRI detector, used mainly to determine eluting solution concentrations) are contained in an oven maintained at 135° C.

The LALLS detector is the model 2040 dual-angle light scattering photometer (Precision Detector Inc.). Its flow cell, located in the SEC oven, uses a 690 nm diode laser light source and collects scattered light at two angles, 15° and 90°. Only the 15° output was used in these experiments. Its signal is sent to a data acquisition board (National Instruments) that accumulates readings at a rate of 16 per second. The lowest four readings are averaged, and then a proportional signal is sent to the SEC-LALLS-VIS computer. The LALLS detector is placed after the SEC columns, but before the viscometer.

The viscometer is a high temperature Model 150R (Viscotek Corporation). It consists of four capillaries arranged in a Wheatstone bridge configuration with two pressure transducers. One transducer measures the total pressure drop across the detector, and the other, positioned between the two sides of the bridge, measures a differential pressure. The specific viscosity for the solution flowing through the viscometer is calculated from their outputs. The viscometer is inside the SEC oven, positioned after the LALLS detector but before the DRI detector.

Solvent for the SEC experiment was prepared by adding 6 grams of butylated hydroxy toluene (BHT) as an antioxidant to a 4 liter bottle of 1,2,4 Trichlorobenzene (TCB) (Aldrich Reagent grade) and waiting for the BHT to solubilize. The TCB mixture was then filtered through a 0.7 micron glass pre-filter and subsequently through a 0.1 micron Teflon filter. There was an additional online 0.7 micron glass pre-filter/0.22 micron Teflon filter assembly between the high pressure pump and SEC columns. The TCB was then degassed with an online degasser (Phenomenex, Model DG-4000) before entering the SEC.

Polymer solutions were prepared by placing dry polymer in a glass container, adding the desired amount of TCB, then heating the mixture at 160° C. with continuous agitation for about 2 hours. All quantities were measured gravimetrically. The TCB densities used to express the polymer concentration in mass/volume units are 1.463 g/ml at room temperature and 1.324 g/ml at 135° C. The injection concentration ranged from 1.0 to 2.0 mg/ml, with lower concentrations being used for higher molecular weight samples.

Prior to running each sample the DRI detector and the injector were purged. Flow rate in the apparatus was then increased to 0.5 ml/minute, and the DRI was allowed to stabilize for 8-9 hours before injecting the first sample. The argon ion laser was turned on 1 to 1.5 hours before running samples by running the laser in idle mode for 20-30 minutes and then switching to full power in light regulation mode.

The branching index was measured using SEC with an on-line viscometer (SEC-VIS) and are reported as g' at each molecular weight in the SEC trace. The branching index g' is defined as:

$$g' = \frac{\eta_b}{\eta_l}$$

where $\eta_b$ is the intrinsic viscosity of the branched polymer and $\eta_l$ is the intrinsic viscosity of a linear polymer of the same viscosity-averaged molecular weight ($M_v$) as the branched polymer. $\eta_l = KM_v^\alpha$, K and $\alpha$ are measured values for linear polymers and should be obtained on the same SEC-DRI-LS-VIS instrument as the one used for branching index measurement. For polypropylene samples presented in this invention, K=0.0002288 and $\alpha$=0.705 were used. The SEC-DRI-LS-VIS method obviates the need to correct for polydispersities, since the intrinsic viscosity and the molecular weight are measured at individual elution volumes, which arguably contain narrowly dispersed polymer. Linear polymers selected as standards for comparison should be of the same viscosity average molecular weight and comonomer content. Linear character for polymer containing C2 to C 10 monomers is confirmed by Carbon-13 NMR the method of Randall (Rev. Macromol. Chem. Phys., C29 (2&3), p. 285-297).

Linear character for C11 and above monomers is confirmed by GPC analysis using a MALLS detector. For example, for a copolymer of propylene, the NMR should not indicate branching greater than that of the co-monomer (i.e. if the comonomer is butene, branches of greater than two carbons should not be present). For a homopolymer of propylene, the GPC should not show branches of more than one carbon atom. When a linear standard is desired for a polymer where the comomoner is C9 or more, one can refer to T. Sun, P. Brant, R. R. Chance, and W. W. Graessley, *Macromolecules*, Volume 34, Number 19, 6812-6820, (2001) for protocols on determining standards for those polymers. In the case of syndiotactic polymers, the standard should have a comparable amount of syndiotacticty as measured by Carbon 13 NMR.

In another embodiment the polymer produced by this invention has a molecular weight distribution (Mw/Mn) of at least 2, preferably at least 5, preferably at least 10, even more preferably at least 20.

In another embodiment the polymer produced may have a unimodal, bimodal, or multimodal molecular weight distribution (Mw/Mn) distribution of polymer species as determined by Size Exclusion Chromatography (SEC). By bimodal or multimodal is meant that the SEC trace has more than one peak or inflection points. An inflection point is that point where the second derivative of the curve changes in sign (e.g., from negative to positive or vice versus).

Peak melting point (Tm), peak crystallization temperature (Tc), heat of fusion and crystallinity were determined using the following procedure according to ASTM E 794-85.

Differential scanning calorimetric (DSC) data was obtained using a TA Instruments model 2920 machine. Samples weighing approximately 7-10 mg were sealed in aluminum sample pans. The DSC data was recorded by first cooling the sample to −50° C. and then gradually heating it to 200° C. at a rate of 10° C./minute. The sample is kept at 200° C. for 5 minutes before a second cooling-heating cycle is applied. Both the first and second cycle thermal events are recorded. Areas under the curves were measured and used to determine the heat of fusion and the degree of crystallinity. The percent crystallinity is calculated using the formula, [area under the curve (Joules/gram)/B (Joules/gram)]* 100, where B is the heat of fusion for the homopolymer of the major monomer component. These values for B are to be obtained from the Polymer Handbook, Fourth Edition, published by John Wiley and Sons, New York 1999. A value of 189 J/g (B) was used as the heat of fusion for 100% crystalline polypropylene. For polymers displaying multiple melting or crystallization peaks, the highest melting peak was taken as peak melting point, and the highest crystallization peak was taken as peak crystallization temperature.

The glass transition temperature (Tg) was measured by ASTM E 1356 using a TA Instrument model 2920 machine.

Polymer samples for $^{13}$C NMR spectroscopy were dissolved in $d_2$-1,1,2,2-tetrachloroethane and the samples were recorded at 125° C. using a NMR spectrometer of 75 or 100 MHz. Polymer resonance peaks are referenced to mmmm=21.8 ppm. Calculations involved in the characterization of polymers by NMR follow the work of F. A. Bovey in "Polymer Conformation and Configuration" Academic Press, New York 1969 and J. Randall in "Polymer Sequence Determination, Carbon-13 NMR Method", Academic Press, New York, 1977. The percent of methylene sequences of two in length, %$(CH_2)_2$, were calculated as follows: the integral of the methyl carbons between 14-18 ppm (which are equivalent in concentration to the number of methylenes in sequences of two in length) divided by the sum of the integral of the methylene sequences of one in length between 45-49 ppm and the integral of the methyl carbons between 14-18 ppm, times 100. This is a minimum calculation for the amount of methylene groups contained in a sequence of two or more since methylene sequences of greater than two have been excluded. Assignments were based on H. N. Cheng and J. A. Ewen, Makromol. Chem. 1989, 190, 1931.

Ethylene content of a polymer can be measured as follows. A thin homogeneous film is pressed at a temperature of about 150° C. or greater, then mounted on a Perkin Elmer PE 1760 infrared spectrophotometer. A full spectrum of the sample from 600 $cm^{-1}$ to 4000 $cm^{-1}$ is recorded and the monomer weight percent of ethylene can be calculated according to the following equation: Ethylene wt %=82.585−111.987X+30.045 $X^2$, wherein X is the ratio of the peak height at 1155 $cm^{-1}$ and peak height at either 722 $cm^{-1}$ or 732 $cm^{-1}$, whichever is higher. The concentrations of other monomers in the polymer can also be measured using this method.

Adhesive Testing

SAFT (modified D4498) measures the ability of a bond to withstand an elevated temperature rising at 10° F. (5.5° C.)/15 min., under a constant force that pulls the bond in the shear mode. Bonds were formed in the manner described above (1 inch by 3 inch (2.5 cm×7.6 cm) (on Kraft paper). The test specimens were suspended vertically in an oven at room temperature with a 500 gram load attached to the bottom. The temperatures at which the weight fell was recorded (when the occasional sample reached temperatures above the oven capacity >265° F. (129° C.) it was terminated and averaged in with the other samples at termination temperature).

Set time is defined as the time it takes for a compressed adhesive substrate construct to fasten together enough to give substrate fiber tear when pulled apart, and thus the bond is sufficiently strong to remove the compression. The bond will likely still strengthen upon further cooling, however, it no longer requires compression. These set times were measured by placing a molten dot of adhesive on to a file folder substrate taped to a flat table. A file folder tab (1 inch by 3 inch (2.5 cm×7.6 cm) was placed upon the dot 3 seconds later and compressed with a 500 gram weight. The weight was allowed to sit for about 0.5 to about 10 seconds. The construct thus formed was pulled apart to check for a bonding level good enough to produce substrate fiber tear. The set time was recorded as the minimum time required for this good bonding to occur. Standards were used to calibrate the process.

Once a construct has been produced it can be subjected to various insults in order to assess the effectiveness of the bond. Once a bond fails to a paper substrate a simple way to quantify the effectiveness is to estimate the area of the adhesive dot that retained paper fibers as the construct failed along the bond line. This estimate is called percent substrate fiber tear. An example of good fiber, after conditioning a sample for 15 hours at −12° C. and attempting to destroy the bond, would be an estimate of 80-100% substrate fiber tear. It is likely that 0% substrate fiber tear under those conditions would signal a loss of adhesion.

Shore A hardness was measured according to ASTM 2240. An air cooled dot of adhesive was subjected to the needle and the deflection was recorded from the scale.

Dot T-Peel was determined according to ASTM D 1876, except that the specimen was produced by combining two 1 inch by 3 inch (2.54 cm×7.62 cm) substrate cut outs with a dot of adhesive with a volume that, when compressed under a 500 gram weight occupied about 1 square inch of area (1 inch=2.54 cm). Once made all the specimens were pulled apart in side by side testing (at a rate of 2 inches per minute) by a machine that records the destructive force of the insult being applied. The maximum force achieved for each sample tested was recorded and averaged, thus producing the Average Maximum Force which is reported as the Dot T-Peel.

Adhesive Melt Viscosity (ASTM D-3236): Melt viscosity profiles are typically measured at temperatures from 120° C. to 190° C. using a Brookfield Thermosel viscometer and a number 27 spindle.

Peel Strength (modified ASTM D1876): Substrates (1×3 inches (25×76 mm)) are heat sealed with adhesive film (5 mils (130 μm) thickness) at 135° C. for 1 to 2 seconds and 40 psi (0.28 MPa) pressure. Bond specimens were peeled back in a tensile tester at a constant crosshead speed of 2 in/min (51 mm/min). The average force required to peel the bond (5 specimens) apart is recorded.

Shear Adhesion Fail Temperature (SAFT) (modified ASTM D4498) measures the ability of the bond to withstand an elevated temperature rising at 10° F. (5.5° C.)/15 min, under a constant force that pulls the bond in the shear mode. Bonds 1 inch by 1 inch (Kraft paper) (25 mm×25 mm) were formed of adhesive by heat sealing as in procedure "(b)" above for 1.5 s. The test specimens were suspended vertically in an oven at 32° C. with a 500 g load attached to the bottom. The temperature at which the weight falls is recorded. Adhesives possessing high failure temperature are essential for the assembly of packaging goods that are often subjected to very high temperatures during storage and shipping.

Peel Adhesion Failure Temperature (PAFT) was determined using following procedure modified according to the procedure of TAPPI T814 PM-77. Two sheets of 6"×12" Kraft paper were laminated together with a one inch strip of molten adhesive heated to 177° C. The laminated sheet was trimmed and cut into 1-inch wide strips. These strips were placed in an oven with a 100-gram of weight hanging in a peel mode. The over temperature increased at a rate of 30° C. per hour. The sample were hung from a switch that trips when the samples fail to record the temperature of failure.

Low Temperature Substrate Fiber Tear: Kraft paper bonds are prepared as in procedure "(b)" above. The bond specimens are placed in a freezer or refrigerator to obtain the desired test temperature. The bonds are separated by hand and a determination made as to the type of failure observed. The amount of substrate fiber tear is expressed in percentage. "SF" indicates substrate failure.

Cloud point is determined by heating the adhesive blends to 121° C. and applying a small bead (approximately 1 gram) of the molten adhesive to the bulb of an ASTM thermometer. The temperature at which the molten adhesive clouds over is then noted. These measures of cloud point provide an indication of a hot melt's overall compatibility, i.e., the compatibility of the individual ingredients with each other.

Compression Molding: Plaques suitable for physical property testing were compression molded on a Carver hydraulic press. 6.5 g of polymer was molded between brass plates (0.05" thick) lined with Teflon™ coated aluminum foil. A 0.033" thick chase with a square opening 4"×4" was used to control sample thickness. After one minute of preheat at 170° or 180° C., under minimal pressure, the hydraulic load was gradually increased to ~10,000-15,000 lbs., at which it was held for three minutes. Subsequently the sample and molding plates were cooled for three minutes under ~10,000 to 15,000 lbs. load between the water cooled platens of the press. Plaques were allowed to equilibrate at room temperature for a minimum of two days prior to physical property testing.

Unidirectional Tensile Testing: Dogbones for tensile testing were cut from compression molded plaques using a mallet handle die. Specimen dimensions were those specified in ASTM D 1708. Tensile properties were measured on an Instron™ model 4502 equipped with a 22.48 lb. load cell and pneumatic jaws fitted with serrated grip faces. Deformation was performed at a constant crosshead speed of 5.0 in/min with a data sampling rate of 25 points/second. Jaw separation prior to testing was 0.876", from which strains were calculated assuming affine deformation. Initial modulus, stress and strain at yield (where evident), peak stress, tensile strength at break, and strain at break were calculated. A minimum of five specimens from each plaque was tested, the results being reported as the average value. All stresses quoted were calculated based upon the original cross-sectional area of the specimen, taking no account of reduced cross-section as a function of increasing strain.

The Theological properties (G', G") were determined on ARES instrument manufactured by Rheometric Scientific, Piscataway, N.J. The polymers were first melted and then cooled down at 1° C./min. Dynamic moduli were recorded during the cooling, starting from a temperature higher than the melting point of the material by at least 30° C. down to about 80° C. The output of the test is therefore the evolution of the storage modulus G', the loss modulus G", as well as the ratio tanδ=G"/G' as a function of temperature. Measurements were made at a constant frequency of 10 rad/s and 20 percent of strain, using a 12.5 mm diameter plate-and-plate geometry.

EXAMPLES

General

All polymerizations were performed in a liquid filled, single-stage continuous reactor using mixed metallocene catalyst systems. The reactor was a 0.5-liter stainless steel autoclave reactor and was equipped with a stirrer, a water cooling/steam heating element with a temperature controller, and a pressure controller. Solvents, propylene, and comonomers (such as butene and hexene), if present, were first purified by passing through a three-column purification system. The purification system consists of an Oxiclear column (Model # RGP-R1-500 from Labclear) followed by a 5A and a 3A molecular sieve columns. Purification columns were regenerated periodically whenever there is evidence of lower activity of polymerization. Both the 3A and 5A molecular sieve columns were regenerated in-house under nitrogen at a set temperature of 260° C. and 315° C., respectively. The molecular sieve material was purchased from Aldrich. Oxiclear column was regenerated in the original manufacture. Purified ethylene from in-house supply was fed into the manifold then the reactor through a Brookfield mass flow controller. The ethylene was delivered as a gas solubilized in the chilled solvent/monomer mixture. The purified solvents and monomers were then chilled to about −15° C. by passing through a chiller before fed into the reactor through a manifold. Solvent and monomers were mixed in the manifold and fed into reactor through a single tube. All liquid flow rates are measured using Brooksfield mass flow meters or Micro-Motion Coriolis-type flow meters.

Unless otherwise noted the catalysts compounds were obtained form Albemarle.

The catalyst compounds used to produce semi-crystalline polypropylene were rac-dimethylsilylbis(2-methyl-4-phenylindenyl)zirconium dichloride, rac-dimethylsilylbis(2-methyl-4-phenylindenyl)zirconium dimethyl, rac-dimethylsilylbis(2-methylindenyl)zirconium dimethyl, rac-dimethylsilylbis(indenyl)hafnium dimethyl, and rac-1,2-ethylene-bis(4,7-dimethylindenyl)hafnium dimethyl (obtained from Boulder Scientific Company).

The catalyst compounds used to produce amorphous polypropylene were dimethylsilyl(tetramethylcyclopentadienyl)(cyclododecylamido)titanium dichloride, dimethylsilyl(tetramethylcyclopentadienyl)(cyclododecylamido)titanium dimethyl, dimethylsilyl(tert-butylamido)(tetramethylcyclopentadienyl)titanium dimethyl(obtained from Boulder Scientific Company), [di(p-triethylsilylphenyl)methylene](cyclopentadienyl)(3,8-di-t-butylfluorenyl)hafnium dimethyl (produced according to the examples in U.S. Pat. No. 6,528,670) and dimethylsilyl(tetramethylcylopentadienyl)(N-1-adamantyl)titanium dimethyl (produced according to the examples in U.S. Pat. No. 5,955,625).

Dimethylsilyl(tetramethylcyclopentadienyl)(cyclododecylamido) titanium dichloride was made according to the examples in U.S. Pat. No. 5,057,475. The dimethyl version was obtained by dimethylation of the dichloride version.

Rac-Dimethylsilylbis(2-methyl-4-phenylindenyl)zirconium dichloride and dimethylsilyl(tetramethylcyclopentadienyl)(cyclododecylamido)titanium dichloride were activated with MAO (methylalumoxane). Rac-1,2-ethylenebis (4,7-dimethylindenyl)hafnium dimethyl was preactivated with trityl tetrakis(pentafluorophenyl)borate (obtained from Single-Site Catalysts, LLC). The rest of the catalysts were preactivated with N,N-dimethylanilinium tetrakis(pentafluorophenyl)borate(obtained from Albemarle). For catalyst systems with preactivation, the catalysts were activated with cocatalyst at a molar ratio of 1:1 to 1:1.1 in 700 ml of toluene at least 10 minutes prior to the polymerization reaction. The catalyst systems were diluted to a concentration of catalyst ranging from 0.2 to 1.4 mg/ml in toluene. The catalyst solution was used for all polymerization runs carried out in the same day. New batch of catalyst solution was prepared in case that more than 700 ml of catalyst solution was consumed in one day. Each catalyst solution was pumped through separate lines. Catalysts were mixed in a manifold, and then fed into the reactor through a single line. In methylalumoxane activated systems, 280 ml of methylalumoxane (MAO, 10 wt. % in toluene, from Albemarle) was diluted in 1000 ml of toluene, and the solution was stored in a 5-liter stainless cylinder. Catalysts were diluted to a concentration ranging from 0.2 to 1.4 mg/ml in toluene. Each catalyst solution and the methylalumoxane solution were pumped through separate lines. Catalysts and MAO were mixed in a manifold, and then fed into the reactor through a single line. The connecting tube between the catalyst manifold and reactor inlet was about 1 meter long.

All catalyst solutions were kept in an inert atmosphere with <1.5 ppm water content and fed into reactor by metering pumps. Catalyst and monomer contacts took place in the reactor. Catalyst pumps were calibrated periodically using toluene as the calibrating medium. Catalyst concentration in the feed was controlled through changing the catalyst concentration in catalyst solution and/or changing in the pumping rate of catalyst solution. The pumping rate of catalyst solution varied in a range of 0.2 to 5 ml/minute.

As an impurity scavenger, 55 ml of tri-iso-butyl aluminum (25 wt. % in toluene, Akzo Noble) was diluted in 22.83 kilogram of hexane. The diluted tri-iso-butyl aluminum solution was stored in a 37.9-liter cylinder under nitrogen blanket. The solution was used for all polymerization runs until about 90% of consumption, then a new batch was prepared. Pumping rates of the tri-iso-butyl aluminum solution varies from polymerization reaction to reaction, ranging from 0 (no scavenger) to 4 ml per minutes.

For polymerization reactions involving alpha, omega-dienes, 1,9-decadiene was diluted to a concentration ranging from 4.8 to 9.5 vol. % in toluene. The diluted solution was then fed into reactor by a metering pump through a comonomer line. (The 1,9-decadiene was obtained from Aldrich and was purified by first passing through alumina activated at high temperature under nitrogen, followed by molecular sieve activated at high temperature under nitrogen.)

The reactor was first cleaned by continuously pumping solvent (e.g., hexane) and scavenger through the reactor system for at least one hour at a maximum allowed temperature (about 150° C.). After cleaning, the reactor was heated/cooled to the desired temperature using water/steam mixture flowing through the reactor jacket and controlled at a set pressure with controlled solvent flow. Monomers and catalyst solutions were then fed into the reactor when a steady state of operation was reached. An automatic temperature control system was used to control and maintain the reactor at a set temperature. Onset of polymerization activity was determined by observations of a viscous product and lower temperature of water-steam mixture. Once the activity was established and system reached equilibrium, the reactor was lined out by continuing operating the system under the established condition for a time period of at least five times of mean residence time prior to sample collection. The resulting mixture, containing mostly solvent, polymer and unreacted monomers, was collected in a collection box after the system reached a steady state operation. The collected samples were first air-dried in a hood to evaporate most of the solvent, and then dried in a vacuum oven at a temperature of about 90° C. for about 12 hours. The vacuum oven dried samples were weighed to obtain yields. All the reactions were carried out at a pressure of 2.41 MPa-g and in the temperature range of 45 to 130° C.

Examples 1-4

Four samples were made with rac-dimethylsilylbis(2-methyl-4-phenylindenyl)zirconium dimethyl and dimethylsilyl(tetramethylcyclopentadienyl)(cyclododecylamido)titanium dimethyl at a temperature 115° C. over a range of catalyst ratios. The polymerization reactions followed the general procedure described above. The detailed experimental conditions and results are presented in Table 1.

TABLE 1

|  | Example | | | |
| --- | --- | --- | --- | --- |
|  | 1 | 2 | 3 | 4 |
| Catalyst #1 | A | A | A | A |
| Catalyst #1 feed rate (mole/min) | 4.83E−06 | 3.66E−06 | 3.00E−06 | 2.68E−06 |
| Catalyst #2 | B | B | B | B |
| Catalyst #2 feed rate (mole/min) | 3.64E−07 | 3.64E−07 | 3.64E−07 | 3.64E−07 |
| Propylene feed rate (g/min) | 14 | 14 | 14 | 14 |
| Hexane feed rate (ml/min) | 90 | 90 | 90 | 90 |
| Polymerization temp (° C.) | 115 | 115 | 115 | 115 |
| Mn (kg/mol) | 19.1 | 18.2 | 16.4 | 16.9 |
| Mw (kg/mol) | 31 | 28.3 | 25.7 | 26.7 |
| Mz (kg/mol) | 66.1 | 52.4 | 46.9 | 53.1 |
| g' @ Mz | 1.02 | 0.99 | 0.96 | 0.9 |
| Tc (° C.) | 90.5 | 98.8 | 97.7 | 97.1 |
| Tm (° C.) | 140.5 | 143.2 | 143.8 | 142.8 |
| Tg (° C.) | −17.7 | −10.4 | −10.4 | −11.3 |
| Heat of fusion (J/g) | 21.7 | 25.7 | 34.7 | 35.1 |
| Viscosity @ 190° C. (cps) | 1540 | 1340 | 1240 | 798 |
| Conversion (%) | 95.3 | 89.6 | 87.1 | 92.8 |
| Catalyst activity (kg polymer/g catalyst) | 5.7 | 6.9 | 8.0 | 9.4 |

Catalysts:
A = dimethylsilyl (tetramethylcyclopentadienyl) (cyclododecylamido) titanium dimethyl
B = rac-dimethylsilyl bis(2-methyl-4-phenylindenyl) zirconium dimethyl Examples 5-8

Four samples were made with rac-dimethylsilylbis(2-methyl-4-phenylindenyl)zirconium dimethyl and dimethylsilyl(tetramethylcyclopentadienyl)(t-butylamido)titanium dimethyl at a temperature of 100° C. over a range of catalyst ratio. The polymerization reactions followed the general procedure described above. The detailed experimental conditions and results are presented in Table 2.

TABLE 2

| | Example | | | |
|---|---|---|---|---|
| | 5 | 6 | 7 | 8 |
| Catalyst #1 | F | F | F | F |
| Catalyst #1 feed rate (mole/min) | 4.92E−06 | 4.92E−06 | 4.92E−06 | 4.92E−06 |
| Catalyst #2 | B | B | B | B |
| Catalyst #2 feed rate (mole/min) | 5.67E−07 | 8.50E−07 | 1.13E−06 | 1.42E−06 |
| Propylene feed rate (g/min) | 14 | 14 | 14 | 14 |
| Hexane feed rate (ml/min) | 90 | 90 | 90 | 90 |
| Polymerization temperature (° C.) | 100 | 100 | 100 | 100 |
| Mn (kg/mol) | 12.1 | 11.9 | 8.8 | 12.4 |
| Mw (kg/mol) | 29.4 | 30.7 | 26.3 | 28 |
| Mz (kg/mol) | 84.3 | 81.6 | 80.7 | 84.7 |
| g' @ Mz | 0.93 | 0.88 | 0.87 | 0.84 |
| Tc (° C.) | 95.8 | 98.4 | 96.1 | 95.8 |
| Tm (° C.) | 145.2 | 145.7 | 143.3 | 143.0 |
| Tg (° C.) | −9.6 | −10.4 | −11.1 | −10.0 |
| Heat of fusion (J/g) | 21.4 | 32.4 | 30.0 | 33.0 |
| Viscosity @ 190° C. (cps) | 1100 | 1040 | 840 | 675 |
| Conversion (%) | 88.63 | 91.73 | 68.09 | 77.23 |
| Catalyst activity (kg polymer/g catalyst) | 6.38 | 6.08 | 4.18 | 4.42 |

Catalysts:
B = rac-dimethylsilyl bis(2-methyl-4-phenylindenyl) zirconium dimethyl
F = dimethylsilyl(tetramethylcyclopentadienyl)(tert-butylamido) titanium dimethyl Examples 9-15

Seven samples were made with dimethylsilylbis(indenyl) hafnium dimethyl and dimethylsilyl(tetramethylcyclopentadienyl)(cyclododecylamido)titanium dimethyl over a range of temperatures. The polymerization reactions followed the general procedure described above. The detailed experimental conditions and results are presented in Table 3. The data show that temperature has appreciable effects on crystallinity, Mw, Mw/Mn, and level of branching. The population can also be manipulated through reaction temperatures since the reaction kinetics of each catalyst has unique response to polymerization temperatures.

TABLE 3

| | Example | | | | | | |
|---|---|---|---|---|---|---|---|
| | 9 | 10 | 11 | 12 | 13 | 14 | 15 |
| Catalyst #1 | A | A | A | A | A | A | A |
| Catalyst #1 feed rate (mole/min) | 5.22E−06 | 5.22E−06 | 5.22E−06 | 5.22E−06 | 5.22E−06 | 5.22E−06 | 5.22E−06 |
| Catalyst #2 | C | C | C | C | C | C | C |
| Catalyst #2 feed rate (mole/min) | 1.31E−06 | 1.31E−06 | 1.31E−06 | 1.31E−06 | 1.31E−06 | 1.31E−06 | 1.31E−06 |
| Propylene feed rate (g/min) | 14 | 14 | 14 | 14 | 14 | 14 | 14 |
| Hexane feed rate (ml/min) | 90 | 90 | 90 | 90 | 90 | 90 | 90 |
| Polymerization temperature (° C) | 110 | 105 | 100 | 95 | 90 | 85 | 80 |
| Mn (kg/mol) | 8.5 | 8.2 | 9.8 | 11.1 | 22.5 | 26.6 | 30.9 |
| Mw (kg/mol) | 15.7 | 17.1 | 19.8 | 23.5 | 41.1 | 46.9 | 55.8 |
| Mz (kg/mol) | 30.6 | 37.9 | 42.2 | 40.4 | 79.8 | 84.8 | 95.5 |
| g' @Mz | 1 | 0.97 | 0.95 | 0.97 | 0.98 | 0.97 | 0.98 |
| Tc (° C.) | 22.8 | 31.6 | 40.5 | 47.8 | 53.5 | 61.0 | 64.8 |
| Tm (° C.) | 74.7 | 82.3 | 87.4 | 94.3 | 103.3 | 107.7 | 113.7 |
| Tg (° C.) | −15.5 | −13.0 | −12.0 | −10.0 | −7.5 | −7.5 | −6.0 |
| Heat of fusion (J/g) | 14.4 | 16.6 | 21.5 | 26.0 | 21.0 | 27.8 | 26.7 |
| Viscosity @190° C. (cps) | 227 | 272 | 441 | 813 | 5280 | 7250 | 15400 |

Catalysts:
A = dimethylsilyl (tetramethylcyclopentadienyl) (cyclododecylamido) titanium dimethyl
C = rac-dimethylsilyl bis (indenyl) hafnium dimethyl

Examples 16-19

Four samples were made with rac-dimethylsilylbis(indenyl)hafnium dimethyl and dimethylsilyl(tetramethylcyclopentadienyl)(cyclododecylamido)titanium dimethyl at a temperature of 100° C. and various catalyst ratios. The polymerization reactions followed the general procedure described above. The detailed experimental conditions and results are presented in Table 4. The data show that catalyst ratios have appreciable effects on crystallinity, Mw, Mw/Mn, and level of branching. The population can also be manipulated through reaction temperatures since the reaction kinetics of each catalyst has unique response to polymerization temperatures.

TABLE 4

| | Example | | | |
|---|---|---|---|---|
| | 16 | 17 | 18 | 19 |
| Catalyst #1 | A | A | A | A |
| Catalyst #1 feed rate (mole/min) | 8.49E−07 | 8.49E−07 | 8.49E−07 | 8.49E−07 |
| Catalyst #2 | C | C | C | C |
| Catalyst #2 feed rate (mole/min) | 5.51E−07 | 8.26E−07 | 1.28E−06 | 1.93E−06 |
| Propylene feed rate (g/min) | 14 | 14 | 14 | 14 |
| Hexane feed rate (ml/min) | 90 | 90 | 90 | 90 |
| Polymerization temperature (° C.) | 100 | 100 | 100 | 100 |
| Mn (kg/mol) | 17.1 | 14.1 | 9.6 | 7.3 |
| Mw (kg/mol) | 28 | 20.7 | 14.3 | 10.6 |
| Mz (kg/mol) | 65 | 37.6 | 24.9 | 18.2 |
| g' @ Mz | 1.05 | 0.97 | 0.92 | 0.94 |
| Tc (° C.) | 61.2 | 55.2 | 30.8 | 28.8 |
| Tm (° C.) | 107.3 | 97.6 | 76.9 | 64.3 |
| Tg (° C.) | −8.9 | −14.5 | −15.3 | −14.6 |
| Heat of fusion (J/g) | 29.9 | 31.2 | 19.9 | 7.6 |
| Viscosity @ 190° C. (cps) | 1355 | 412 | 165 | 87 |
| Conversion (%) | 86.20 | 91.89 | 100.56 | 97.90 |
| Catalyst activity (kg polymer/g catalyst) | 18.74 | 16.49 | 13.97 | 10.34 |

Catalysts:
A = dimethylsilyl (tetramethylcyclopentadienyl) (cyclododecylamido) titanium dimethyl
C = rac-dimethylsilyl bis (indenyl) hafnium dimethyl

Examples 20-34

Fifteen samples were made with rac-dimethylsilylbis(2-methyl-4-phenylindenyl)zirconium dimethyl and dimethylsilyl(tetramethylcyclopentadienyl)(cyclododecylamido)titanium dimethyl catalysts, following the general procedure described above with the exception that a small quantity of 1,9-decadiene was fed as the diolefin monomer along with propylene as the alpha-olefin monomer. The detailed experimental conditions and results are presented in Tables 5 and 6.

TABLE 5

| | Example | | | | |
|---|---|---|---|---|---|
| | 20 | 21 | 22 | 23 | 24 |
| Catalyst #1 | A | A | A | A | A |
| Catalyst #1 feed rate (mole/min) | 6.53E−06 | 6.53E−06 | 6.53E−06 | 6.53E−06 | 6.53E−06 |
| Catalyst #2 | B | B | B | B | B |
| Catalyst #2 feed rate (mole/min) | 6.92E−07 | 3.64E−07 | 3.64E−07 | 2.19E−07 | 2.19E−07 |
| Propylene feed rate (g/min) | 14 | 14 | 14 | 8.3 | 10 |
| 1,9 decadiene feed rate (ml/min) | 0.19 | 0.19 | 0.19 | 0.13 | 0.13 |
| Hexane feed rate (ml/min) | 90 | 90 | 90 | 90 | 90 |
| Polymerization temperature (° C.) | 120 | 125 | 120 | 120 | 110 |
| Mn (kg/mol) | 15.6 | 14.7 | 14.3 | — | — |
| Mw (kg/mol) | 23 | 24.6 | 29.5 | — | — |
| Mz (kg/mol) | 55.2 | 64.2 | 85 | — | — |
| g' @Mz | 0.85 | 0.91 | 0.85 | — | — |
| Tc (° C.) | 86.5 | 91.8 | 91.8 | 86.5 | 87.6 |
| Tm (° C.) | 116.6 | 128.7 | 129.7 | 128.8 | 137.6 |
| Tg (° C.) | −10.6 | −11.1 | −9.7 | −9.4 | −7.5 |
| Heat of fusion (J/g) | 31.8 | 32.1 | 26.0 | 17.0 | 19.4 |
| Viscosity @ 190° C. (cps) | 721 | 725 | 1240 | 448 | 2240 |
| Conversion (%) | 93.32 | 77.57 | 81.12 | 77.49 | 85.13 |
| Catalyst activity (kg polymer/g catalyst) | 4.00 | 3.54 | 3.70 | 2.15 | 2.85 |

| | Example | | | | |
|---|---|---|---|---|---|
| | 25 | 26 | 27 | 28 | 29 |
| Catalyst #1 | A | A | A | A | A |
| Catalyst #1 feed rate (mole/min) | 5.22E−06 | 5.22E−06 | 5.22E−06 | 6.53E−06 | 6.53E−06 |

TABLE 5-continued

| Catalyst #2 | B | B | B | B | B |
|---|---|---|---|---|---|
| Catalyst #2 feed rate (mole/min) | 7.65E-07 | 7.65E-07 | 7.65E-07 | 2.19E-07 | 4.74E-07 |
| Propylene feed rate (g/min) | 14 | 14 | 14 | 10 | 14 |
| 1,9 decadiene feed rate (ml/min) | 0.24 | 2.24 | 0.19 | 0.13 | 0.19 |
| Hexane feed rate (ml/min) | 90 | 90 | 90 | 90 | 90 |
| Polymerization temperature (° C.) | 115 | 117 | 110 | 125 | 115 |
| Mn (kg/mol) | 20 | | 23 | | 17.3 |
| Mw (kg/mol) | 36.7 | | 45.5 | | 34.5 |
| Mz (kg/mol) | 111.9 | | 104 | | 97.1 |
| g' @Mz | 0.68 | | 0.75 | | 0.75 |
| Tc (° C.) | 91.1 | 87.0 | 96.8 | 77.3 | 88.5 |
| Tm (° C.) | 136.6 | 133.7 | 134.2 | 130.0 | 136.3 |
| Tg (° C.) | −9.6 | −10.7 | −9.7 | −11.2 | −12.4 |
| Heat of fusion (J/g) | 51.5 | 39.5 | 42.5 | 15.1 | 35.8 |
| Viscosity @ 190° C. (cps) | 880 | 518 | 1850 | 661 | 1040 |
| Conversion (%) | 92.20 | 89.30 | 96.84 | 80.62 | 91.15 |
| Catalyst activity (kg polymer/g catalyst) | 4.72 | 4.57 | 4.96 | 2.70 | 4.07 |

Catalysts:
A = dimethylsilyl (tetramethylcyclopentadienyl) (cyclododecylamido) titanium dimethyl
B = rac-dimethylsilyl bis(2-methyl-4-phenylindenyl) zirconium dimethyl

TABLE 6

| | Example | | | | |
|---|---|---|---|---|---|
| | 30 | 31 | 32 | 33 | 34 |
| Catalyst #1 | A | A | A | A | A |
| Catalyst #1 feed rate (mole/min) | 1.02E-06 | 5.22E-06 | 6.53E-06 | 6.53E-06 | 6.53E-06 |
| Catalyst #2 | B | B | B | B | B |
| Catalyst #2 feed rate (mole/min) | 1.13E-07 | 7.65E-07 | 4.74E-07 | 6.20E-07 | 3.64E-07 |
| Propylene feed rate (g/min) | 14 | 14 | 14 | 14 | 14 |
| 1,9 decadiene feed rate (ml/min) | 0.19 | 0.24 | 0.19 | 0.19 | 0.19 |
| Hexane feed rate (ml/min) | 90 | 90 | 90 | 90 | 90 |
| Polymerization temperature (° C.) | 115 | 115 | 110 | 110 | 115 |
| Mn (kg/mol) | 20.3 | 14.9 | 13.6 | 16.1 | 17.6 |
| Mw (kg/mol) | 96.2 | 34.3 | 30.2 | 30.4 | 36.5 |
| Mz (kg/mol) | 636.2 | 114.8 | 67.6 | 68.7 | 91.5 |
| g' @Mz | 0.46 | 0.72 | 0.95 | 0.88 | 0.85 |
| Tc (° C.) | | 91.4 | 91.8 | 94.3 | 84.4 |
| Tm (° C.) | | 129.3 | 140.5 | 140.6 | 137.2 |
| Tg (° C.) | | −10.0 | −11.2 | −8.9 | −8.2 |
| Heat of fusion (J/g) | | 46.9 | 28.3 | 38.4 | 20.8 |
| Viscosity @ 190° C. (cps) | | 1030 | 1870 | 1360 | 2470 |
| Conversion (%) | 56.38 | 95.32 | 97.29 | 97.24 | 87.82 |
| Catalyst activity (kg polymer/g catalyst) | 15.44 | 4.88 | 4.34 | 4.23 | 4.00 |

Catalysts:
A = dimethylsilyl (tetramethylcyclopentadienyl) (cyclododecylamido) titanium dimethyl
B = rac-dimethylsilyl bis(2-methyl-4-phenylindenyl) zirconium dimethyl Examples 35-39

Five samples were made with dimethylsilylbis(indenyl) hafnium dimethyl and dimethylsilyl(tetramethylcyclopentadienyl)(cyclododecylamido)titanium dimethyl over a range of temperatures from 85 to 105° C., following the general procedure described above with the exception that a small quantity of 1,9-decadiene was fed as the diolefin monomer along with propylene as the alpha-olefin monomer. The detailed experimental conditions and results are presented in Table 7.

TABLE 7

| | Example | | | | |
|---|---|---|---|---|---|
| | 35 | 36 | 37 | 38 | 39 |
| Catalyst #1 | A | A | A | A | A |
| Catalyst #1 feed rate (mole/min) | 5.22E−06 | 5.22E−06 | 5.22E−06 | 5.22E−06 | 5.22E−06 |
| Catalyst #2 | C | C | C | C | C |
| Catalyst #2 feed rate (mole/min) | 1.75E−06 | 1.75E−06 | 1.75E−06 | 1.75E−06 | 1.75E−06 |
| Propylene feed rate (g/min) | 14 | 14 | 14 | 14 | 14 |
| 1,9 decadiene feed rate (ml/min) | 0.24 | 0.24 | 0.24 | 0.24 | 0.24 |
| Hexane feed rate (ml/min) | 90 | 90 | 90 | 90 | 90 |
| Polymerization temperature (° C.) | 105 | 100 | 95 | 90 | 85 |
| Mn (kg/mol) | 9.6 | 15.7 | 14.1 | 15.2 | 29.3 |
| Mw (kg/mol) | 16.5 | 24.6 | 30 | 40.4 | 69.1 |
| Mz (kg/mol) | 33.4 | 48.4 | 70.7 | 103.1 | 222.6 |
| g' @ Mz | 0.89 | 0.81 | 0.8 | 0.76 | 0.66 |
| Tc (° C.) | 25.2 | 29.4 | 30.9 | 41.8 | 53.5 |
| Tm (° C.) | 67.3 | 76.1 | 81.2 | 91.3 | 102.3 |
| Tg (° C.) | −15.4 | −13.3 | −13.1 | −8.1 | −7.4 |
| Heat of fusion (J/g) | 13.4 | 19.5 | 20.9 | 25.7 | 33.3 |
| Viscosity @ 190° C. (cps) | 194 | 291 | 568 | 1650 | 5210 |

Catalysts:
A = dimethylsilyl (tetramethylcyclopentadienyl) (cyclododecylamido) titanium dimethyl
C = rac-dimethylsilyl bis (indenyl) hafnium dimethyl Examples 40-43

Four samples were made with rac-dimethylsilylbis(indenyl)hafnium dimethyl and dimethylsilyl(tetramethylcyclopentadienyl)(cyclododecylamido)titanium dimethyl, following the general procedure described above with the exception that a small quantity of 1,9-decadiene was fed as the diolefin monomer along with propylene as the alpha-olefin monomer. The detailed experimental conditions and results are presented in Table 8.

TABLE 8

| | Example | | | |
|---|---|---|---|---|
| | 40 | 41 | 42 | 43 |
| Catalyst #1 | A | A | A | A |
| Catalyst #1 feed rate (mole/min) | 8.49E−07 | 8.49E−07 | 8.49E−07 | 5.22E−06 |
| Catalyst #2 | C | C | C | C |
| Catalyst #2 feed rate (mole/min) | 8.26E−07 | 5.51E−07 | 5.51E−07 | 5.82E−07 |
| Propylene feed rate (g/min) | 14 | 14 | 14 | 14 |
| 1,9 decadiene feed rate (ml/min) | 0.05 | 0.02 | 0.05 | 0.19 |
| Hexane feed rate (ml/min) | 90 | 90 | 86 | 90 |
| Polymerization temperature (° C.) | 100 | 95 | 90 | 95 |
| Mn (kg/mol) | 10.5 | 16.1 | 23 | 28.3 |
| Mw (kg/mol) | 19.5 | 24.4 | 39.4 | 94.8 |
| Mz (kg/mol) | 38 | 44.3 | 71.3 | 455.2 |
| g' @ Mz | 0.92 | 0.93 | 0.93 | 0.54 |
| Tc (° C.) | 47.7 | 53.7 | 71.0 | 37.4 |
| Tm (° C.) | 94.4 | 98.6 | 112.5 | 101.2 |
| Tg (° C.) | −12.3 | −11.1 | −24.6 | −10.3 |
| Heat of fusion (J/g) | 30.8 | 31.6 | 44.6 | 22.4 |
| Viscosity @ 190° C. (cps) | 327 | 625 | 2370 | — |
| Conversion (%) | 93.80 | — | 98.62 | — |

TABLE 8-continued

| | Example | | | |
|---|---|---|---|---|
| | 40 | 41 | 42 | 43 |
| Catalyst activity (kg polymer/g catalyst) | 16.83 | — | 21.44 | — |

Catalysts:
A = dimethylsilyl (tetramethylcyclopentadienyl) (cyclododecylamido) titanium dimethyl
C = rac-dimethylsilyl bis (indenyl) hafnium dimethyl Examples 44-47

Four samples were made using rac-1,2-ethylene-bis(4,7-dimethylindenyl)hafnium dimethyl and dimethylsilyl-(tetramethylcyclopentadienyl)(cyclododecylamido)titanium dimethyl at a temperature 110° C. over a range of catalyst ratios. The conditions used for examples 44 to 47, which included diolefin incorporation, followed the general procedure described above with the exception that a small quantity of 1,9-decadiene was fed as the diolefin monomer along with propylene as the alpha-olefin monomer. The detailed experimental conditions and results are presented in Table 9.

TABLE 9

| | Example | | | |
|---|---|---|---|---|
| | 44 | 45 | 46 | 47 |
| Catalyst #1 | A | A | A | A |
| Catalyst #1 feed rate (mole/min) | 6.53E−06 | 3.79E−06 | 2.74E−06 | 2.09E−06 |
| Catalyst #2 | D | D | D | D |
| Catalyst #2 feed rate (mole/min) | 4.25E−07 | 4.25E−07 | 4.25E−07 | 4.25E−07 |

TABLE 9-continued

|  | Example | | | |
|---|---|---|---|---|
|  | 44 | 45 | 46 | 47 |
| Propylene feed rate (g/min) | 14 | 14 | 14 | 14 |
| 1,9 decadiene feed rate (ml/min) | 0.09 | 0.09 | 0.09 | 0.09 |
| Hexane feed rate (ml/min) | 90 | 90 | 90 | 90 |
| Polymerization temperature (° C.) | 115 | 115 | 115 | 115 |
| Mn (kg/mol) | 21.5 | 20 | 21.2 | 16.1 |
| Mw (kg/mol) | 36.2 | 32.7 | 34 | 33.5 |
| Mz (kg/mol) | 100.1 | 95.6 | 123.7 | 128.8 |
| Tc (° C.) | 41.0 | 51.5 | 59.8 | 74.4 |
| Tm (° C.) | 94.3 | 97.6 | 103.4 | 109.4 |
| Tg (° C.) | −22.8 | −23.8 | −12.5 | −18.9 |
| Heat of fusion (J/g) | 4.1 | 6.8 | 11.3 | 15.8 |
| Viscosity @ 190° C. (cps) | 2090 | 1750 | 1570 | 1230 |
| Conversion (%) | 83.58 | 83.95 | 71.84 | 63.10 |
| Catalyst activity (kg polymer/g catalyst) | 3.80 | 6.26 | 7.08 | 7.78 |

Catalysts:
A = dimethylsilyl (tetramethylcyclopentadienyl) (cyclododecylamido) titanium dimethyl
D = rac-1,2-ethylene bis (4,7-dimethylindenyl)hafnium dimethyl Examples 48-51

Four samples were made with rac-dimethylsilylbis(2-methylindenyl)zirconium dimethyl and dimethylsilyl(tetramethylcyclopentadienyl)(cyclododecylamido)titanium dimethyl at a temperature of 80° C. following the general procedure described above with the exception that a small quantity of 1,9-decadiene was fed as the diolefin monomer along with propylene as the alpha-olefin monomer. The detailed experimental conditions and results are presented in Table 10.

TABLE 10

|  | Example | | | |
|---|---|---|---|---|
|  | 48 | 49 | 50 | 51 |
| Catalyst #1 | A | A | A | A |
| Catalyst #1 feed rate (mole/min) | 6.53E−06 | 6.53E−06 | 6.53E−06 | 6.53E−06 |

TABLE 10-continued

|  | Example | | | |
|---|---|---|---|---|
|  | 48 | 49 | 50 | 51 |
| Catalyst #2 | E | E | E | E |
| Catalyst #2 feed rate (mole/min) | 1.23E−06 | 1.57E−06 | 1.92E−06 | 2.26E−06 |
| Propylene feed rate (g/min) | 14 | 14 | 14 | 14 |
| 1,9 decadiene feed rate (ml/min) | 0.14 | 0.14 | 0.14 | 0.14 |
| Hexane rate (ml/min) | 90 | 90 | 90 | 90 |
| Polymerization temperature (° C.) | 80 | 80 | 80 | 80 |
| Mn (kg/mol) | 19.9 | 16 | 11.4 | 10 |
| Mw (kg/mol) | 43.8 | 36.9 | 25.9 | 19.2 |
| Mz (kg/mol) | 106.3 | 72.3 | 54.5 | 38.8 |
| g' @ Mz | 0.88 | 0.93 | 0.93 | 0.93 |
| Tc (° C.) | 49.0 | 53.3 | 58.6 | 53.1 |
| Tm (° C.) | 109.8 | 107.8 | 103.2 | 102.0 |
| Tg (° C.) | −10.7 | −7.4 | −9.1 | −9.6 |
| Heat of fusion (J/g) | 25.8 | 29.4 | 31.4 | 37.7 |
| Viscosity @ 190° C. (cps) | 4680 | 2040 | 952 | 464 |

Catalysts:
A = dimethylsilyl (tetramethylcyclopentadienyl) (cyclododecylamido) titanium dimethyl
E = rac-dimethylsily bis(2-methylindenyl)zirconium dimethyl Examples 52-57

Six samples were made with rac-dimethylsilylbis(2-methyl-4-phenylindenyl)zirconium dimethyl and dimethylsilyl-(tetramethylcyclopentadienyl)(cyclododecylamido)titanium dimethyl at a temperature range of 80 to 95° C. following the general procedure described above with the exception that (1) a small quantity of 1,9-decadiene was fed as the diolefin monomer along with propylene as the alpha-olefin monomer; (2) A small amount of hydrogen was also fed in the reactor. The detailed experimental conditions and results are presented in Table 11. Examples 52-57 show that addition of hydrogen can effectively manipulate Mw, Mw/Mn, crystallinity, the ratio of crystalline phase to the amorphous phase, in addition to the control obtained through catalyst selections and process conditions such as temperatures.

TABLE 11

|  | Example | | | | | |
|---|---|---|---|---|---|---|
|  | 52 | 53 | 54 | 55 | 56 | 57 |
| Catalyst #1 | A | A | A | A | A | A |
| Catalyst #1 feed rate (mole/min) | 6.10E−06 | 6.10E−06 | 6.10E−06 | 6.10E−06 | 6.10E−06 | 6.10E−06 |
| Catalyst #2 | B | B | B | B | B | B |
| Catalyst #2 feed rate (mole/min) | 2.83E−07 | 2.83E−07 | 2.83E−07 | 2.83E−07 | 1.98E−07 | 1.98E−07 |
| Propylene (g/min) | 14 | 14 | 14 | 14 | 14 | 14 |
| 1,9 decadiene feed rate (ml/min) | 0.19 | 0.19 | 0.19 | 0.19 | 0.19 | 0.19 |
| H2 feed rate (cc/min) | 50 | 50 | 50 | 50 | 70 | 70 |
| Hexane feed rate (ml/min) | 90 | 90 | 90 | 90 | 90 | 90 |
| Polymerization temperature (° C.) | 95 | 90 | 85 | 80 | 90 | 80 |
| Mn (kg/mol) | 12.6 | 11 | 12.5 | 15.7 | 18.1 | 11.7 |

TABLE 11-continued

| | Example | | | | | |
|---|---|---|---|---|---|---|
| | 52 | 53 | 54 | 55 | 56 | 57 |
| Mw (kg/mol) | 27.5 | 43.2 | 42.3 | 85.3 | 34 | 29.8 |
| Mz (kg/mol) | 72.2 | 127 | 153.4 | 468.3 | 126 | 99 |
| g' @ Mz | 0.82 | 0.74 | 0.8 | 0.66 | 0.8 | 0.84 |
| Tc (° C.) | 95.7 | 95.8 | 97.4 | 97.0 | 98.9 | 97.7 |
| Tm (° C.) | 141.0 | 145.1 | 145.8 | 147.0 | 144.5 | 145.1 |
| Tg (° C.) | −14.6 | −13.3 | −12.3 | −9.8 | −17.2 | −14.8 |
| Heat of fusion (J/g) | 38.5 | 45.4 | 35.9 | 35.4 | 49.3 | 39.2 |
| Viscosity @ 190° C. (cps) | 668 | 1049 | 2148 | 16090 | 810 | 822 |

Catalysts:
A = dimethylsilyl (tetramethylcyclopentadienyl) (cyclododecylamido) titanium dimethyl
B = rac-dimethylsilyl bis(2-methyl-4-phenylindenyl) zirconium dimethyl Examples 58-60

Three samples were made with rac-dimethylsilylbis(2-methyl-4-phenylindenyl)zirconium dimethyl and dimethylsilyl-(tetramethylcyclopentadienyl)(cyclododecylamido)titanium dimethyl at a temperature 115° C. and a catalyst ratio of about 87 molar percent, following the general procedure described above with the following exceptions: (1) a small quantity of 1,9-decadiene was fed as the diolefin monomer; (2) both rac-dimethylsilylbis(2-methyl-4-phenylindenyl)zirconium dimethyl and dimethylsilyl(tetramethylcyclopentadienyl)(cyclododecylamido)titanium dimethyl catalysts were premixed and diluted in toluene, then fed into catalyst manifold without preactivation; (3) N,N-dimethylanilinium tetrakis(pentafluorophenyl)borate was diluted in toluene and then fed into catalyst manifold; (4) catalyst activation started in catalyst manifold. The detailed experimental conditions and results are presented in Table 12. Examples 58-60 demonstrate that catalysts can be activated in-line just prior to the reactor and in reactor.

TABLE 12

| | Example | | |
|---|---|---|---|
| | 58 | 59 | 60 |
| Catalyst #1 | A | A | A |
| Catalyst #1 feed rate (mole/min) | 4.06E−06 | 2.54E−06 | 1.52E−06 |
| Catalyst #2 | B | B | B |
| Catalyst #2 feed rate (mole/min) | 2.95E−07 | 1.84E−07 | 1.11E−07 |
| Propylene (g/min) | 14 | 14 | 14 |
| 1,9 decadiene feed rate (ml/min) | 0.14 | 0.14 | 0.14 |
| Hexane feed rate (ml/min) | 90 | 90 | 90 |
| Polymerization temperature (° C.) | 115 | 115 | 115 |
| Mn (kg/mol) | 13.2 | 18.2 | 24.2 |

TABLE 12-continued

| | Example | | |
|---|---|---|---|
| | 58 | 59 | 60 |
| Mw (kg/mol) | 34.5 | 50.8 | 69.9 |
| Mz (kg/mol) | 99.6 | 169 | 248.6 |
| g' @ Mz | 0.79 | 0.72 | 0.69 |
| Tc (° C.) | 90.6 | 92.9 | 93.0 |
| Tm (° C.) | 137.0 | 139.6 | 142.6 |
| Tg (° C.) | −10.8 | −10.0 | −8.7 |
| Heat of fusion (J/g) | 32.5 | 32.9 | 28.4 |
| Viscosity @ 190° C. (cps) | 1657 | 3170 | 11600 |
| Conversion (%) | 89.64 | 77.50 | 95.59 |
| Catalyst activity (kg polymer/g catalyst) | 6.43 | 8.90 | 18.29 |

Catalysts:
A = dimethylsilyl (tetramethylcyclopentadienyl) (cyclododecylamido) titanium dimethyl
B = rac-dimethylsilyl bis(2-methyl-4-phenylindenyl) zirconium dimethyl Examples 61-66

Six samples were made with dimethylsilylbis(2-methyl-4-phenylindenyl)zirconium dimethyl and dimethylsilyl(tetramethylcyclopentadienyl)(cyclododecylamido)titanium dimethyl at a temperature range of 105 to 130° C. and a catalyst mix of about 35.6 molar percent, following the general procedure described above with the following exceptions: (1) a small quantity of 1,9-decadiene was fed as the diolefin monomer; (2) ethylene was added to the reactor. The detailed experimental conditions and results are presented in Table 13. Ethylene content in the polymer was obtained from by Fourier Transformation Infrared analysis (FTIR).

TABLE 13

| | Example | | | | | |
|---|---|---|---|---|---|---|
| | 61 | 62 | 63 | 64 | 65 | 66 |
| Catalyst #1 | A | A | A | A | A | A |
| Catalyst #1 feed rate (mole/min) | 1.02E−06 | 1.02E−06 | 1.02E−06 | 1.02E−06 | 1.02E−06 | 1.02E−06 |
| Catalyst #2 | B | B | B | B | B | B |
| Catalyst #2 feed rate (mole/min) | 1.84E−07 | 1.84E−07 | 1.84E−07 | 1.84E−07 | 1.84E−07 | 1.84E−07 |
| Propylene feed rate (g/min) | 20 | 20 | 20 | 20 | 20 | 20 |

TABLE 13-continued

|  | Example | | | | | |
| --- | --- | --- | --- | --- | --- | --- |
|  | 61 | 62 | 63 | 64 | 65 | 66 |
| 1,9 decadiene feed rate (ml/min) | 0.186 | 0.186 | 0.186 | 0.186 | 0.186 | 0.186 |
| Ethlyene feed rate (SLPM) | 0.2 | 0.2 | 0.2 | 0.2 | 0.2 | 0.2 |
| Hexane feed rate (ml/min) | 90 | 90 | 90 | 90 | 90 | 90 |
| Polymerization temperature (° C.) | 130 | 125 | 120 | 115 | 110 | 105 |
| Mn (kg/mol) | 13.1 | 12.3 | 11.8 | 15.1 | 15.3 | 17.7 |
| Mw (kg/mol) | 37.3 | 36.2 | 40.5 | 47.7 | 45.2 | 53.8 |
| Mz (kg/mol) | 149.2 | 122 | 132.1 | 153.9 | 206.8 | 180.7 |
| g' @ Mz | 0.67 | 0.65 | 0.63 | 0.61 | 0.56 | 0.56 |
| Tc (° C.) | 80.4 | 79.6 | 84.6 | 85.5 | 87.7 | 86.6 |
| Tm (° C.) | 121.8 | 121.9 | 124.6 | 125.2 | 126.1 | 126.2 |
| Tg (° C.) | −15.0 | −15.2 | −14.9 | −14.8 | −15.0 | −15.6 |
| Heat of fusion (J/g) | 32.4 | 43.3 | 51.7 | 50.5 | 50.4 | 49.7 |
| Viscosity @190° C. (cps) | 1440 | 977 | 1090 | 1510 | 1530 | 1720 |
| Ethylene content from FTIR (wt. %) | 4.3 | 3.5 | 3 | 2.6 | 2.9 | 2.9 |
| Conversion (%) | 68.11 | 82.57 | 89.87 |  | 92.79 | 92.18 |
| Catalyst activity (kg polymer/g catalyst) | 24.92 | 30.21 | 32.88 |  | 33.95 | 33.73 |

Catalysts:
A = dimethylsilyl (tetramethylcyclopentadienyl) (cyclododecylamido) titanium dimethyl
B = rac-dimethylsilyl bis(2-methyl-4-phenylindenyl) zirconium dimethyl Examples 67-71

All these samples were made with dimethylsilylbis(2-methyl-4-phenylindenyl)zirconium dimethyl and dimethylsilyl-(tetramethylcyclopentadienyl)(cyclododecylamido)titanium dimethyl at a temperature range of 105 to 115° C. except example 69, following the general procedure described above with the following exceptions: (1) a small quantity of dicyclopentadiene was used in example 67 (The dicyclopentadiene, obtained from aldrich, was first dissolved in toluene. The solution was then purified by passing through alumina activated at high temperature under nitrogen, followed by molecular sieve activated at high temperature under nitrogen.); (2)1-butene was used in examples 68 and 70; (3) 1,9-decadiene and 1-hexene were fed as the diolefin monomer and comonomer, respectively in example 71. Example 69 was made using dimethylsilyl-(tetramethylcyclopentadienyl)(cyclododecylamido)titanium dimethyl and rac-dimethylsily bis(2-methylindenyl)zirconium dimethyl catalysts. The detailed experimental conditions and results are presented in Table 14.

TABLE 14

|  | Example | | | | |
| --- | --- | --- | --- | --- | --- |
|  | 67 | 68 | 69 | 70 | 71 |
| Catalyst #1 | A | A | A | A | A |
| Catalyst #1 feed rate (mole/min) | 5.22E−06 | 5.22E−06 | 2.09E−06 | 5.22E−06 | 5.22E−06 |
| Catalyst #2 | B | B | E | B | B |
| Catalyst #2 feed rate (mole/min) | 7.65E−07 | 7.65E−07 | 4.25E−07 | 7.65E−07 | 7.65E−07 |
| Propylene feed rate (g/min) | 14 | 14 | 14 | 14 | 14 |
| Comonomer | dicyclopentadiene | Butene-1 | — | Butene-1 | 1,9 decadiene |
| Comonomer feed rate (ml/min) | 0.23 | 0.6 | — | 2.5 | 0.206 |
| 1-hexene flow rate (ml/min) | — | — | — | — | 3.29 |
| Hexane feed rate (ml/min) | 90 | 90 | 90 | 90 | 90 |
| Polymerization temperature (° C.) | 110 | 115 | 110 | 105 | 115 |
| Mn (kg/mol) | — | — | 12.2 | — | — |
| Mw (kg/mol) | — | — | 30.6 | — | — |
| Mz (kg/mol) | — | — | 84.3 | — | — |
| Tc (° C.) | — | — | 72.3 | 86.0 | 42.6 |
| Tm (° C.) | — | — | 112.1 | 124.8 | 89.8 |
| Tg (° C.) | — | — | −22.4 | −12.3 | −15.2 |

TABLE 14-continued

| | Example | | | | |
|---|---|---|---|---|---|
| | 67 | 68 | 69 | 70 | 71 |
| Heat of fusion (J/g) | — | — | 23.3 | 38.4 | 27.0 |
| Viscosity @190° C. (cp) | 665 | 563 | 1420 | 1100 | 524 |
| Conversion (%) | 74.40 | 98.07 | 65.78 | — | 98.98 |
| Catalyst activity (kg polymer/g catalyst) | 3.81 | 5.15 | 8.11 | — | 5.77 |

Catalysts
A = dimethylsilyl (tetramethylcyclopentadienyl) (cyclododecylamido) titanium dimethyl
B = rac-dimethylsilyl bis(2-methyl-4-phenylindenyl) zirconium dimethyl Example 72

Example 72 was carried out in a 500-ml autoclave batch reactor. 125 ml of purified toluene was first added into the stainless steel autoclave reactor, followed by addition of 0.1 ml of tri-iso-butyl aluminum (TIBAL) solution (25-wt. % of TIBAL diluted in 5 ml of toluene). The mixture was then stirred and heated to 120° C. until stable pressure. The reactor was maintained at a slightly positive pressure. In succession, 125 ml of prepurified propylene was added under stirring. The reactor mixture was heated to 120° C. At this reactor temperature, 1.5 ml of the premixed and preactivated catalyst solution was cannulated into the reactor using nitrogen. The catalyst solution consists of 32 mg of dimethylsilyl(tetramethylcyclopentadienyl)(cyclododecylamido)titanium dimethyl, 1.9 mg of rac-dimethylsilylbis(2-methyl-4-phenylindenyl)zirconium dimethyl, and 1.6 mg of dimethylsilylbis(indenyl)hafnium dimethyl, and 62.1 mg of N,N-dimethylanilinium tetrakis(pentafluorophenyl)borate were dissolved in 50 ml of toluene. The polymerization was conducted for 15 minutes. Thereafter, the reactor was cooled down and vented to the atmosphere. The resulting mixture, containing mostly solvent, polymer and unreacted monomers, was collected in a collection box and first air-dried in a hood to evaporate most of the solvent, and then dried in a vacuum oven at a temperature of about 90° C. for about 12 hours. The resulting polymer (12.79 grams) showed a peak crystallization temperature by DSC of 102.9° C., a glass transition (Tg) of −8.7° C., and a heat of fusion of 51.9 J/g. The average molecular weights, Mn/Mw/Mz, are 33825/66387/267680.

Example 73-75 (Comparative)

Three samples were made with rac-dimethylsilylbis(2-methyl-4-phenylindenyl)zirconium dimethyl or dimethylsilyl(tetramethylcyclopentadienyl)(cyclododecylamido)titanium dimethyl, following the general procedure described above except that only one catalyst was used. Rac-dimethylsilylbis(2-methyl-4-phenylindenyl)zirconium dimethyl was used to make isotactic polypropylene, while dimethylsilyl(tetramethylcyclopentadienyl)(cyclododecylamido)titanium dimethyl was used to make amorphous polypropylene. The experimental conditions and viscosity of polymer samples are presented in Table 15.

TABLE 15

| | Example | | |
|---|---|---|---|
| | 73 | 74 | 75 |
| Catalyst | A | A | B |
| Catalyst feed rate (mol/min) | 5.08E−06 | 5.08E−06 | 5.67E−07 |
| Propylene feed rate (g/min) | 14 | 14 | 14 |
| Hexane feed rate (ml/min) | 90 | 90 | 90 |
| Polymerization temperature (° C.) | 130 | 125 | 110 |
| Viscosity (cps) @ 190° C. | 1132 | 2220 | 328 |

Catalyst
A = dimethylsilyl (tetramethylcyclopentadienyl) (cyclododecylamido) titanium dimethyl
B = rac-dimethylsilyl bis(2-methyl-4-phenylindenyl) zirconium dimethyl Several samples from the preceding experiments were analyzed to determine their level of branching. For the purposes of this invention, the degree of branching is determined using the value of branching index g' at the molecular weight of Mz of the branched polymer. The results are presented in Tables 1 to 13.

Figure 5:
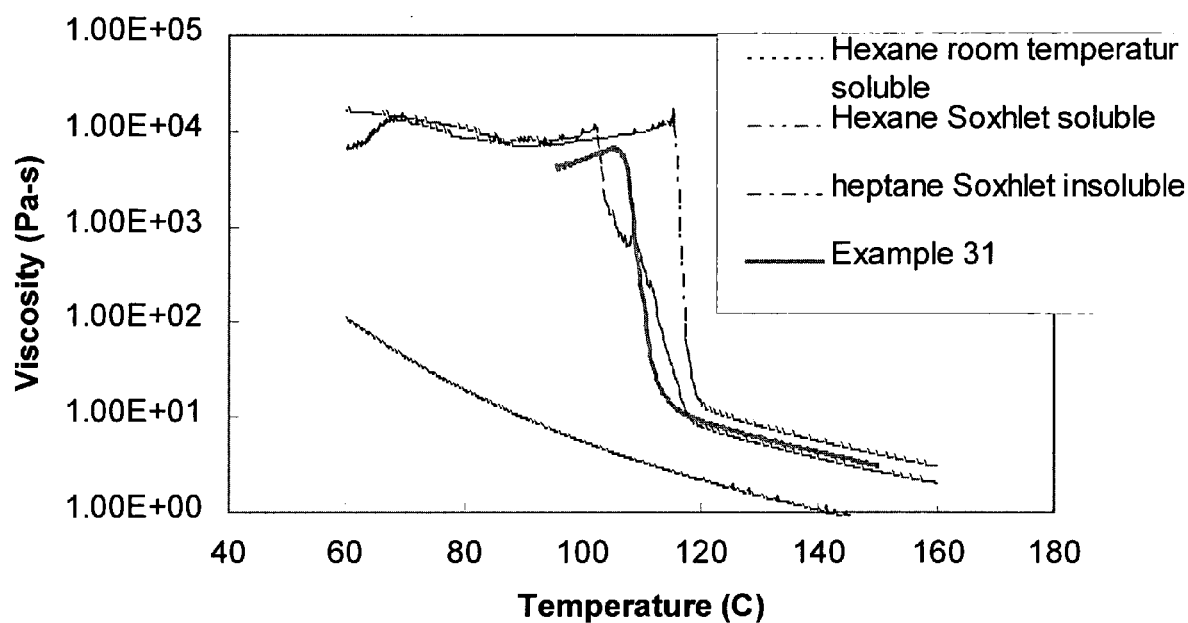
FIG. 5 shows the relationship between temperature and complex viscosity of the fractionated samples extracted from example 31.
Figure 6:
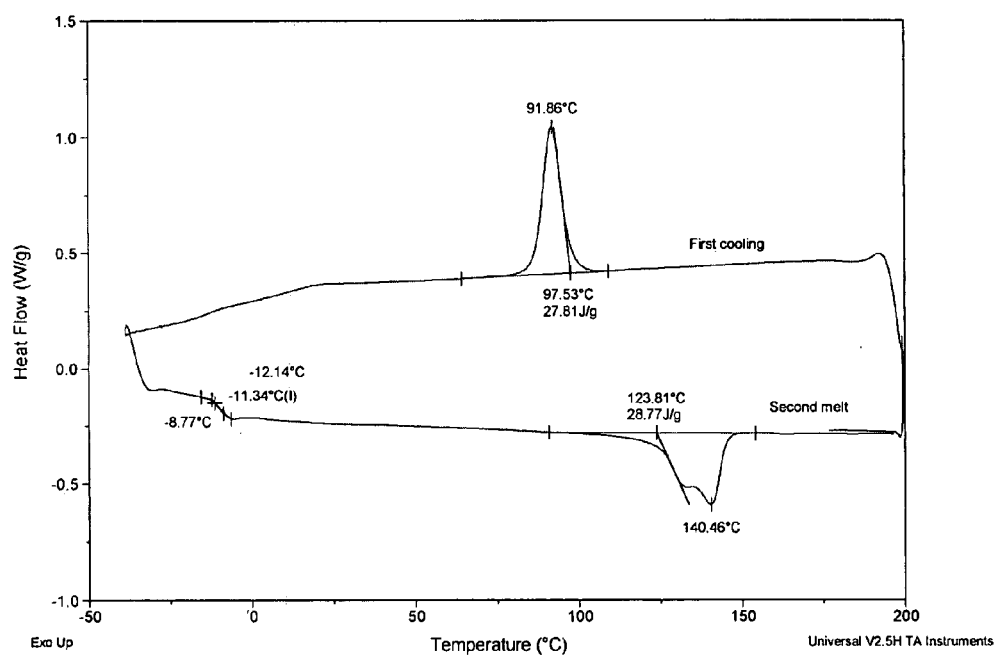
FIG. 6 is the DSC trace for polymer of example 32 in Table 6.

Samples described in Example 4 and Examples 31-34 were fractionated using solvent extraction. The results are presented in Table 16. Selected fractionated fractions were analyzed using GPC-DR1-VIS-LS and DSC. The results from these analyses are also presented in Table 17. The complex viscosity profiles of the fractionated fraction from sample described in Example 31 were measured over the temperature range of 80 to 130° C., are shown in FIG. 5.

The sample described in Example 4 and its fractions extracted from solvent extraction were analyzed using $^{13}C$ NMR.

Percent mm triad is measured directly from the C-13 NMR spectrum; it is assumed that the level of mm triad in the mixture depends only on the amounts of aPP and scPP ("atactic polypropylene and semi-crystalline polypropylene, respectively"') components in the sample. By knowing the tacticity (mm) level of the pure aPP and scPP components the proportion of each can be calculated that corresponds to the observed mm level in the mixture. The values shown below show the percentage of isotatic triads on a whole, unfractionated polymer as well as the three fractions. The calculated data are generated by using the assumption that the isotactic and atactic reference polymers are indicative of the tacticities that are in the blocky polymer segments. Using the methyl triad region it is calculated that the isotactic reference polymer has 94.7% mm and the atactic reference contains 13.6%.

| Sample | % mm | % Calculated Isotactic Polymer |
|---|---|---|
| Unfractionated Polymer | 68 | 66 |
| Hexane Soluble | 16 | around 2% |
| Heptane Soluble | 76 | 76 |
| Heptane Insoluble | 89 | 93 |

TABLE 16

| Samples | Example 31 | Example 33 | Example 32 | Example 34 |
|---|---|---|---|---|
| Hexane room temperature solubles, wt. % | 29.17 | 42.52 | 55.39 | 74.4 |
| Soxhlet hexane soluble, wt. % | 25.14 | 15.17 | 10.55 | 6.93 |
| Soxhlet heptane soluble, wt. % | 7.88 | 7.1 | 8.53 | 0.44 |
| Soxhlet heptane insoluble, wt. % | 35.32 | 35 | 25.15 | 17.8 |

TABLE 17

Example 4

| | Hexane room temperature solubles | Heptane soxhlet solubles | Heptane soxhlet insolubles | |
|---|---|---|---|---|
| Mn (kg/mol) | 6.6 | 10.3 | 16.5 | — |
| Mw (kg/mol) | 14.3 | 30.2 | 31.3 | — |
| Mz (kg/mol) | 32.2 | 58.5 | 53.2 | — |
| g' @ Mz | 1.16 | 0.86 | 0.87 | — |
| Tc (° C.) | — | 105.2 | 112.8 | — |
| Tm (° C.) | — | 138.2 | 145.2 | — |
| Tg (° C.) | −11.1 | — | — | — |
| Heat of fusion (J/g) | 0.0 | 68.6 | 108.9 | — |

Example 31

| | Hexane room temperature solubles | Soxhlet hexane solubles | Soxhlet heptane solubles | Soxhlet heptane insolubles |
|---|---|---|---|---|
| Mn (kg/mol) | 9.5 | 20.9 | 20.1 | 20.8 |
| Mw (kg/mol) | 12.7 | 48 | 56.3 | 47.4 |
| Mz (kg/mol) | 25 | 131.5 | 148.8 | 150.2 |
| g' @ Mz | 1.08 | 0.68 | 0.64 | 0.63 |
| Tc (° C.) | — | 93.3 | 101.4 | 105.2 |
| Tm (° C.) | — | 128.2 | 133.5 | 138.3 |
| Tg (° C.) | −11.8 | −8.3 | — | — |
| Heat of fusion (J/g) | 0.0 | 52.5 | 66.1 | 70.7 |

The viscosity of products of Examples 12, 22 and 49 were measured over a temperature range of 80 to 130° C. The complex viscosity profiles are shown in FIG. 1. These data demonstrate the three-zone characteristics described above.

Selected samples and their blends were tested for adhesive performance. The pure polymers were compounded with tackifiers, oil or wax and stabilizer to form hot melt adhesive blends. The properties of these polymers and their blends were tested against typical commercially available EVA blends from Henkel and Chief. The blending was carried out under low shear at elevated temperature to form fluid melts. The mixing temperatures vary from about 130 to 190° C.

Escorez™ 5637 is a hydrogenated aromatic modified resin produced from dicyclopentadiene feedstock, exhibiting a ring and ball softening point of 130° C. available from ExxonMobil Chemical Company in Houston, Tex.

Paraflint H-1 is a Fisher-Tropsch wax exhibiting a molten viscosity of 10 mPa sec at 250 F., available from Moore and Munger.

Aristowax 165 is a refined paraffin wax available from Frank B Ross Co in Jersey City N.J. It is isolated from petroleum and has a melt point of 158 to 165 F.

Henkel Hot Melt 80-8368 is a commercial hot melt made from a blend of EVA's, tackifiers, and wax available from Henkel Corp.

MAPP 40 is a maleic anhydridemodified polypropylene, having an acid number of 50, a viscosity of 300 cps at 190° C., a softening point of 149° C., available from Chusei, USA.

Chief Hot Melt 268 is a commercial hot melt made from EVA, tackifiers, and wax available from Chief Adhesives.

KAYDOL® is a highly refined white mineral oil that consists of saturated aliphatic and alicyclic non-polar hydrocarbons having a pour point of −20° C., having a kinematic viscosity of 64 to 70 cSt at 40° C., available from Witco.

Licomont AR 504 is a maleic anhydride grafted polypropylene wax having an acid number of 41, a viscosity of 373 mPas at 190° C., and a softening point of 156° C. available from Clarient.

AC 540 is an ethylene acrylic acid copolymer having an acid number of 40, a viscosity of 575 at 140° C. and a drop point of 105° C. available from Honeywell.

Polywax 2000 is a Polyethylene wax available from Baker Petrolite Plain BOPP (biaxially oriented polypropylene film) a 28 micron thick film was obtained from Mobil Films.

Corona treated BOPP (biaxially oriented polypropylene film) a 28 micron thick film was obtained from Mobil Films.

Paperboard 84A is gray Poster Board 20 pt chipboard with 20% recycle fiber available from Huckster packaging and supply, Inc. in Houston, Tex.

Paperboard 84B is generic poster board clay coated news print available from Huckster packaging and supply, Inc. in Houston, Tex.

Cardboard 84C is generic corrugated cardboard 200 # stock available from Huckster packaging and supply, Inc. in Houston, Tex.

| Tradename | Description | Source |
|---|---|---|
| Tackifiers | | |
| Escorez ® 1102RM | C5 tackifier | ExxonMobil Chemical Company |
| Escorez ® 2203 | is a low aromatic modified hydrocarbon resin having a | ExxonMobil Chemical Company |

-continued

| Tradename | Description | Source |
|---|---|---|
| | narrow molecular weight distribution produced from a feed of C5, C6 and C9 olefins and di-olefins, having a ring and ball softening point of about 95° C. | |
| Escorez ® 2393 | is a highly aromatic modified hydrocarbon resin produced from a feed of C5, C6 and C9 olefins and di-olefins, having a ring and ball softening point of about 93° C. | ExxonMobil Chemical Company |
| Escorez ® 2596 | is a low aromatic modified hydrocarbon resin having a broad molecular weight distribution produced from a feed of C5, C6 and C9 olefins and di-olefins, having a ring and ball softening point of about 96° C. | ExxonMobil Chemical Company |
| Escorez ® 5637 | is a hydrogenated aromatic modified resin produced from dicyclopentadiene feedstock, exhibiting a ring and ball softening point of 130° C. | ExxonMobil Chemical Company |
| Escorez ® 5690 | is a hydrogenated aromatic modified resin produced from dicyclopentadiene feedstock, exhibiting a ring and ball softening point of 130° C. | ExxonMobil Chemical Company |
| Oils | | |
| Primol 352 | Hydrogenated paraffinic oil | ExxonMobil Chemical Company |
| Primol 876 | Napthenic oils | ExxonMobil Chemical Company |
| Flexon 876 | Napthenic oils | ExxonMobil Chemical Company |
| Kadol oil | Refined white mineral oil | Witco |
| Polymers/Adhesives | | |
| Escorene UL 7720 | Is an ethylene vinylacetate copolymer, having about 29 weight % vinyl acetate and a melt index of 150 dg/min. | ExxonMobil Chemical Company |
| NSC Easymelt | Hot melt adhesive for non-woven applications. | National Starch, Bound Brook, NJ |
| Henkel Hot Melt 80-8368 | Commercial adhesive of EVA, tackifier, and wax | Henkel Corp |
| Chief Hot Melt 268 | Commercial adhesive of EVA, tackifier, and wax | Chief Adhesives |
| Advantra 9250 | Commercial adhesive of ethylene/octene-1 metallocene polymers, tackifiers, and wax | Fuller |
| Tite Bond Wood Glue | Water based adhesive | Home Depot, Houston Texas |
| Dap Glue | Solvent based wood glue | Home Depot, Houston Texas |
| Waxes | | |
| Aristowax 165 | Refined petroleum wax, melting temperature: 158-165° F. | Frank B Ross, Jersey City, NJ |
| AC 8 lot 500081EQ | Polyethylene wax | Honeywell, New Jersey |
| Paraflint H-1 | Fisher-Tropsch wax, 10 mPa @ 250° F. | Moore and Munger |
| AR-504 | Maleated PE wax acid number 41 and viscosity of 373 mPa @ 190° C. | Clarient |

-continued

| Tradename | Description | Source |
|---|---|---|
| AC-540 | Ethylene acrylic acid copolymer having an acid number of 40 and a viscosity of 575 cps @ 140° C. | Honeywell, New Jersey |
| Polywax 2000 | Polyethylene wax | Baker Petrolite |
| AC-1302P | Maleated polypropylene | Honeywell |
| P-C80 | Fischer Tropsch fractionated wax | Moore and Munger |
| MAPP-40 | Maleic modified polypropylene with acid number of 50, viscosity of 300 cps @ 190° C. | Chusei, Pasadena Texas |
| Antioxidants and other additives | | |
| Irganox 1010 | Phenolic antioxidant | Ciba-Geigy |
| Dolomite 16 mesh | sand | Supplied by Fordamin Company Ltd (UK) |
| Microcarb MC 50F | calcium carbonate | Supplied by Microfine Minerals Ltd (UK) |
| Glass beads of 3F type | Glass bead | Supplied by Sovitec SA (Belgium) |
| TiO2 Lot: TR92 | titanium dioxide | Supplied by Hunstman Tioxide Ltd (UK) |
| Test surfaces | | |
| Metallized acrylic coated | Metallized acrylic coated cardboard for cereal box | General Mills |
| Non-coated CB testliner | 1250 gr/m2 for vegetable trays | Kappa, Holland |
| Paperboard 84A | Gray poster 20 pt chipboard with 20% recycle content | Huckster Packaging and Supply, Houston, TX |
| Paperboard 84B | Generic posterboard clay coated newsprint | Huckster Packaging and Supply, Houston, TX |
| Paperboard 84C | Generic corrugated cardboard 200# stock | Huckster Packaging and Supply, Houston, TX |
| Inland Paper Board | High Performance box board | Inland Paper Board and Packaging Company of Rome |
| Black White Fabric | Printed stretch 100% Cotton with a Thread Count of 17 by 13 per square cm, a more loosely woven fabric | High Fashion Fabrics, Houston Texas |
| Formica | Tabs were made from standard sheet Formica | Lowe's Hardware, Houston Texas |
| Blue fabric | Tabs were made from Blue Stock 038C0TP 100% Cotton, Thread Count 21 by 45 per square cm with a weight of 0.022 grams per square cm, a tightly woven cotton fabric | High Fashion Fabrics, Houston Texas. |
| Catalog paper | Book paper bound by a hot melt process as determined from examination | Seton Catalog |
| NWC | Non-woven Coverstock, Paratherm PT 120/20 | Lohmann, Germany |
| PE | Polyethylene, White Opaque Micro-embossed CO/EX film (rubber treated inside), Reference #: CM001ARIE000757-C | Tacolin Ltd, UK |
| Polyester (PET) construct | Polyester construct | |
| BOPP | Bi-axially oriented polypropylene film, 28 micron | Mobil Films, Rochester, NY |
| Corona treated BOPP | Corona treated bi-axially oriented polypropylene film, 28 micron thick | Mobil Films, Rochester, NY |
| PP cast film construct | A cast film. | |

REXTAC RT 2730 is a copolymer of propylene, butene and ethylene having about 67.5 mole percent propylene, about 30.5 mole percent butene and about 2 mole percent ethylene produced by Huntsman, Company. The copolymer has about 15 mole percent BB dyads, 43 mole percent PB dyads and about 43 mole percent PP dyads. The melting point is 70° C. with a melting range from 25 to 116° C. the Tg is −25° C., the crystallinity is about 7 percent, the enthalpy is 10 J/g by DSC. The Mn is 8260 the Mw is 59100 and the Mz 187900 by GPC. Mw/Mn is 7.15.

REXTAC RT 2715 is a copolymer of propylene, butene and ethylene having about 67.5 mole percent propylene, about 30.5 mole percent butene and about 2 mole percent ethylene produced by Huntsman, Company. The copolymer has about 11 mole percent BB dyads, 40 mole percent PB dyads and about 49 mole percent PP dyads. The melting point is 76° C. with a melting range form 23 to 124° C. the Tg is −22° C., the crystallinity is about 7 percent, the enthalpy is 11 J/g by DSC. The Mn is 6630 the Mw is 51200 and the Mz 166,700 by GPC. Mw/Mn is 7.7.

All the adhesive formulations are in weight percent, unless otherwise noted in the compositions listed in Table 18 through Table 50.

TABLE 18

Applications Formulas (percent) and Performance Values

| | Formulation | | | | | |
|---|---|---|---|---|---|---|
| | A | B | C | D | E | F |
| Example 42 | 80 | | | | | |
| Escorez ™ 5637 | 7 | 7 | 13 | 10 | 10 | |
| Paraflint H-1 | 13 | 13 | 7 | 10 | | |
| Example 27 | | 80 | 80 | 80 | 80 | |
| Aristowax 165 | | | | | 10 | |

TABLE 18-continued

Applications Formulas (percent) and Performance Values

| | Formulation | | | | | |
|---|---|---|---|---|---|---|
| | A | B | C | D | E | F |
| Henkel Standard Hot Melt 80-8368 | | | | | | 100 |
| Viscosity at 190° C. (cps) | 1091 | 870 | 1152 | 1000 | 945 | 700 |
| SAFT, F (° C.) | 233 (112) | 253 (123) | 257 (125) | 253 (123) | 259 (126) | 182 (83) |
| Set Time (sec.) | 1.5 | 1.5 | 2 | 1 | 2.5 | 1 |
| Percent Substrate Fiber Tear | 0 | 80 | 95 | 10 | 100 | 100 |
| Low Temperature −12° C., File folder | | | | | | |

TABLE 19

Comparison of Blended aPP/scPP with branched aPP-g-scPP

| | Formulation | | | | | | |
|---|---|---|---|---|---|---|---|
| | A | B | C | D | E | F | G |
| Example 73 | 100 | | | 5 | | | |
| Example 74 | | 100 | | 39 | | | |
| Example 75 | | | 100 | 39 | | | |
| Example 29 | | | | | 82 | | |
| Irganox 1010 | | | | 1 | 1 | | |
| MAPP 40 | | | | 5 | 5 | | |
| Escorez ™ 5637 | | | | 7 | 5 | | |
| Paraflint H-1 | | | | 5 | 7 | | |
| Henkel Standard Hot Melt 80-8368 | | | | | | 100 | |
| Chief Standard Hot Melt 268 | | | | | | | 100 |
| Viscosity at 190° C. (cps) | 1132 | 2220 | 328 | 711 | 812 | 807 | 1055 |
| SAFT, F (° C.) | — | — | — | 263 (128) | 266 (130) | 173 (78) | 175 (79) |
| Set Time (sec.) | >6 | 6 | No Adhesion | 1.5-2.0 | 1.5 | 1 | 1.5 |
| Percent Substrate Fiber Tear Low Temperature −12° C., cardboard | 100 | 100 | 0 | 100 | 85 | 100 | 100 |
| Percent Substrate Fiber Tear Room Temperature 20-25° C., File Folder | 0 | 5 | 0 | 100 | 100 | 100 | 100 |

TABLE 20

Comparison of branched aPP-g-scPP with propylene/ethylene copolymers

| | Formulation | | | | | | | | | | |
|---|---|---|---|---|---|---|---|---|---|---|---|
| | A | B | C | D | E | F | G | H | I | J | K |
| Example 41 | 100 | 90 | 90 | | | | | | | | |
| Example 16 | | | | 100 | 90 | 90 | | | | | |
| C3/C2 | | | | | | | 100 | 90 | 90 | | |
| Escorez 5637 | | 7 | 3 | | 7 | 3 | | 7 | 3 | | |
| Paraflint H-1 | | 3 | 7 | | 3 | 7 | | 3 | 7 | | |
| Henkel Standard Hot Melt 80-8368 | | | | | | | | | | 100 | |
| Chief Standard Hot Melt 268 | | | | | | | | | | | 100 |
| SAFT, ° F. | 204 | 195 | 198 | 215 | 198 | 200 | 198 | 199 | 179 | 171 | 185 |
| Set Time (sec.) | 6 | 5 | 2 | >6 | 6 | 1.5 | 6 | 3 | >6 | 2 | 1 |
| Percent Substrate Fiber Tear Low Temperature −12° C., Filefolder | 0 | 100 | 0 | 100 | 100 | 0 | 100 | 60 | 0 | 100 | 100 |

The C3/C2 is a comparative example. The polymer was an ethylene/propylene copolymer with ethylene content of about 10 wt. %. This polymer was made using rac-dimethylsilyl bis(2-methyl-4-phenylindenyl)zirconium dimethyl at a polymerization temperature of 70° C., following the general procedure described above for example 1, except that only one catalyst was used. The polymer had a peak melting temperature of 95° C. and viscosity of 1368 cps at 190° C.

TABLE 21

Multiple Polymer and Oil Blends of branched aPP-g-scPP Polymer

| | Formulation | | | | | | | | | |
|---|---|---|---|---|---|---|---|---|---|---|
| | A | B | C | D | E | F | G | H | I | J |
| Example 26 | 74 | 69 | | | 78 | 72 | | | | |
| Example 25 | | | 74 | 69 | | | 78 | 72 | | |
| Example 23 | | | | | 5 | 9 | 5 | 9 | | |
| Irganox 1010 | 1 | 1 | 1 | 1 | 1< | 1< | 1< | 1< | | |
| Kaydol Oil | 10 | 10 | 10 | 10 | 5 | 9 | 5 | 9 | | |
| Escorez ™ 5637 | 10 | 10 | 10 | 10 | 7 | 6 | 7 | 6 | | |
| Paraflint H-1 | 5 | 10 | 5 | 10 | 5 | 4 | 5 | 4 | | |
| Henkel Standard Hot Melt 80-8368 | | | | | | | | | 100 | |
| Chief Standard Hot Melt 268 | | | | | | | | | | 100 |
| Viscosity, cps 190° C. | 315 | 120 | 525 | 445 | 358 | 262 | 888 | 724 | 1002 | 732 |
| SAFT, F (° C.) | | | | | | | | | | |
| Set Time (sec.) | 3 | 1.5 | 1.5 | 1 | 1.5 | 1.5 | 3 | 3 | 1.5 | 1.0 |
| Percent Substrate Fiber Tear Room Temperature 20-25° C., File Folder | 100 | 20 | 100 | 100 | 100 | 100 | 100 | 100 | 100 | 100 |
| Percent Substrate Fiber Tear Low Temperature 5° C., File folder | — | — | — | — | 100 | 100 | 100 | 100 | 100 | 100 |

TABLE 22

Comparison of Various formulations of branched aPP-g-scPP

| | Formulation | | | | | | | | |
|---|---|---|---|---|---|---|---|---|---|
| | A | B | C | D | E | F | G | H | I |
| Example 25 | 92.5 | 78.6 | 78.6 | | | | | | |
| Example 69 | | 5 | 5 | | | | | | |
| Example 29 | | | | 82 | 84.5 | 82 | 82 | | |

TABLE 22-continued

Comparison of Various formulations of branched aPP-g-scPP

| | Formulation | | | | | | | | |
|---|---|---|---|---|---|---|---|---|---|
| | A | B | C | D | E | F | G | H | I |
| Escorez ™ 5400 | | | | | | 5 | 7 | | |
| AR 504 | | 5 | | | | | | | |
| MAPP 40 | | | 5 | 5 | 2.5 | 5 | 5 | | |
| Irganox 1010 | .5 | .4 | .4 | 1 | 1 | 1 | 1 | | |
| Kaydol Oil | | 5 | 5 | | | | | | |
| Escorez(tm) 5637 | 2 | 1.7 | 1.7 | 5 | 5 | | | | |
| Paraflint H-1 | 5 | 4.3 | 4.3 | 7 | 7 | 7 | 5 | | |
| Henkel Standard Hot Melt 80-8368 | | | | | | | | 100 | |
| Chief Standard Hot Melt 268 | | | | | | | | | 100 |
| Viscosity at 190° C. (cps) | 790 | 695 | 688 | 688 | 758 | 750 | 830 | 834 | 1050 |
| SAFT, ° F. | 263 | >250 | >250 | 265 | 266 | 265 | 265 | 184 | 171 |
| Set Time (sec.) | 2.5 | 2 | 2 | 1.5 | 1.5 | 1.5 | 1.75 | 1 | 1.5 |
| Percent Substrate Fiber Tear Low Temperature −12° C., cardboard | 10 | 98 | 100 | 75 | 60 | 90 | 100 | 100 | 100 |
| Percent Substrate Fiber Tear Room Temperature 20-25° C., File Folder | 34 | 100 | 100 | 100 | 100 | 100 | 100 | 100 | 100 |

TABLE 23

Hard and soft aPP-g-scPP mixes with Escorez(tm) 5400

| | Formulation | | | | | | | | |
|---|---|---|---|---|---|---|---|---|---|
| | A | B | C | D | E | F | G | H | I |
| Example 28 | 9 | 9 | 9 | 9 | 9 | 9 | 9 | | |
| Example 17 | 78 | | | | | | | | |
| Example 40 | | 78 | | | | | | | |
| Example 21 | | | 78 | | | | | | |
| Example 20 | | | | 78 | | | | | |
| Example 67 | | | | | 78 | | | | |
| Example 25 | | | | | | 78 | | | |
| Example 26 | | | | | | | 78 | | |
| Irganox 1010 | 1 | 1 | 1 | 1 | 1 | 1 | 1 | | |
| Escorez ™ 5400 | 7 | 7 | 7 | 7 | 7 | 7 | 7 | | |
| Paraflint H-1 | 5 | 5 | 5 | 5 | 5 | 5 | 5 | | |
| Henkel Standard Hot Melt 80-8368 | | | | | | | | 100 | |
| Chief Standard Hot Melt 268 | | | | | | | | | 100 |
| Viscosity, cps 190° C. | 344 | 306 | 548 | 505 | 521 | 1185 | 404 | 783 | 1090 |
| SAFT, (° F.) | | | | | | | | | |
| Set Time (sec.) | 3 | 3.5 | 3.5 | 2.5 | 1.5 | >2 | 1.5 | 1 | 1.5 |
| Percent Substrate Fiber Tear Low Temperature 5° C., File Folder | 50 | 50 | 90 | 65 | 100 | 100 | 100 | 100 | 100 |
| Percent Substrate Fiber Tear Room Temperature 20-25° C., File Folder | 100 | 100 | 100 | 100 | 100 | 100 | 100 | 100 | 100 |
| Shore A Hardness | 74 | 77 | 54 | 63 | 76 | 76 | 76 | 80 | 85 |

There is no Table 24

TABLE 25

Comparison Various Wax Types with Two Polymer Types

| | Formulation | | | | | | | | | | |
|---|---|---|---|---|---|---|---|---|---|---|---|
| | A | B | C | D | E | F | G | H | I | J | K |
| Paraflint H-1 | 0 | 10 | 0 | 0 | 0 | 0 | 10 | 0 | 0 | | |
| Example 29 | 82 | 82 | 82 | 82 | 0 | 0 | 0 | 0 | 0 | | |
| Example 62 | | | | | 82 | 82 | 82 | 82 | 82 | | |
| Escorez™ 5637 | 7 | 7 | 7 | 7 | 7 | 7 | 7 | 7 | 7 | | |
| Irganox 1010 | 1 | 1 | 1 | 1 | 1 | 1 | 1 | 1 | 1 | | |
| AC 540 | | | | 10 | 10 | | | | 5 | | |
| Polywax 2000 | 10 | | | | | | | 10 | 5 | | |
| Licowax PP 230 | | | 10 | | | 10 | | | | | |
| Henkel Standard Hot Melt 80-8368 | | | | | | | | | | 100 | |
| Chief Standard Hot Melt 268 | | | | | | | | | | | 100 |
| Viscosity, cps 190° C. | 820 | 763 | 1140 | 1254 | 848 | 977 | 588 | 691 | 715 | 765 | 1131 |
| Set Time (sec.) | 0.5 | 1 | 4 | 2 | 1.5 | 4+ | 1 | 0.5 | 1 | 1 | 1.5 |
| Percent Substrate Fiber Tear Low Temperature −12° C., cardboard | 0 | 0 | 95 | 50 | 70 | 100 | 0 | 0 | 50 | 100 | 100 |
| Percent Substrate Fiber Tear Room Temperature 20-25° C., File Folder | 100 | 0 | 98 | 100 | 100 | 100 | 0 | 5 | 100 | 100 | 100 |

TABLE 26

Formulating Response of butene-1 modified aPP-g-scPP

| | Formulation | | | | |
|---|---|---|---|---|---|
| | A | B | C | D | E |
| Example 68 | 100 | | 93 | | |
| Example 70 | | 100 | | 93 | |
| Escorez™ 5637 | | | 2 | 2 | |
| Paraflint H-1 | | | 5 | 5 | |
| Henkel Standard Hot Melt 80-8368 | | | | | 100 |
| Viscosity @190° C. (cps) | 563 | 1100 | 485 | 1140 | 750 |
| Set Time (sec.) | 2.5 | >3 | 1.5 | 2 | 1 |
| Percent Substrate Fiber Tear Room Temperature 20-25° C., File Folder | 100 | 100 | 88 | 70 | 100 |

TABLE 27

Comparison of dicyclopentadiene modified aPP-g-scPP with and without diene

| | Formulation | | | | | |
|---|---|---|---|---|---|---|
| | A | B | C | D | E | F |
| Example 28 | 93 | 100 | 80 | | | |
| Example 71 | | | | 100 | 93 | |
| Escorez™ 5637 | 2 | | 20 | | 2 | |
| Paraflint H-1 | 5 | | | | 5 | |
| Henkel Standard Hot Melt 80-8368 | | | | | | 100 |
| Viscosity, cps 190° C. | 390 | 661 | 205 | 524 | 502 | — |
| Shore A Hardness | 22 | 34 | 45 | — | — | — |
| Set Time, sec | 3 | 4 | 2.5 | 3.5 | 2 | 1 |
| Percent Substrate Fiber Tear Room Temperature 20-25° C., File Folder | 50 | 80 | 90 | 80 | 90 | 90 |

TABLE 28

Comparison Various aPP-g-scPP Polymer and Adhesive Blends

| | Formulation | | | | | | | | | | |
|---|---|---|---|---|---|---|---|---|---|---|---|
| | A | B | C | D | E | F | G | H | I | J | K |
| Example 12 | 100 | 93 | | | | | | | | | |
| Example 24 | | | 100 | 93 | | | | | | | |

TABLE 28-continued

Comparison Various aPP-g-scPP Polymer and Adhesive Blends

| | Formulation | | | | | | | | | | |
|---|---|---|---|---|---|---|---|---|---|---|---|
| | A | B | C | D | E | F | G | H | I | J | K |
| Example 22 | | | | | 100 | 93 | 88 | | | | |
| Example 37 | | | | | | | | 100 | 93 | | |
| Escorez™ 5637 | | 2 | | 2 | | 2 | 4 | | 2 | | |
| Paraflint H-1 | | 5 | | 5 | | 5 | 8 | | 5 | | |
| Henkel Standard Hot Melt 80-8368 | | | | | | | | | | 100 | |
| Chief Standard Hot Melt 268 | | | | | | | | | | | 100 |
| Viscosity, cps 190° C. | 813 | 875 | 2240 | 1527 | 1240 | 950 | 797 | 568 | 497 | 730 | 1027 |
| Set Time, sec | 3 | 3 | 3 | 3 | 3.5 | 2.5 | 1.5 | 3.5 | 2.5 | 1 | 1.5 |
| Percent Substrate Fiber Tear Room Temperature 20-25° C., File Folder | 85 | 95 | 95 | 95 | 90 | 90 | 90 | 90 | 95 | 90 | 10 |

TABLE 29

Example Adhesive Testing on a Variety of Surfaces

| | Formulation | | | |
|---|---|---|---|---|
| | Blend of 78% example 29, 5% Licomont AR504, 7% Escorez 5637, 5% Paraflint H-1, 5% Kaydol oil. 1% Irganox 1010 was added to the blend | | Henkel 80-8368 Hot Melt | |
| Surface | Maximum average Force by Dot T-Peel Test, (Newtons\lbs) | Failure Type | Maximum average Force by Dot T-Peel Test (Newtons\lbs) | Failure Type |
| Cardboard 84C | 24.2\5.4 | Substrate Failure | 16.4\3.7 | Substrate Failure |
| BOPP Film (Corona Treated) | 19.2\4.3 | Cohesive Failure | 1.0\0.2 | Complex jerking |
| PP Film plain | 13.7\3.1 | Several Types | 1.0\0.2 | Complex jerking |
| Paperboard 84B | 6.0\1.3 | Substrate Failure | 5.3\1.2 | Substrate Failure |
| Paperboard 84A | 4.7\1.1 | Substrate Failure | 4.6\1.0 | Substrate Failure |
| Aluminum foil | 3.2\0.7 | Cohesive Failure | 1.3\0.3 | Cohesive Failure |

Example EX1-EX13

The following samples were made at a temperature range of 70 to 125° C., following the general procedure described above with the following exceptions: (1) a small quantity of 1,9-decadiene was fed as the diolefin monomer in Example EX1-EX3, EX5 and EX9; (2) ethylene was used in Example EX13-EX17. The detailed experimental conditions and results are presented in Tables 30, 31 and 32.

TABLE 30

| | Example | | | | | |
|---|---|---|---|---|---|---|
| | EX1 | EX2 | EX3 | EX4 | EX5 | EX6 |
| Catalyst #1 | A | A | A | A | A | G |
| Catalyst #1 feed rate (mole/min) | 5.22E−06 | 5.88E−06 | 6.10E−06 | 3.91E−06 | 1.82E−06 | 9.89E−07 |
| Catalyst #2 | B | E | B | C | B | C |
| Catalyst #2 feed rate (mole/min) | 7.65E−07 | 2.62E−06 | 2.83E−07 | 9.86E−07 | 9.45E−08 | 2.22E−07 |
| Propylene feed rate (g/min) | 14 | 14 | 14 | 14 | 14 | 14 |
| 1,9 decadiene feed rate (ml/min) | 0.09 | 0.10 | 0.19 | 0.00 | 0.01 | 0.00 |

TABLE 30-continued

| | Example | | | | | |
|---|---|---|---|---|---|---|
| | EX1 | EX2 | EX3 | EX4 | EX5 | EX6 |
| H2 (cc/min) | 0 | 0 | 30 | 0 | 0 | 0 |
| Hexane feed rate (ml/min) | 90 | 90 | 90 | 90 | 90 | 90 |
| Polymerization temperature (° C.) | 95 | 75 | 70 | 92 | 100 | 105 |
| Mn (kg/mol) | 28.1 | — | 15.8 | — | 33 | — |
| Mw (kg/mol) | 63 | — | 58.3 | — | 67.7 | — |
| Mz (kg/mol) | 168.3 | — | 203.7 | — | 136.4 | — |
| g' @ Mz | 0.81 | — | 0.78 | — | — | — |
| Tc (° C.) | 100.7 | 74.8 | 91.9 | 54.6 | 86.4 | 60.1 |
| Tm (° C.) | 146.1 | 113.8 | 148.9 | 103.0 | 149.4 | 102.9 |
| Tg (° C.) | −7.6 | −8.2 | −7.1 | −8.3 | −6.7 | −8.2 |
| Heat of fusion (J/g) | 36.5 | 27.8 | 19.3 | 23.9 | 12.5 | 35.8 |
| Viscosity @ 190° C. (cps) | 11200 | 4940 | 10100 | 2940 | 54870 | 5340 |

Catalysts
A = dimethylsilyl (tetramethylcyclopentadienyl) (cyclododecylamido) titanium dimethyl
B = rac-dimethylsilyl bis(2-methyl-4-phenylindenyl) zirconium dimethyl
C = rac-dimethylsilyl bis (indenyl) hafnium dimethyl
E = rac-dimethylsily bis(2-methylindenyl)zirconium dimethyl
G = di(p-triethylsilylphenyl)methylene](cyclopentadienyl)(3,8-di-t-butylfluorenyl)hafnium dimethyl

TABLE 31

| | Example | | | | | | |
|---|---|---|---|---|---|---|---|
| | EX7 | EX8 | EX9 | EX10 | EX11 | EX12 | EX13 |
| Catalyst #1 | G | G | G | G | G | G | G |
| Catalyst #1 feed rate (mole/min) | 1.65E−06 | 1.65E−06 | 1.77E−06 | 2.35E−06 | 1.65E−06 | 9.89E−07 | 1.77E−06 |
| Catalyst #2 | B | B | B | B | B | C | B |
| Catalyst #2 feed rate (mole/min) | 7.09E−08 | 4.72E−08 | 1.42E−07 | 5.74E−08 | 7.09E−08 | 3.70E−07 | 1.42E−07 |
| Propylene feed rate (g/min) | 14 | 14 | 14 | 14 | 14 | 14 | 14 |
| Ethylene feed rate (SLPM) | — | — | — | — | — | — | 0.2 |
| 1,9 decadiene feed rate (ml/min) | — | — | 0.02 | — | — | — | — |
| Hexane feed rate (ml/min) | 90 | 90 | 90 | 90 | 90 | 90 | 90 |
| Polymerization temperature (° C.) | 110 | 115 | 125 | 130 | 120 | 105 | 110 |
| Mn (kg/mol) | 22.5 | — | 17.7 | — | — | — | — |
| Mw (kg/mol) | 68.6 | — | 35.9 | — | — | — | — |
| Mz (kg/mol) | 132.4 | — | 67.8 | — | — | — | — |
| g' @ Mz | — | — | 0.82 | — | — | — | — |
| Tc (° C.) | 96.0 | 81.6 | 82.5 | 81.0 | 96.5 | 54.2 | 56.9 |
| Tm (° C.) | 147.9 | 142.6 | 124.9 | 134.1 | 144.7 | 94.5 | 113.5 |
| Tg (° C.) | −3.3 | −2.8 | −6.3 | −3.9 | −4.2 | −10.5 | −9.6 |
| Heat of fusion (J/g) | 40.7 | 15.2 | 37.2 | 17.1 | 40.0 | 32.7 | 21.7 |
| Viscosity @ 190° C. (cps) | 45400 | 47500 | 1180 | 8325 | 7957 | 1157 | 7975 |

Catalysts
B = rac-dimethylsilyl bis(2-methyl-4-phenylindenyl) zirconium dimethyl
C = rac-dimethylsilyl bis (indenyl) hafnium dimethyl
G = di(p-triethylsilylphenyl)methylene](cyclopentadienyl)(3,8-di-t-butylfluorenyl)hafnium dimethyl

TABLE 32

| | Example | | | |
|---|---|---|---|---|
| | EX14 | EX15 | EX16 | EX17 |
| Catalyst #1 | G | G | G | G |
| Catalyst #1 feed rate (mole/min) | 1.77E−06 | 1.77E−06 | 1.77E−06 | 1.77E−06 |
| Catalyst #2 | B | B | B | B |
| Catalyst #2 feed rate (mole/min) | 3.12E−07 | 3.12E−07 | 3.12E−07 | 3.12E−07 |
| Propylene feed rate (g/min) | 14 | 14 | 10 | 10 |

TABLE 32-continued

| | Example | | | |
|---|---|---|---|---|
| | EX14 | EX15 | EX16 | EX17 |
| Ethylene feed rate (SLPM) | 1.5 | 0.8 | 0.8 | 1.5 |
| Hexane feed rate (ml/min) | 90 | 90 | 90 | 90 |
| Polymerization temperature (° C.) | 80 | 80 | 105 | 105 |
| Mn (kg/mol) | | | | |
| Mw (kg/mol) | | | | |
| Mz (kg/mol) | | | | |
| g' @ Mz | | | | |
| Tc (° C.) | 28.7 | 58.0 | 19.1 | — |
| Tm (° C.) | 73.7 | 99.3 | 57.6 | −47.8 |
| Tg (° C.) | −26.3 | −19.4 | −26.8 | −19.5 |
| Heat of fusion (J/g) | 14.8 | 29.6 | 8.0 | 3.7 |
| Viscosity @ 190° C. (cps) | 23400 | 37120 | 495 | 481 |
| Ethylene content (mole %) | 16.9 | 10.7 | | |

Catalysts
B = rac-dimethylsilyl bis(2-methyl-4-phenylindenyl)zirconium dimethyl
G = di(p-triethylsilylphenyl)methylene](cyclopentadienyl)(3,8-di-t-butylfluorenyl)hafnium dimethyl Polymerization Conditions Propylene feed at the rate of 8 lb/hr was combined with hexane at 17 lb/hr to form 25 lb/hr of reactor feed solution. Tri-n-octyl aluminum (TNOA) as a 3 wt. % solution in hexane (obtained from Albemarle) was introduced into this stream at the rate of 0.0006 lb/hr.

Catalyst and activator entered the reactor from a separate port. The catalyst solution consisted of a mixture of di(p-triethylsilylphenyl)methylene](cyclopentadienyl)(3,8-di-t-butylfluorenyl)hafnium dimethyl (catalyst G) and rac-dimethylsilyl bis(2-methyl-4-phenylindenyl)zirconium dimethyl (catalyst B), with 97 molar % of catalyst G. The catalyst solution was prepared by dissolving the catalyst mixture in toluene to form a 0.5 wt % solution. The activator feed stream was made up of a 0.2 wt-% solution of N,N-dimethylanilinium tetrakis(pentafluorophenyl)borate in toluene. Both the catalysts and activator were obtained from Albemarle. The catalyst and activator feed lines were configured to mix in line immediately upstream of the reactor, with an estimated contact time of 2-4 minutes. The catalyst and activator feed rates were 0.04 g/hr and 0.1 g/hr respectively.

The reactor feed was converted to polymer through two continuous stirred tank reactors in series. The temperatures of both reactors were controlled at 135° C. The reactors were operated liquid full under 530 psig pressure. The residence time of the feed in each reactor was 45 minutes. Conversion of propylene to polymer product was about 91%.

Molten polymer was recovered from solution via two flash stages, each with a preheater. The first stage (20 psig) polymer contained about 2% solvent and the second stage (50 torr vacuum) incorporated about 800 ppm volatiles. Water was injected into the second stage flash (devolatilizer) feed to quench residual catalyst and aid with solvent stripping. The properties of the polymer and the finished adhesives are summarized in Table 33.

TABLE 33

| | Example # | | | | | | | |
|---|---|---|---|---|---|---|---|---|
| | PP1 | PP2 | PP3 | PP4 | PP5 | PP6 | PP7 | PP8 |
| Polymerization temperature (° C.) | 132 | 135 | 135 | 135 | 135 | 134 | 133 | 137 |
| Cat1 in catalyst blend (mol %) | 96 | 93 | 93 | 93 | 93 | 93 | 96 | 93 |
| Catalyst in reactor feed (wppm) | 3.20 | 4.17 | 4.17 | 4.17 | 4.17 | 4.17 | 4.17 | 3.8 |
| Propylene in reactor feed (wt %) | 28.00 | 29.17 | 29.17 | 29.17 | 29.17 | 28.0 | 28.0 | 30.0 |
| Scavenger (wppm) | 7.44 | 25 | 25 | 25 | 25 | 24 | 24 | 24 |
| Quench water (wt %) | 1.82 | 0.86 | 0.86 | 0.86 | 0.62 | 1.4 | 2.8 | 0 |
| Mn (kg/mol) | 18.3 | 17.1 | 13 | 16.7 | 12.3 | 11.4 | 17.3 | 18.5 |
| Mw (kg/mol) | 41.7 | 36.6 | 32.5 | 34.4 | 32.3 | 31.9 | 38.5 | 34.1 |
| Mz (kg/mol) | 76.4 | 68.1 | 61.9 | 61.7 | 64.6 | 61.6 | 71.4 | 69.6 |
| g' @ Mz | — | 0.83 | 0.85 | 0.83 | 0.81 | 0.83 | 0.94 | 0.89 |
| Tc (° C.) | 69.2 | 79.8 | 80.6 | 78.4 | 63.8 | 71.8 | 62.8 | 85 |
| Tm (° C.) | 131 | 134 | 136 | 137 | 130 | 132 | 137 | 136 |
| Heat of fusion (J/g) | 15.9 | 25.7 | 30.7 | 28.7 | 38 | 28.2 | 9.5 | 38.6 |
| Viscosity @ 190° C. (cps) | 2300 | 1992 | 1382 | 1527 | 1211 | 1340 | 4235 | 1270 |

Catalyst
B = rac-dimethylsilyl bis(2-methyl-4-phenylindenyl) zirconium dimethyl
G = di(p-triethylsilylphenyl)methylene](cyclopentadienyl)(3,8-di-t-butylfluorenyl)hafnium dimethyl All documents described herein are incorporated by reference herein, including any priority documents and/or testing procedures. As is apparent from the foregoing general description and the specific embodiments, while forms of the invention have been illustrated and described, various modifications can be made without departing from the spirit and scope of the invention. Accordingly, it is not intended that the invention be limited thereby.

We claim:

1. A branched olefin polymer prepared from a continuous process comprising the steps of:
   1) selecting a first catalyst component capable of producing a polymer having an Mw of 100,000 or less and a crystallinity of 5% or less under selected polymerization conditions;
   2) selecting a second catalyst component capable of producing polymer having an Mw of 100,000 or less and a crystallinity of 20% or more at the selected polymerization conditions;
   3) contacting the catalyst components in the presence of one or more activators with one or more C3 to C40 olefins;
   4) at a temperature of greater than 100° C.; and
   5) at a residence time of 120 minutes or less;
   6) wherein the ratio of the first catalyst to the second catalyst is from 1:1 to 50:1;
   7) wherein the activity of the catalyst components is at least 50 kilograms of polymer per gram of the catalyst compounds; and wherein at least 80% of the olefins are converted to polymer,
   wherein the polymer has the following properties:
   a) a Dot T-Peel of 1 Newton or more on Kraft paper;
   b) an Mw of 10,000 to 100,000;
   c) a branching index (g') of 0.4-0.98 measured at the Mz of the polymer when the polymer has an Mw of 10,000 to 60,000, or
   a branching index (g') of 0.4-0.95 measured at the Mz of the polymer when the polymer has an Mw of 10,000 to 100,000; and
   d) amorphous polymer segments and semi-crystalline polymer segments.

2. The polymer product of claim 1 where the polymer is a homopolypropylene or a copolymer of propylene and up to 5 mole % ethylene having:
   a) an isotactic run length of 1 to 30,
   b) a percent of r dyad of greater than 20%, and
   c) a heat of fusion of between 1 and 70 J/g.

3. The polymer product of claim 1 wherein the olefin comprises propylene.

4. The polymer product of claim 1 wherein the first catalyst component comprises a non-stereospecific metallocene catalyst compound.

5. The polymer product of claim 1 wherein the first catalyst component comprises a stereospecific metallocene catalyst compound.

6. The polymer product of claim 1 wherein the second catalyst component comprises a stereospecific metallocene catalyst compound.

7. The polymer product of claim 1 wherein the second catalyst component comprises one or more of the racemic versions of:
   dimethylsilyl(2-methyl-4-phenylindenyl)zirconium dichloride, dimethylsilyl(2-methyl-4-phenylindenyl) zirconium dimethyl, dimethylsilyl(2-methyl-4-phenylindenyl)hafnium dichloride, dimethylsilyl(2-methyl-4-phenylindenyl)hafnium dimethyl, dimethylsilylbis(indenyl)hafnium dimethyl, dimethylsilylbis(indenyl)hafnium dichloride, dimethylsilylbis(indenyl)ziconium dimethyl, dimethylsilylbis(indenyl)zirconium dichloride,
   the racemic isomers of:
   dimethylsilanediylbis(2-methylindenyl)metal dichloride; dimethylsilanediylbis(indenyl)metal dichloride; dimethylsilanediylbis(indenyl)metal dimethyl; dimethylsilanediylbis(tetrahydroindenyl)metal dichloride; dimethylsilanediylbis(tetrahydroindenyl)metal dimethyl; dimethylsilanediylbis(indenyl)metal diethyl; and dibenzylsilanediylbis(indenyl)metal dimethyl;
   wherein the metal is chosen from Zr, Hf, or Ti.

8. The polymer product of claim 1 wherein the activator comprises an alumoxane.

9. The polymer product of claim 1 wherein the activator comprises an ionizing compound.

10. The polymer product of claim 1 wherein the activator comprises a non-coordinating anion.

11. The polymer product of claim 1 wherein the first catalyst component is capable of polymerizing macromonomers having reactive termini; and the second component is capable of producing macromonomers having reactive tennini.

12. The polymer product of claim 1 wherein the monomers comprise propylene and butene.

13. The polymer product of claim 1 further comprising contacting the catalyst components in the presence of one or more activators with a diolefin.

14. The polymer product of claim 13 wherein the diolefin comprises one or more C4 to C40 diolefins.

15. The polymer product of claim 13 wherein the diolefin is selected from the group consisting of 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, cyclopentadiene, vinylnorbornene, norbornadiene, ethylidene norbornene, divinylbenzene, dicyclopentadiene, polybutadiones having an Mw less than 1000 g/mol, and combinations thereof.

16. The polymer product of claim 1 further comprising contacting the catalyst components in the presence of one or more activators with one or more dienes selected from the group consisting of 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, cyclopentadiene, vinylnorbornene, norbornadiene, ethylidene norbornene, divinylbenzene, dicyclopentadiene, polybutadienes having an Mw less than 1000 g/mol, and combinations thereof.

17. The polymer product of claim 1 wherein the reaction zone is a gas phase reactor.

18. The polymer product of claim 1 wherein the reaction zone is a solution phase reactor.

19. The polymer product of claim 1 wherein the reaction zone is a slurry phase reactor.

20. The polymer product of claim 1 wherein the olefin comprises propylene and the reaction zone is a solution phase reactor.

* * * * *